(12) United States Patent
Tadayon et al.

(10) Patent No.: US 8,449,255 B2
(45) Date of Patent: May 28, 2013

(54) WIND TURBINE BLADE SYSTEM WITH AIR PASSAGEWAY

(75) Inventors: Saied Tadayon, Potomac, MD (US); Bijan Tadayon, Potomac, MD (US); David Martin, Potomac, MD (US)

(73) Assignee: BTPatent LLC, Potomac, MD (US)

( * ) Notice: Subject to any disclaimer, the term of this patent is extended or adjusted under 35 U.S.C. 154(b) by 616 days.

(21) Appl. No.: 12/728,226

(22) Filed: Mar. 21, 2010

(65) Prior Publication Data

US 2011/0229322 A1    Sep. 22, 2011

(51) Int. Cl.
F03D 7/04    (2006.01)

(52) U.S. Cl.
USPC ............................ 416/37; 416/23; 416/90 R

(58) Field of Classification Search
USPC .................. 416/90 R, 91, 92, 90 A, 93 R, 94, 416/23, 37
See application file for complete search history.

(56) References Cited

U.S. PATENT DOCUMENTS

| | | | |
|---|---|---|---|
| 3,144,220 A * | 8/1964 | Kittelson ...................... 244/203 |
| 4,360,315 A | 11/1982 | Olson | |
| 5,540,406 A | 7/1996 | Occhipinti | |
| 5,669,758 A | 9/1997 | Williamson | |
| 6,109,566 A | 8/2000 | Miller et al. | |
| 6,378,807 B1 * | 4/2002 | Tomioka ................... 244/134 R |
| 6,471,477 B2 | 10/2002 | Hassan et al. | |
| 6,492,743 B1 * | 12/2002 | Appa ............................... 290/55 |
| 6,543,719 B1 | 4/2003 | Hassan et al. | |
| 6,629,674 B1 * | 10/2003 | Saddoughi et al. ........... 244/207 |
| 6,722,581 B2 | 4/2004 | Saddoughi | |
| 6,940,185 B2 * | 9/2005 | Andersen et al. ............... 290/44 |
| 7,143,983 B2 | 12/2006 | McClure | |
| 7,198,234 B2 | 4/2007 | Saddoughi | |
| 7,264,444 B2 * | 9/2007 | Dunn .......................... 416/97 R |
| 7,290,738 B1 | 11/2007 | Rogers et al. | |
| 7,344,353 B2 | 3/2008 | Naskali et al. | |
| 7,354,247 B2 * | 4/2008 | Bonnet ....................... 416/90 R |
| 7,387,491 B2 * | 6/2008 | Saddoughi et al. ............. 416/62 |
| 7,422,051 B2 | 9/2008 | Sinha | |
| 2002/0179777 A1 * | 12/2002 | Al-Garni et al. .............. 244/206 |
| 2005/0242233 A1 * | 11/2005 | Battisti ............................ 244/58 |
| 2008/0023589 A1 * | 1/2008 | Miles et al. .................... 244/205 |
| 2008/0042013 A1 * | 2/2008 | Shmilovich et al. ........ 244/199.4 |
| 2008/0317598 A1 * | 12/2008 | Barbu et al. ....................... 416/9 |
| 2009/0104039 A1 | 4/2009 | Vettese | |

FOREIGN PATENT DOCUMENTS

GB    2186033 A  *  1/1987
WO    WO 2007/007108 A1  *  1/2007

* cited by examiner

*Primary Examiner* — Nathaniel Wiehe
*Assistant Examiner* — Joshua R Beebe
(74) *Attorney, Agent, or Firm* — Bijan Tadayon; Saied Tadayon

(57) ABSTRACT

In this presentation, we study various aspects of the wind turbines or wind mills. We optimize the performances of both a single wind turbine and a wind farm, collectively. We study the nozzles on the blades and all the variations and accessories for the operation of a nozzle. We also explore flow patterns around the blades, the mechanisms to get air or other gasses to the blades, the couplers for the electrical connections and the gas connections, and the gaps, holes, channels, conduits, or openings on the body or structure of a tower. We also present various mathematical models and formulations for optimizations.

12 Claims, 111 Drawing Sheets

Spoiler plates on tower

Top view of tower cross section

Top view of tower cross section

Bearing example between blade pieces

Bearing ring example between blade pieces

Bearing sub-ring example between blade pieces having four stubs for top piece:

Example of 4-terminal Liquid Sensor:

Liquid Sensor in blades:

Examples of variation on number of electrodes per terminal
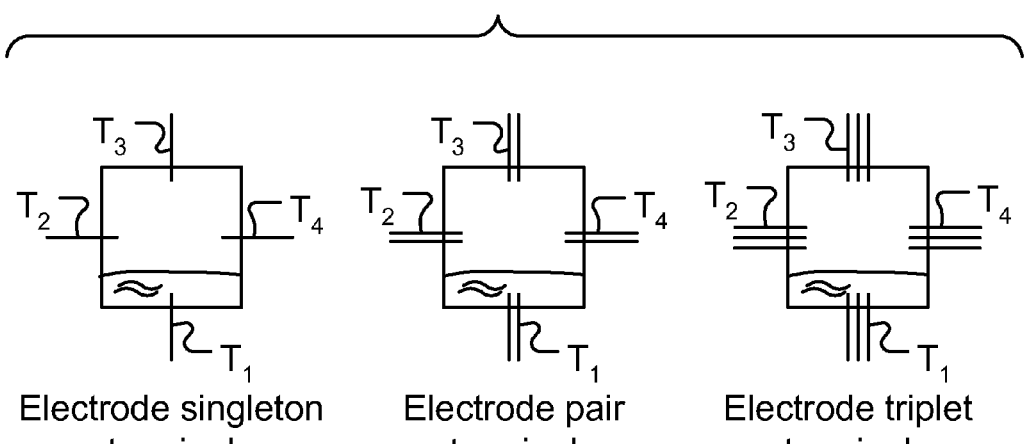
Electrode singleton terminal
FIG 75(a)
Electrode pair terminal
FIG 75(b)
Electrode triplet terminal
FIG 75(c)
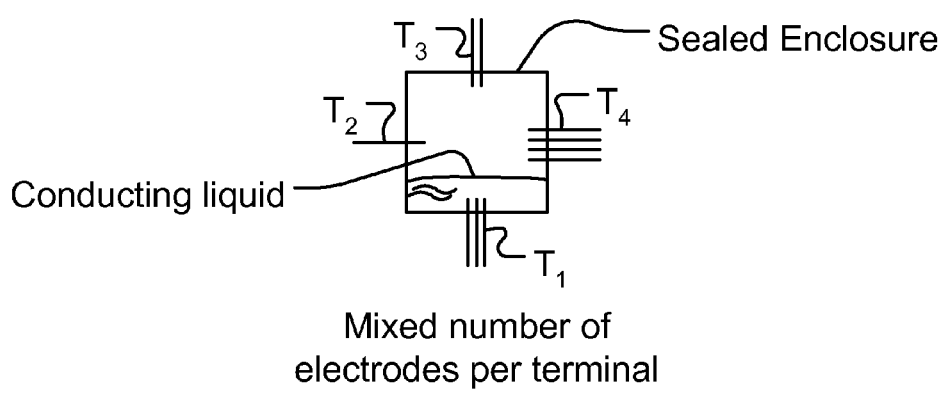
Mixed number of electrodes per terminal
FIG 75(d)

Examples of variation on cross section shape for liquid sensor

Triangular cross section

Square cross section

Rectangular cross section

Capsule cross section

Elliptical cross section

Circular cross section

Examples of variation on cross section shape for liquid sensor
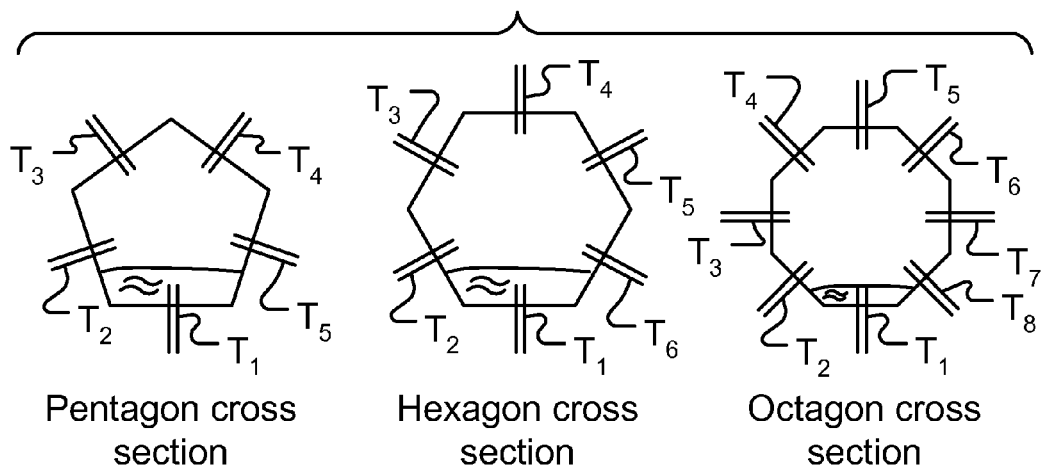
Pentagon cross section
FIG 76(g)
Hexagon cross section
FIG 76(h)
Octagon cross section
FIG 76(i)
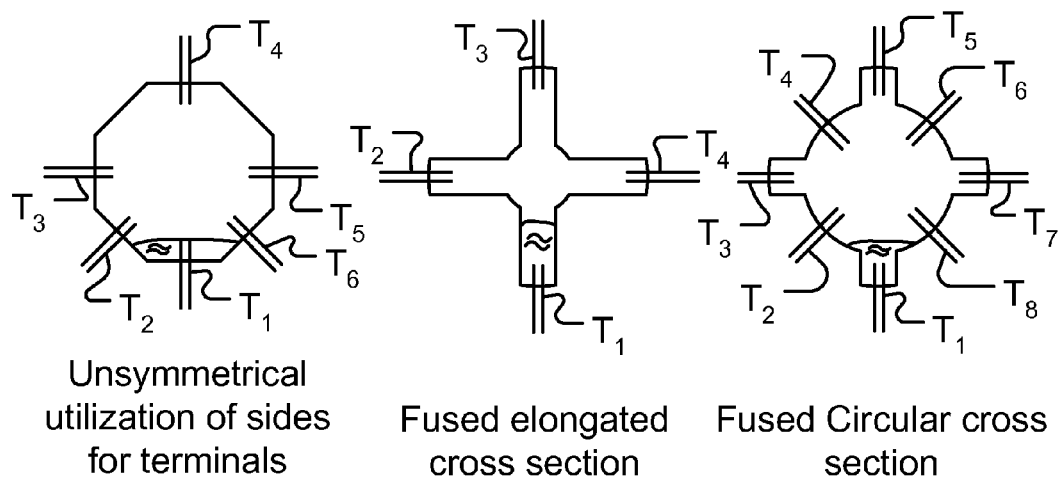
Unsymmetrical utilization of sides for terminals
FIG 76(j)
Fused elongated cross section
FIG 76(k)
Fused Circular cross section
FIG 76(l)

Examples of variation on cross section shape for liquid sensor
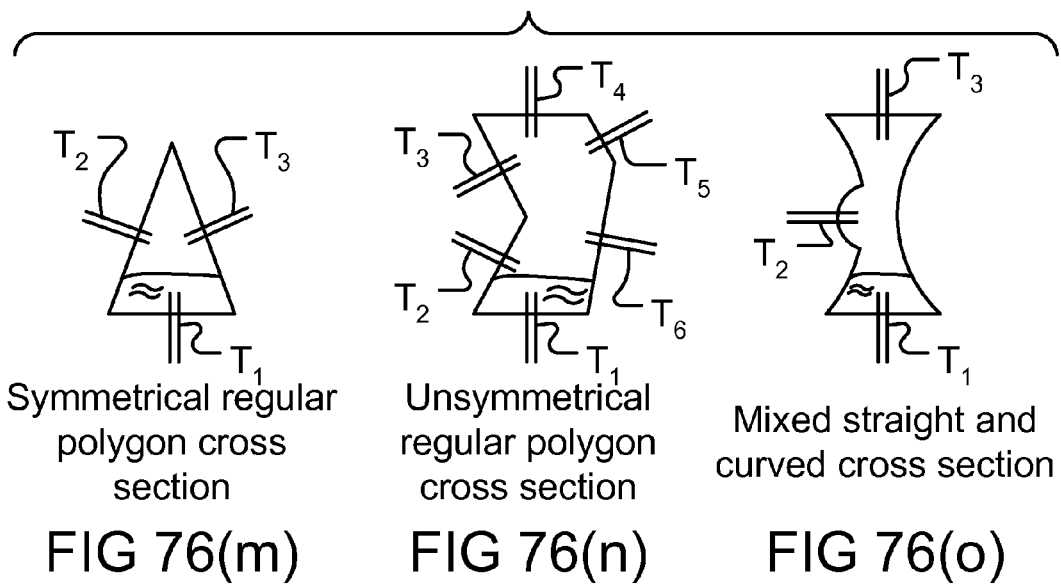
Symmetrical regular polygon cross section
FIG 76(m)
Unsymmetrical regular polygon cross section
FIG 76(n)
Mixed straight and curved cross section
FIG 76(o)
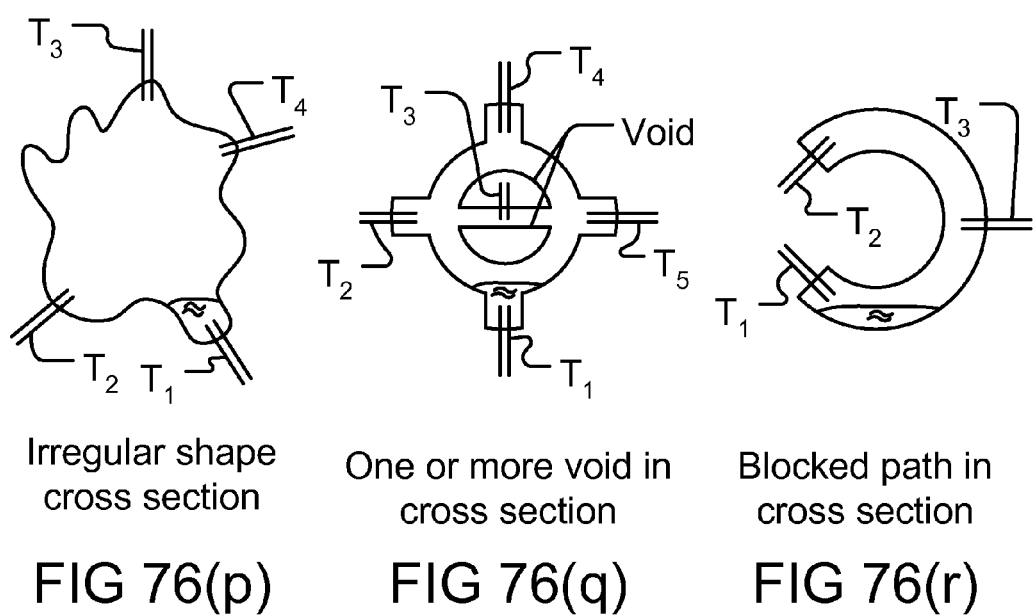
Irregular shape cross section
FIG 76(p)
One or more void in cross section
FIG 76(q)
Blocked path in cross section
FIG 76(r)

Examples of variation on position of electrodes with respect to cross section of liquid sensor Electrodes at middle of sides Electrodes close to corners/vertices Electrodes at corners Mixed location for electrodes Asymmetric distribution of electrode locations None, one, or more electrodes on each side Examples of variation on the amount of conducting liquid in liquid sensor

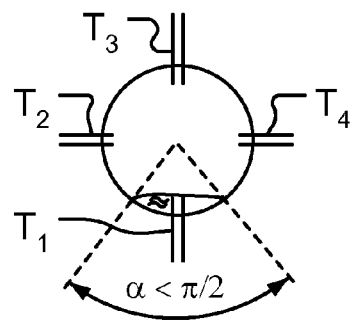

Low conducting liquid level

Example as shown:
$T_1$ : ON
$T_2, T_3, T_4$ : OFF

Sensor rotated 45°CW:
$T_1, T_2, T_3, T_4$ : OFF

FIG 78(a)

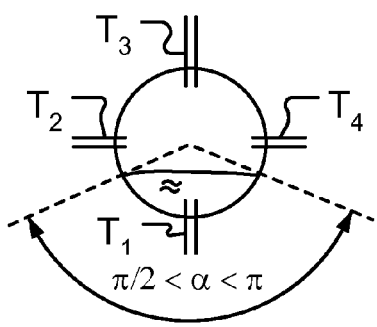

Medium conducting liquid level

Example as shown:
$T_1$ : ON
$T_2, T_3, T_4$ : OFF

Sensor rotated 45°CW:
$T_1, T_4$ : ON
$T_2, T_3$ : OFF

FIG 78(b)

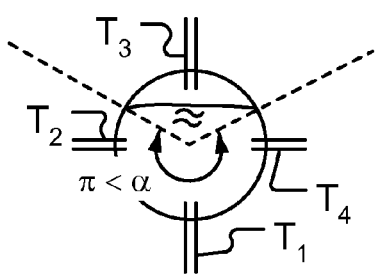

High conducting liquid level

Example as shown:
$T_1, T_2, T_3$ : ON
$T_4$ : OFF

Sensor rotated 45°CW:
$T_1, T_4$ : ON
$T_2, T_3$ : OFF

FIG 78(c)

Examples of sensor status based on variation on the amount of conducting liquid in liquid sensor

Examples of sensor status based on sensor rotation speed ω

Examples of sensor status based on sensor rotation speed ω

Examples of sensor status based on sensor rotation speed ω

Examples of variation in elongation for liquid sensor

Cubic or rectangular cubic shape

Spherical or Elliptical shape

Cylindrical shape

Examples of variation in electrode shape for liquid sensor

Wire type electrode

Patch type electrodes

Plate type electrodes

Plate edge type electrodes

Examples of variation in multiple
liquids for liquid sensor

Conducting and non-conducting liquids

Multiple conducting liquids with different conductance

Liquid mixture separating at high $\omega$ By $f_{centrifugal}$
($T_1$ pointing toward blade)

Examples of variation in configuration of multiple liquid sensor

Multiple sensors at relative angular offset

Mixed use of electrodes from terminals

WIND TURBINE BLADE SYSTEM WITH AIR PASSAGEWAY

BACKGROUND

The prior art dealing with using a flexible composite surface for pressure-drop free heat transfer enhancement and flow drag reduction is Sinha (U.S. Pat. No. 7,422,051). Hassan et al (U.S. Pat. No. 6,543,719) deals with oscillating air jets for implementing blade variable twist, enhancing engine and blade efficiency, and reducing drag, vibration, download, and IR signature. Hassan et al (U.S. Pat. No. 6,471,477) deals with jet actuators for aerodynamic surfaces. Miller et al (U.S. Pat. No. 6,109,566) teaches vibration-driven acoustic jet controlling boundary layer separation. Dunn (U.S. Pat. No. 7,264,444) teaches aerofoils with passage outlet. Rogers et al (U.S. Pat. No. 7,290,738) teaches dual jet emerging lift augmentation system for airfoils and hydrofoils. Saddoughi (U.S. Pat. No. 6,722,581) teaches synthetic jet actuators, with piezoelectric plates. Saddoughi et al (U.S. Pat. No. 7,387,491), from GE Corporation, teaches active flow modifications on wind turbine blades, with Disruptive and Along directions. Saddoughi (U.S. Pat. No. 7,198,234) teaches modulating flow separation. Miles et al (US 2008/0023589) teaches controlling flow with electrical pulses. McClure (U.S. Pat. No. 7,143,983) teaches passive jet spoiler for YAW control of an aircraft. Al-Garni et al (US 2002/0179777) teaches movable surface plane.

In addition, Dimpletape, available from (and described in) www.dimpletape.com, is a clear perforated polyurethane tape, applied to the wings of airplanes. Naskali et al (U.S. Pat. No. 7,344,353) teaches helical wind turbines, with dimples. Olson (U.S. Pat. No. 4,360,315) teaches vortex wind turbine. Vettese (US 2009/0104039) teaches curved blade for wind turbine, with dimples. Occhipinti (U.S. Pat. No. 5,540,406) teaches hydrofoils and airfoils, with veneer, plus strip or tape. Williamson (U.S. Pat. No. 5,669,758) teaches wind turbine, with dimples.

However, none of the prior art (including the ones mentioned above) teaches the features of current invention, as described below.

SUMMARY

In this invention, we teach various aspects of the wind turbines or wind mills. We optimize the performances of both a single wind turbine and a wind farm, collectively. We teach the nozzles on the blades and all the variations and accessories for the operation of a nozzle. We also teach flow patterns around the blades, the mechanisms to get air or other gasses to the blades, the couplers for the electrical connections and the gas connections, and the gaps, holes, channels, conduits, or openings on the body or structure of a tower. We also present various mathematical models and formulations.

In one embodiment, the first nozzle and the second nozzle (or more nozzles) are connected, through the blade, tower, or pipes, for one or multiple blades, as in FIG. 8. In one embodiment, the first nozzle and the second nozzle are on the opposite sides of a blade, as in FIG. 8. In one embodiment, the first nozzle and the second nozzle are on the same side of a blade, as in FIG. 8. In one embodiment, the nozzles are connected to a valve, manifold, cap, cover, diaphragm, plate, shutter, or regulator, as in FIG. 8.

In one embodiment, the nozzles or openings are cone shaped, spiral shaped, telescopic structure, retractable, line source, point source, circular shaped, spherical shaped, cylindrical shaped, rectangular shaped, or square shaped, as in FIGS. 36, 37, 71, and 1-6.

In one embodiment, the nozzles or openings are connected to air outside or inside of tower or one or more blades, through one or more pipes, conduits, or gaps, as in FIG. 8.

The wind turbine or wind mill comprises one or more of the following, in our different embodiments: a rotor (which comprises one or more blades and a hub), a tower, a shaft, a pitch adjuster (placed in 916 in FIG. 9(*b*), at the end of blades 914), low speed shaft or axis, gear box, generator, anemometer (placed at the end of 912, or any other place, e.g. on tower or on the ground), wind vane (placed at the end of 912, or any other place, e.g. on tower or on the ground), nacelle, high speed shaft, yaw drive (placed between 934 and 910), yaw motor (placed under yaw drive), one or more brakes, and one or more batteries for storage (placed anywhere in blades, tower, or outside tower, on the ground), as in FIG. 9.

The nacelle or hub can also include a fan, for cooling down or air circulation or other purposes (which can act as a source of the air for nozzles or other places in the system or tower), in one embodiment, with its energy coming/supplied from internal (wind turbine mechanical or electrical parts, such as shaft, gear, flywheel, generator, battery, capacitor, or similar parts) or external sources, e.g. from outside, grid, battery, or a small generator.

BRIEF DESCRIPTION OF THE DRAWINGS

FIG. 1(*b*) shows the blade or airfoil, with nozzle, top view, for an embodiment of our invention.

FIGS. 75(a)-(d) show liquid sensor, with various configurations, for an embodiment of our invention.

FIGS. 78(a)-(f) show liquid sensor, with various configurations, with corresponding terminals, e.g. $T_1$, $T_2$, $T_3$, and $T_4$, and corresponding signals, for calibration, for an embodiment of our invention.

DETAILED DESCRIPTION OF THE PREFERRED EMBODIMENTS

Figure 33:
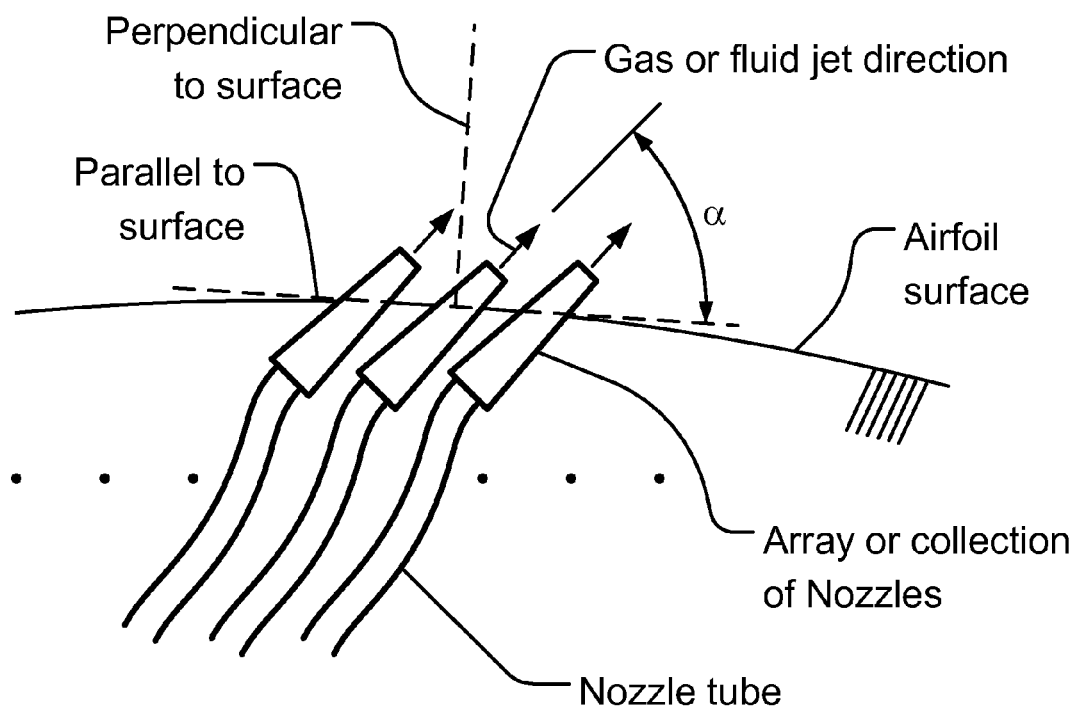
FIG. 33 shows a parallel array of nozzles, for an embodiment of our invention.
Figure 34:
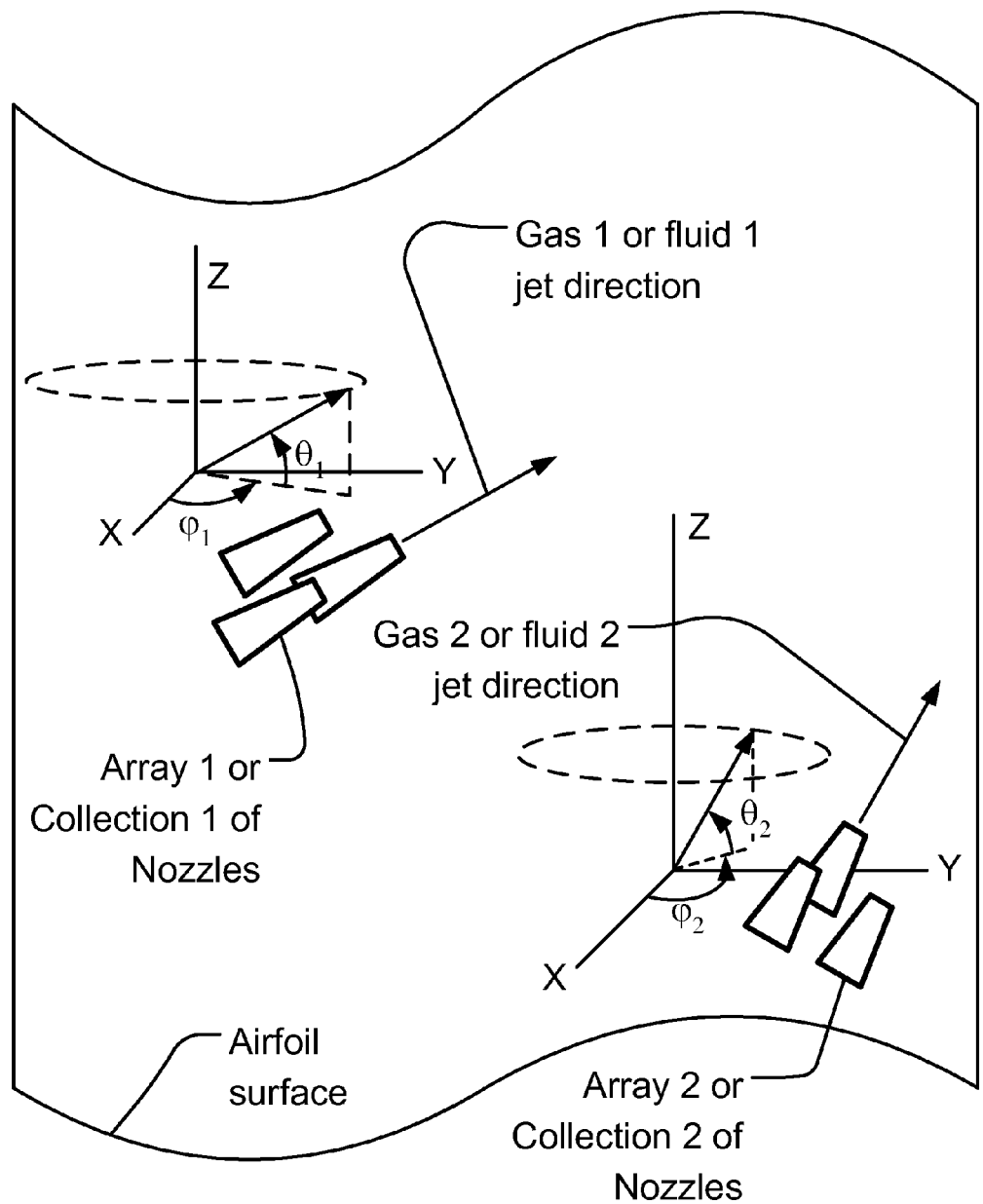
FIG. 34 shows multiple nozzles, at different directions, on a blade or airfoil, for an embodiment of our invention.

In one embodiment of the invention, the array(s) of nozzles or jets are used. In one embodiment, different jets can be parallel, as shown in FIG. 33. In one embodiment, different jets are at different directions, or at different angles coming out, with respect to the 3-dimensional planes, in Cartesian, polar, or cylindrical coordinates, as different embodiments, e.g. as shown in FIG. 34.

Figure 32:
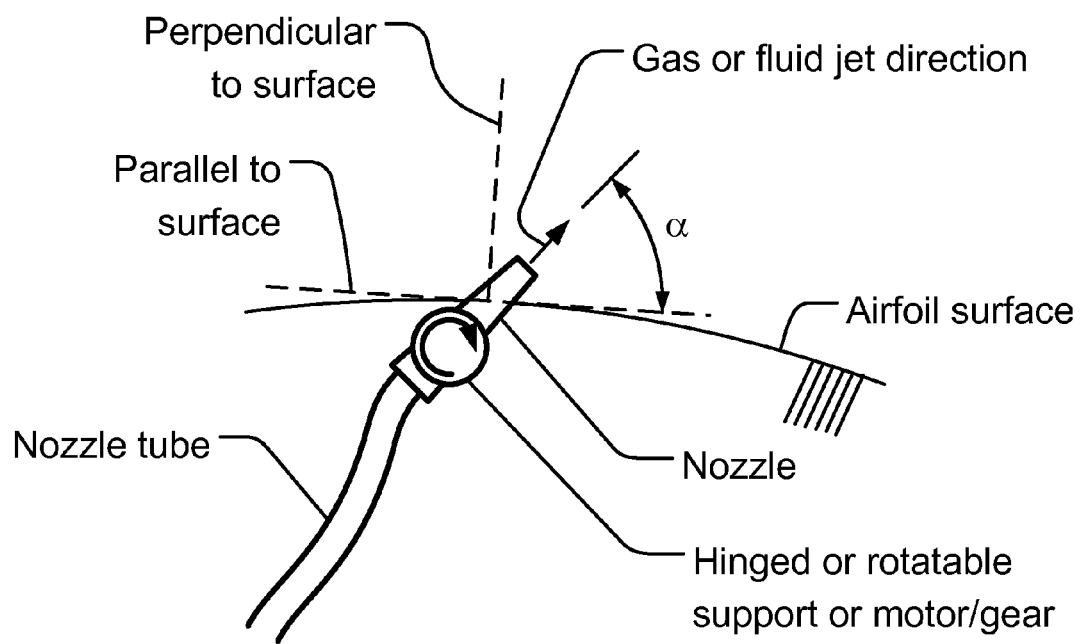
FIG. 32 shows a rotatable nozzle, for an embodiment of our invention.

In one embodiment, the nozzle is set on a hinge, pulley, ball, or sphere, so that by adjusting the hinge, pulley, ball, or sphere, as different embodiments, the angle or direction of the nozzle can be adjusted, as shown in FIG. 32.

Figure 36:
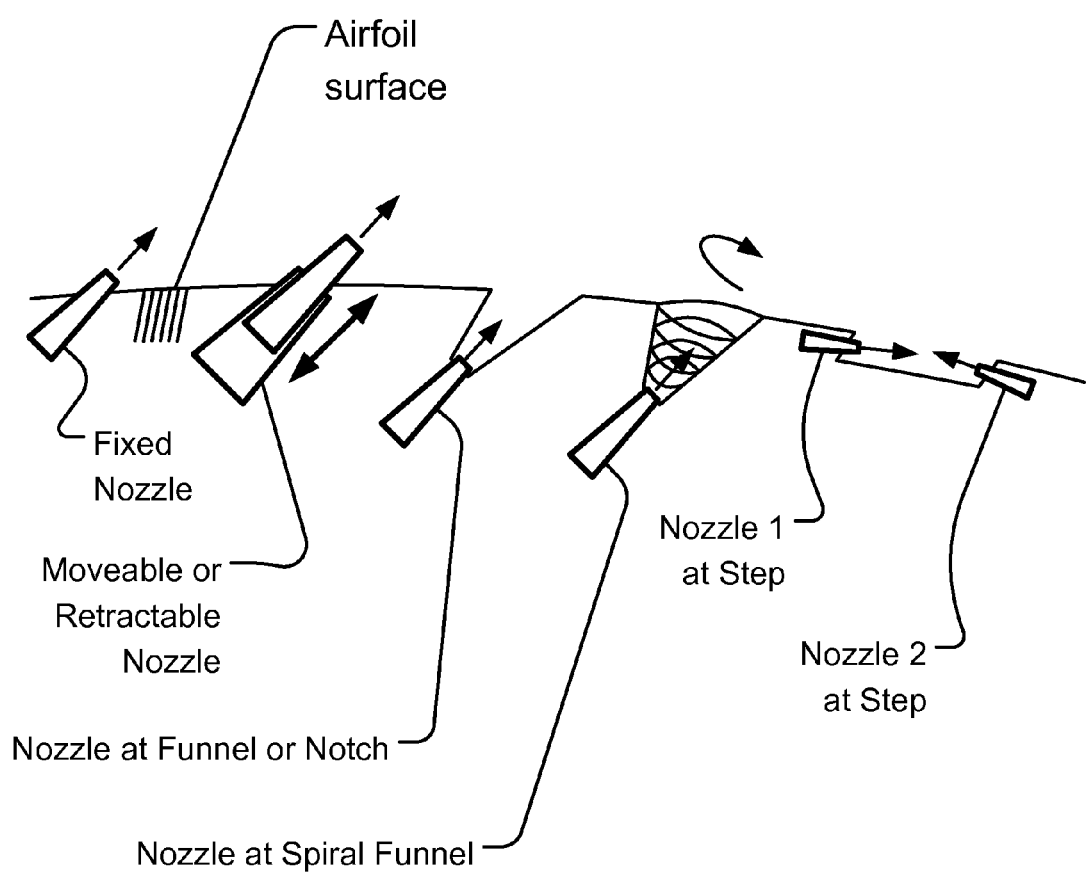
FIG. 36 shows different types of nozzles, for an embodiment of our invention.
Figure 37:
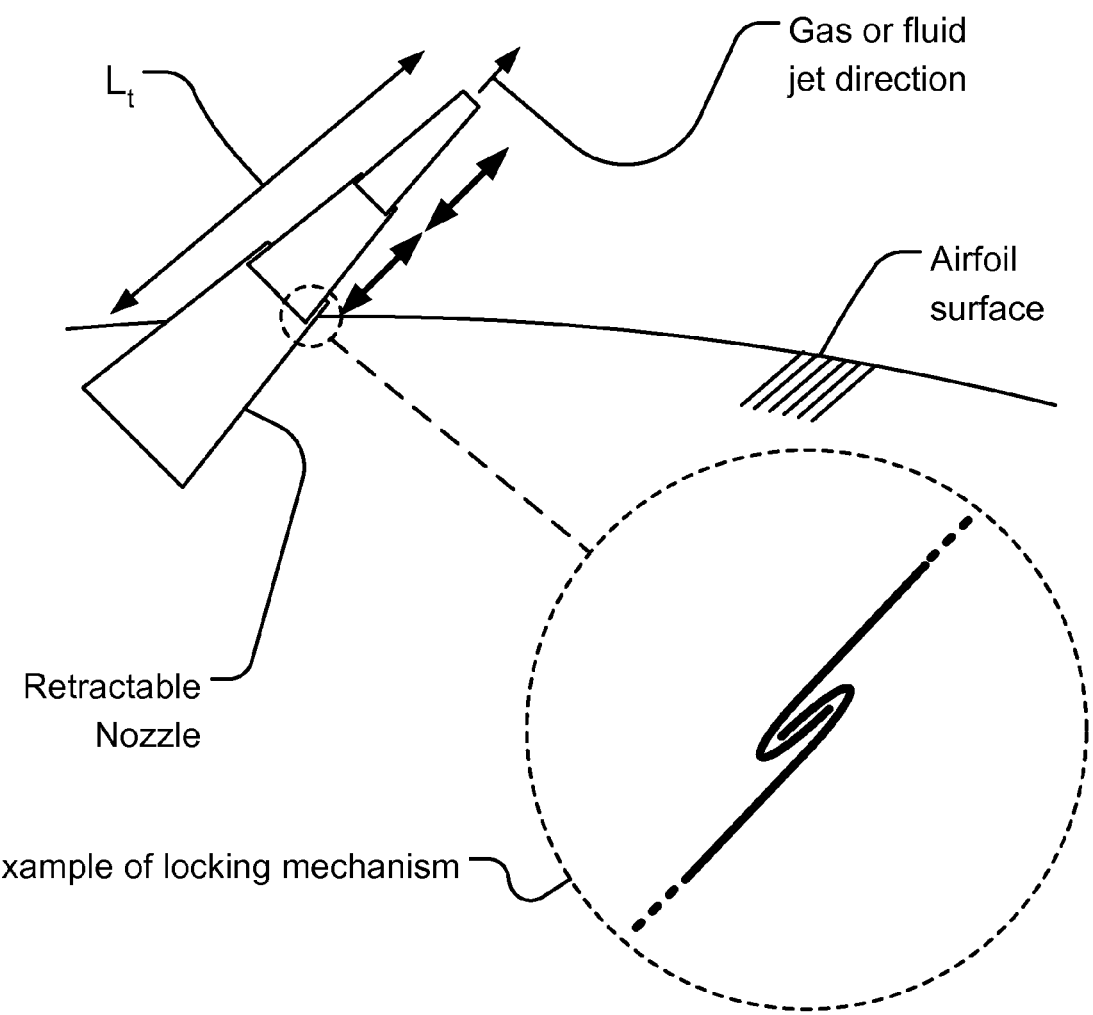
FIG. 37 shows a retractable or telescopic nozzle, for an embodiment of our invention.

In one embodiment, size, length, diameter, and material of some nozzles are not the same. In one embodiment, size, length, diameter, and material of all nozzles are the same. In one embodiment, the extension of nozzle coming out of the surface ranges from zero to a few centimeters (as a fixed structure), as shown in FIG. 36. In case of zero extension, it means that it only has a hole on the surface. In one embodiment, the hole on the surface can have a sink hole with slope structure, gradually narrowed down to a smaller hole, as a funnel or cone (as shown in FIG. 36), twisting, corkscrew, or spiral structure (as shown in FIG. 36), as different embodiments. In one embodiment, the nozzle is moveable (not fixed), extending out/in from the surface at different lengths (retractable) (as shown in FIG. 36). In one embodiment, the retractable nozzle is telescopic, to adjust the length and height of the nozzle, to change the flow of air around the blade (as shown in FIG. 37).

The nozzle or tube can be used to force air out or suck the air in from the same place, in the reverse direction, e.g. by just reversing the motor or pump, as in FIG. 51. The nozzle can be put on the surface of the tower, as well as the blade, as another example, to modify the air flow around the tower, as well.

In one embodiment, the air or fluid is sucked in from around one or more blades into one or more nozzles or openings. In one embodiment, the fluid or mixture is sent out of one or more nozzles or openings onto one or more blades.

The telescopic feature/pieces can be pulled back or extended forward via different mechanisms (as some examples, shown below (but other conventional methods for telescopic movement are also applicable for operation of this type of nozzles)):

(1) The pieces are pulled in or pushed out using a small motor, connected to the pieces, using one or more chain(s), cable(s) (or bar or solid rod, with gear, with a motor), belt(s), or string(s), as different embodiments, shown in FIG. 41, with notches at inside or outside positions, to limit the motion or extension of the pieces. As shown in FIG. 37, as an example, the pieces can be connected at the ends, using a hook, to limit the amount of extensions on the telescopic pieces, and to hold all the pieces together.

Figure 42:
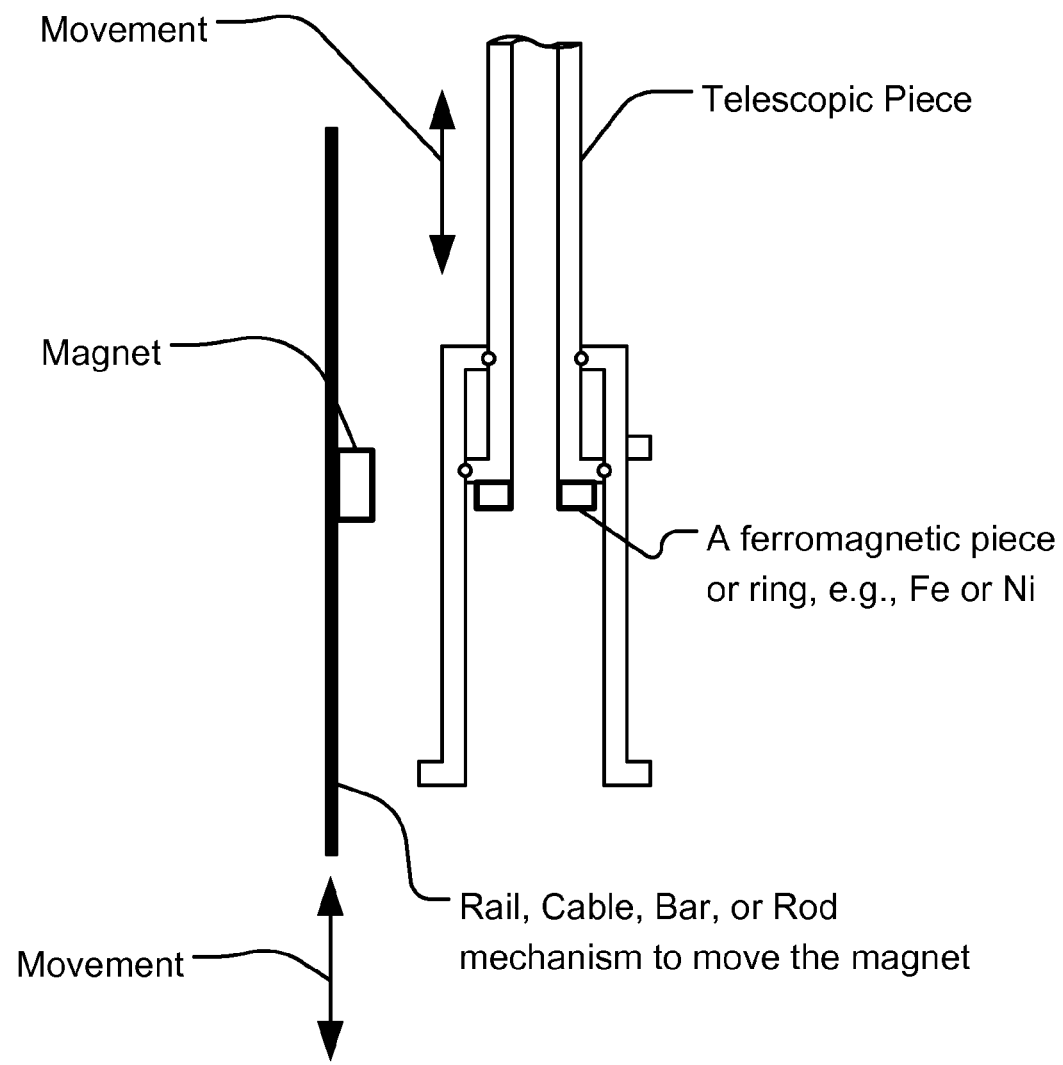
FIG. 42 shows the mechanism for a telescopic or retractable nozzle, with different components, with magnetic piece or magnet, at one or more locations, for an embodiment of our invention.

(2) The pieces are pulled in or pushed out using a magnetic material or piece (which is on a rail or chain, or similar mechanism, to move back and forth), to pull in or push out another magnetic piece, which is connected to the individual telescopic pieces, shown in FIG. 42 (reducing the length of the nozzle, or telescopic piece, thereby, changing the air flow pattern outside/on the surface of the blade), as a driving mechanism for changing the length of the telescopic structure ($L_t$), to change the flow of the air around the blades, or function $F_f(\ )$. That is:

$$F_f(\ )=F_f(L_t)$$

$F_f(\ )$ can be represented by a vector or tensor or matrix, with multi-dimension, represented by multiple absolute numbers and direction(s). Note that $F_f(\ )$ is usually time dependent (t):

$$F_f(\ )=F_f(t)$$

Figure 39:
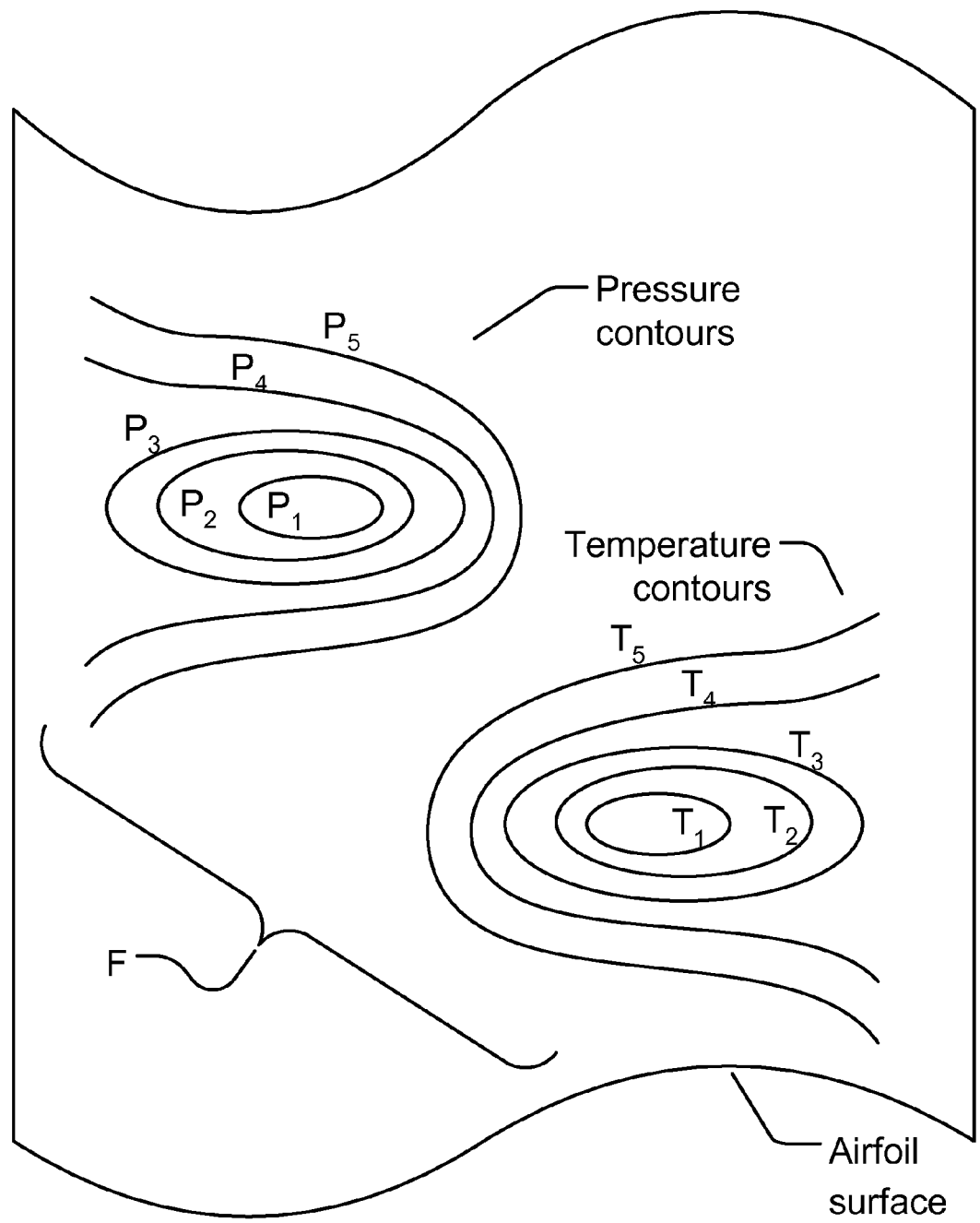
FIG. 39 shows a pressure and temperature contours, for locations of constant pressures and temperatures, on a blade, included in the information carried by function F, for an embodiment of our invention.

$F_f(\ )$ can also represent (include the information about) the 3-dimensional flows around the blades, representing maps and cross sections or contours of same/constant pressure (P), speed (V), or temperature (T) (e.g. measured by thermo-couple or optical measurements/techniques), as some examples, as shown in FIG. 39:

$$F_f(\ )=F_f(T,P)$$

In one example, $F_f(\ )$ is a function of 3 Cartesian coordinates (x, y, z) in 3-dimensional space, expressing the pressure, temperature, and velocity of the jets (including direction, as a vector, V) out of nozzle, at every point on the surface of the blade, which is time-dependent (changing over time):

$$F_f(\ )=F_f(T,P,V,x,y,z,t)$$

Figure 47:
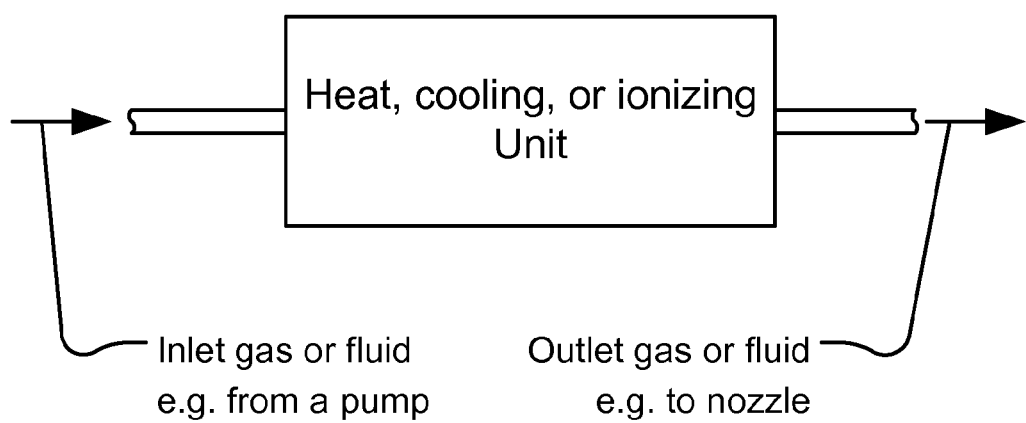
FIG. 47 shows nozzle, with fluid coming out, with heating unit, cooling unit, or ionizing unit, for an embodiment of our invention.
Figure 48:
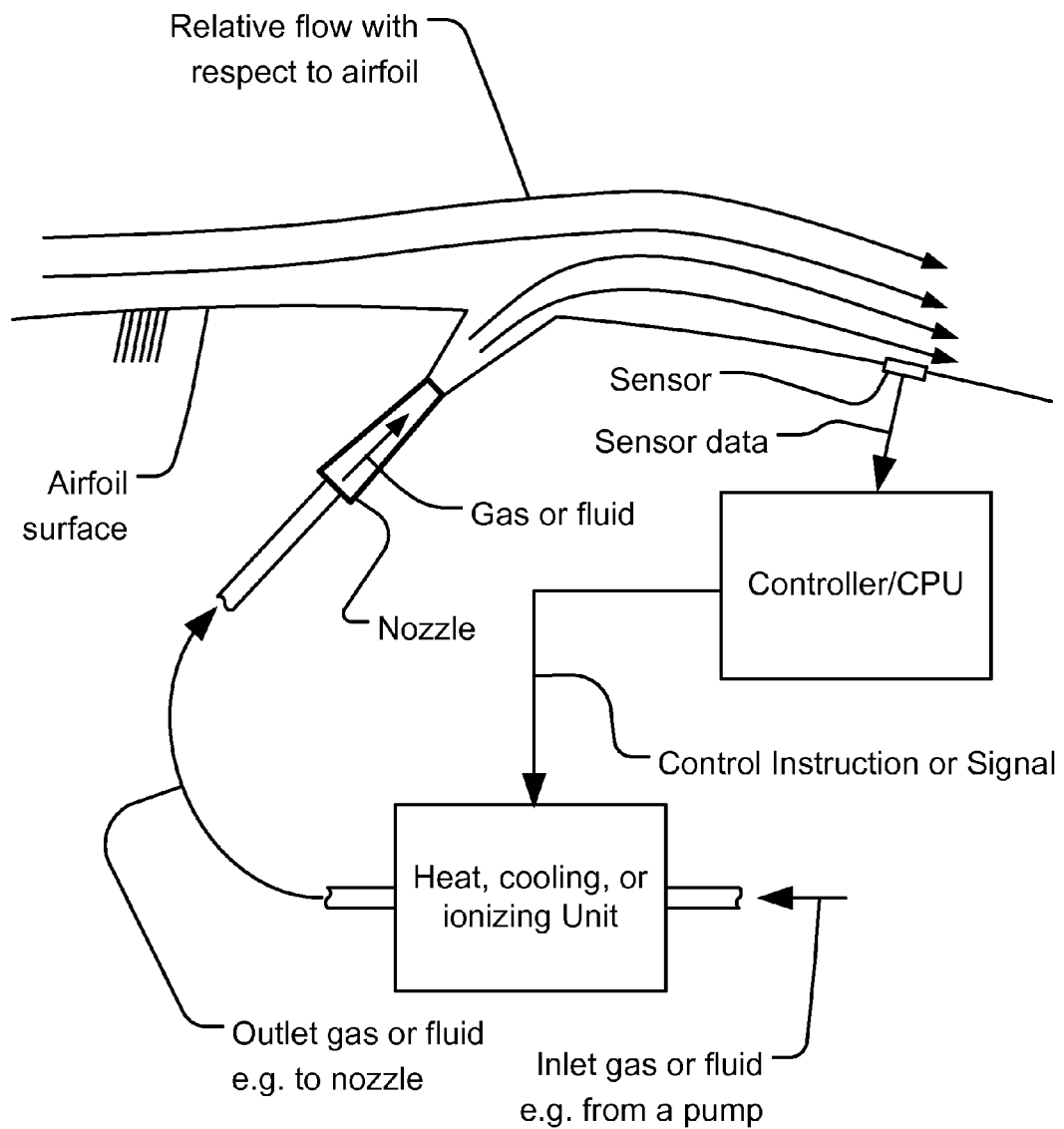
FIG. 48 shows nozzle, with fluid coming out, with heating unit, cooling unit, or ionizing unit, with controller controlling heating unit, cooling unit, or ionizing unit, and sensor on the blade, for an embodiment of our invention.
Figure 54:
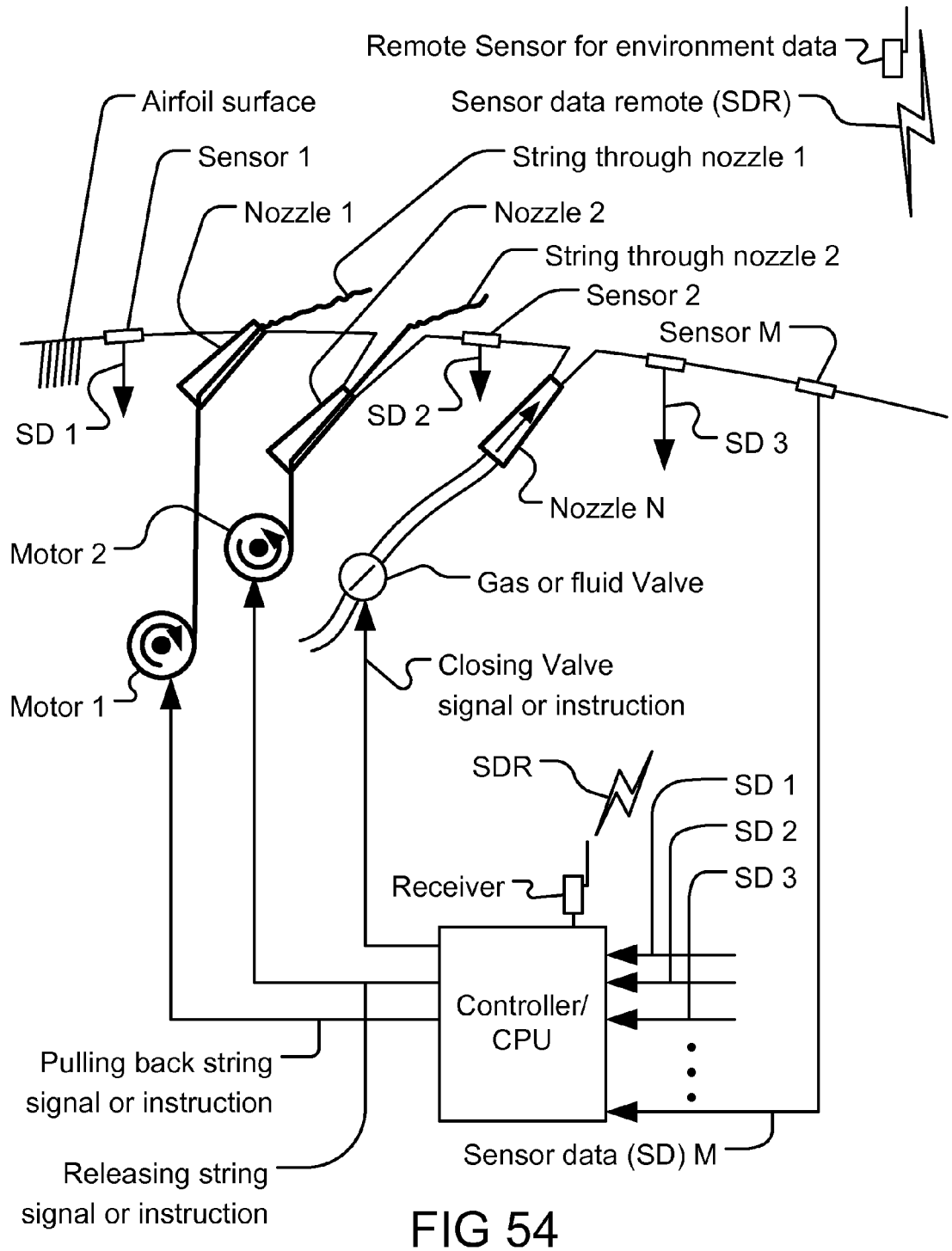
FIG. 54 shows nozzle, with fluid coming out, with strings pulling in or out, or valve closing, controlled by the controller or processor, fed by sensors or cameras, in various locations on tower, on blades, or remote, on the ground, using wired or wireless communication, for an embodiment of our invention.

For example, by adjusting or closing the valve before the nozzle, or adjusting pressure or temperature of the gas coming out of nozzle, or changing the angle of jet/nozzle (as in FIG. 32, by sending a signal from the controller to the motor under the nozzle, for the rotation of the nozzle, to set to an appropriate angle α), the function $F_f(\ )$ is adjusted to the optimum condition, e.g. for the rotation of blades, or most efficient conversion to the electricity (increase efficiency of the system). This can be based on pre-calibrated data, or based on real-time measurements and real-time/immediate adjustments, such as measuring electricity (voltage, current, or frequency, generated from the system), to adjust valves and nozzles, to be able to adjust the $F_t()$, accordingly, as shown in FIG. 54, FIG. 47, FIG. 48 (through the sensors' feedback, for the next adjustments), FIG. 49, and FIG. 35, as an example.

In one example, the telescopic piece is magnetic, and in another embodiment, an external piece attached to the telescopic piece is magnetic. Either way, the magnetic force moves the telescopic piece. Both pieces could be magnet, or alternatively, only one piece is magnet, with a second piece as ferromagnetic. It can be placed anywhere, close by, such as under the surface of the blade, or on the surface of the blade, as in FIG. 42.

(3) The pieces are pulled in or pushed out using suction or air pressure, using a small pump, or by other methods, to either suck in or push out the air through the nozzles, to open or close the telescopic structure, as shown in FIG. 40 for the case of pushing the air out, to open the telescopic structure and increase its length. The reverse of FIG. 40 is when we suck in the air, to pull back the telescopic piece in the reverse direction, to close the telescopic structure and decrease its length, as the exact opposite of FIG. 40, in the reverse direction.

We can use a ball bearing set for easier movement for FIG. 40. In addition, in another embodiment, we can use a flap, or cover, with spring action behind it, to enable the reverse function for the reduction of the length of the nozzle. The rectangular or circular openings and cross sections/covers/flaps can be used, as some examples.

Figure 43:
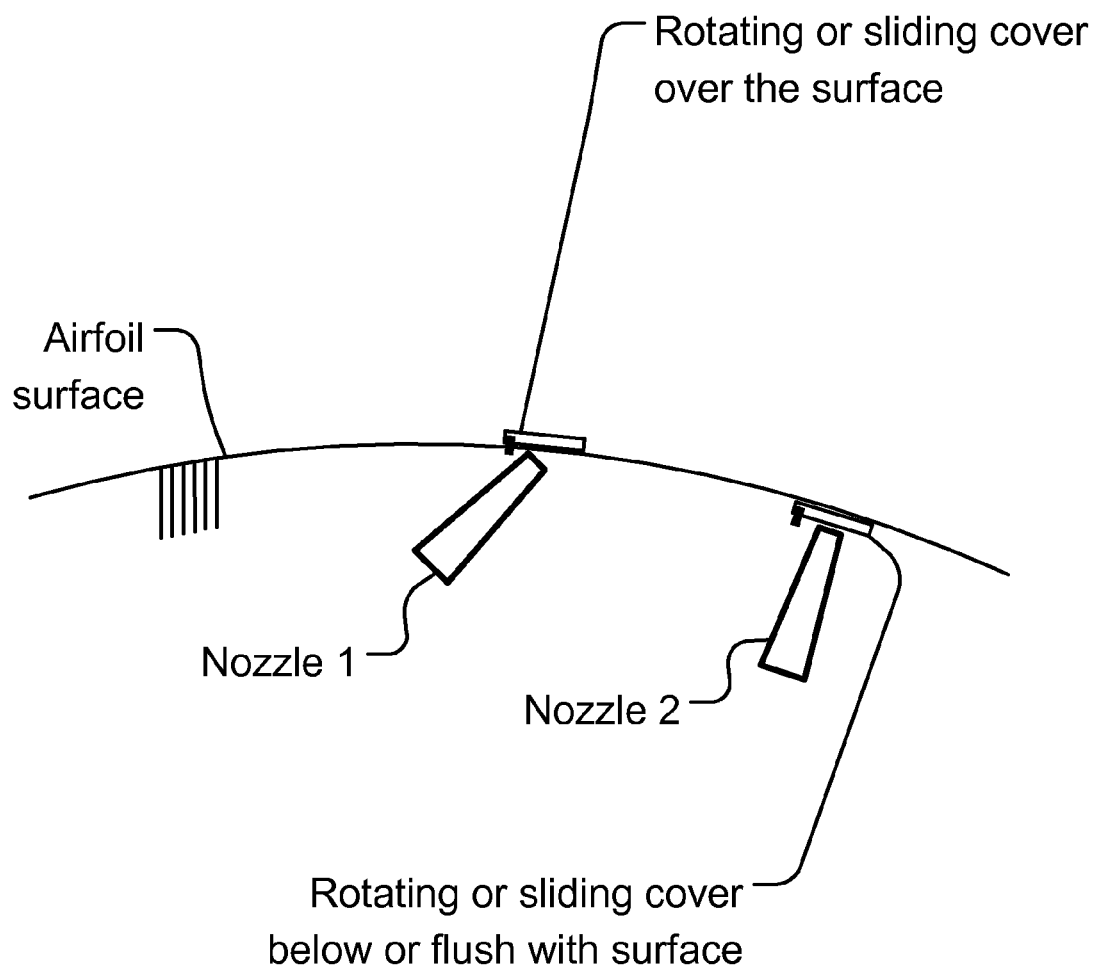
FIG. 43 shows the mechanism for a rotating or sliding cover for nozzle, with different components, under the surface of the blade or over the surface of the blade, for an embodiment of our invention.

In one embodiment, the holes or nozzles can be closed or adjusted, using valves, flaps, covers, caps, or shutters, on a hinge, rail, chain, or other mechanisms, placed under the surface or on the surface, as in FIG. 43, as different embodiments.

Figure 44:
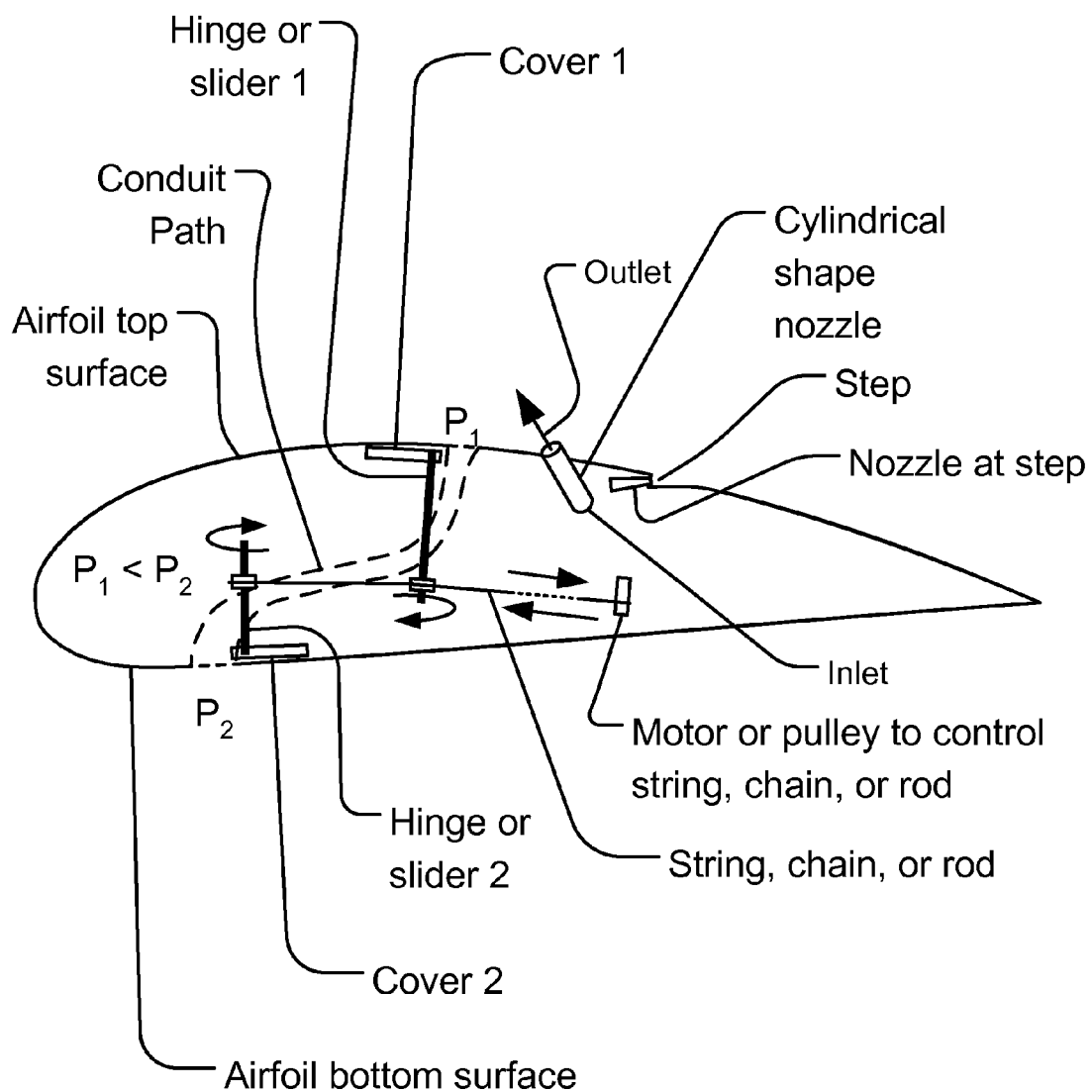
FIG. 44 shows a mechanism for closing and opening the conduit between bottom surface and top surface of a blade, with different components, for an embodiment of our invention.

In one embodiment, as shown in FIGS. 36 and 44, the funnel shaped or cone shaped is formed outside (above) the surface (i.e. variable diameter along its length). In one embodiment, the nozzle is cylindrical (i.e. uniform diameter along its length). In one embodiment, the nozzle surface is smooth. In one embodiment, the nozzle surface is coarse. In one embodiment, the nozzle has a valve underneath, to stop or adjust the flow, as in FIG. 43. In one embodiment, the nozzle has a diaphragm (as in FIG. 45), membrane, partition, or shell, to stop or adjust the flow. In one embodiment, there is no valve or stopping mechanism, other than pressure differential and the forces due to rotation or gravity.

FIG. 44 shows a mechanism for closing and opening the conduit between bottom surface and top surface of a blade, with different components, for an embodiment of our invention. For example, as in FIG. 44, for the case $P_1$ (pressure of top of blade) being smaller than $P_2$ (pressure of bottom of the blade), the air from bottom of the blade is pushed to the top of the blade, through the blade, through some small pipes/conduits, located inside the thickness of the blade, using the pressure differential, only, namely, $(P_2-P_1)$, or dP, or delta(P).

In one embodiment for FIG. 44, the closing mechanism for the conduit on one end or both ends, or in the middle, using valve, shutter, cap, or cover, uses a motor or pulley or cable or chain or rod or gear, to close off one or more openings or nozzles, simultaneously, or one at a time, controlled separately, to stop or cease the pressure adjustment, and flow of air due to differential pressure, as explained above. That will change the lift and drag on the blade, for different speeds of the blade rotation, and different stages of startup for the blade from the stationary state, or zero angular velocity. It is also helpful during hurricane with high speed winds, to reduce the pressure and stress/damage on the blades.

In one embodiment for FIG. 44, the nozzle has a regulator (as in FIG. 43) or manifold (underneath), to stop or adjust the flow. (In one example, the nozzle is cylindrical, or is at a step, on the blade cross section.)

The feature mentioned above, using the pressure differential, only, namely, $(P_2-P_1)$, is useful for the bad weather or extreme conditions, to remove the covers on the 2 sides of the small pipe(s) or conduit, shown in FIG. 44, by a small motor/cable, to make the air flow between the two sides of the blade, to reduce the pressure gradient/stress, and thus, reducing the wear and tear on the blades due to that gradient, to increase the life of the blades, shaft, gears, and other components, saving a huge amount of the money for the maintenance of the tower and blades. So, we will open the covers during the bad weather, e.g. high winds, e.g., monitored by sensors mentioned elsewhere in this invention. Then, we will close the covers, and close off the conduit in the blade, for the normal operations/times/speed of wind.

In one embodiment, the nozzles are patterned or placed, such that they produce:
a predetermined flow pattern, or
disrupt, adjust (as in FIG. 46), or optimize the flow, or
change the flow from laminar to turbulent (or vice versa or combination), and/or
change (as in FIG. 46), adjust, move, or optimize the boundary layers.

In one embodiment, the material coming out of the nozzle is heated (as in FIG. 47). In one embodiment, the material coming out of the nozzle is cooled (as in FIG. 47). In one embodiment, the material coming out of the nozzle is ionized by an ionizer, placed after the gas supply, but before nozzle, as one of the embodiments of FIG. 47, so that nozzle sends out ionized gas near the blade surface (e.g. with electrostatic properties), to change the air flow pattern around blade, e.g. using water and humidity in air and the interferences with (forces exerted on) the water molecules in the air.

FIG. 48 shows nozzle, with fluid coming out, with heating unit, cooling unit, or ionizing unit, with controller controlling heating unit, cooling unit, or ionizing unit, and sensor on the blade, for an embodiment of our invention.

In one embodiment, the material coming out of the nozzle is at ambient temperature (e.g. adjusted to the temperature of the outside, using a sensor on the blade, which, through a feedback, feeds to the heating/cooling element, to adjust the temperature of the air coming out from nozzle end/tip (as in FIG. 48)).

This is (in general, for this disclosure) monitoring and feedback/adjustment, periodically, randomly, based on history/last measurements, dynamically (adjusting based on the external or internal parameters), or continuously.

Figure 49:
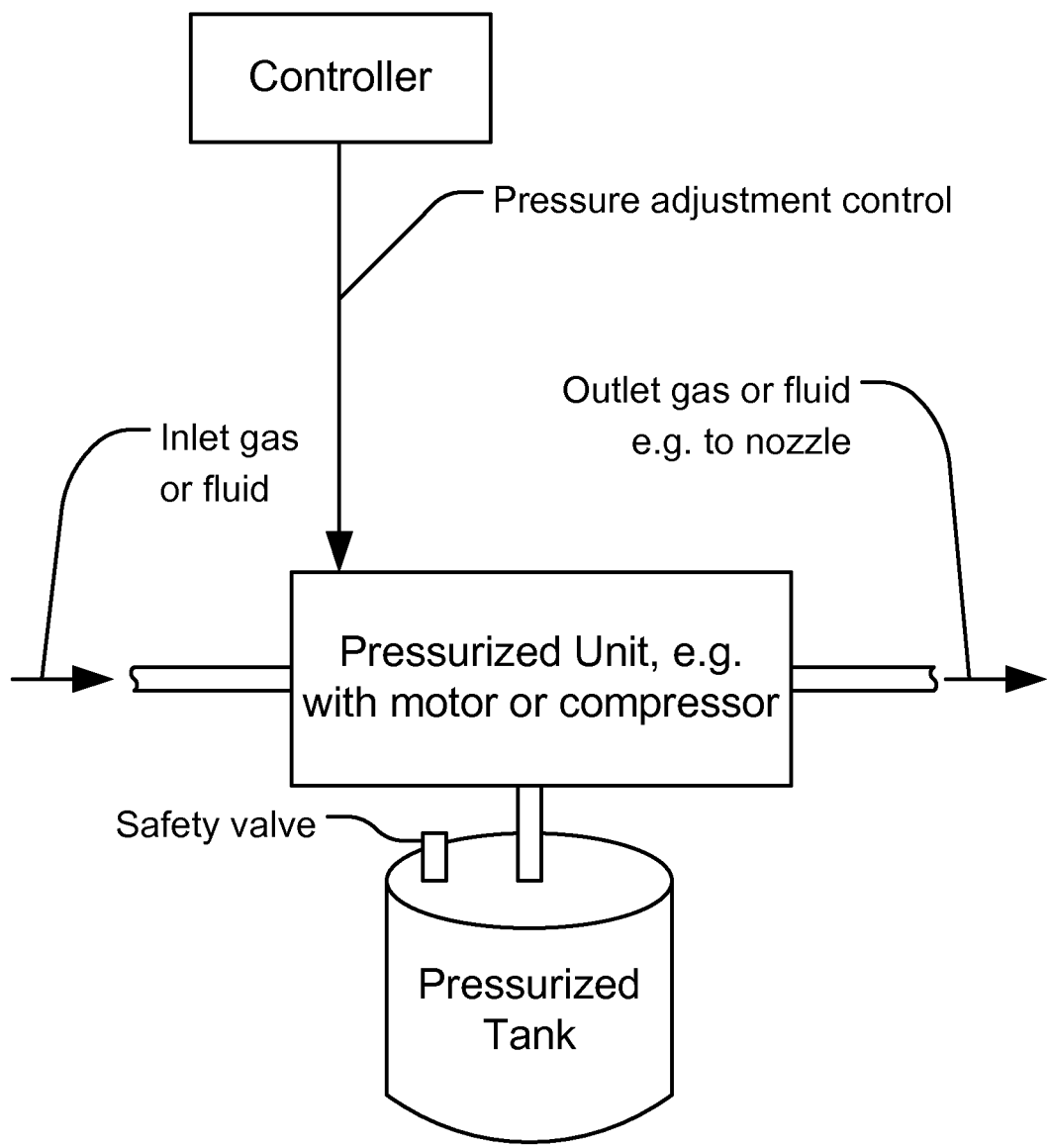
FIG. 49 shows nozzle, with fluid coming out, with pressurizing unit, optional regular or pressurized tank, and controller, for an embodiment of our invention.

In one embodiment, the material coming out of the nozzle is at high pressure (as in FIG. 49). In one embodiment, the material coming out of the nozzle is at low pressure (as in FIG. 49).

In one embodiment, the material coming out of the nozzle is a pure gas (e.g. coming out of a single source, e.g. a single container/tank/capsule/cylinder, or air from outside tower, pressurized or not pressurized, mixed or pure, as different embodiments) (as in FIG. 51). In one embodiment, the material coming out of the nozzle is a combination of different gasses, liquids, fluids, air, sand, or powder, e.g. from multiple sources (as in FIG. 50, as an example), as different embodiments, as a dynamic nozzle. In one embodiment, the material coming out of the nozzle is burned gas or fuel (as in FIG. 52, e.g. as exhaust). In case of powder or sand (or any solid material), the flow of air (or fluid, liquid, or gas), over a container containing the material/solid material, picks up the material or powder and carries them out of the nozzle, which can be done with a chemical reaction (e.g. bonding of the fluid with the powder, chemically) or no chemical reaction (e.g. pure physical suction or momentum).

The material coming out of the nozzle is supplied from tank(s) (as in FIG. 51), capsules, container, from tower, from another part of the blade, from under blade, from inside blade, from another blade, by motor, by pump (as in FIG. 51), by pure suction (with no mechanical parts or motor), by using pressure differential (as in FIG. 44), by using centrifugal force (due to rotation of blade), by using Bernoulli's principle (for pressure difference, using moving fluid, e.g. the flow caused by the rotation of the blade), by winded spring (or other mechanisms to store potential energy to be released later (e.g. while going up and down the blade, during rotation of the blade, for example) (as in FIG. 53, in which case, the potential energy of the load/spring can be used in each cycle of rotation, to move something else or do another action, converting it to usable energy for the function of inside the turbine or blade, e.g. opening or closing a valve, or running a motor or step motor.)).

The components of the turbine or blade can have their own batteries (located anywhere, close or far, in the system), solar cells (e.g. on the surface of the blades), or use energy from outside, grid, or turbine itself, as different embodiments, to function and operate, as they are supposed to, e.g. opening or closing a valve, or running a pump.

All of the teachings in this application can be done using one or more of the followings: pipe(s), using jets, using sprays, using hose, using conduits, using canals, using capillary, using tube, using vessel, using passageway, using channel, using canals, or using ducts (using one or more units or pieces), with or without extra pressure (as in FIG. 51), or using similar mechanisms or methods, as different embodiments.

Figure 35:
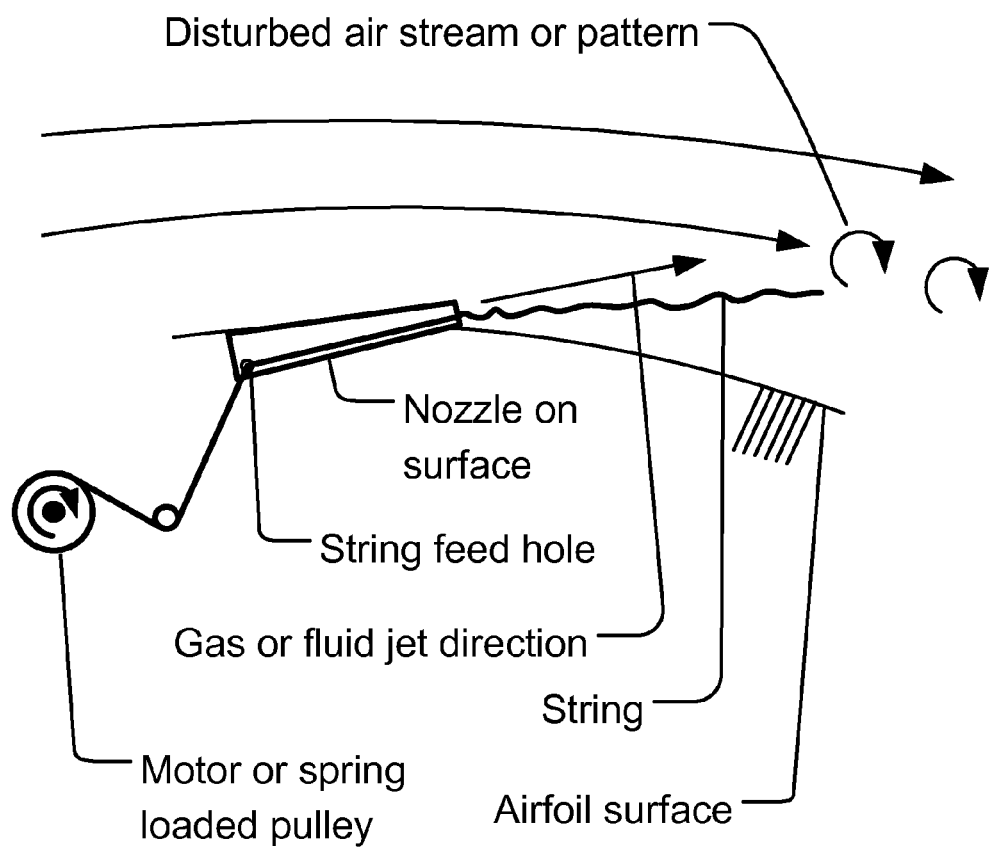
FIG. 35 shows a nozzle, with a string through the nozzle, for an embodiment of our invention.

In one embodiment, there is a narrow string (as in FIG. 35) (or strings, cable, chain, belt, hair-type, multiple-thread, twisted, or wire, made up of soft, rigid, flexible, not-flexible, plastic, elastic, metal, cotton, wool, nylon, polyester, artificial material, multiple material, co-axial, with-jacket, or the like, at different thickness or width, or cross section, e.g. circular, flat, rectangular, or elliptical, e.g. with width or diameter range of 1 mm to 10 cm, with length of e.g. range of 5 mm to 20 m, as typical, but not limited to, depending on the size and width of the blades and nozzles, as different embodiments) coming out of the nozzle, or attached close to, or under nozzle, with one end loose outside and close to surface, and one end attached to surface or to under surface, as shown in FIG. 35. (FIG. 35 shows a nozzle, with a string through the nozzle, for an embodiment of our invention.) The string can be pulled in/out using a motor or gear or shaft or rail.

The size of the nozzles or openings or dimples (or other features in this invention) can vary in a large range. As an example, but not limited to, they can be small fraction or big fraction of the size of tower and blades, from $10^{-3}$ percent to 20 percent, as an example, or e.g. 0.5 mm to 10 m, but not limiting to that range.

For this invention, the nozzle can be replaced with a spray, jet, syringe, hose, tube, pipe, plumbing structure, capillary, duct, vessel, passageway, or canal, from supply, chamber, source, tank, capsule, or container, as different embodiments.

Instead of a string or narrow cable, in FIG. 35, one can use a piece of fabric, square, rectangle, or other shapes, attached at one end, and loose at the other end (or e.g. one side attached for a rectangle, and loose on 3 other sides), so that it can float or fly in the stream or air flow, almost freely, subject to the attached end and the rigidity of the piece of fabric, as constraints. The fabric or string change the flow and pattern of air around the blades, as desired, as shown in FIG. 35, depending on the weather conditions, speed of blades, and feedback from sensors on the ground or on the blades, measuring the blade and weather conditions, going through the control system, for adjustment of the string or fabric piece, e.g. by adjusting the length of the string, as how much of the string is pulled in or out of the nozzle, using a small motor or a pulley, inside the blade structure, and under or close to the nozzle, as shown in FIG. 54. Note that, in one embodiment, some or all nozzles have their own strings, and at different shapes, material, and lengths, controllable by the control system, collectively or individually, for example, for different embodiments, as shown in FIG. 54.

The string can act with or without air jet, in parallel to or close by the string, to divert, disrupt (as shown in FIG. 35), modify, reshape, or move the flow, stream, or boundary layers, on the blade or airfoil. Note that the diameter (size or width) and length of the string is typically within the same order of magnitude as the nozzle hole diameter and blade length (or width), respectively, or a few orders (e.g. 1-5 orders) of magnitude larger or smaller than those dimensions, for example, but not limiting to those ranges.

The jet or air coming out of the nozzle can be pulse, uniform, ramping, variable, or continuous, in terms of the amount, duration, and pressure of fluid, as different embodiments, decided by the controller (as shown in FIG. 54), depending on the weather condition and the desired blade speed or condition, read and monitored continuously, periodically, randomly, or as-needed (e.g. dynamically, based on prior history or last measurement), by the sensors, on the blade, tower, or remote on the ground or elsewhere, predicting or measuring/recording the weather and physical parameters (generally time-dependent (t)), such as pressure (P), temperature (T), velocity of fluid ($V_F$), velocity of wind ($V_W$), velocity of blade (angular velocity ($\omega_B$) and regular velocity ($V_B$), as a magnitude (V) and as a vector ($\overline{V}$), with direction and dimension, as different embodiments), humidity (H), cloudiness, rain, snow, size of rain drops, temperature of snow flakes, shape and weight of snow flakes, frequency or density or distribution of snow flakes or snow fall, amount of particles in the air (such as dust and pollen), or wind turbulence and patterns (versus laminar flow characteristics, as described below for dimensionless numbers, as a way of quantifying the flow and characteristics, as an example).

The controller (as shown in FIG. 54) decides selectively how much and at what pressure the air should come out each nozzle or a subset of nozzles, with each nozzle controlled collectively or individually, as different embodiments.

The characteristics of a flow/fluid are generally measured by dimensionless parameters, such as Reynolds Number ($N_R$) (for relating acceleration, speed, and length), Froude Number ($N_F$) (for relating fluid acceleration, acceleration due to gravity (g), speed, and length), or Strouhal Number ($N_S$) (for relating time interval characteristics of the flow (indicating rate of change of flow), speed, and length).

Figure 38:
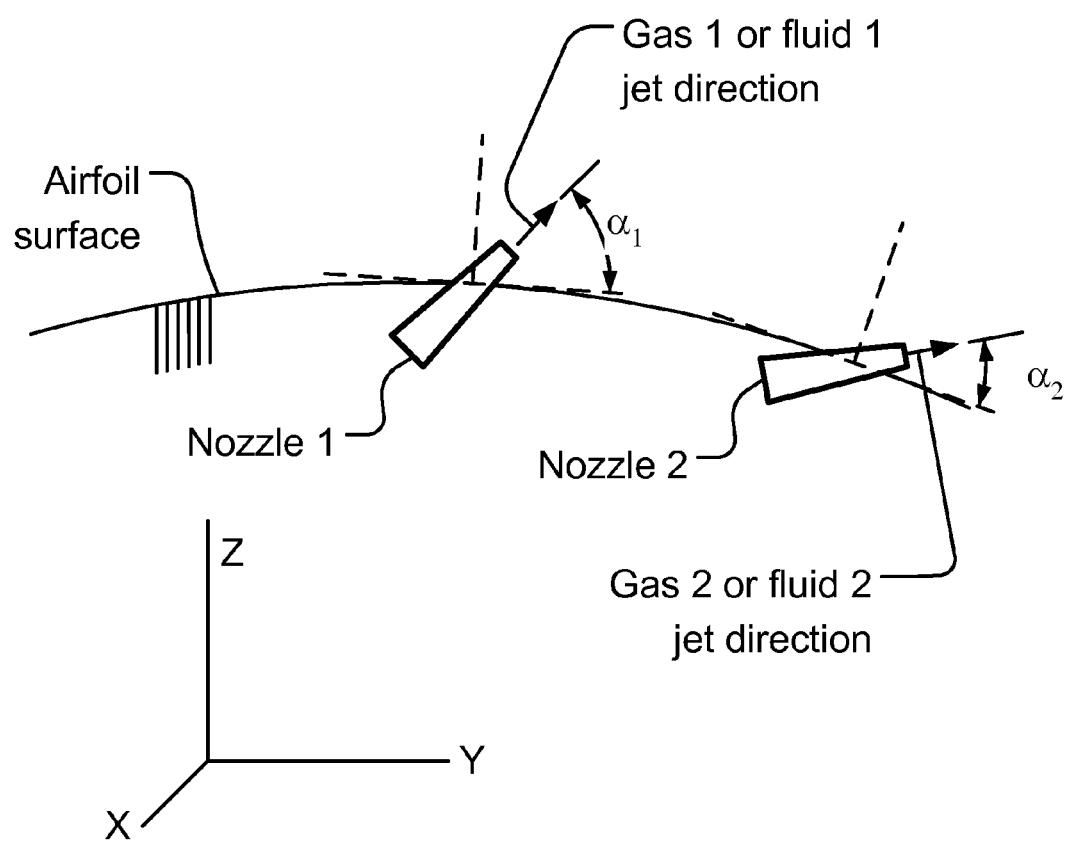
FIG. 38 shows multiple nozzles, at different angles, with respect to the local curvature of the surface for the blade or airfoil, for an embodiment of our invention.

As shown in FIG. 38, the surface of the blade in 3-dimension (x, y, z), for example, has multiple nozzles, each with different angles of fluid coming out (with respect to the local surface tilt), with angles $\alpha_1$ and $\alpha_2$ being different in general (and in some special cases, they may be the same). The angle is a function of dimensions (x, y, z), Cartesian coordinates, as a variable. That is, for a function f:

$$\alpha=f(x,y,z)$$

In a special case, the angle is constant for one or more axes, or one or more regions on the surface, or one or more directions on the surface, with respect to the local tilt of surface (relative value), or with respect to the absolute coordinate, such as (x, y, z) coordinate (absolute value). For example:

α=Constant, with respect to the local tilt of surface (relative value)

For the purpose of this invention, blade can be replaced with rotational piece, moving piece, or airfoil, for different embodiments and applications.

The weather condition and fluid mechanics of the air flow around the blade or airfoil can be measured or sensed using multiple sensors, detectors (e.g. located on the blade, tower, inside of structures (tower or blade), outside of structures, on the ground, on the air, floating, wired, remote, wirelessly connected, or far away), or data from an external source, such as weather channel or data feed from a pressure meter or thermometer, for measuring or data for one or more of the following:

wind speed,
wind acceleration,
temperature (T),
temperature gradient, with gradient versus time (delta time, or dt) or distance (delta distance, or dx) (namely, dT/dt and dT/dx, respectively),
pressure,
pressure gradient,
rate of the changes versus time or distance (first order gradient, based on dt or dx, respectively),
rate of rate changes (e.g. acceleration) versus time or distance (second order gradient, based on $dt^2$ or $dx^2$) (e.g. for temperature, as: $d^2T/dt^2$ and $d^2T/dx^2$, respectively),
$2^{nd}$ order rate of change in mixed form, e.g. dxdt, or dtdx (e.g. for temperature, as: $d^2T/dxdt$ and $d^2T/dtdx$, respectively),
humidity or moisture, with relative or absolute values,
wind chill factor, dependent on absolute temperature, humidity, and wind speed,
wind direction and magnitude, in 3-dimensional, in polar, cylindrical, or Cartesian coordinates, e.g. $V_X$, $V_Y$, and $V_Z$, as a vector, in X, Y, Z coordinates,
wind spin, rotation, or turbulence, quantified or normalized as a real number, on a scale, e.g. linearly or logarithmically,
sampling of the measurements, per specific time $t_0$, periodically,
sampling of the measurements, random time period,
sampling of the measurements, based on a distribution, such as Normal or Gaussian distribution,
averaging of sampling of the measurements,
sampling based on distance variations,
sampling based on time variations, quantum, steps, or deltas,
averaging over distance variations,
averaging over time variations, quantum, steps, or deltas,
weighted averaging of sampling of the measurements, with higher weights for more important factors, e.g. if temperature, T, is more important than wind speed, V, by a factor of 2, then ⅔ weight is assigned to T, and ⅓ weight is assigned to V. That is, the overall decision is based on this function, e.g.: F=(⅔)T+(⅓)V The overall decision (function F) is based on the factors or parameters ($F_1$, $F_2$, $F_3$, $F_4$, ..., $F_N$) mentioned above, e.g. T, V, pressure (P), and/or pressure change with respect to time (rate) (dP/dt) (or their combination, or their weighted average). For example, $F_1$=T. For example, F is defined as:

$$F=A_1F_1+A_2F_2+A_3F_3+\ldots+A_NF_N,$$

with $A_i$ as a coefficient or weight.

Or, in general form: F as a function of all $F_i$:

$$F=F(F_1,F_2,F_3,\ldots,F_N)$$

where i is an integer, e.g. 1 through N.

Or, the decision F is based on multiple linear or non-linear functions, optimized locally or globally, for one or more parameters. For example, simultaneous optimization, as linear optimization, for multiple M functions $D_j$, as a function of factors $F_i$:

$$D_j=D_j(F_1,F_2,F_3,\ldots,F_N)$$

where j is an integer, e.g. 1 through M.

Thus, the final decision F is dependent on, or based on, optimization of functions $D_j$:

$$F=F(D_1,D_2,D_3,\ldots,D_M)$$

Note that the function F can be one or more of the following, or combinations: a closed or not-closed function/formula(s), a table, list, mapping function, one-to-one function, or not-one-to-one function, graph, spread sheet, formula(s), approximate relationship, exact relationship, multiple relationships, many-solution problem, single-solution, reversible mapping, non-reversible mapping, conditional relationship(s), logical relationship, fuzzy logic, binary logic, relational database, database, mathematical relationship, or any similar statement(s) or expression(s).

As an example, let's assume that $F_i$ are V, P, (dP/dt), and T (i.e. velocity of the wind, pressure near the surface of the blade, rate of change of pressure with respect to time near the blade, and (absolute) temperature near the blade, respectively), measured by the sensors, in the middle of the blade, located on top of the blade, or on the leading edge of the blade, with respect to the direction of the movement of the blade, or temperature measured/extrapolated from the sensors on the ground or tower (or alternatively, from weather forecast from local TV station, or fed from weather channel server, automatically and periodically, or on-demand, to a computer or the controller, at the blade or tower, to make decisions or adjust settings, for optimization or proper operation).

Now, let's assume that we measured or obtained the following environmental conditions, related to our blade or airfold:

V=20 miles/hr
P=1.005 atm
dP/dt=$10^{-4}$ atm/sec
T=303 K (Kelvin)

Now, let's assume that we have the following rules and conditions:

$D_1$=True, if V>10 miles/hr (otherwise, it is False)
$D_2$=True, if (P>1 atm & T>250 K)
$D_3$=True, if dP/dt>$10^{-5}$ atm/sec
$D_4$=True, if T>300 K Thus, we will have, for this case:
$D_1$=True,
$D_2$=True,
$D_3$=True,
$D_4$=True, Now, let's assume we have the following F function:
$F(D_1, D_2, D_3, \ldots, D_M) = D_1 \& D_2 \& D_3 \& D_4$
Thus, here, we have, for this case:
F=True AND True AND True AND True=True The function (F equal True) indicates that (for example) some settings of the wind turbine get adjusted. The reason may be to improve the efficiency of the wind turbine, increase speed, decrease speed of blades, turn on/off some switch or device, optimize a device or operation, or for safety reasons (or any similar reasons).

In this example, (F equal True) indicates that the air jet valve gets Open, sending high speed air on the surface of the blade, through the air nozzle, to change the stream or flow of the air and boundary conditions around the blade, for a specific purpose, e.g. changing the drag for the blade, changing the efficiency of the turbine, changing the angular speed of the blades, or removing the snow, ice, debris, dust, or water attached to the blade (for example, to clean the blade), for example, as shown in FIG. 54.

Figure 55:
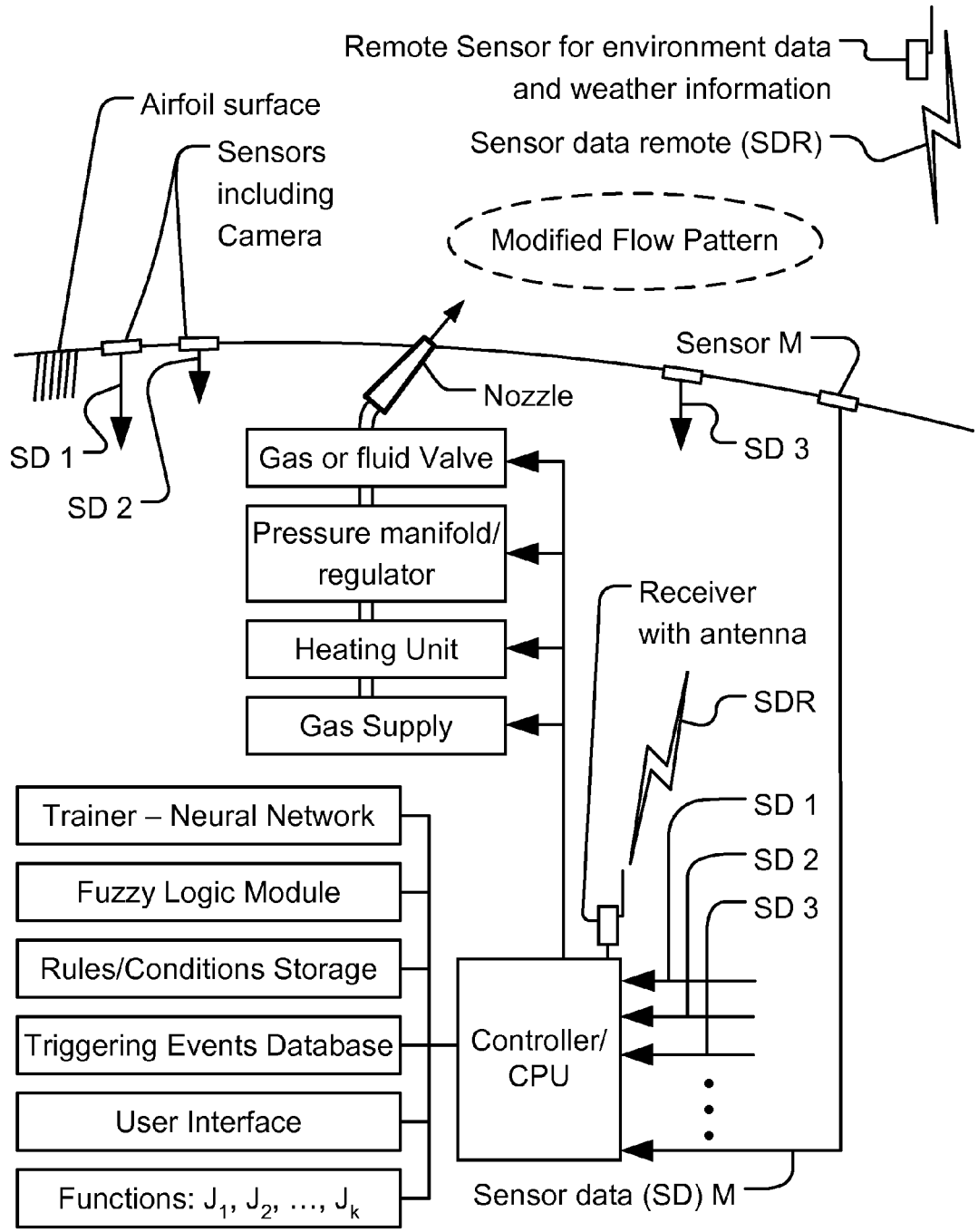
FIG. 55 shows nozzle, with fluid coming out, with gas supply, heater, pressure regulator, and valve, controlled by the controller, and its processing databases and rules, fed by sensors or cameras, in various locations on tower, on blades, or remote, on the ground, using wired or wireless communication, to send a command to perform various functions (e.g. $J_1$, $J_2$), for an embodiment of our invention.

In this example, the measured values are transmitted from the detectors or sensors (for example on the blades) to the controller or computer/server, e.g. in the tower or a remote location, by antenna, as an example, or by any other communication methods. The data is analyzed to get the values of $F_i$, such as V, P, (dP/dt), and T, e.g. by the controller. The rules, formulas, or relationships (for example, $D_j$) are stored in a storage, e.g. hard drive or disk, which is connected to the controller, to be evaluated and analyzed by the controller, in view of the values of $F_i$. Then, the resultant $D_j$ values are fed into the function F (stored on a storage bank and accessible to the controller), to get the value of F, by the controller, as shown in FIG. 55. The sensors or cameras periodically sense or take pictures for weather information or parameters, and send/transmit to the controller, directly or indirectly.

In this example, the value of F determines an action or no-action, e.g. for a component of wind turbine (or send a signal or data to a location, e.g. to do something else). For example, it may send a signal to the valve, from controller, to Open or Adjust the valve for the air jet, so that air comes out of the nozzle (or modify amount of air/pressure/speed) on the blade of the wind turbine to change the boundary conditions and profiles on the blade, to optimize the blade performance and increase the efficiency of the electrical generator, as shown in FIG. 55.

For example, the Coanda Effect in fluid mechanics is applied for the structure of FIG. 55. Thus, the air coming out of the nozzle stays very close to the surface of the blade, mixing along the way with some of the air passing on the surface of the blade, during the blade rotation.

The controller has a feedback loop, for example, to get the valve adjusted, based on the new measured data, to control the nozzle and air jet. The feedback may have a neural net trainer, for example, for future similar conditions, to train the valve accordingly, with a fuzzy logic unit, for example, to slowly open or close the valve, based on the fuzzy variable, as shown in FIG. 55.

The sensors or detectors can be installed on, under, or inside the blade; or on tower, hub, or stationary part of the wind turbine; or outside, nearby, on a stand, platform, or on the ground, as some examples.

In one example, the piezoelectric material is used as the sensor for precise pressure difference measurement, calibrated against the resultant electric field, for a specific load, to find the minute pressure changes on the blade, in terms of the resultant current or voltage, so that the controller receives the values, and the controller decides how much the valve for the nozzle or jet air be opened or closed, or how much the pressure behind the air jet be changed, based on prior calibrations stored in a memory bank, in which nozzle sends the air on the surface of the blade or airfoil, to modify the air patterns around the blade, to optimize the blade performance for efficient electrical generation.

In one example, the piezoelectric material is used as the precision valve, to open or close the nozzle head, to adjust the jet air. The voltage or electric field applied to the material acts as the controlling parameter, calibrated previously on the amount of displacement or mechanical movement it produces (versus the applied voltage or electric field across the crystal, ceramic, or piezoelectric material, stored on a disk or memory unit). Thus, the electric field change (small signal from the controller, for adjusting the valve opening) causes the precise physical displacement of the piezoelectric material, which blocks or opens the opening for the jet air or nozzle, acting as a precision valve, for precise amount of air coming out of the nozzle (e.g. opening or closing the gap from which the air or fluid comes out or passes).

In one embodiment, the amount of air coming out of the jet or nozzle is known, versus how much changes it causes in the air profile or blade rotation efficiency, at various weather conditions, calibrated using computer simulations or wind tunnels, or on an actual wind turbine measurements/feedback, as the history of the operation, and stored on a memory unit, accessible to the controller. So, for a given weather condition, measured periodically or constantly by the sensors, the controller can adjust and map the optimized parameters (e.g. for electrical generation or blade rotation or efficiency) to a new setting of the blade and turbine parameters, to make the electrical generation more efficient (e.g. changing the drag or lift on the blade, by modifying the air profile, flow, or cross section), or safer to operate (e.g. for high speed wind conditions, which require disabling or reducing the speed of the blade).

Thus, in one embodiment, the controller instructs the blade and turbine to the new parameter settings, and the controller adjust the blade and turbine accordingly, periodically or constantly, or based on an event or condition triggering such an adjustment (e.g. when the wind speed goes below or above a threshold, the adjustment is needed, and triggered by the controller). The triggering mechanism or the periodic monitoring described above applies to all monitoring instances in this disclosure, as shown in FIG. 55.

FIG. 55 shows nozzle, with fluid coming out, with gas supply, heater, pressure regulator, and valve, controlled by the controller, and its processing databases and rules, fed by sensors or cameras, in various locations on tower, on blades, or remote, on the ground, using wired or wireless communication, to send a command to perform various functions (e.g. $J_1$, $J_2$), for an embodiment of our invention. The neural network, fuzzy logic, rules, conditions, and triggering events are used, along with user input, to decide what functions (e.g. $J_1$, $J_2$) are needed for optimum operation.

In one embodiment, when the blade starts the rotation at the beginning, from zero angular velocity for the blade ($\omega=0$) (the startup phase), for a given weather and environment condition, such as V and P, the optimized profile and air flow around blades (for the startup phase) are different from those of the steady state phase of the blade operation (as tabulated, graphed, simulated on a software, analytically analyzed, modeled, experimented within a wind tunnel (or on a real device before), or estimated before, and stored on a memory unit). Thus, as the $\omega$ increases to $\omega_0$ (to a steady state), for a given weather and environment condition, the blade or turbine optimum situation and parameters shifts and changes, which require constant optimization and adjustment by the controller, during the transition phase, or at some periodic intervals, to optimize as practicable as possible.

Thus, in one embodiment, the optimized settings for the blade or turbine, such as how much to open the valve for the jet air (e.g. how much air is coming out of the nozzle, or $J_A$), on the blade surface, is a function ($J_A$) of phase of operation, or time (t), or angular velocity of the blade ($\omega$), controlled and monitored by the controller:

$J_A = J(t,\omega)$ (as an example)

In one embodiment, the jet can have different directions on the surface, using hinges, motors, balls, valves, shutters, canals, patterns on the surface, or multiple jets, for example, to move or mix the air in different directions on the blade surface. In that case, the $J_A$ is generalized to a vector ($\underline{J_A}$), having 3-dimensional information included, for the jet air vector or direction, in addition to its magnitude, represented by vector function ($\underline{J}$):

$\underline{J_A} = \underline{J}(t,\omega)$

Note that J can be a function of other parameters, as well, such as P, V, or their derivatives or rates, with respect to time and distance (on the blade):

$\underline{J_A} = \underline{J}(t,\omega,P,V,\ldots)$ (as an example)

The degree as how much to open the valve for the jet air (e.g. how much air is coming out of the nozzle, or $J_A$), on the blade surface, can be based on binary value, OPEN and CLOSE the valve for the nozzle (or TRUE/FALSE, as binary), to start or stop the flow of fluid through the nozzle, in one example:

$J_A$=OPEN (as an example)

This can also be based on a real number, in a range A to B, or normalized to 0-100 percent, or 0-1 ranges (with 0 as indicating being fully closed, and 1 indicating being fully open), for example, to quantify how much the valve is open, in linear scale (or logarithmic or exponential scales):

$J_A$=50%=0.50 (as an example, to indicate that the valve is exactly half-open)

This can also be based on the time, t, to indicate how fast the valve is closed or opened, or show the opening of the valve as a function of time:

$J_A = J(t)$, (as an example) for $t=0$ to 2 sec &

$J_A$=OPEN, or $J_A = 1$, for $t > 2$ sec

In addition, this can be periodic, based on some period $t_0$, e.g.:

$J_A = J(t)$, (as an example) for $t=0$ to $t_0$ & then, it repeats itself based on the period $t_0$.

Figure 56:
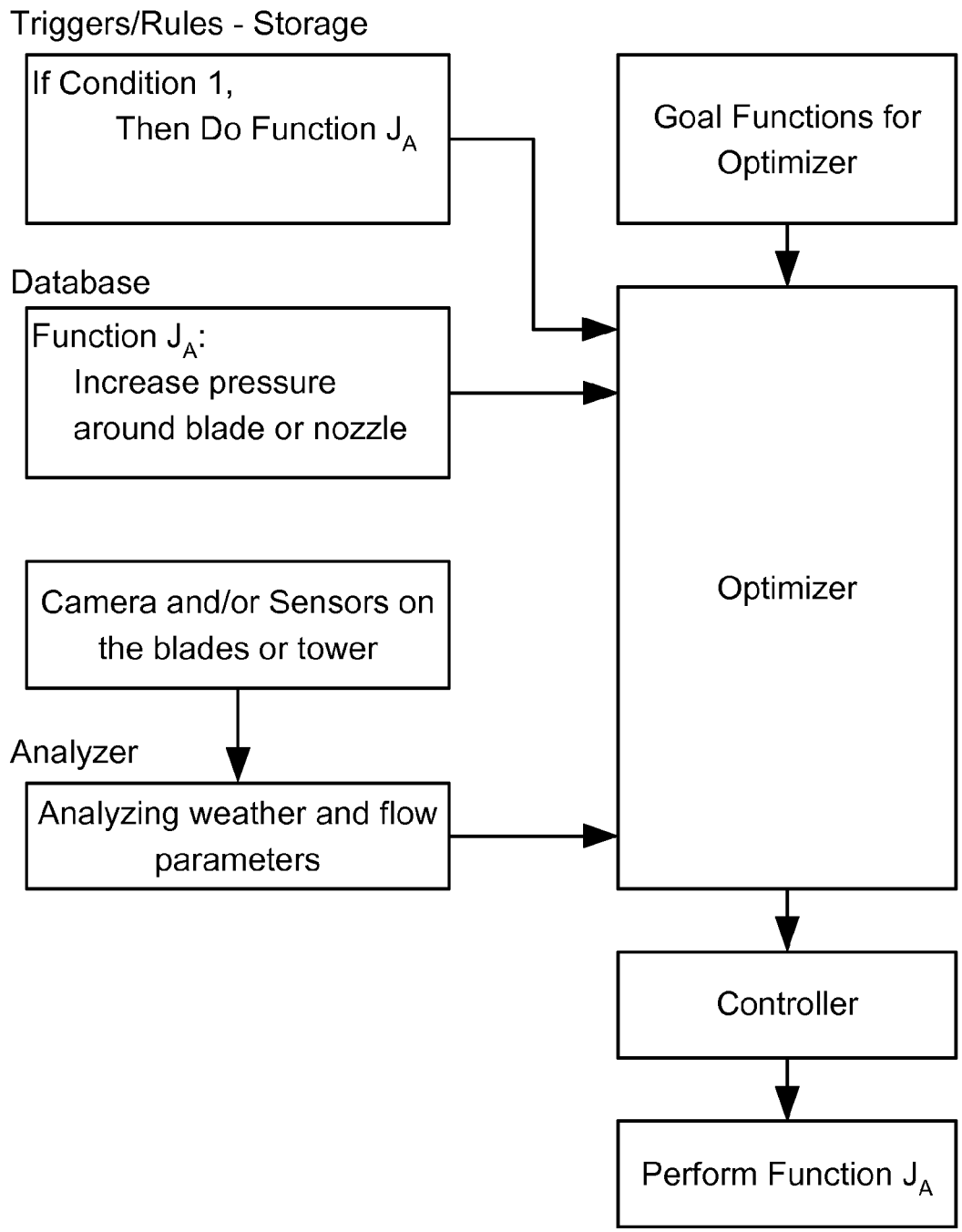
FIG. 56 shows sensors feeding analyzers, with optimizer using the goals and predetermined conditions, and functions (e.g. $J_A$) corresponding to a physical property or parameter, all supplying to controller, to perform a function (e.g. $J_A$), for an embodiment of our invention.

The function $J_A$ can be changed based on some trigger or event, externally or internally to the system or blades/tower, which can be stated as an IF or WHILE statement, stored in a memory or rule storage unit, and monitored and applied after triggering, by the controller unit, as shown in FIG. 56. Here, in FIG. 56, $J_A$ corresponds to the effect of "increasing pressure around blade or nozzle", as an example, based on prior calibration or data in the database.

The speed (rate) and acceleration ($2^{nd}$ order rate) for closing (or opening) the valve are also defined as, for example (which can be controlled by the controller module/CPU/the processor unit):

($dJ_A/dt$) and ($d^2J_A/dt^2$), respectively.

The concept $J_A$ is applied to all functions needed to operate or optimize the system, e.g. it applies to (including some weather parameters, as shown below):

adjusting the tilt of the blades, sideway (as $J_{tb}$),
adjusting the tilt of the tower (as $J_{tt}$),
adjusting the temperature of the air coming out of the nozzle (as $J_{Tn}$),
locking the whole assembly (from rotation) (e.g. during storms) (as $J_{la}$),
braking the whole assembly to stop rotation (e.g. during emergencies) (as $J_{ba}$),
tilting the whole blade assembly upward (as $J_{BtiltUp}$),
changing the pressure of the gas (as $J_P$),
opening the valves to mix gasses (as $J_{mix}$),
changing the velocity of the gas (as $J_V$),
changing the humidity of the gas (as $J_H$),
folding a section of blade (as $J_{fold}$),
cleaning the surface of the blades, using liquid cleaner through nozzles (as $J_{clean}$)
de-icing the surface of the blades, using liquid de-icing agent, through nozzles (as $J_{de-ice}$),
recording the data from sensor S1 (as $J_{sensorS1}$)
sending the data to the controller (as $J_{controller}$),
heating up the blades, using heating wires inside blades (as $J_{heatwire}$),
calibrate some parameter Q (as $J_{parameterQ}$)
or to any other functions for the blades, tower, or its components (as generic J).

All the J's defined here (e.g. $J_{tb}$) are treated the same way as what we said about $J_A$, as shown above.

The adjustments (e.g. closing the valve or changing the pressure for the gas) can be done using a computer (or central controller), manually (by an operator), automatically (based on rules and conditions, locally or for each module or stage), or a combination of all of the above.

Figure 57:
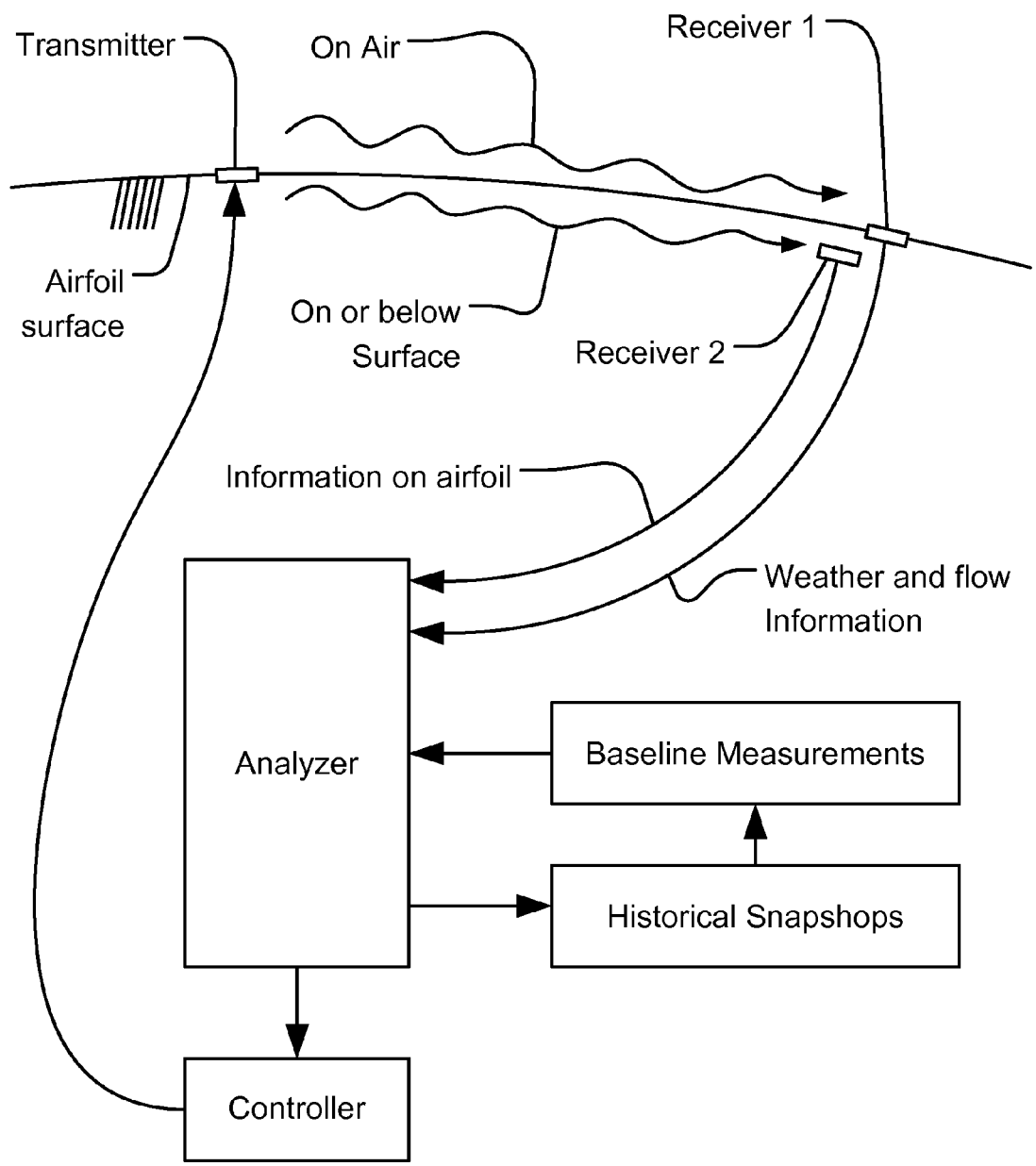
FIG. 57 shows one or more transmitters and one or more receivers, for the electromagnetic, sound, or ultrasound waves, for traveling through blade and traveling through air around the blade, to get information on the integrity of the blade and about the weather parameters, respectively, to be compared to a historic record of baseline, to analyze the information, for controller, to control the functions on tower and blades, and further instruct transmitter(s) to adjust their functions in the future, for better accuracy, if needed, for an embodiment of our invention.

Consider 2 points (or more points) on the tower, blades, or one point on each of them (one of the blades and tower), with at least one of them transmitter, and at least one receiver, as shown in FIG. 57. By sending and receiving a sound wave or electromagnetic wave (for example, visible light or laser), from a waveguide or source from the transmitter position and receiving at the receiving point, using a calibrated curve and table (beforehand), we can get some information about the environmental data or parameters around the blades, e.g. V and P, for the air around the blade, e.g. from the transmission, reflection, or refraction of waves (or interference or combination of them) through specific medium, such as air, for a specific V and P, for example, or any other parameter (e.g. humidity).

Air and surface studies are based on two signals transmitted through the air or through the solid surface of the blade, sensed and analyzed separately, or in combination, as shown in FIG. 57, in comparison with the baseline data in database or storages, in controller or outside controller, for calibrated measurements, to measure weather data, e.g. density of the air ($D_A$) or T, and blades integrity, e.g. finding a micro-crack on the blade, which is a big problem later on, if not fixed early, due to discontinuity or abnormality in the signal received.

In addition, sending and receiving the waves from 2 points of a blade, for example, can be used to find the defects on the blade. For example, a small crack on the blade shows up as a glitch or discontinuity on the sound wave recorded, while traveling on the surface of the blade (solid material), at the receiving side, if the wave passes that crack on its way, compared to a blade with the no-crack situation, calibrated at the factory or averaged/measured on many "not-defective" (brand new, perfect quality) blades, beforehand.

Figure 58:
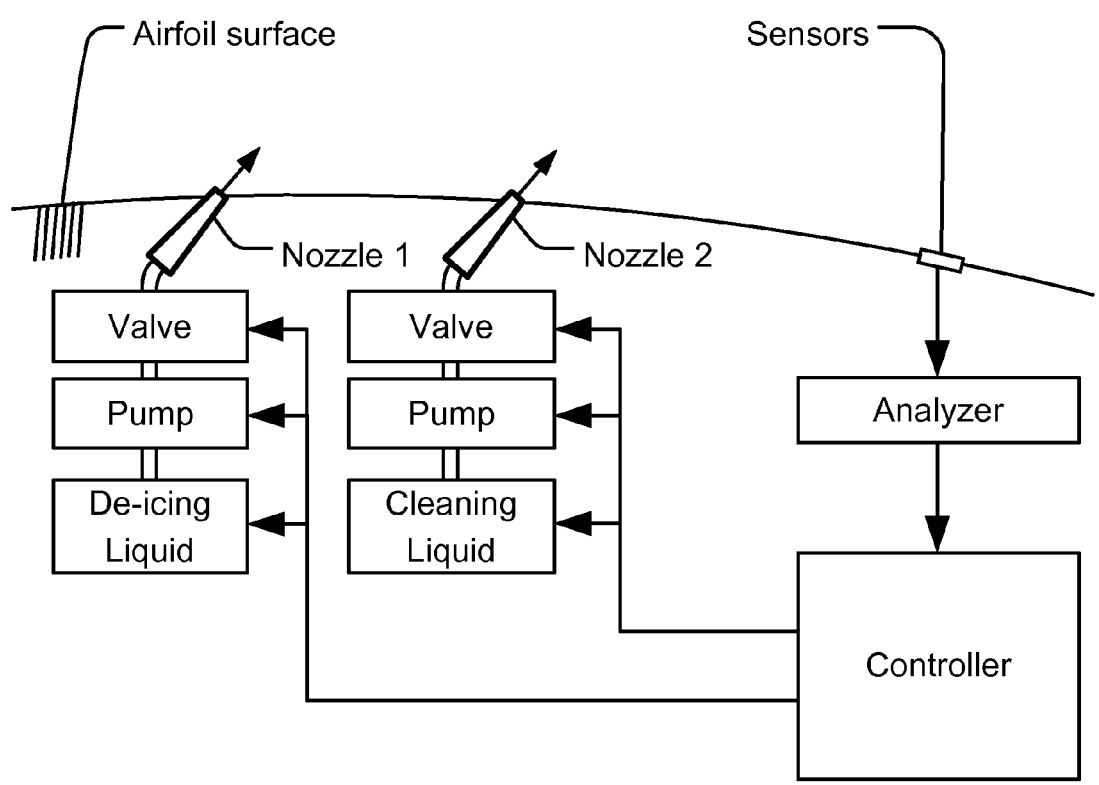
FIG. 58 shows nozzle, with fluid coming out, or mixture, for cleaning material or de-icing, with pump and valve, to be controlled and adjusted by the controller, after analyzing data by sensors, as feedback to system, for an embodiment of our invention.

The holes (or nozzles) on the blades (or on the tower) can be used, for another embodiment and purpose, to deliver a cleaning liquid to wash, or deliver de-icing material or liquid to de-ice the blades, e.g. during winter, with a source of the material in a container or a pipe at the blade, in tower, or on the ground, pumping up or sucking in through the pipes and nozzles to the surface of the blades (or tower), as shown in FIG. 58.

Some blade linear or angular speed ranges (between $\omega_1$ and $\omega_2$), or $[\omega_1, \omega_2]$, are optimum for the rotation of the blades (e.g. increases the electricity generation efficiency, or reduces the wear-and-tear on the blades or tower components and structure, or increases the life-expectancy of the components or the system, or reduces the cost of the maintenance or upkeep of the tower and blades), based on the condition of the weather outside. This can change dynamically, based on the weather parameters (e.g. P and V, for the air flow around the blade, which is time-dependent (t) and location dependent (x, y, z), for example), which can be sensed by sensors periodically, randomly, continuously, or based-on-history (e.g. prior measurements or last measurement), which are fed back to the controller, to adjust all valves, jets, pressures, temperatures, and other functions or parameters on the blades and/or tower (and its components) (some examples are shown above, e.g. in FIG. 54).

Once we are outside the optimum range of operation for the system or blades, the blades, shaft, rotor, gearbox, or other mechanical parts can be locked (e.g. put a brake on the axis of rotation or shaft) or released from engaging the gear box (e.g. mechanically separate the gearbox connection, as "Neutral"). For example, if the wind is too strong or too weak, we may want to stop or halt the operation, or put the system into the Neutral state.

Figure 59:
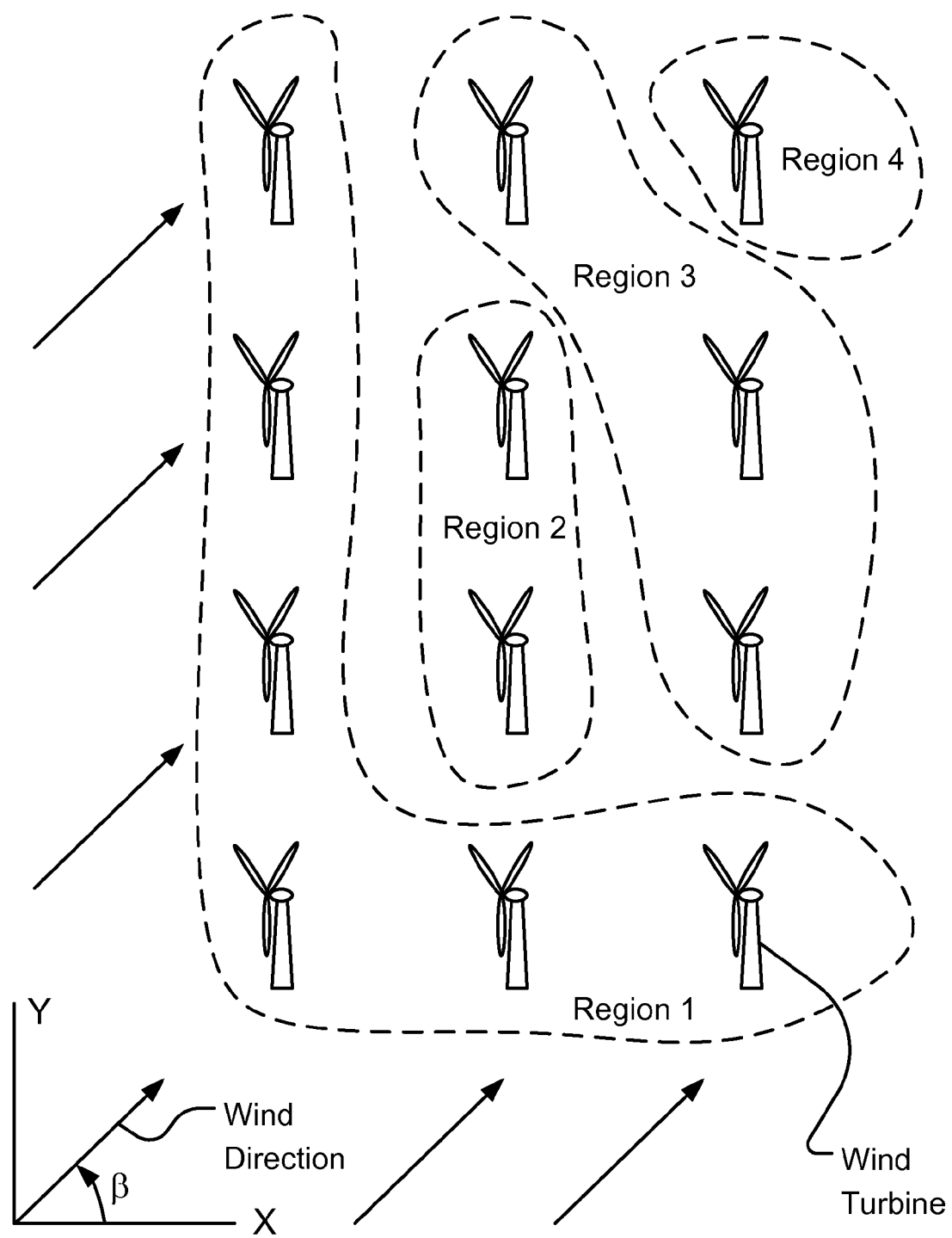
FIG. 59 shows wind turbine farm, with rows and columns, divided in different regions, based on the angle of the wind and direction with respect the array of the towers or wind turbines, for the proximity and interference effects of wind turbines on each other, and number of neighboring wind turbines, for an embodiment of our invention.
Figure 61:
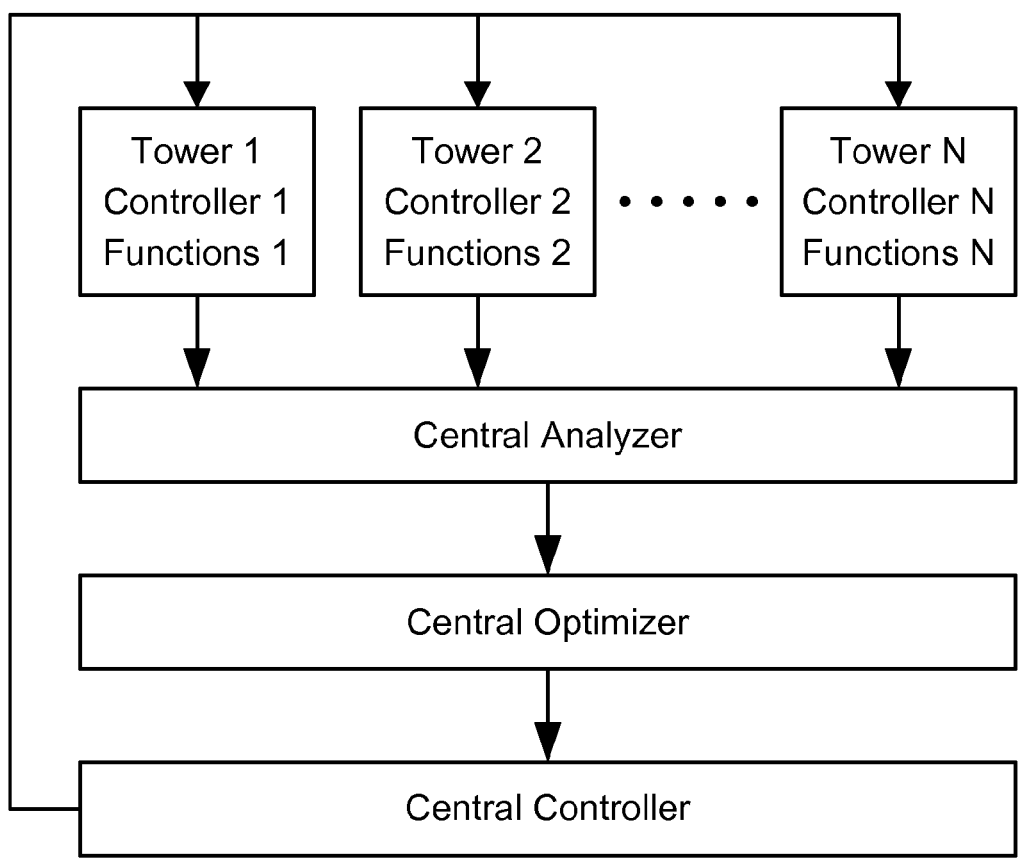
FIG. 61 shows wind turbine farm, with N wind turbines, sending the sensors data to a central analyzer, which is optimized and the result goes to a central controller to coordinate and adjust the functions of all N wind turbines in the farm, to optimize the farm as a whole, on any goal or issue, such as maximizing torque (or minimizing stress on blades, that causes deformation, bend, or tear on the structure), for an embodiment of our invention.

For multiple towers close to each other, the controllers of all towers are synchronized and connected to a central location, as in FIG. 61, to adjust each tower with respect to all of the neighboring towers, as in FIG. 59, to optimize the wind farm (an array or matrix of symmetric or not-symmetric wind turbines or towers, which can be just scattered points on the landscape or map, with no regular patterns, as an example), altogether, because the optimization of the whole farm (overall) may be different from the individual tower optimizations, individually. This is especially applicable when the towers shadow each other (too close to each other, changing the flow of air around the other tower(s)). However, when the towers are far apart, then the individual optimization of the operational conditions of each tower makes sense, which is (almost) the same as the overall optimization of all towers combined.

In practice, the wind direction for each point is different, the towers are not uniformly-placed, and the shadowing effect of each tower is a bit different, depending on the exact position of the tower with respect to the rest of the array or matrix of towers (windmill farm). However, as an example, to the first order, one can simplify the problem, and bunch the towers together, as a subset, to make the treatments the same, and simplify the problem/solution.

As shown in FIG. 59, as an example, assuming a general average wind direction for the matrix of a windmill farm, one can roughly divide the set of towers into 4 different subsets or regions, as an example: Region 1 represents the first set of towers that get the wind energy in that direction. Region 2 is the second set of towers that get the wind energy in the second wave, and surrounded by other towers from all directions. Region 3 is the third set of towers that are on the fringe or boundaries of the wind farm, having neighbors in all directions, except in one direction. Region 3 has 2 pieces or components/sub-regions, which are on the 2 sides of regions 2 and 4. Region 4 is the 4th set of towers that are on the fringe or boundaries of the wind farm, having neighbors in all directions, except in two directions (here, e.g., as (+x) and (+y) directions).

Of course, these regions are not fixed, and they are dependent on the wind direction, for definition of its boundaries, between the regions. In addition, the more precise and fine separation/distinction we make, the more number of regions we will define, which means more calculation power needed for analysis of optimization of all towers, and also means that the optimization is more accurate and better (a trade-off between accuracy and cost of optimization).

Figure 62:
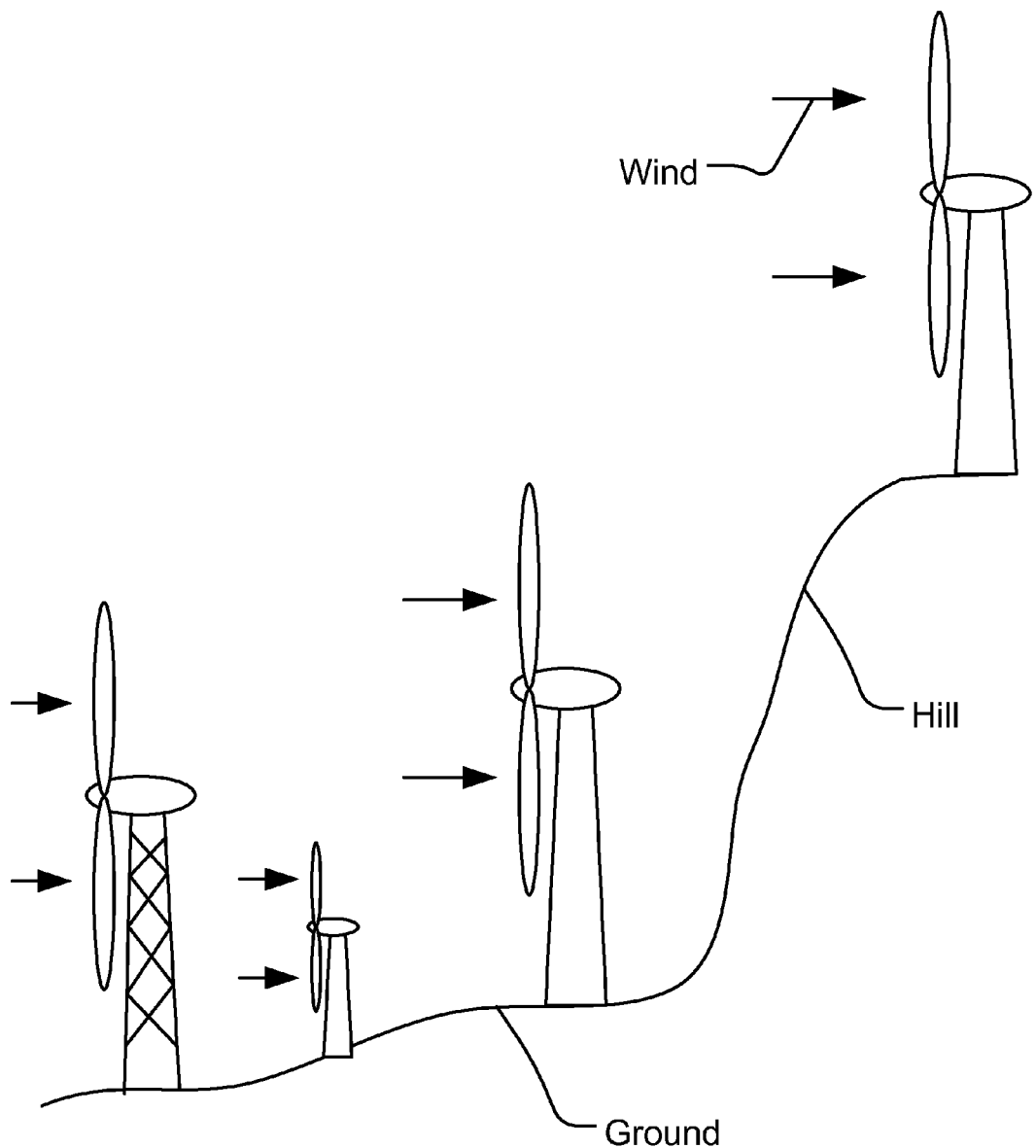
FIG. 62 shows wind turbine farm, with wind turbines at different heights, sizes, or shapes, such as hollow structure made of metal/steel beams, to reduce interference on neighboring unit, based on some acceptable threshold, for proper operation or reduced interference level or stress, per wind turbine, for an embodiment of our invention.

The height of the towers can be non-uniform or the surface of the Earth can be non-uniform, as shown in FIG. 62, to adjust or change the shadowing effect, or redefine the regions, accordingly, into different categories or class of towers. Or, the shape of a tower can be optimized for the neighboring tower, as shown in FIG. 62, to let the air passing through, and not blocking the operation of the other tower.

As shown in FIG. 59, as an example, assume that one or some of the towers in region 2 are interfering with the operation of those in regions 1 and 3. Thus, the valve or jets for air blowing on the blades of towers of region 2 may be adjusted accordingly, as an example, to change the rotation of blades and change the flow of air or wind pattern between the towers, to reduce the negative effect. Alternatively, as an example, some or all of the towers/blades are locked ($J_{lock}$) (stopped from rotation, at the gearbox or at the shaft), in region 2, to reduce the interference with other neighboring towers. Alternatively, as an example, for some or all of the towers, the gap in the middle of the tower is opened ($J_{OpenGap}$) (the mid-section cover is removed, e.g. as described elsewhere in this disclosure), to allow direct passage of air from its mid-section, as shown in FIG. 62, to let the air passing through, and not blocking the operation of the other tower. J's defined here (e.g. $J_{lock}$) are some more examples for the J's defined above.

For N regions ($G_1, G_2, \ldots, G_N$) and M towers ($W_1, W_2, \ldots, W_M$) (where N and M are positive integers, wherein $N \leq M$, and usually $N \ll M$, which means that usually, M is much larger than N), based on the generalization of FIG. 59, in a wind farm, we can optimize function Z for overall performance optimization of the farm (e.g. highest electrical generation efficiency (e.g. by measuring voltage ($V_E$), current (I), and phase, to calculate power and total energy generated, being proportional to the product (multiplication) of the values ($V_E I$)), or lowest stress on components and blades, or longer lifetime of the towers and blades, as metrics of comparison and quantification) as follows.

For a case of no-interference (or no cross-talk or no shadowing) between towers, we have:

$$Z(W_1, W_2, \ldots, W_M) = Z(W_1) U Z(W_2) U \ldots U Z(W_M)$$

wherein U is the union or combination of the optimization of individual towers, as shown on right side of the equation. That represents the union of all values, parameters, and constraints that optimizes the operation of each individual tower. The left side of the equation represents the overall optimization for the whole wind farm.

For a case of interference (or cross-talk or shadowing) between towers, we have:

$$Z(W_1, W_2, \ldots, W_M) \neq Z(W_1) U Z(W_2) U \ldots U Z(W_M)$$

which means that optimizing all towers individually will not result in optimization of the farm as a whole. So, the optimization should be done with that context in mind, using constraints applied or imposed by the neighboring towers.

The reason for inequality above is simple, because mathematically, there are some extra term(s) in the equation missing, relating all cross-linking terms or intersection between towers crossed together (using the symbol/concept of "intersection" in mathematics, "∩", for Set Theory), representing all the interferences between the towers (e.g. single one-way interference or mutual interference or combinational interference). The bigger the effect of interference (e.g. the closer the towers are to each other), the larger the coefficient of that specific intersection term (or larger contribution to the overall effect on a specific tower or assembly/system).

Assume that each tower within a region is behaving similarly (for all the towers within the same region). Then, the problem from solving for optimization for M towers is reduced to the problem of solving for N regions (wherein usually N<<M), reducing the complexity of the problem:

$$Z(W_1, W_2, \ldots, W_M) = Z(G_1, G_2, \ldots, G_N)$$

As shown in FIG. 59, for that example, the equation above becomes:

$$Z(W_1, W_2, \ldots, W_{12}) = Z(G_1, G_2, G_3, G_4)$$

For example, in this example of FIG. 59, solving for the constraints of these 4 regions, one may get an optimum solution for Z that has the following parameters:
- all of the towers/blades are locked/not rotating ($J_{lock}$), for region 2, or: ($J_{lock}=1$) or ($J_{lock}=\text{TRUE}$)
- for all of the towers in region 1, the gap in the middle of the tower is half-opened ($J_{OpenGap}$), or ($J_{OpenGap}=0.5$)
- for all of the towers in region 3, the valves for nozzles are 40 percent open, sending a specific gas (such as water steam or oxygen) from a cylinder in the tower, piped through the blades, with a specific P, V, and T, through a heating unit and a pressure manifold to adjust the pressure, and ending at the nozzles on the blades, injecting the gas on the surface of the blades, to modify the air patterns on the blades, to increase the efficiency of the blade rotations, for the electricity generation: ($J_A=0.4$),
- for all of the towers in region 4 (one tower only), the whole blades assembly/axis/shaft is tilted backward/upward, by an angle equal to 1 percent of Radian ($J_{BtiltUp}$), or: ($J_{BtiltUp}=0.01$)

In another example, assuming that the interactions between regions 1 and 2 are the largest, compared to other interferences between other regions, as an example, for an approximation, then we have:

$$Z(W_1, W_2, \ldots, W_{12}) = Z(G_1, G_2) U Z(G_3) U Z(G_4)$$

which is a much simpler problem to optimize than the original 12 towers, each interacting potentially with 11 other towers.

For the case of towers of different shapes and heights, in a specific region of landscape, we can bundle them together as a specific class (C), for K different classes (K is a positive integer), as an example, and treat them the same way we are treating the regions, as described here, as a subset of the wind farm, with a unified answer and optimization parameters.

$$Z(W_1, W_2, \ldots, W_M) = Z(C_1, C_2, \ldots, C_K)$$

wherein $K \leq M$, and usually $KZ << M$.

So, in general, having both distinct regions and classes, with no overlap in members/towers, we have:

$$Z(W_1, W_2, \ldots, W_M) = Z(C_1, C_2, \ldots, C_K, G_1, G_2, \ldots, G_N)$$

wherein $(K+N) \leq M$ (and usually $(K+N) << M$).

For the example above, if the towers in region 2 are turned off (locked or stopped), as an example, then we have:

$$Z(W_1, W_2, \ldots, W_{12}) = Z(G_1) U Z(G_3) U Z(G_4)$$

which means that we can optimize each region individually, for this example.

In fact, to find the cross-link between towers, and the corresponding mathematical terms, one can turn off one region (or tower) (locked or stopped the function or rotation, as shown in the example above for region 2) and measure the performance of the rest, or change a region's status or parameters one at a time (comparing the 2 cases together), to be able to pinpoint and separate the cross-link/contributory terms between the regions.

Another way to optimize is to initially ignore the cross-link/contributory terms between the regions (or towers), and run each region (or tower) one at a time (either actually or in simulation model), to optimize all $Z(G_i)$ individually (where i is an integer, for indexing, with a range of i=1 to N), resulting as $Z_0(G_i)$. Then, run 2 neighboring regions (or towers) at a time, to adjust on all individual $Z_0(G_i)$, resulting as $Z_1(G_i)$. Then, run 3 neighboring regions (or towers) at a time, to adjust on all individual $Z_1(G_i)$, resulting as $Z_2(G_i)$. The iteration continues, until we exhaust the whole wind farm. That is, this continues, until we get to this stage: Run all N neighboring regions (or all towers), which means running the whole wind farm, to (incrementally) adjust on all individual $Z_{N-2}(G_i)$, resulting as $Z_{N-1}(G_i)$. Then, the final result, as $Z_{N-1}(G_i)$, is a good approximation for the optimization of the whole wind farm. That is:

$$Z(W_1, W_2, \ldots, W_M) = Z_{N-1}(G_1) U Z_{N-1}(G_2) U \ldots U Z_{N-1}(G_N)$$

Of course, to do this process faster, but with less accuracy, one can skip some steps, and jump from 2 neighboring regions step to N neighboring regions step (for all of the wind farm). That is, one can go from $Z_1(G_i)$ to the last step of $Z_{(n-1)modified}(G_i)$, in one step, without any intermediary steps, mentioned above (as a good approximation of the method mentioned above, with less number of steps and calculations). That is: Run all N neighboring regions (or all towers), which means running the whole wind farm, to adjust on all individual $Z_1(G_i)$, resulting as $Z_{(N-)modified}(G_i)$.

We can also ignore the cross-link between regions 1 and 4, due to the large distance between them, and other towers in between, as a good approximation, as another example.

So, in general, to perform better, the towers must be much higher than the surrounding ground and obstacles, with enough distance from other towers. There is an exception to this rule, when 2 towers are optimized together to work in tandem, basically as one big unit and system. Then, they may be very close to each other, or even located on the same axis or shaft, or on the same tower but positioned at different heights or angles, with axis of rotations or shafts parallel or same or angled, for different embodiments, with respect to each other.

The optimization or higher efficiency taught here results in higher efficiency for electrical generation, longer life of blades, mechanical components, turbine, structure, and tower, with less vibration and wobbling on the blades during rotations, less cost of operation and maintenance, bigger range of conditions suitable for operation for the wind turbine in terms of weather conditions and wind speed, and less voltage sag for the generated electricity.

As shown in FIG. 60, the shadowing effect may not be the same for different heights, and sides, back, or front of the blades. Thus, the minimum distance of the tower to the left or right (sides) ($L_{side}$) is different from those of (minimum distance for) front ($L_{front}$), back ($L_{back}$), up ($L_{up}$), down ($L_{down}$), diagonal front ($L_{Dfront}$), or diagonal back ($L_{Dback}$). Usually, a 3-dimensional envelope defines the safe minimum distances from the obstacles (e.g. house, tree, ground, hill, sea, or soft material, such as sand reservoir or region) and/or neighboring towers. Of course, the degrees of sensitivity to the kind of obstacles and towers are a bit different. Thus, one has different 3-dimensional envelopes for different materials, obstacles, and towers.

Figure 68:
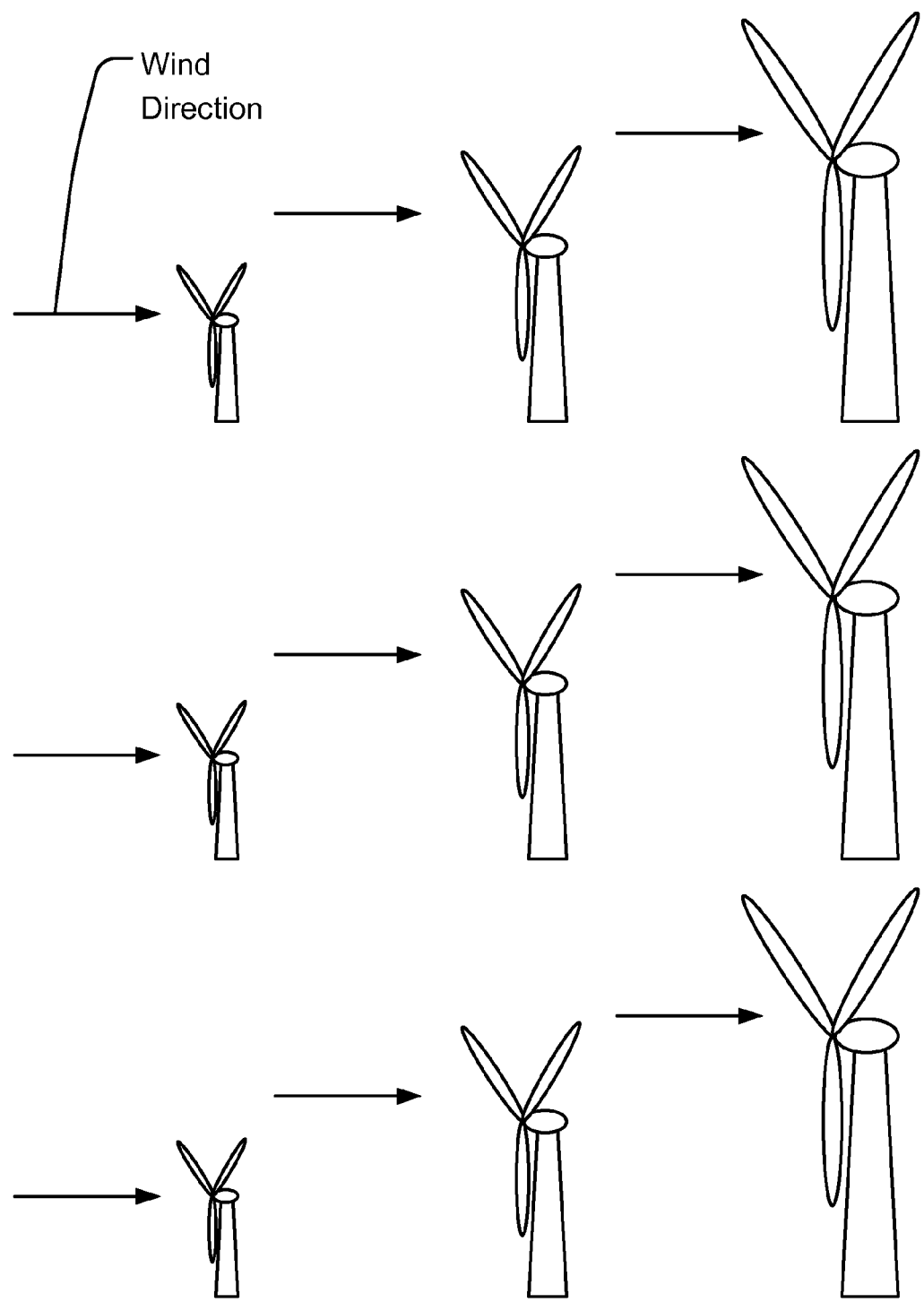
FIG. 68 shows wind farm with matrix, array, or multiple turbines or towers, in different rows and columns, with various sizes or heights, to stagger, and to reduce the interference effect on neighboring units, for an embodiment of our invention.

As shown in FIG. 68, the shadowing effect of an array or matrix of wind turbines (or wind mills) can be minimized by staggering the towers at multiple N different sizes or heights, at different rows or columns, as shown for N=3 in the figure, for a given region, with winds coming predominantly from a specific general direction, based on history and records. One can also use different heights for towers, in a row, as an example.

Figure 63:
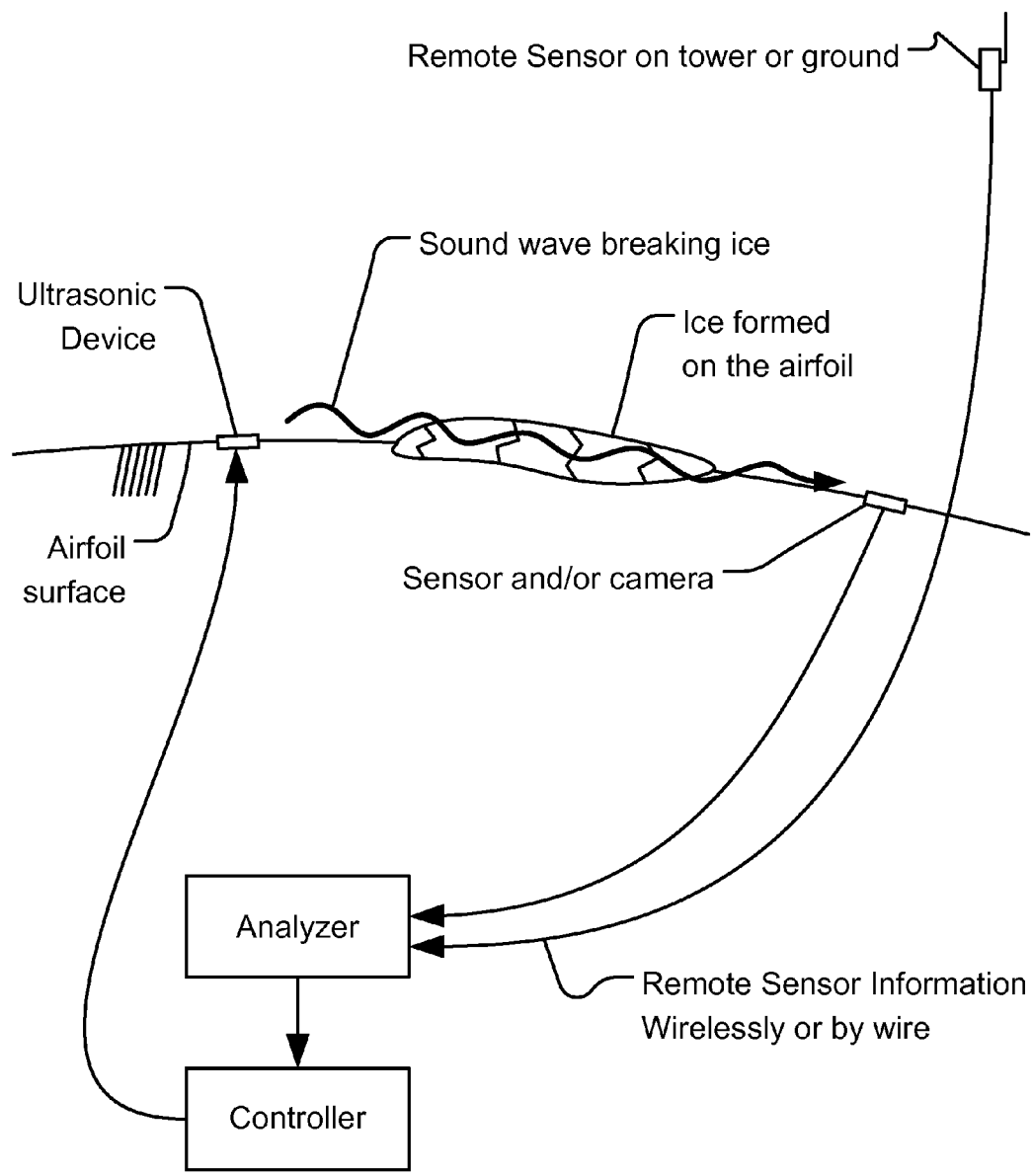
FIG. 63 shows an ultrasonic or vibration device (or any source of radiation, e.g. electromagnetic waves) sending waves on or close to the surface of the blade, or under the surface, to break the ice or prevent the formation of ice, monitored by sensor(s) and camera(s), or heat them up as a method of prevention (e.g. with microwave frequency), or resonate at a frequency for breaking the bonds for ice formation, mechanically, with analyzer and controller, for feedback from sensors, at different locations, for an embodiment of our invention.

One way of removing ice, snow, dirt, or debris from blades is to use an ultrasonic device or a vibrator on the blade (e.g. at a resonant frequency, or changing frequencies, for various materials to be removed, optimized for that specific material, such as ice), close to the blade, or under the blade's surface (inside the blade), so that for flexible or rigid blades, it shakes/vibrates the surface slightly, to remove the unwanted accumulations, as an example. The rain, humidity, or snow detectors have already been used in cars for windshield wipers' operation and speed adjustments. Such detectors can be used here, to detect the snow or ice, to start the ultrasonic device, when needed. Thus, the operation of the ultrasonic device can be initiated manually, by the user, or by computer, automatically, based on some rules, conditions, or triggering events, as shown in FIG. 63.

For the electrical conducting purposes, between the two moving objects in the mechanical transmission system for the wind turbine, one can use mercury, or any electrical conducting liquids, liquid forms, gasses, mixtures, or polymers. Some other solutions are metal brushes, conducting polymer brushes, or Carbon Nano-Tube brushes, placed between the moving objects, to conduct electricity between the relatively moving objects.

Figure 64:
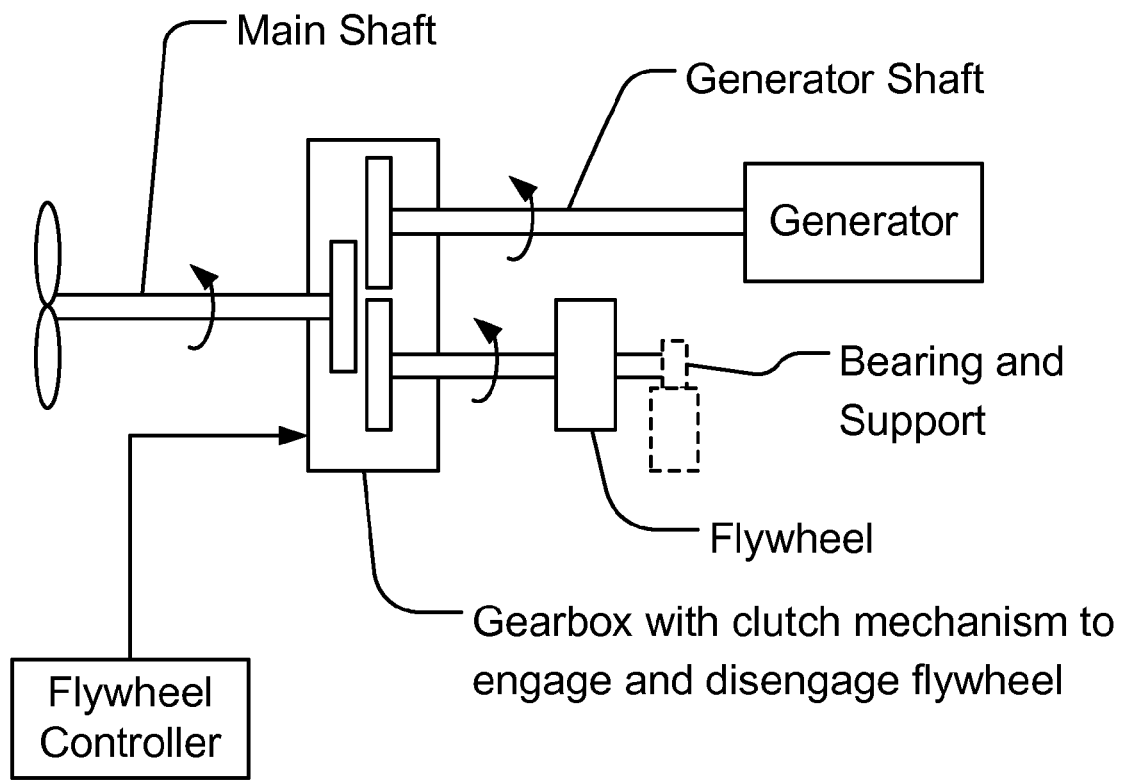
FIG. 64 shows a wind turbine with flywheel, with possibility of placing at many locations in the system, for storing energy or smoothening the rotation and cycle, with gear(s) and clutch, to engage or disengage the flywheel, or harvest the energy of the flywheel, e.g. at the slow wind situation or sleeping/idle mode for the generator, with a controller, deciding the mode of operation, for an embodiment of our invention.

For storage of the energy produced, that may not go to grid or immediate local usage of the consumers, we add a flywheel and battery to the system of wind turbine, to store the energy for future use. The battery is connected to electrical generator, directly, or through an optional switch. The flywheel is connected to the shaft directly, or through the gearbox, or through an optional gear that can engage or disengage with the flywheel axis, with a clutch system, similar to stick-shift car system, or with a lateral movement of the axis of the flywheel, out of the way, to disengage the flywheel, as shown in FIG. 64. The flywheel can be in the tower, or on the ground, outside of the tower, nearby.

We can put the flywheel at different places, e.g. nacelle, on generator, in hub, on shaft, in tower, in gear box, or connected to it. Some example for the flywheel location is in FIG. 21, at item 2111. The flywheel can generate electricity at the low wind or no wind situations, and can store energy for other purposes, e.g. in farms, e.g. grinding or pumping. It can smooth the transition between high-medium-low wind situations, with a larger range of operation, with more uniform power generation, which are all advantages.

We can also use flywheel for removing or reducing the jerkiness of blades during rotation (due to the proximity to the tower, on the lower part of the rotation cycle for each blade, as an example), to smooth things up, in one embodiment. In one embodiment, we can set the flywheel off-center, with respect to the central axis. In one embodiment, for example for 3 blades on the tower, we need that the flywheel rotates 3 times faster than the speed of rotation of the blade, as angular velocity, to compensate for 3 jerkiness of blades during/per one rotation. This can be done by using a pair of gears or a gearbox, with the ratio of size, radius, diameter, or circumference of the 2 gears at 1 to 3 (or ($\frac{1}{3}$) or about 33 percent), as is conventional on any gearbox for the cars, with the flywheel axis having the smaller gear, to speed up/increase by a factor of 3, in angular speed/rotation, for the flywheel, while engaging with the gear from the blade axis/shaft.

Figure 65:
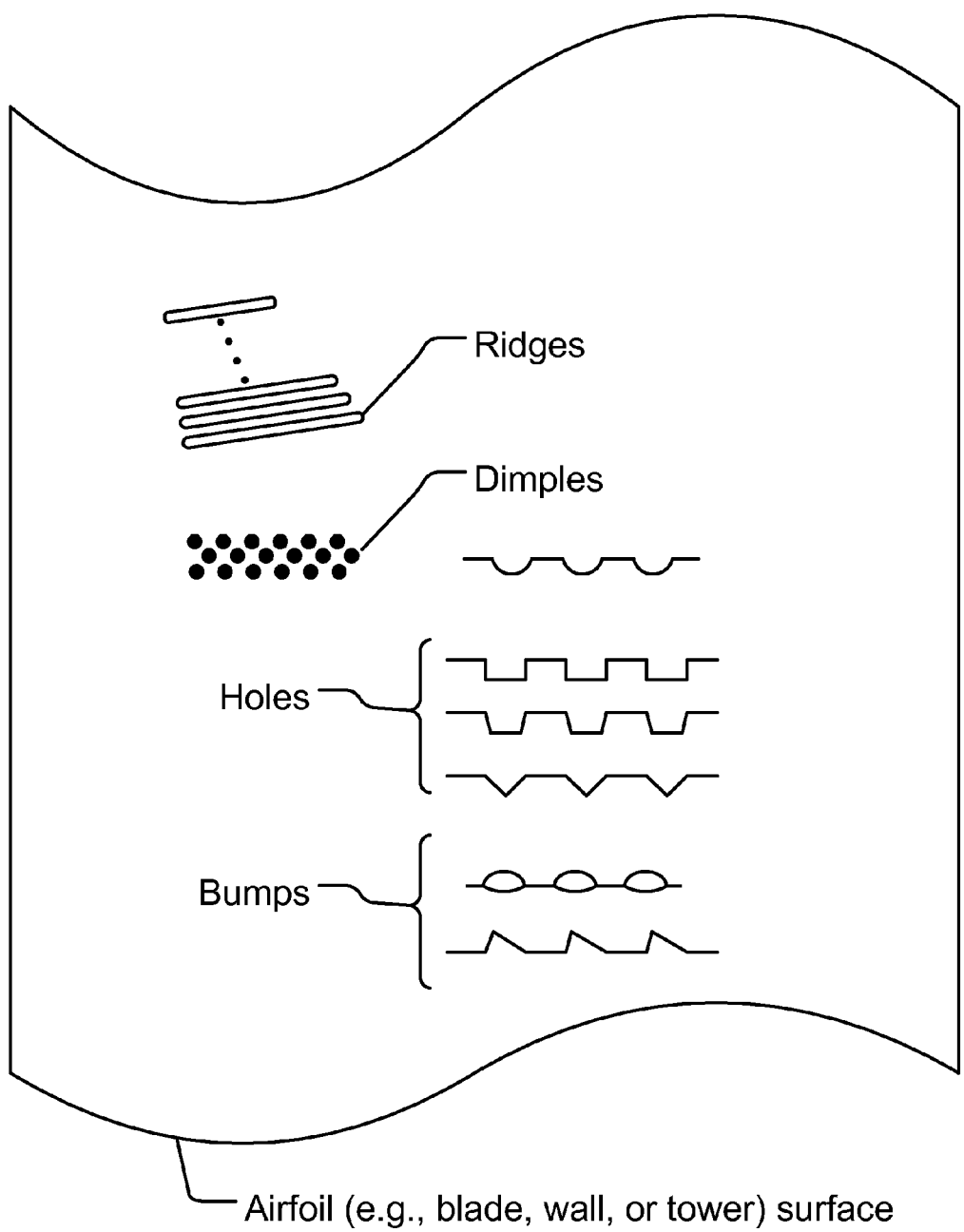
FIG. 65 shows blade with features on it, e.g. ridges, dimples, holes, and bumps, for an embodiment of our invention.

For the "features" on the blades or on the surface of the tower (or for blades, or for walls or jacket or plates or spoilers attached to the tower), we use one or more of the followings: ridges (of any shape or cross section, for example, circular, triangular, cone, cylindrical, rectangular, V-shaped, W-shaped, L-shaped, or curved), dimples (or as vertex generators) (of any shape or cross section, e.g. big, small, concave, convex, patterned, random, same size, various sizes, different densities and distributions on the surface of the blade, circular, rectangular, elliptical, square, checkered, crossed, V-shaped, W-shaped, L-shaped, or triangular, e.g. similar to the golf ball texture or surface), holes (of any shape or cross section), gaps, bumps, slits, or cracks (as in FIG. 65). The ridges on the blades, for example, improves the boundary layers, increasing the torque for the blade, for more efficient electrical generation by the turbine (with higher efficiency for a given wind power). In one example, the dimples or features are elastic, non-rigid, expandable, like a balloon, by air or by change of pressure in/out on 2 sides. In one example, the features mentioned above (e.g. dimples) are symmetric, and in another example, it is asymmetric or randomly patterned.

In one example, these features (e.g. ridges) are permanent, and in another embodiment, they are retractable or removable or covered or closed off (i.e. return back to the original flat surface of the blade). The features cause different air flow patterns for any regime of operations for blades (including laminar flow and turbulence domains), for optimization of the blade operation and rotation, for maximum efficiency of the blades and generation of electricity (e.g. getting the maximum amount of the energy from a given wind power and speed/direction). Since the weather condition and parameters change continuously, we have to adjust the blade/tower parameters dynamically and continuously, as well, to optimize in real time, at any given moment. These dimples, bumps, and others mentioned above can be placed in the middle of the blade, located on top of the blade, bottom of the blade, on edges-only of the blade, tip of the blade, all over the blade, or on the leading edge of the blade, with respect to the rotation of the blade or front of the tower.

The plates attached to the body of the tower act as a directional guide for the flow around the tower (as in FIG. 67, resembling back spoilers for the cars), to optimize the rotation of the blade at different speeds or depending on the weather conditions, such as P, V, and H, for the air around the blades, at a specific location on the blade, for comparisons. The plates are retractable or removable (i.e. return back to the original flat surface of the tower), in one embodiment. In another embodiment, the plates are permanent and affixed to the tower. In another embodiment, the plates are rotatable on a rail or cable around the tower, with horizontal rails around the tower, attached on the wall (or moved up and down, with vertical rails attached on the tower wall), at the outer wall of the tower, at the circumference, so that they can be set at the right locations, depending on the direction of the wind and other weather parameters, such as P and H.

As in FIG. 69, the tower may have 2 wings (or more than 2 wings, or less than 2 wings) (or wall or partitions) (retractable, movable, on a rail, on a wheel, on a track, foldable, fixed, or rotatable around the tower, to change the position and angle with respect to the front or blade position, for different wind direction and speed, or other weather parameters), to optimize the operation of the turbine and blades. The wing can be full height, variable height, fixed height, or shorter height, compared to the height of the tower. We can also use ridges (of any shape or cross section, for example, circular, triangular, cone, cylindrical, rectangular, or curved), dimples (of any shape or cross section), holes (of any shape or cross section), gaps, bumps, slits, or cracks, on the wings, as well, similar to the tower surface, mentioned above. The wing thickness maybe narrow or wide, with solid walls or hollow walls, as different embodiments.

The braking system to stop the generator from functioning or blades from rotating can be done by a hydraulics system, with a moving component or piston in a hydraulic cylinder, to exert pressure to stop the shaft from rotation. In addition, it can be done by a mechanical brake or lock on the gearbox to prevent any rotation for high speed shaft, with brake disc on the shaft, and brake blocks or calipers are spring-loaded, pressing against the brake discs. Furthermore, it can be done using a twisted tip of a blade which rotates with an angle, such as 45 or 90 degrees, with respect to the rest of the blade, to increase the cross section of the blade, to stop or slow down the blade rotation, as a brake (as in FIG. 66).

This method (of FIG. 66) can also be combined with FIG. 44, in which we opened the 2 covers to open the conduit in the blade for stopping or braking purposes, with the same cable/motor/mechanism, so that we effectively brake with 2 different methods simultaneously, for more efficiency for slowing down/braking Note that the concept of the gap, taught and shown here, for the middle of the tower structure, is reducing the stress on the blades and tower, increasing lifetime, reducing maintenance cost, reducing vibrations or jerky motions for the blade rotation at some angles, and removing the need to tilt the whole assembly for the blades upward, to avoid collision to the tower, which is costly and easier to break down, in terms of longevity and structural integrity.

One of the goals is to increase the torque (maximize or optimize), within an acceptable (safe) range of operation, for the blades. Another goal is to increase the range of safe operation for the blades, so that in high winds or low winds, we can still operate and generate electricity. Other "goal functions" are (which are achieved here by our embodiments/inventions):

higher speed of blades,
optimum speed of blades, in general,
higher power and total energy generated, being proportional to the product (multiplication) of the values ($V_E I$), or voltage times current, or
lower stress or vibrations of the blades or tower, sensed by sensors, or ($V_E I$) variations, as measured.

As shown in FIG. 55, for the gas coming out of the nozzle with some (colored) powder (or water steam/spray), for example, the camera on the blade can capture the pattern of the air flow near the blade, in a color picture, to be analyzed by the controller and compared with calibrations stored in databases, for optimum pattern of air flow, to be adjusted further by the controller, based on the current and subsequent pictures. The camera can also take pictures of snow and rain, for further analysis and adjustments in those weather conditions.

FIG. 70 shows a blade, with multiple components or pieces, rotating with respect to each other, dynamically adjusting the angle of attacks, piece by piece. For example, the pieces share a cable plus gear, to change the amount pulled, for example, moving the pieces in tandem, using the same motor.

FIG. 71 is the cross sections for the nozzles shown in FIGS. 1-6, chosen on any combination, as different embodiments. Note some nozzles (e.g. in FIG. 4) are point sources, and some are line sources, for air or gas or fluid coming out (e.g. in FIGS. 2-3).

FIG. 73 shows the edge of the blade which can open/extend, for the shape of the blade, which is useful for the start of the turbine from zero angular velocity (initial startup from stationary position/status/phase), to have a bigger area, for more efficient startups (or during the slow wind situations). Then, it folds back to the original position, for the normal speed and operation of the blades. Again, for the slow down or brake of the blade, to stop the rotation, it will open/extend again. So, the mechanism has multiple purposes for different stages of the operation of the blade.

The extended piece can rotate 45 or 90 degrees, or in or about that range, for example, with a centrifugal force extending the piece, with a cable holding the piece, with a screw action, rotating 90 degrees, for example, during extension stage, as an automatic extension mechanism. This can be done with a motor, rods, levers, or other methods, as well, as another embodiment. A spring and its attached weight can also be used, which is calibrated to automatically extend or pull back the extra piece at the tip of the blade(s), during the rotation of the blades, similar to FIG. 53, to use the potential energy of the spring for movement of the extended piece, as another embodiment.

One of the advantages of this method of piecewise adjustment of the angle and pitch is that we do not have to adjust the pitch of the whole blade, which is much heavier and harder on all joints and life expectancy of components. Thus, it is easier to implement, especially for heavy and large blades, as shown in FIGS. 72 and 73.

FIG. 74 shows a liquid sensor, for example using mercury or similar conducting liquid or material or polymer, with 4 pairs of connections and electrodes on each side of the sensor or switch (as an example, 4 directions and sides or terminals, and one set or pair per side or per terminal). The switch is on/conducting for each pair or side, when that side is shorted by the mercury or conducting liquid or mixture. Thus, during a complete rotation, we will have each pair on/conducting once per rotation. This switch can be positioned on each part of the blade or rotating part in the system, to toggle between 4 or multiple positions or pair of conducting electrodes, e.g. $S_1$, $S_2$, $S_3$, and $S_4$. This device or sensor indicates (electrically) the speed and rotation of the blades, by looking at the train of the electrical pulses observed for $S_1$, $S_2$, $S_3$, and $S_4$, as shown in FIG. 74, using the durations and the period of the pulses, as periods, which is inversely proportional to the frequencies or angular speeds. Thus, it is an accurate sensor for the speed of rotation of the blade, or measuring angular velocity.

For fast blade rotations, the mercury cannot catch up with the rotation, and we see that effect on the train of the electrical pulses observed for $S_1$, $S_2$, $S_3$, and $S_4$. To see the on-set of this effect, let's evaluate this: (centrifugal force compared to the gravitational force):

$$g \ll r\omega^2$$

where g is the acceleration constant of the gravity for the planet Earth.
where r is the radius, for the rotation.
$\omega$ is the angular velocity or ($2\pi f$).

where f is the frequency, for the rotation, or ($1/t_p$).

where $t_p$ is the period of rotation.

For example, if we have r=10 m (meter), then, roughly:

$1 \ll \omega^2$ or: $1 \ll \omega$ or: $1 \ll 2\pi f$ or: $t_p \ll 6$ sec (seconds)

We can set this switch at different locations (multiple) on the blade(s), or inside, at various radiuses, to have various train of pulses, to synchronize and turn on/off the various functions in the tower and blade, such as $J_A$, e.g. based on the speed of rotation, or stage of rotation, or passing a threshold, e.g. above some speed, or another triggering event, to start or stop a function, such as $J_A$.

One can combine belts, rollers, and nozzles on the same blade to manipulate the flow of air around the blade, as shown individually in figures and described above.

Figure 1A:
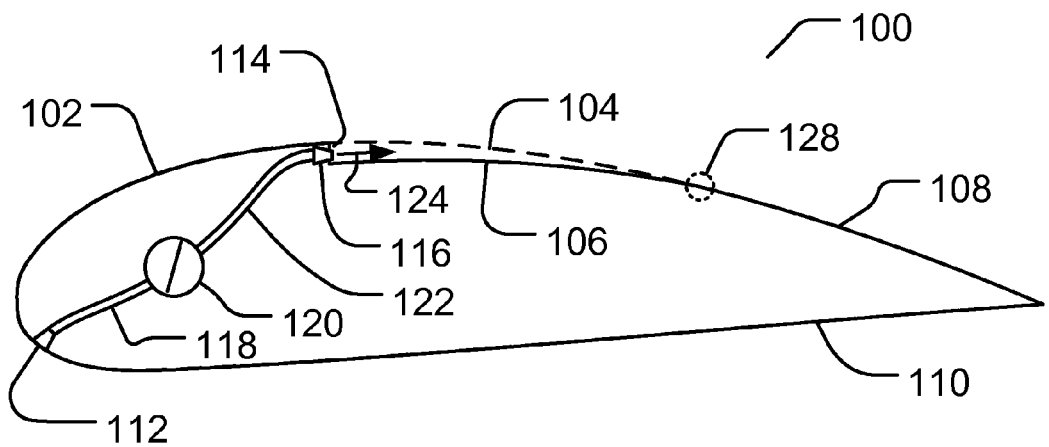
FIG. 1(*a*) shows the blade or airfoil, with nozzle and valve, for an embodiment of our invention.
Figure 7A:
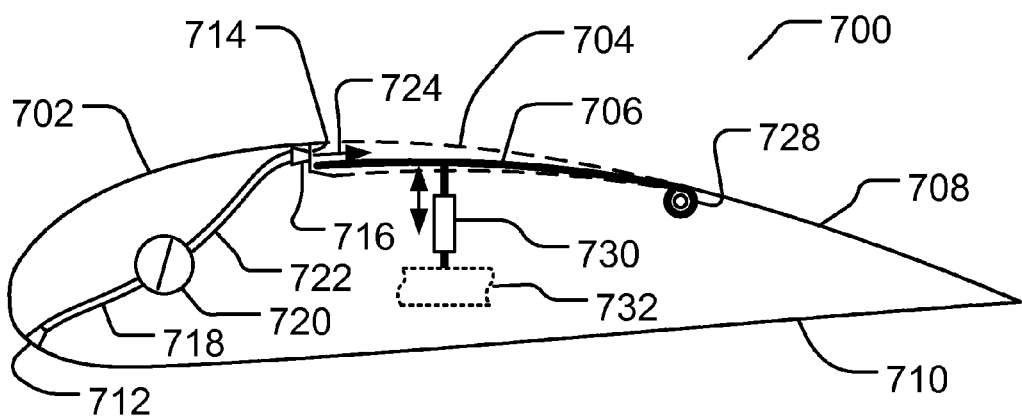
FIGS. 7(*a*)-(*c*) show the blade or airfoil, with nozzle, with different components, for an embodiment of our invention.

In FIGS. 1(a) and 7(a), one can use pump, motor, valve, regulator, pressure valve, or manifold, interchangeably, as different embodiments.

The sensors (e.g. anemometer and wind vane sensors) can talk to the controller or other units using wired or wireless communications, with antenna, for example.

The Micro-Electro-Mechanical Systems (MEMS) is the integration of mechanical elements, sensors, actuators, and electronics on a common (e.g. silicon) substrate, which already been used as inertial sensors for the bridges, for bridge and structural integrity studies, for monitoring. These MEMS devices can also be incorporated as sensors for measuring weather parameters, e.g. P, T, and H, on the blade and tower, to send the data for analyzer in the blade or tower, as discussed above. The movement of the parts can be generated or initiated using fluid surface tension, electrostatic, or magnetic forces.

The startup of the blades from zero speed takes a lot of momentum, especially for jumbo towers. Thus, for example, we can start using an electric motor, using electricity from stored energy in battery or from grid. Alternatively, we can use the nozzles and air/fluid out of them, as the jet action, to propel the blades in the right direction, the same way the jet plane moves, by pushing backward, to go forward, to move the blades. That is a very efficient way for the startup of the assembly, to rotate the blades.

MORE DISCUSSIONS ON VARIOUS EMBODIMENTS AND FIGURES

Figure 1B:
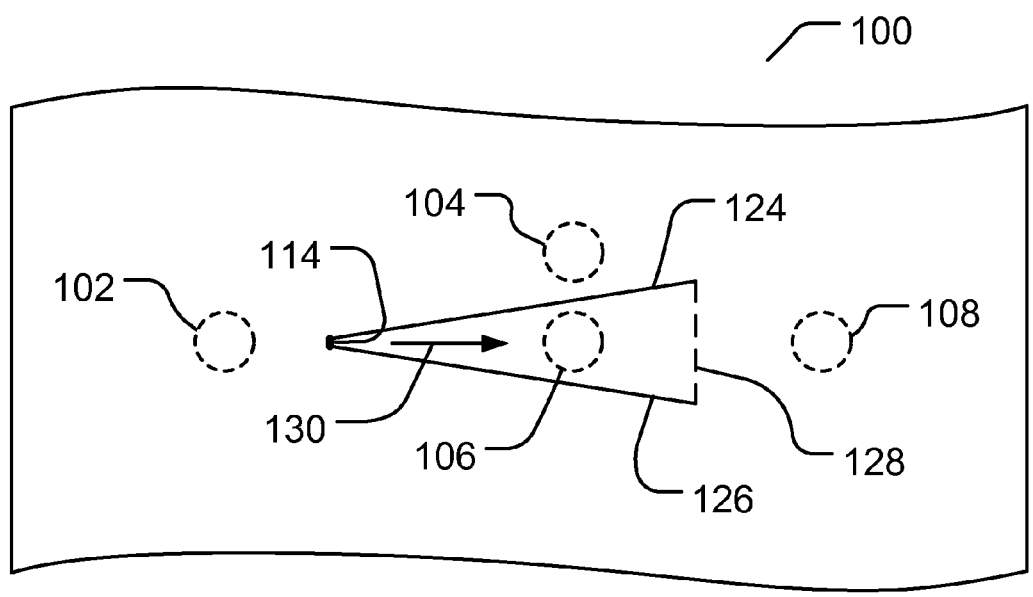
Figure 2A:
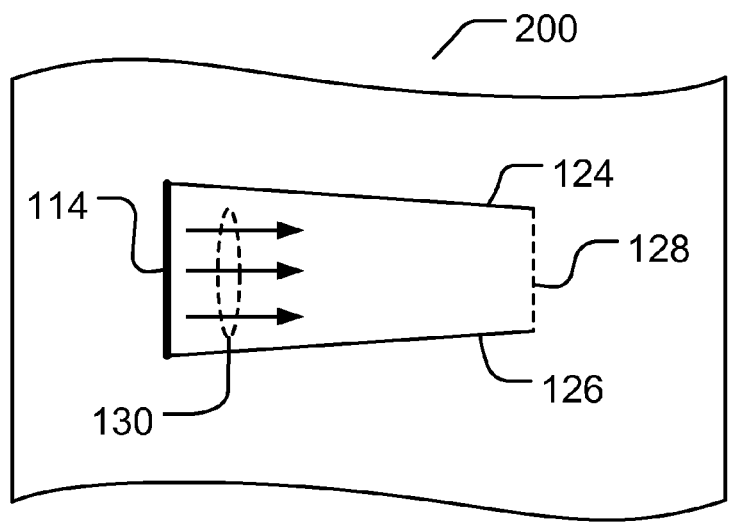
FIGS. 2(*a*)-(*e*) show the blade or airfoil, with nozzle(s), with different shapes, for an embodiment of our invention.
Figure 2B:
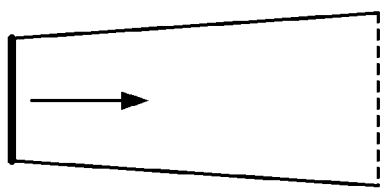
Figure 2C:
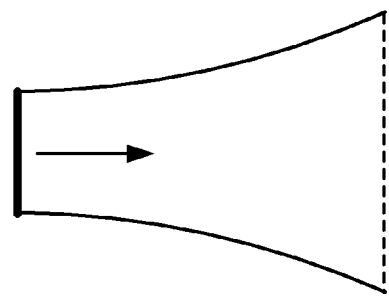
Figure 2D:
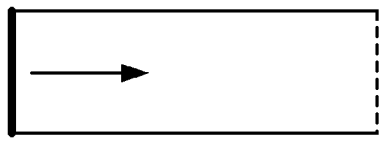
Figure 2E:
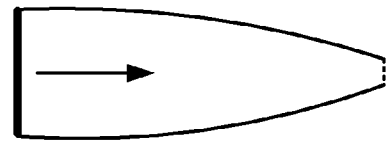

FIG. 1(a) shows the blade or airfoil 100, with nozzles or openings 116 and 112, and valve or regulator 120, with conduits 122 and 118, with step 114 on the blade, starting at point 128, with a narrow variable step between 104 and 106, with fluid jet coming out on surface 106, with top surface 108, front edge 102, and bottom surface 110, for an embodiment of our invention. FIG. 1(b) shows the top view of FIG. 1(a), with corresponding positions on the blade marked with the same number, for an embodiment of our invention. The air can go in or out of the nozzle in both directions, using a pump or fan, in reverse direction.

Figure 3A:
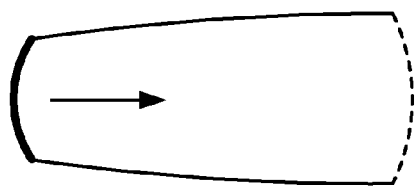
FIGS. 3(*a*)-(*f*) show the blade or airfoil, with nozzle(s), with different shapes, for an embodiment of our invention.
Figure 3B:
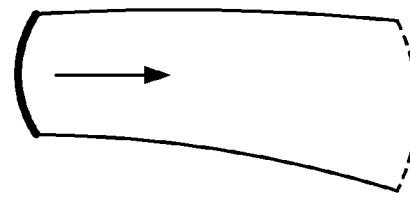
Figure 3C:
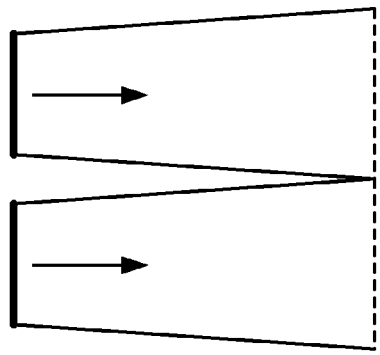
Figure 3D:
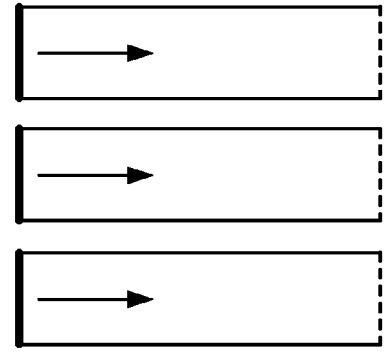
Figure 3E:
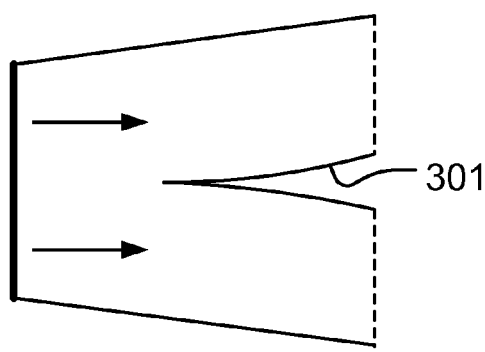
Figure 3F:
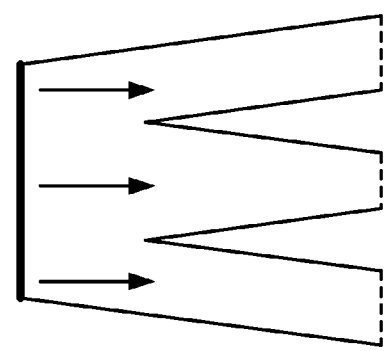
Figure 4A:
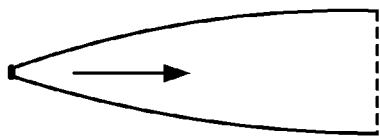
FIGS. 4(*a*)-(*f*) show the blade or airfoil, with nozzle(s), with different shapes, for an embodiment of our invention.
Figure 4B:
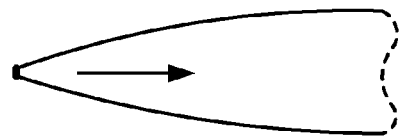
Figure 4C:
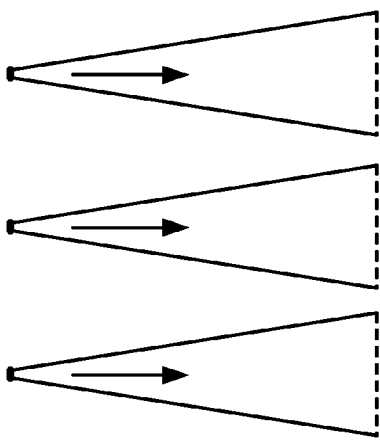
Figure 4D:
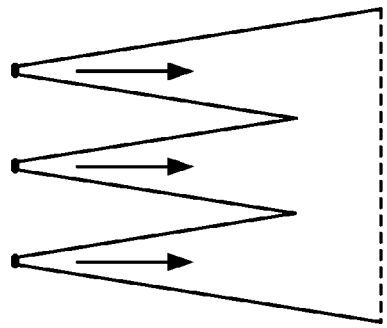
Figure 4E:
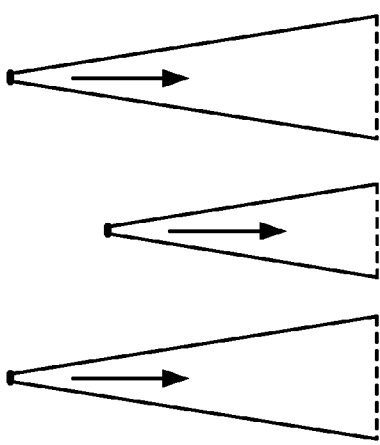
Figure 4F:
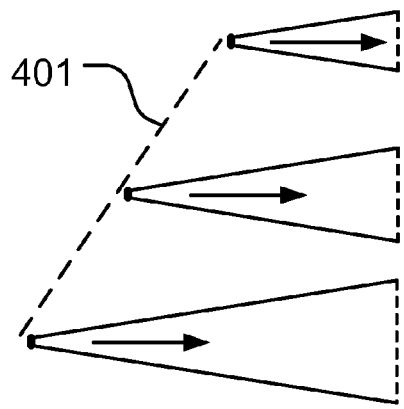
Figure 5A:
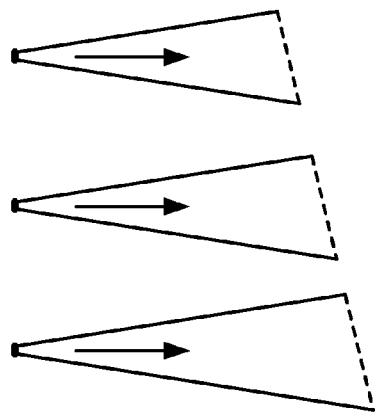
FIGS. 5(*a*)-(*f*) show the blade or airfoil, with nozzle(s), with different shapes, for an embodiment of our invention.
Figure 5B:
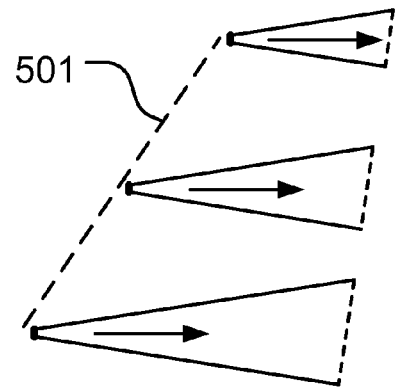
Figure 5C:
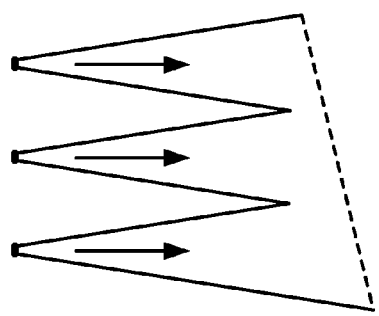
Figure 5D:
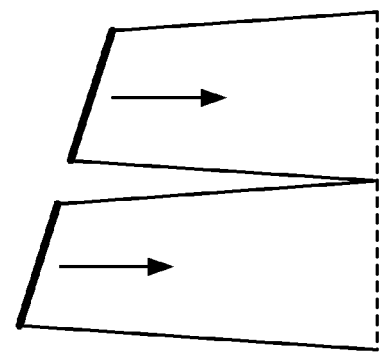
Figure 5E:
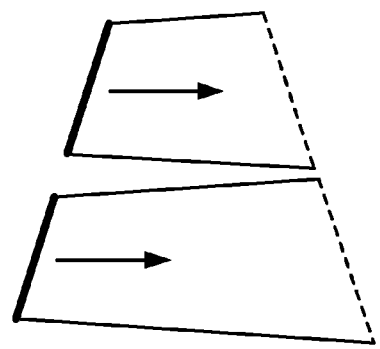
Figure 5F:
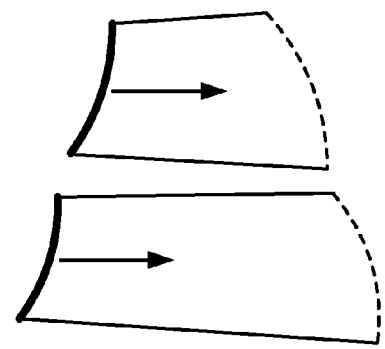
Figure 6A:
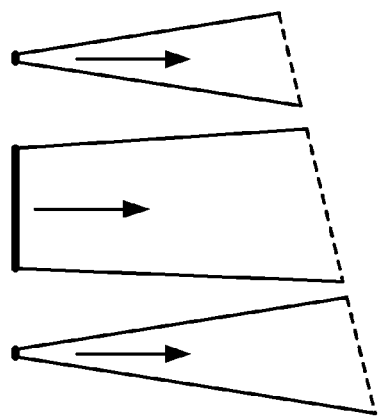
FIGS. 6(*a*)-(*f*) show the blade or airfoil, with nozzle(s), with different shapes, for an embodiment of our invention.
Figure 6B:
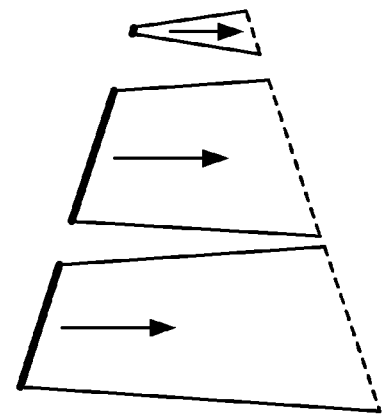
Figure 6C:
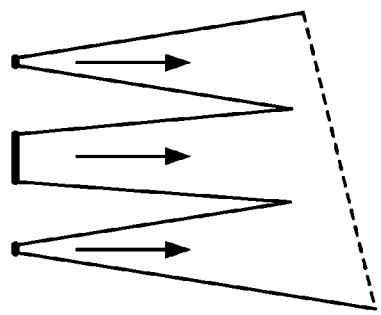
Figure 6D:
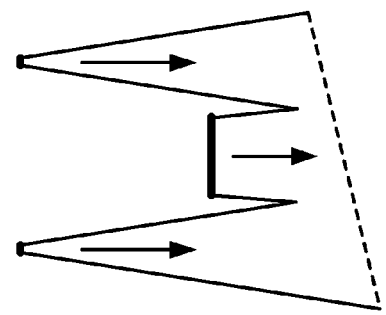
Figure 6E:
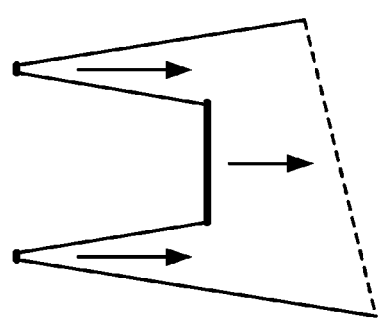
Figure 6F:
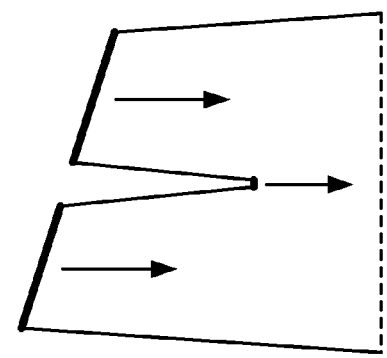

FIGS. 2(a)-(e) show the blade or airfoil, with nozzle(s), with different shapes, for an embodiment of our invention. FIGS. 3(a)-(f) show the blade or airfoil, with nozzle(s), with different shapes, for an embodiment of our invention. FIGS. 4(a)-(f) show the blade or airfoil, with nozzle(s), with different shapes, for an embodiment of our invention. FIGS. 5(a)-(f) show the blade or airfoil, with nozzle(s), with different shapes, for an embodiment of our invention. FIG. 6(a)-(f) show the blade or airfoil, with nozzle(s), with different shapes, for an embodiment of our invention. In one embodiment, the nozzle is point-like, for example as depicted in an embodiment depicted in FIG. 4(a). In one embodiment, the nozzles are arranged in a row along the surface of airfoil forming a nozzle line, for example as depicted in FIG. 3(a). In one embodiment, a nozzle has a line opening along the surface of airfoil, for example, as depicted in FIG. 3(a).

FIGS. 8(a)-(d) show the blade or airfoil, with nozzle(s), 816 and 812, with multiple openings and/or valves 820, or regulator, for an embodiment of our invention. The air or fluid is coming out from different directions and locations on the blade (e.g. backward 824), on a step 814, between 804 and 806, toward 828, modifying the boundary layer from 802 to 808. The supply of fluid is from 830, which may be a tank, open air from outside, another opening on the same blade or another blade, pump, motor, compressor, or a pressurized container. The supply of fluid may come from multiple sources, 812 and 816, and multiple valves, compressors, or motors, 821 and 823. Or, there may be connections between different parts of the blade, as in FIG. 8(c). In one embodiment, pipe/conduit 830 is run through the blade into the hub (or it is connected as a branch of such blade conduit).

Figure 8A:
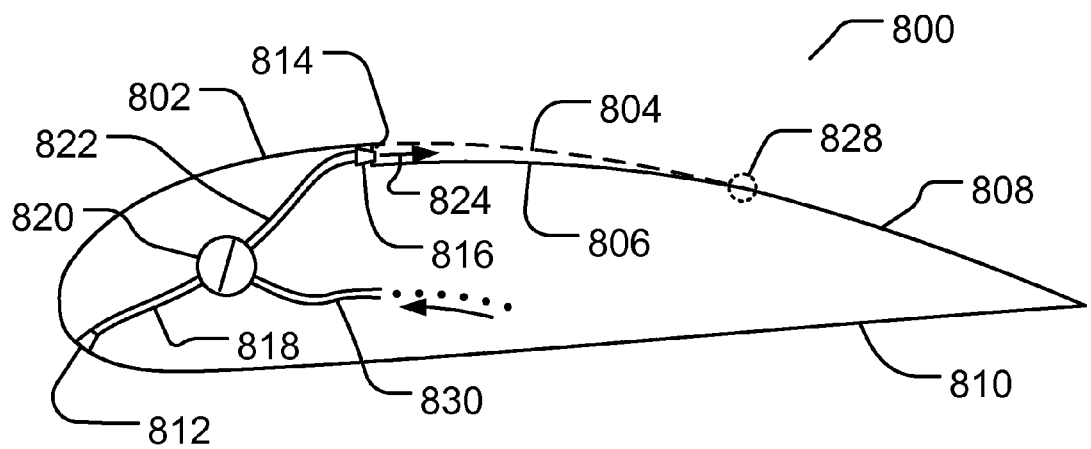
FIGS. 8(*a*)-(*d*) show the blade or airfoil, with nozzle(s), with multiple openings and/or valves, for an embodiment of our invention.
Figure 8B:
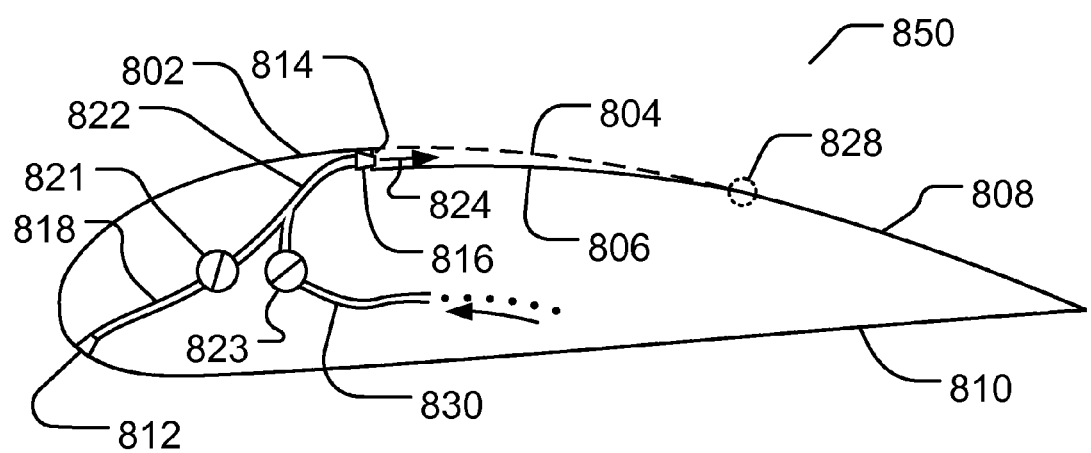
Figure 8C:
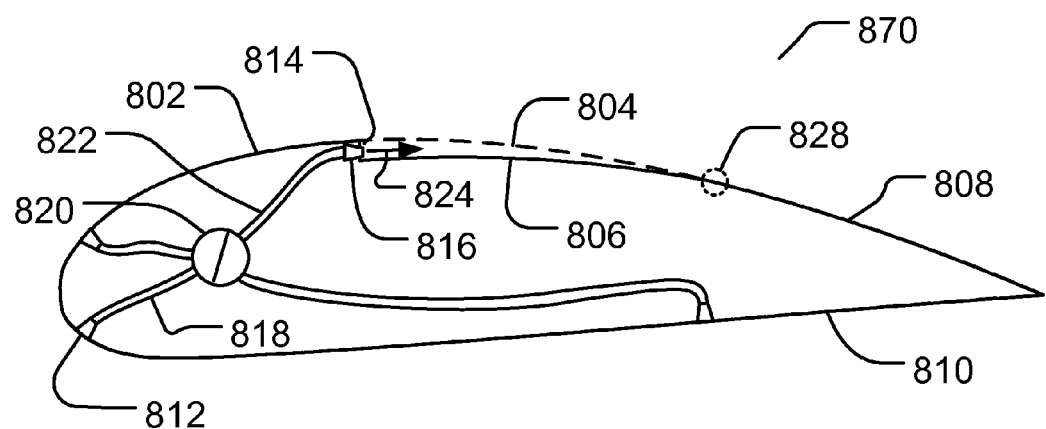
Figure 8D:
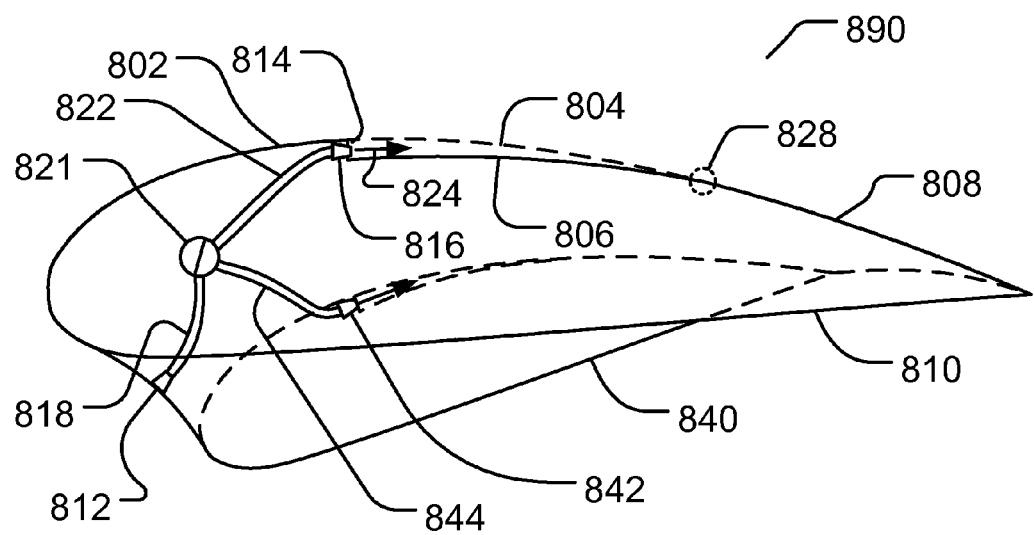

In FIG. 8(d), the cross section of the blade is shown from the hub point of view, with twisted tip of the blade as 840 (non-uniform cross section along the blade length). The source of the air is coming from 812, through valve 821, to two locations on the blade at different lengths or radiuses of rotation, 824 and 816, i.e. two nozzles sending fluid out on the blade at different locations of the blade. The valve or manifold 821 distributes the flow between the two or multiple nozzles, 816 and 842. The function of the manifold can be adjusted and controlled by the controller, described elsewhere in this invention.

Figure 10:
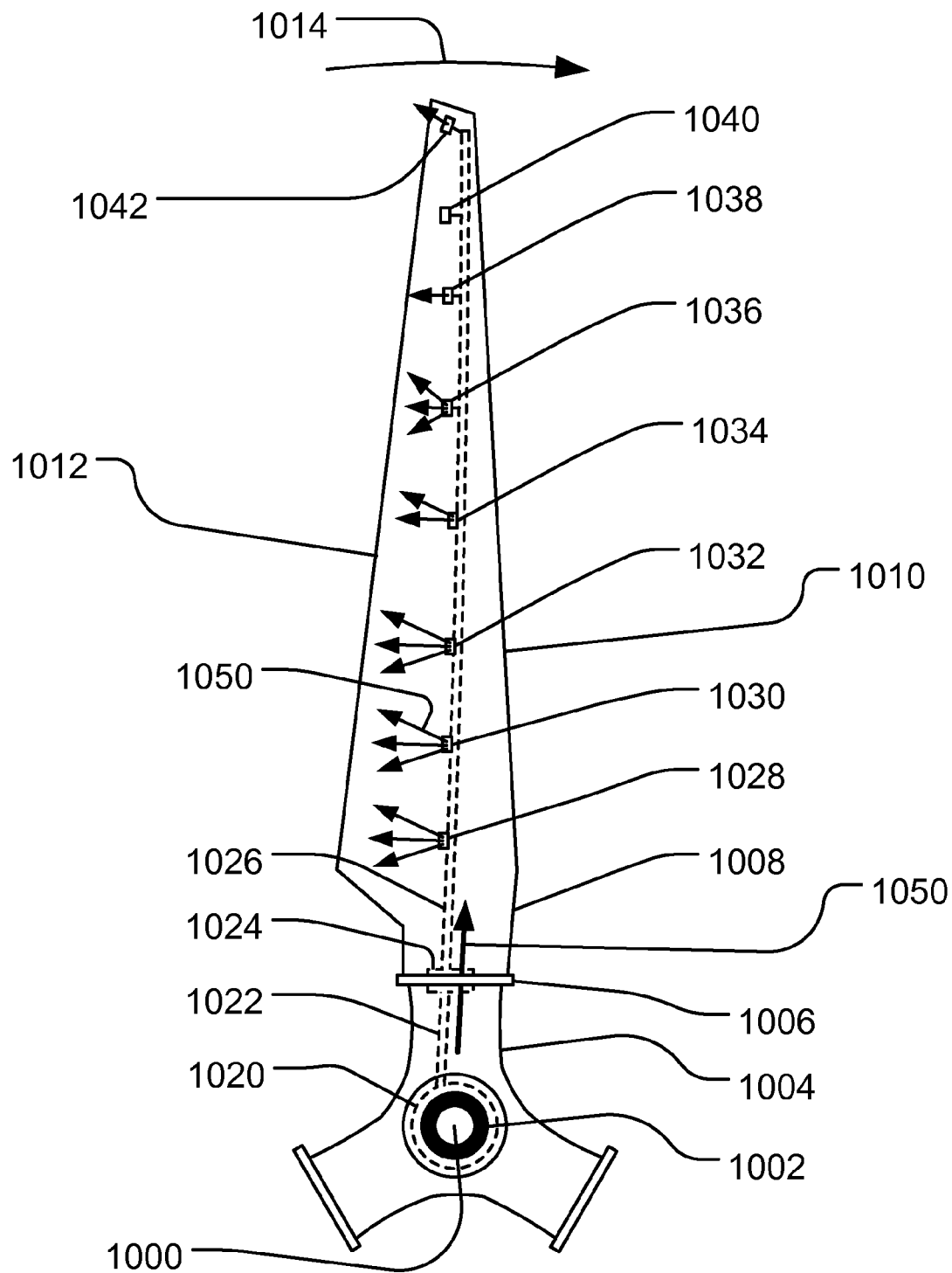
FIG. 10 shows the blade or airfoil, with nozzle(s), with different shapes, for an embodiment of our invention.
Figure 11A:
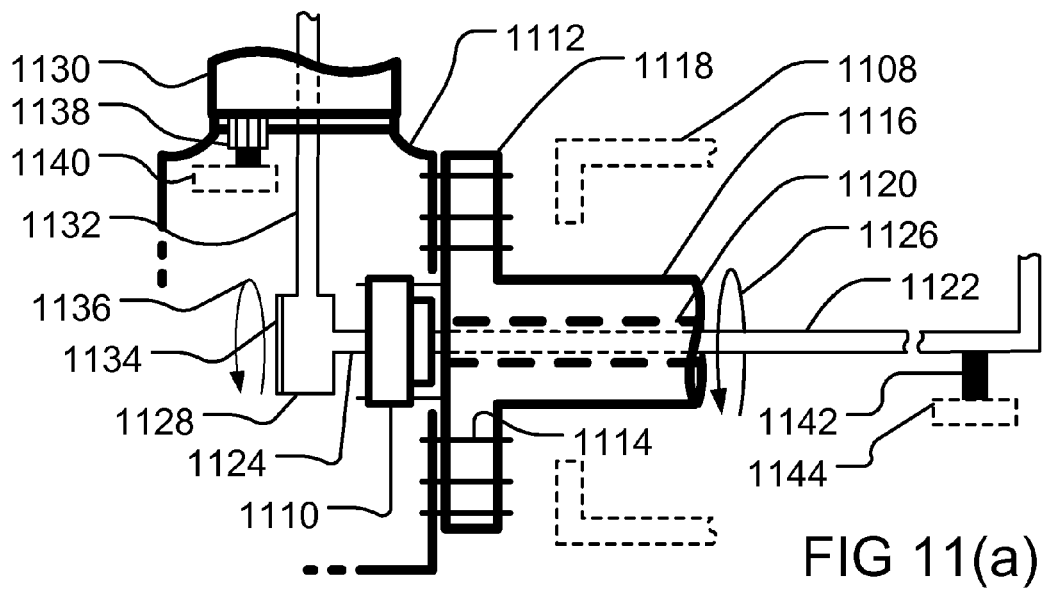
FIGS. 11(*a*)-(*d*) show the operation and details of a component, for fluid and electrical conduit, for rotational coupling, for an embodiment of our invention.
Figure 11B:
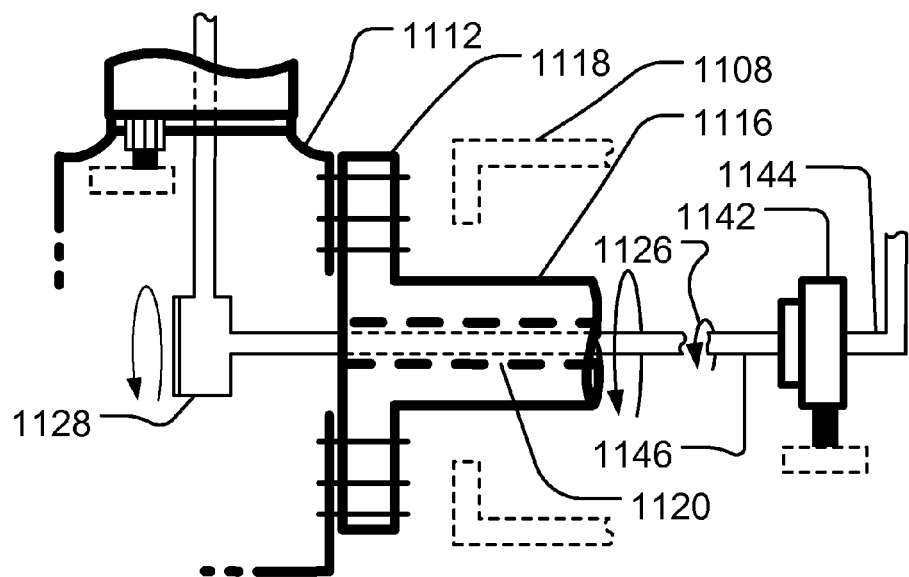
Figure 11C:
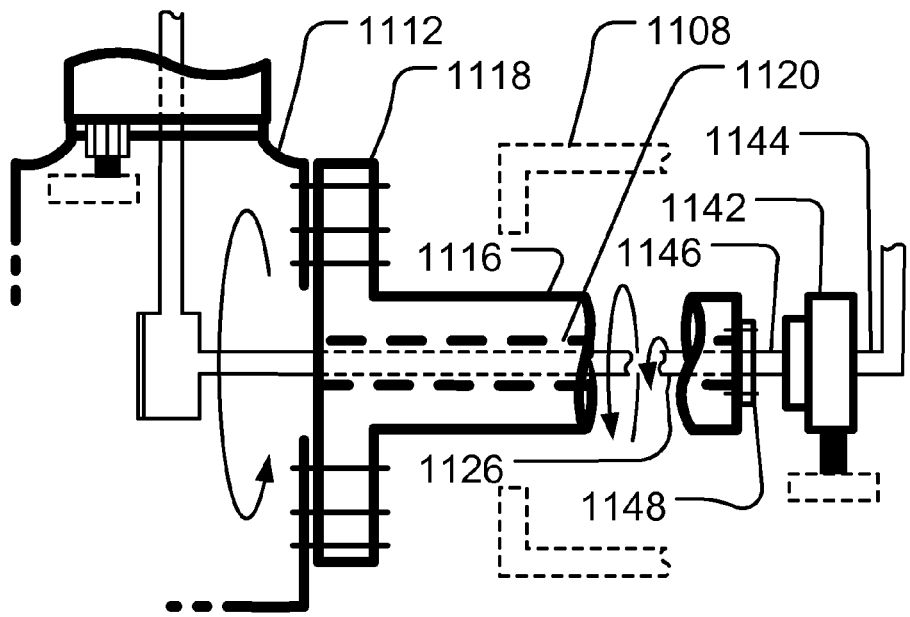
Figure 11D:
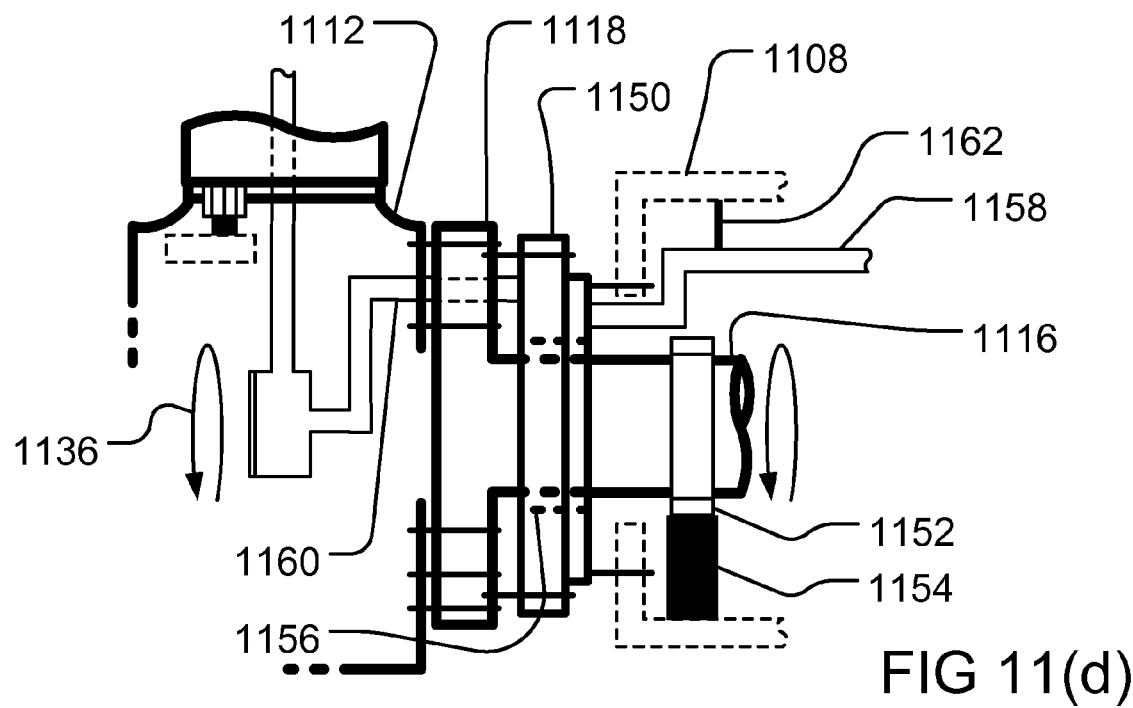

FIG. 10 shows the blade or airfoil, with nozzle(s), with different shapes, for an embodiment of our invention. The item 1008 is base edge of the blade, close to blade root, and 1010 the leading edge, with 1012 the trailing edge, rotating along 1014 direction. The air or fluid is coming through 1000, in hollow shaft 1002, at the hub 1004, through a cavity 1020 and conduit 1022, along 1050, through the joint cavity 1024 at joint 1006 between blade and hub, through nozzles, at different directions, amount, and stages (on/off state), at various radiuses, e.g. 1042, 1040, 1038, 1032, and 1028.

Alternatively, for FIG. 10, we can put a pump at the hub, sucking the air from hub area, from outside hub, and sends the air through 1022 and 1024, along 1050, to nozzles, with solid shaft 1002, with no hollow inside or core.

This (for FIG. 10) is done using an embedded pipe during the blade fabrication process, for an embodiment of our invention. There are also embedded wirings/cables for actuator control, mechanically/electrically, for an embodiment of our invention. The nozzles can spray colored liquid to check the integrity of the blades from far, using visual inspection and cameras, for defects and cracks, for an embodiment of our invention.

Inside the pipe 1022 or 1000, a detector/robot/small vehicle, for detecting fractures, move up and down, to check the blades and hub from inside, for an embodiment of our invention. It can be loaded from the hub assembly. It can be checked during operation, as it gets pulled toward the tip by the centrifugal force, supported by restraining cable, for an embodiment of our invention.

Testing sensors, cameras, or microphones can be moved with a small motor or cable/pulley, vehicle, robot, trolley, or other movement mechanisms, through pipe 1022 or 1000, for various inspections and recordings for calibrations, or diagnosis versus calibrations, to find any problems with the blade or rotor or hub or operations, in general, e.g. vibrations or cracks, to modify or stop operations.

Figure 22:
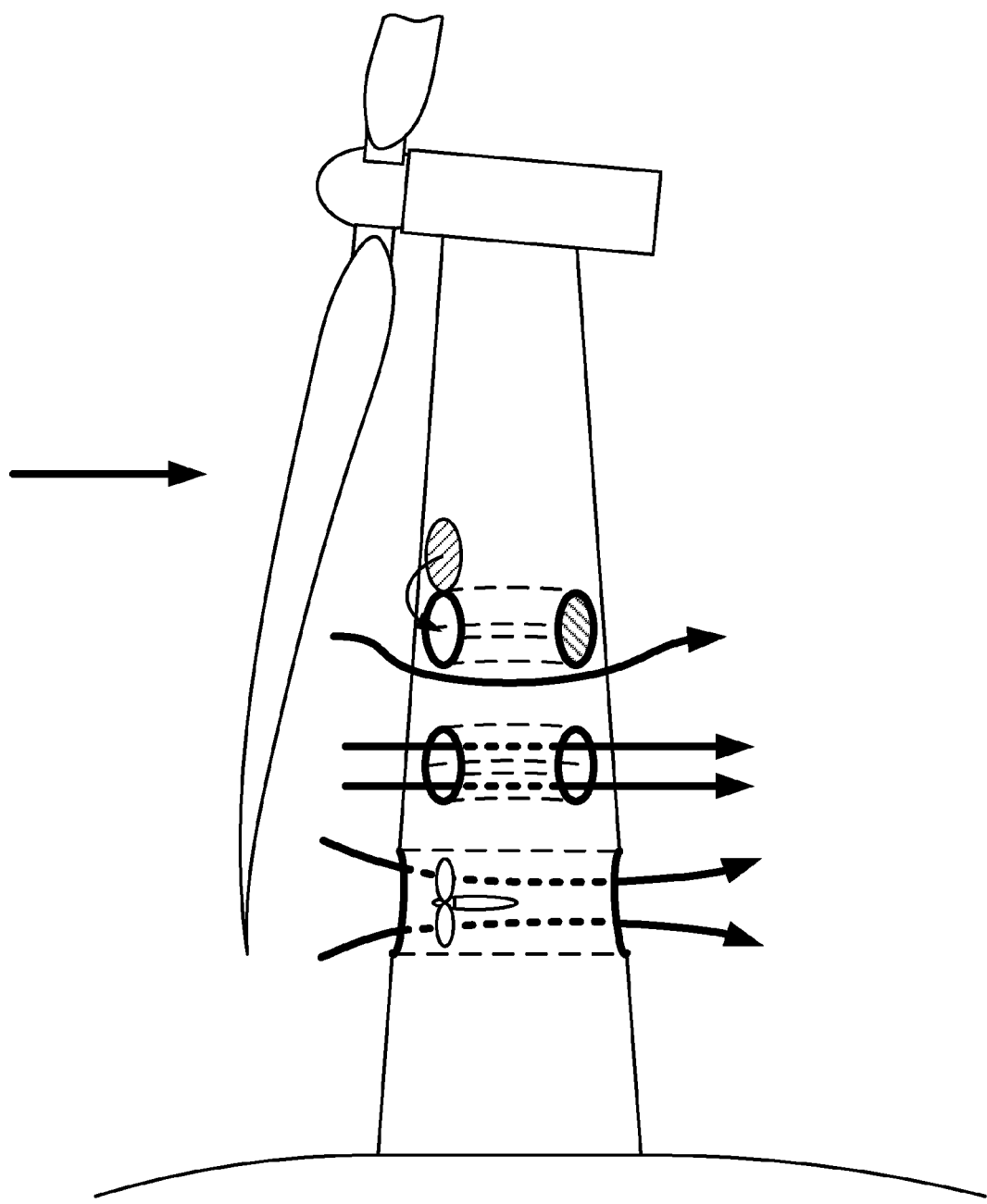
FIG. 22 shows the conduits through the tower, with different shapes, for an embodiment of our invention.

FIG. 22 shows the conduits through the tower, with different shapes, for an embodiment of our invention. The location of fan is at anywhere: entrance, exit, or at the middle, of the conduit. The conduits or holes are off-diagonal or diagonal across the tower's body or structure. The conduits can have valve, cap, or cover(s), on one or both sides. The conduits are at different sizes and heights, uniform cross section or non-uniform cross section along conduit's length. The conduit can change the pressure along the wind direction, and directly change the wind pattern, e.g. useful during the high winds and hurricanes, to reduce the stress on the tower or blades. Or, it can be done even during the normal operations, to open/close the cover for conduit, to reduce the stress on the blade, at each cycle of rotation, based on a motor, synchronized with the rotation, or using the wind turbine energy and shaft, for the movement and operation of the cover/cap(s). The air can go either directions in the conduit depending on the pressure gradient naturally outside, or using a motor or fan, e.g. CW or CCW direction.

Figure 23A:
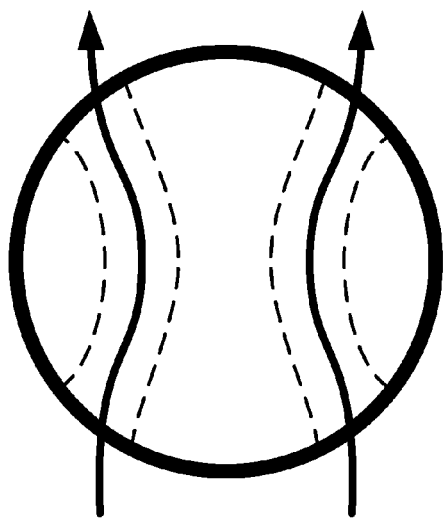
FIGS. 23(a)-(d) show the conduits through the tower, with different shapes, for an embodiment of our invention.
Figure 23B:
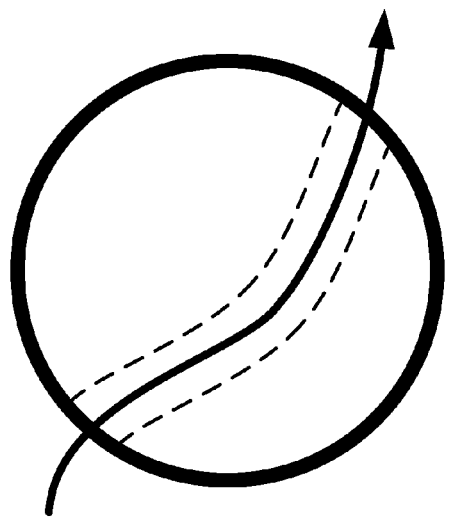
Figure 23C:
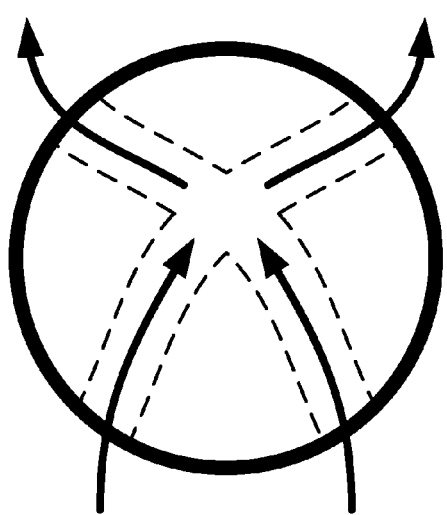
Figure 23D:
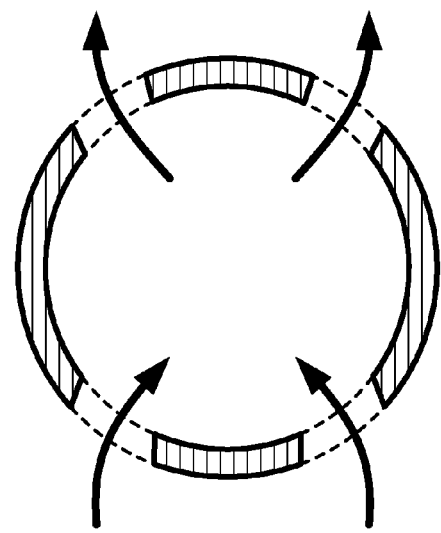

FIGS. 23(a)-(d) show the conduits through the tower, with different shapes, for an embodiment of our invention. In FIG. 23(d), the opening is actually in the wall of the tower itself, with no specific conduit or path in there. However, the conduit may be at one specific height, and the other cross sections of the tower at different heights may have different shapes, e.g. solid, with no conduit, at other heights. Also, one can stack various combinations on top of each other. Axis of rotation, in relation to the conduits on the tower, may be symmetric and asymmetric, or may be on-axis or off-axis, with respect to the center of conduits.

Figure 24A:
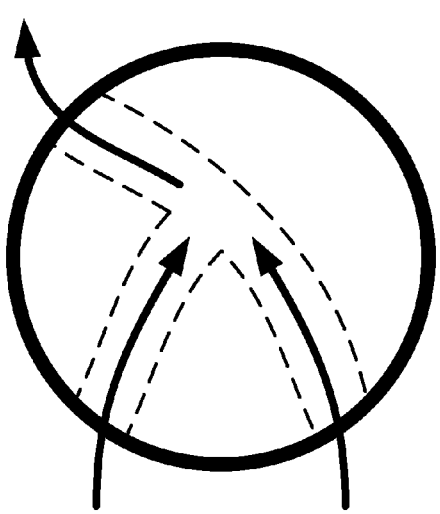
FIGS. 24(a)-(c) show the conduits through the tower, with different shapes, for an embodiment of our invention.
Figure 24B:
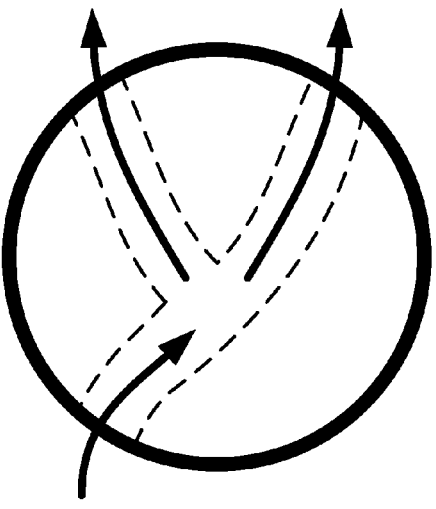
Figure 24C:
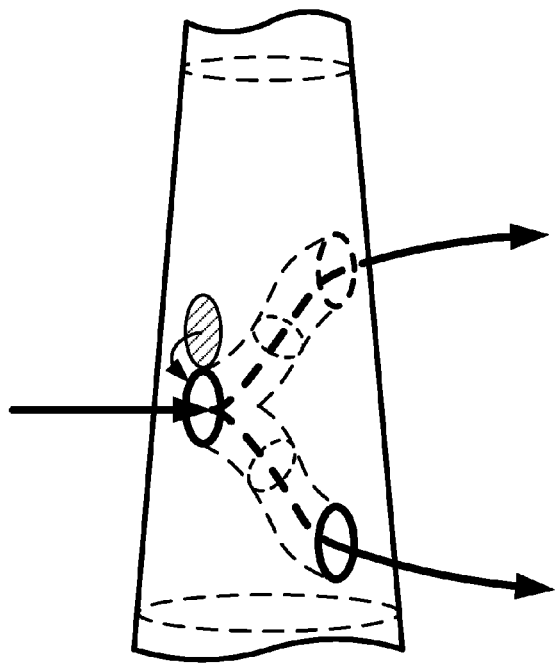

FIGS. 24(a)-(c) show the conduits through the tower, with different shapes, for an embodiment of our invention. Valve or door, e.g. sliding or rotational, can be at any place in the pipe/conduit or tower. The size and cross section/shape of the conduits determine the relative distribution of the air through each conduit. Or, it can be forced using a valve, regulator, pump, fan, motor, compressor, or relative closing of the pipe. The air can go either directions, depending on situation and application, as in FIGS. 24(a)-(b). Door or cap can be partially open or adjusted using feedback, by controller, and with delay, if needed, with respect to the cycle of rotation, to adjust for any out-of-phase response to any external item, for optimization and maximum impact on the rotation and efficiency of electrical generation.

Figure 25:
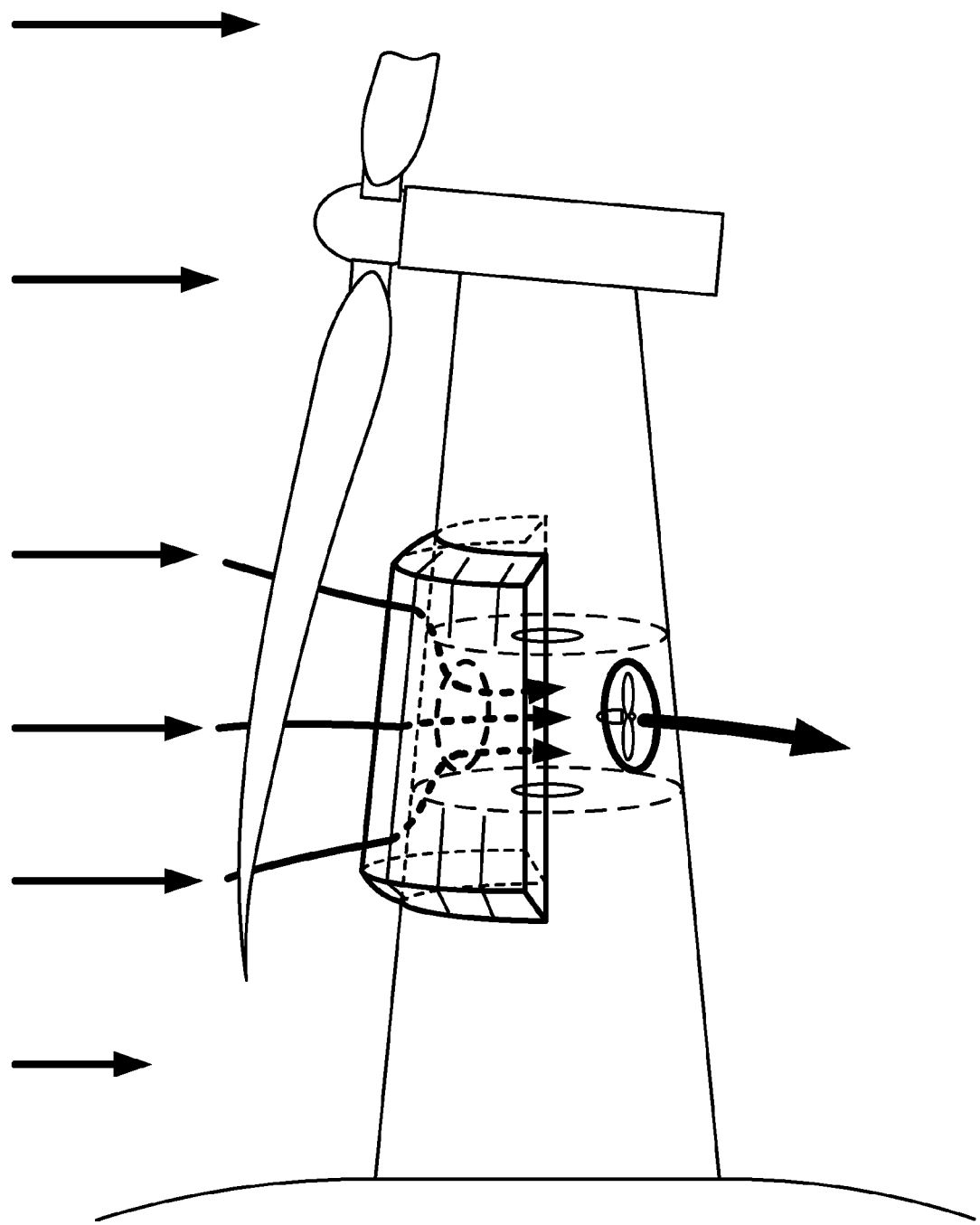
FIG. 25 shows the conduit through the tower, with different components, for an embodiment of our invention.

FIG. 25 shows the conduit through the tower, with different components, for an embodiment of our invention. We can have shutter/cover/cap for the grill-shape or screen, in front of the conduit, to close or open, for air flow through the conduit(s) in the tower, for an embodiment of our invention. The shutter/cover/cap can be placed anywhere with respect to the screen or conduit: front, back, or anywhere in the middle. The shutter/cover/cap can be opened up/down, left/right, slide/turn, or using Venetian or window blind-type. The screen may be checkered, stripes, spots, or random patterns, of any shapes and configurations, for an embodiment of our invention. The screen may be at both sides. The flow of air can be either directions, and be assisted with a fan or pump/motor. In one embodiment, the air cavity within the tower for conducting air flow is formed by two floorings, as depicted in FIG. 25, with respective access panels which are shut during the operation of passing air through grill/screen through the tower. In one embodiment, a fan is used to push the air out of the air cavity within the tower at an exit opening and/or a fan is used to pull the air into the cavity (placed at the side of the screen/grill).

Figure 26A:
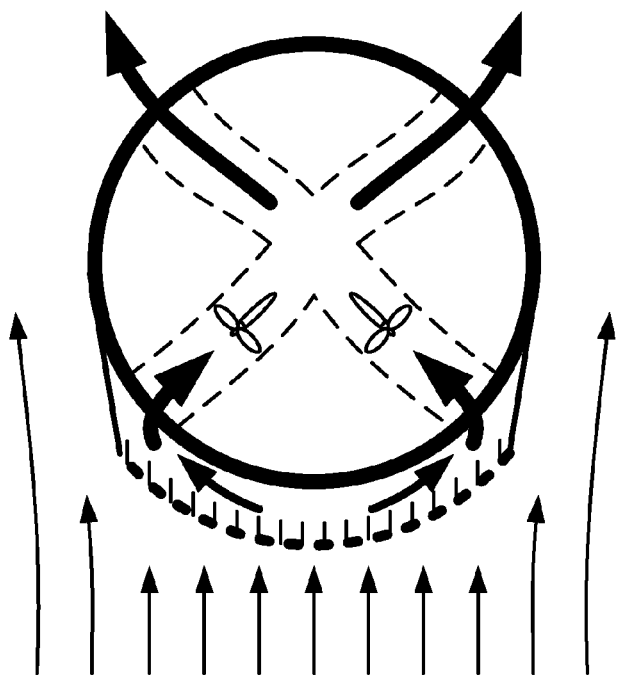
FIGS. 26(a)-(b) show the conduits through the tower, with different shapes, with fan, motor, or pump, for an embodiment of our invention.
Figure 26B:
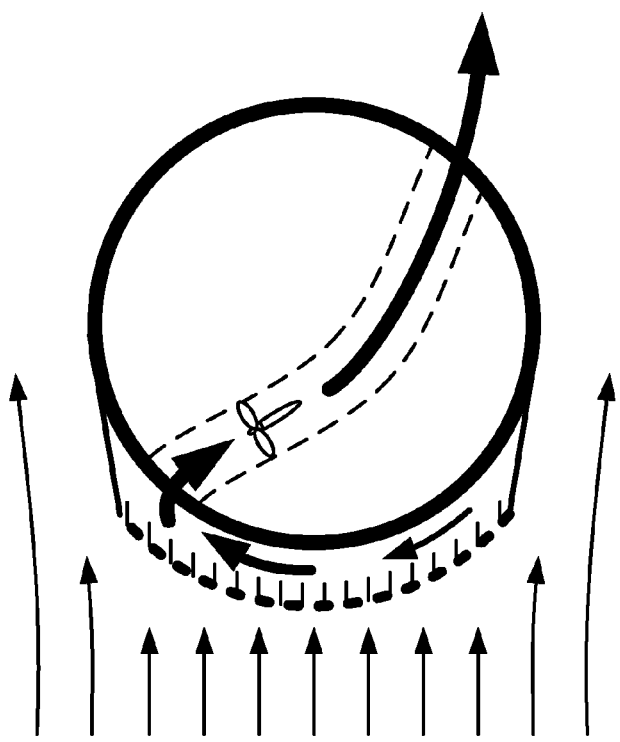

FIGS. 26(a)-(b) show the conduits through the tower, with different shapes, with fan, motor, or pump, for an embodiment of our invention. The air goes through a screen, or more screens, with one or more conduits, maybe connected together, with or without fan, motor, or pump, for an embodiment of our invention.

Figure 27A:
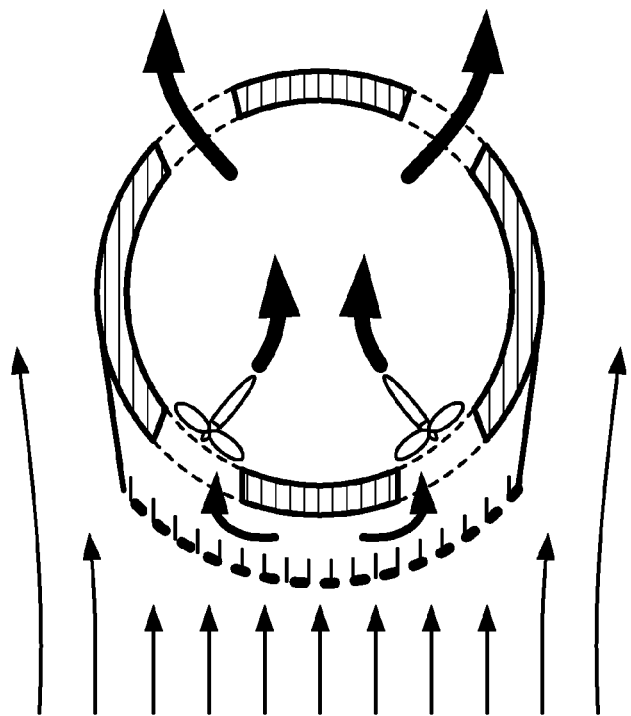
FIGS. 27(a)-(b) show the conduits through the tower, with different shapes, with fan, motor, or pump, for an embodiment of our invention.
Figure 27B:
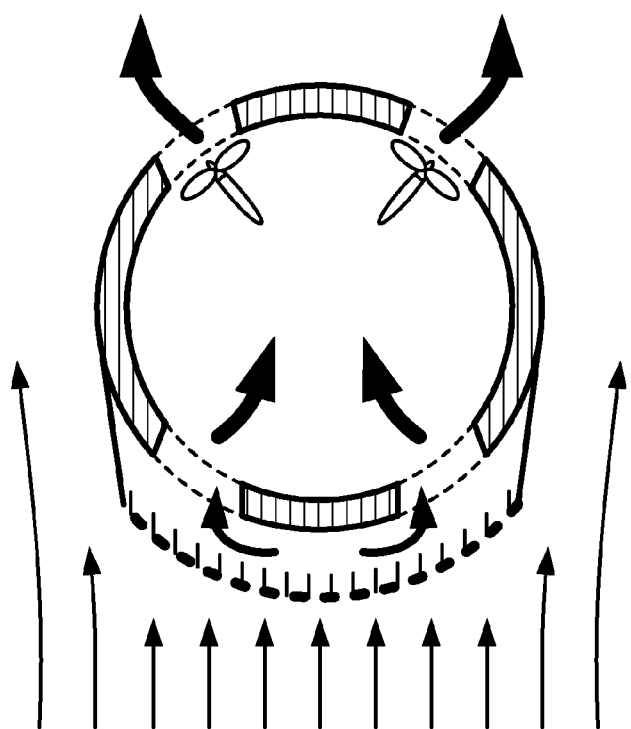

FIGS. 27(a)-(b) show the conduits through the tower, with different shapes, with fan, motor, or pump, for an embodiment of our invention. The whole cross section of the tower can act as a conduit. In one example, we let the vacuum build up, in the conduit, and cyclically open the door/cover to push in the air from outside. In one example, we let the screens (directing the air flow) be at a certain radial range of the blade, where the torque variation has the most impact. In one example, we can supplement the air velocity with a fan or motor to compensate, or more than compensate, for the pressure difference. The energy for the fan or any motor in the tower (or other equipment in the tower/blades) comes from the mechanical gear or shaft or electrical feeds, from the gearbox, generator, battery, solar cells on the tower/blades, or an electrical line feed, from outside or electrical grid.

Figure 28:
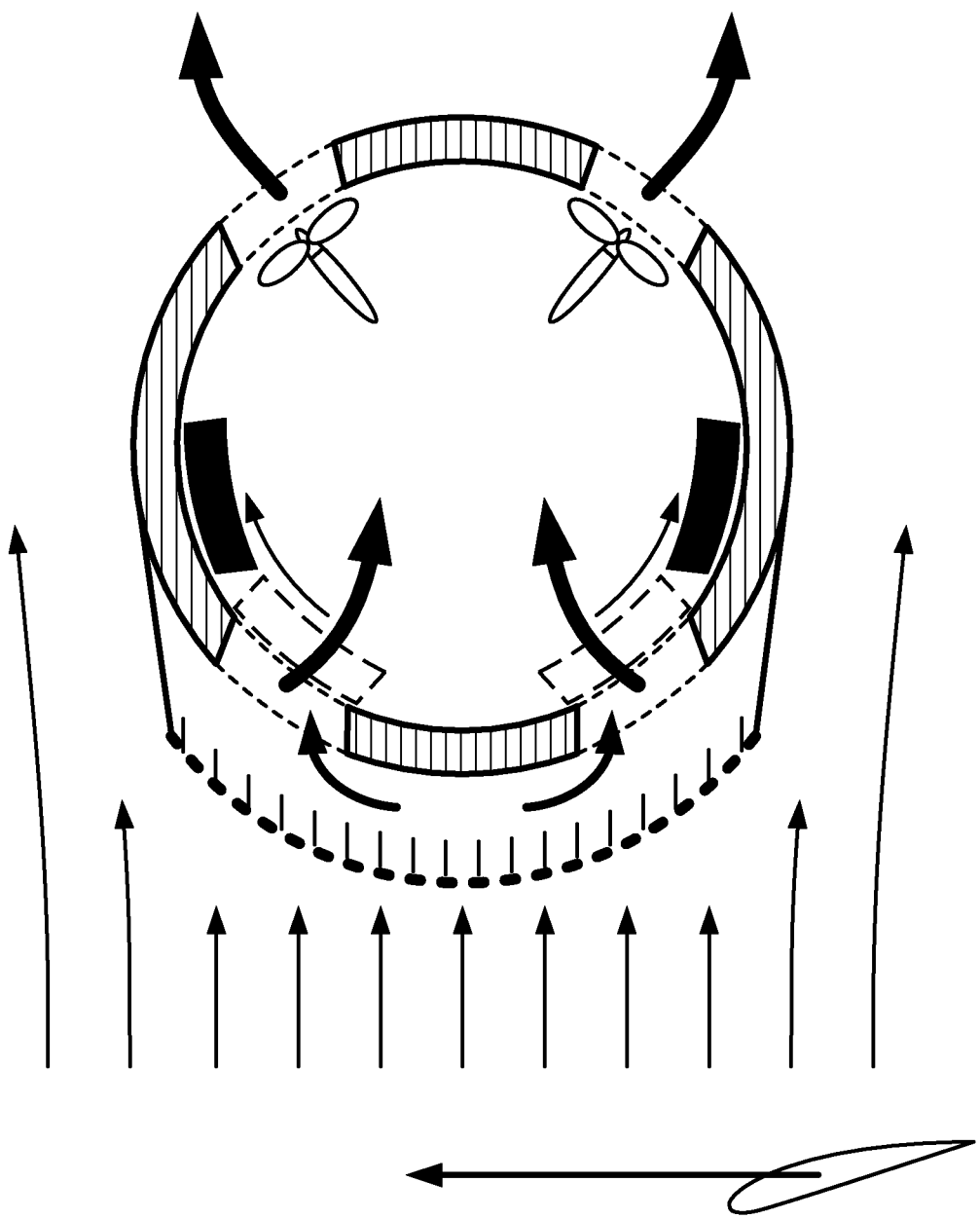
FIG. 28 shows the conduits through the tower, with cap or cover, with fan, motor, or pump, for an embodiment of our invention.

FIG. 28 shows the conduits through the tower, with cap or cover, with fan, motor, or pump, for an embodiment of our invention. The blade's rotation is shown by an arrow in the bottom of the figure (down swing of the blade). The covers/caps/flaps/doors close up the screen opening(s) from one or both sides. The (optional) fan(s) may suck or push the air in/out, from one or more conduits. The opening and closing of the covers (its period and cycle) are phase-locked with the rotation of the blade, in each cycle, to let the air in and out, to adjust the pressure at the both sides of the tower/blades. Or, it can be done only during bad weather/strong wind, to reduce the stress and wear-and-tear on tower and blades. The phase/cycle synchronization can be done using shaft or gear box, or at the generator side. We can synchronize with the blade rotation in an out-of-phase manner, for optimum effect, to optimize, for the inherent time delay of the air movement and response around the blades and tower, $\tau_D$ (a time constant/system characteristics, associated with that process and system response, in terms of time response or decay for a pulse input or wind input).

Figure 29A:
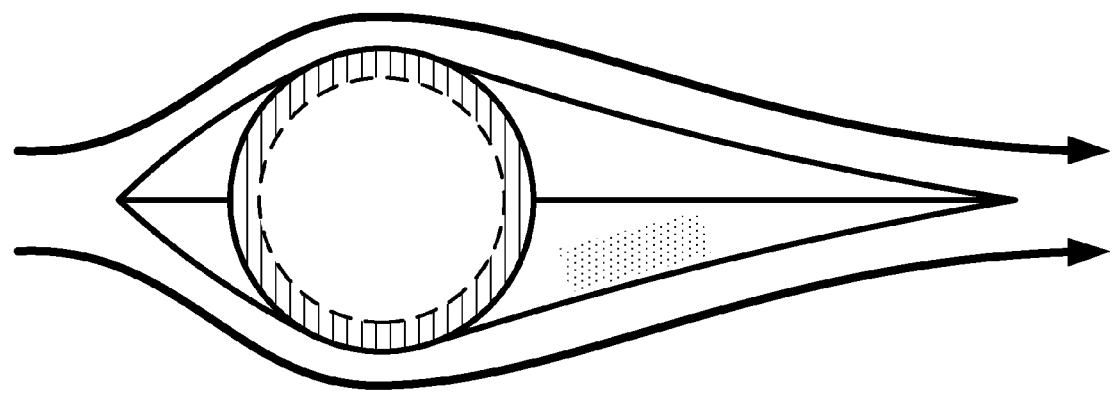
FIGS. 29(a)-(b) show the jacket or shell around the tower, from different views, for an embodiment of our invention.
Figure 29B:
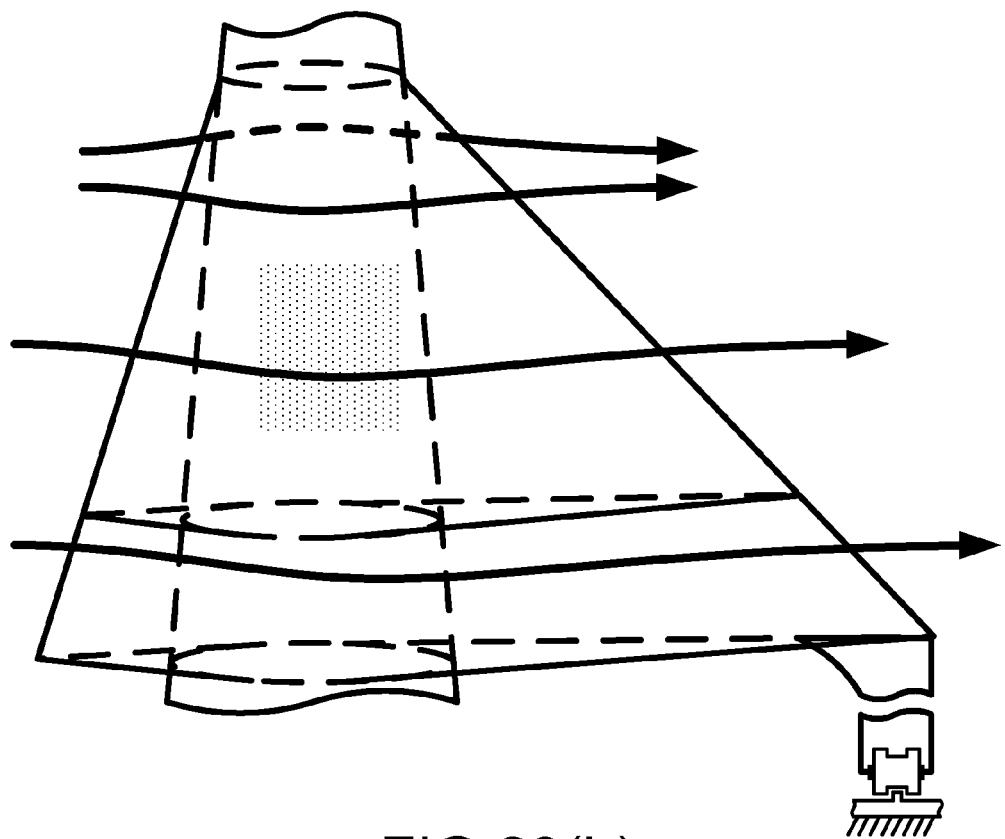

FIGS. 29(a)-(b) show the jacket or shell around the tower, from different views, for an embodiment of our invention, for better air flow. The jacket can move around the tower, radially or rotationally, using rails or wheels or tracks under the jacket assembly. (The jacket is removable and moveable.) We can add the dimple surface, to the jacket or tower itself, to reduce the drag, for an embodiment of our invention.

Figure 30:
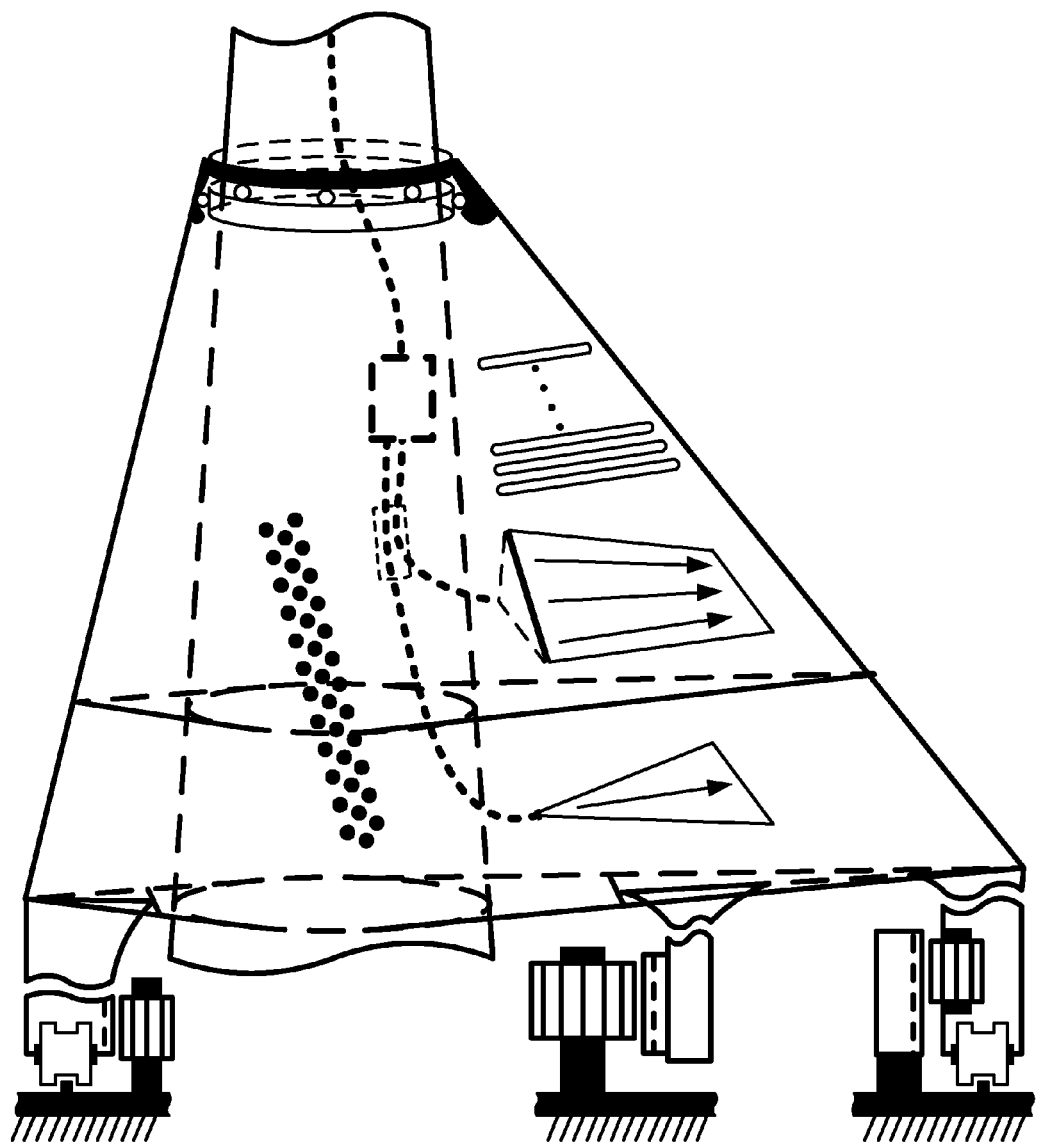
FIG. 30 shows the jacket or shell around the tower, with different features on the jacket or shell, for an embodiment of our invention.

FIG. 30 shows the jacket or shell around the tower, with different features on the jacket or shell, for an embodiment of our invention. These include dimples, ridges, gaps, nozzles, and bumps, with air supplied from the tower, and multiple motors and wheels are provided for mobility of the jacket.

A bump can be made using a bolt or screw which is screwed into the blade, with different shapes and dimensions for its head. Or, alternatively, it can be screwed backward, from inside of the blade, so that one or more washers or nuts, with different shapes and dimensions, are attached to its end, from outside of the blade, per screw or bolt, to customize the shape and the length of the bump (and it is interchangeable or removable, later, manually).

In one embodiment, the fluid supply to the nozzles on the airfoil jacket is supplied via conduit(s) passing through an opening in the tower body. In one embodiment, one or more motors/compressors/pumps (e.g., placed in hub, nacelle or tower) are used to push the fluid out of the nozzle(s).

Figure 31:
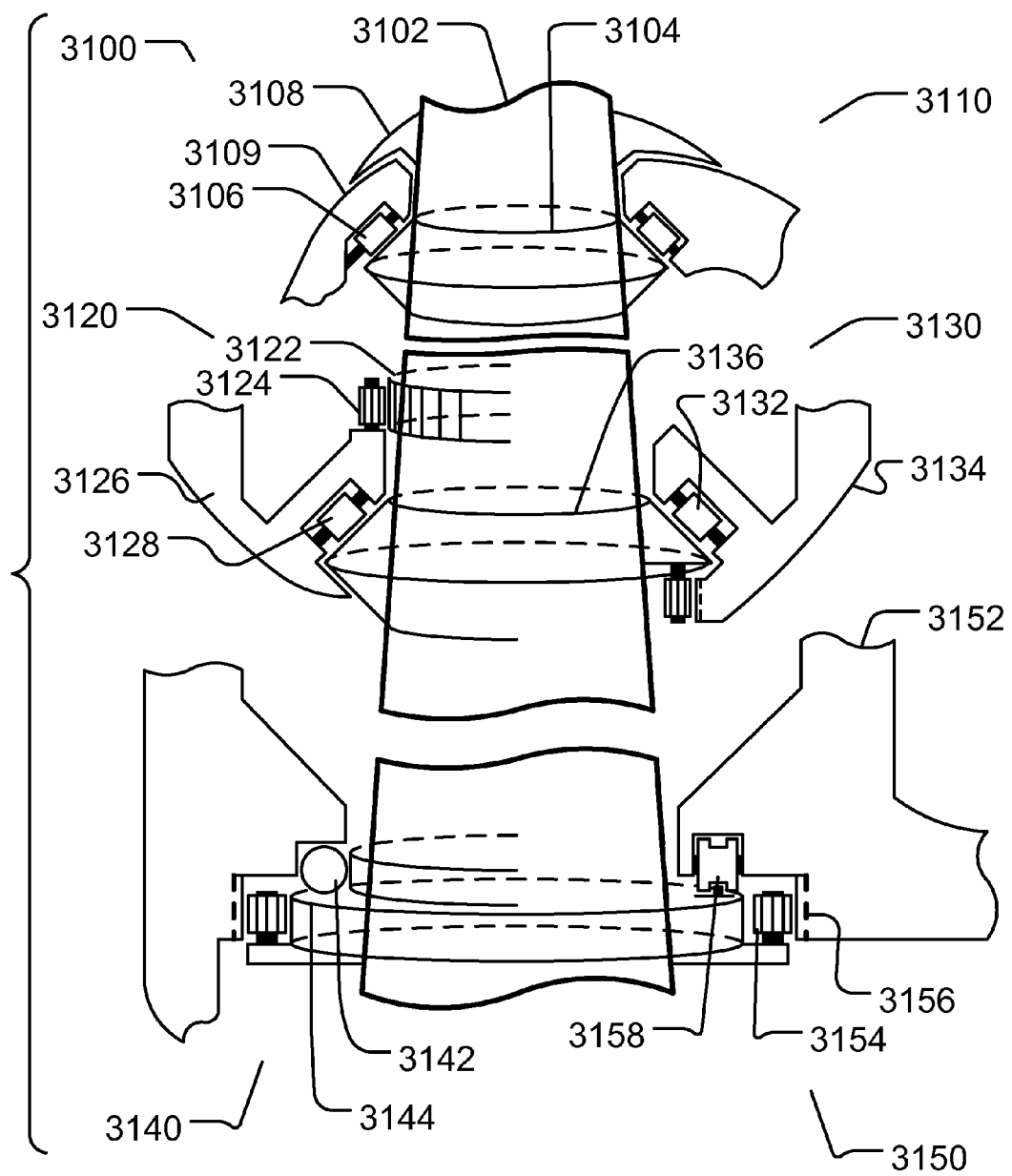
FIG. 31 shows rotational mechanism for the jacket or shell around tower, for an embodiment of our invention.

FIG. 31 shows rotational mechanism for the jacket or shell around tower, for an embodiment of our invention. It can be one piece or multiple pieces. It uses a flashing 3108, so that no water/rain can get into the system, for an embodiment of our invention. The jacket is divided in 3 parts: bottom 3140, middle 3130, and top 3110, for an embodiment of our invention. Each part can have its own rotation mechanism or one or more motor(s), or they can all be run by a single motor or mechanism, for an embodiment of our invention. The pieces may be connected, or all separate, for an embodiment of our invention.

The bottom motor 3154 is engaged with 3156 (gear rim and inside tooth), so that the motor moves the jacket 3152, for an embodiment of our invention. The wheel on rail 3158 or ball bearing 3142 is used to move the jacket around tower, using the two circular rings (attached to the tower) as the base 3144, for an embodiment of our invention. The jacket 3152 can sit on the ground, or the two circular rings are affixed to the tower 3102, for an embodiment of our invention.

For 3130, the motor 3124 is engaged with the gears on tower 3122, and motor 3124 is also connected to jacket 3126, with a roller 3128 rolling on the side of the tower, for an embodiment of our invention. Roller 3132 is also rolling on the opposite side of 3128, to smoothen out the rotation of the jacket around the tower, and with less energy and resistance, for an embodiment of our invention. We can use multiple motors and rollers, for ease of rotation of the jacket, for an embodiment of our invention. The motor that engages to 3134 in the middle part/section 3130 is connected to the tower or its ring extensions (3136 or 3102), for an embodiment of our invention.

The top section/part 3110 can have a motor, as well, but, here, in this example, we only have rollers 3106, for ease of rotation. If we use multiple motors at different locations, for example, for connected parts of the jacket, they all should be synchronized or set together for angular velocity, for the constraint(s), for the continuity of the jacket's structure, for an embodiment of our invention.

FIG. 32 shows a rotatable nozzle, for an embodiment of our invention, with a motor, gear, or hinge, e.g. energy supplied from generator or battery, or motion supplied from a gear or shaft, moved by the main shaft or blades, directly or indirectly.

FIG. 33 shows a parallel array of nozzles, for an embodiment of our invention. They can be at different angles, as well. FIG. 34 shows multiple nozzles, at different directions, on a blade or airfoil, for an embodiment of our invention. FIG. 36 shows different types/shapes of nozzles, for an embodiment of our invention. FIG. 37 shows a retractable or telescopic nozzle, for an embodiment of our invention. FIG. 38 shows multiple nozzles, at different angles, with respect to the local curvature of the surface for the blade or airfoil, for an embodiment of our invention.

FIG. 39 shows a pressure and temperature contours, for locations of constant pressures and temperatures, on a blade, included in the information carried by function F, for an embodiment of our invention.

Figure 40A:
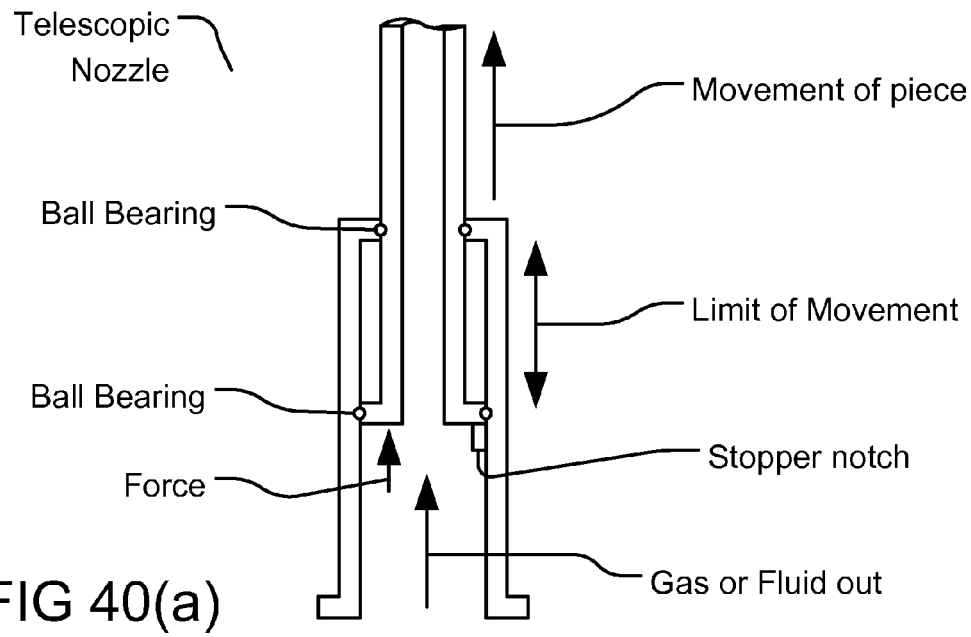
FIGS. 40(a)-(c) show the mechanism for a telescopic or retractable nozzle, with different components, for an embodiment of our invention.
Figure 40B:
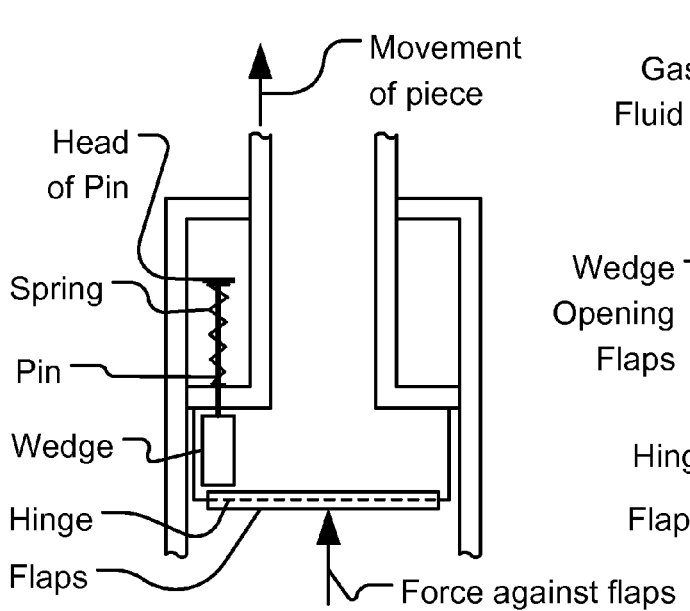
Figure 40C:
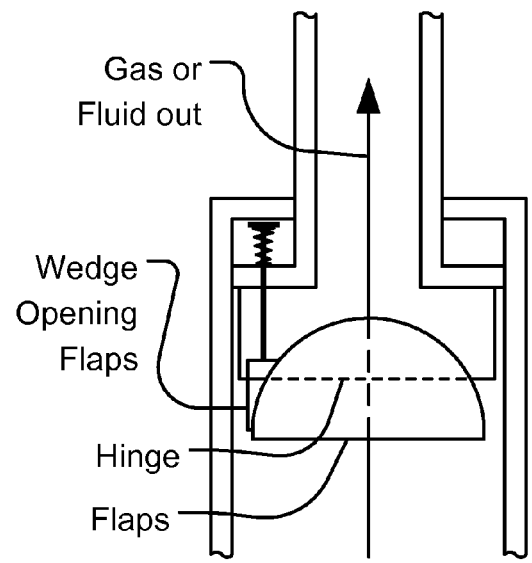

FIGS. 40(a)-(c) show the mechanism for a telescopic or retractable nozzle, with different components, for an embodiment of our invention. FIG. 40(a) shows that the fluid pushes the telescopic piece to open up or extend. Stopper notch keeps the piece in the right domain for movement, as it goes back and forth. FIGS. 40(b) and (c) show that the force behind the flap opens up the flap, and still a spring stops the telescopic piece from movement, up to its range, using a wedge or stopper piece. Then, the fluid or air flows to the tip of the nozzle from there. In one embodiment, for example as depicted in FIG. 40(b), the pressure from fluid against the flaps move up the telescopic piece and the attached pin and spring assembly. Once the pin reaches the end (or a stopper portion of the carrying jacket of the nozzle), the pin presses against the flap via an attached wedge, and the wedge open the flaps for fluid flow by rotating the half circle shaped flaps around their axis of rotations as depicted in FIG. 40(c). In one embodiment, the spring pushes up the pin back to let the flaps go back to their closed position.

Figures 41A, 41B:
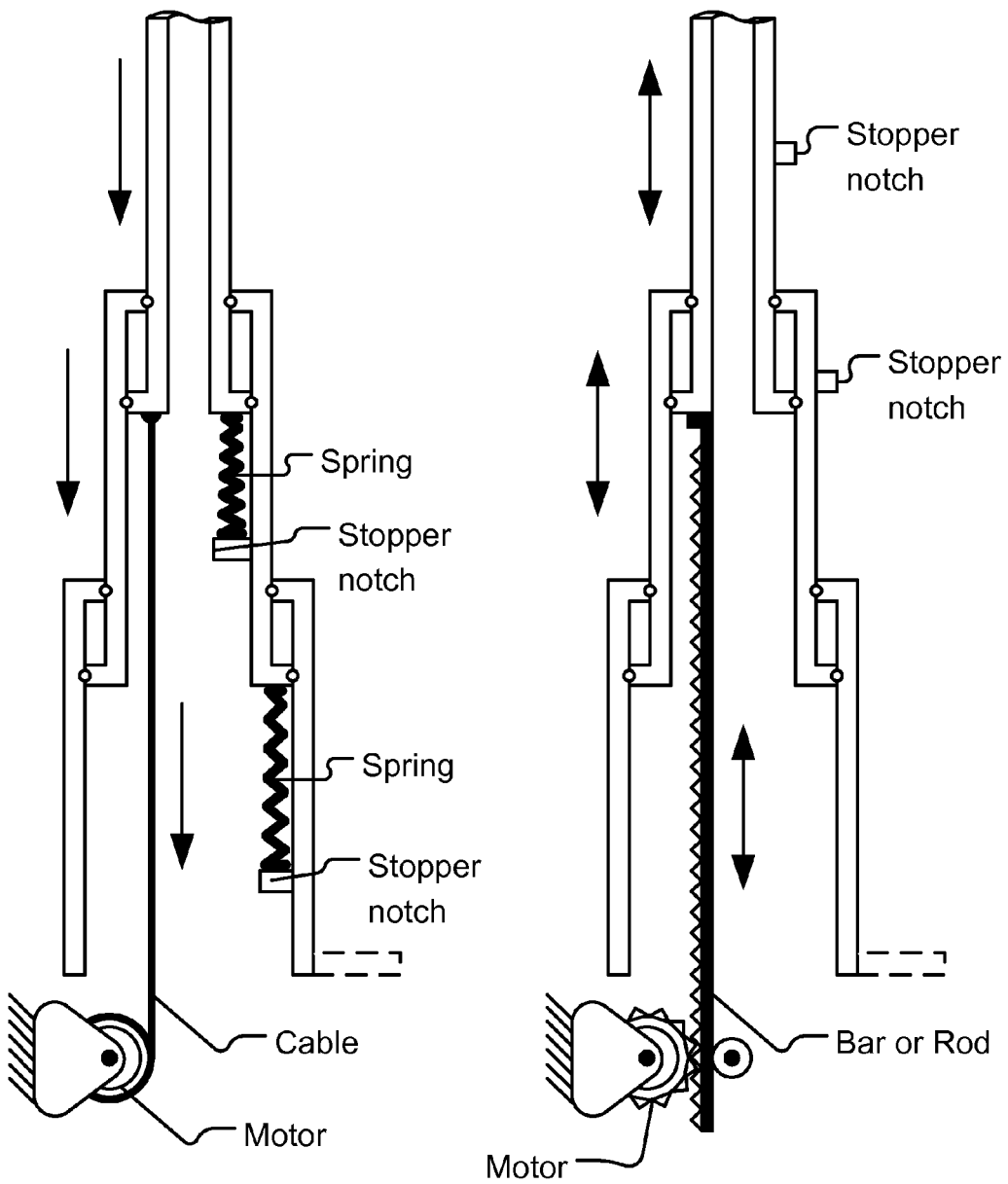
FIGS. 41(a)-(b) show the mechanism for a telescopic or retractable nozzle, with different components, with cable(s) or rod(s), and motor(s), for an embodiment of our invention.

FIGS. 41(a)-(b) show the mechanism for a telescopic or retractable nozzle, with different components, with cable(s) or rod(s), and motor(s), for an embodiment of our invention. Stopper notch(es) and spring(s) hold the system in the right range. The movement is done by cable/pulley/motor or by bar/rod/chain/gear/motor/piston/lever combinations.

FIG. 42 shows the mechanism for a telescopic or retractable nozzle, with different components, with magnetic piece or magnet, at one or more locations, for an embodiment of our invention. One piece can be magnet, and the other piece as magnet or ferromagnetic material, such as oxides, compounds, Fe, or Ni, as a ring, block, hollow or cylinder, as an example, placed parallel or aligned to each other, under or on the blade. The magnet can be permanent magnet or an electrical coil. One can change the polarity, by rotation of the magnet or its holder. It can attract or repel, accordingly.

FIG. 43 shows the mechanism for a rotating or sliding cover for nozzle, with different components, under the surface of the blade or over the surface of the blade, for an embodiment of our invention, or cap, flap, door, or shutter, for closing/opening/controlling amount for the nozzle/flow of fluid, on the blade.

Figure 45:
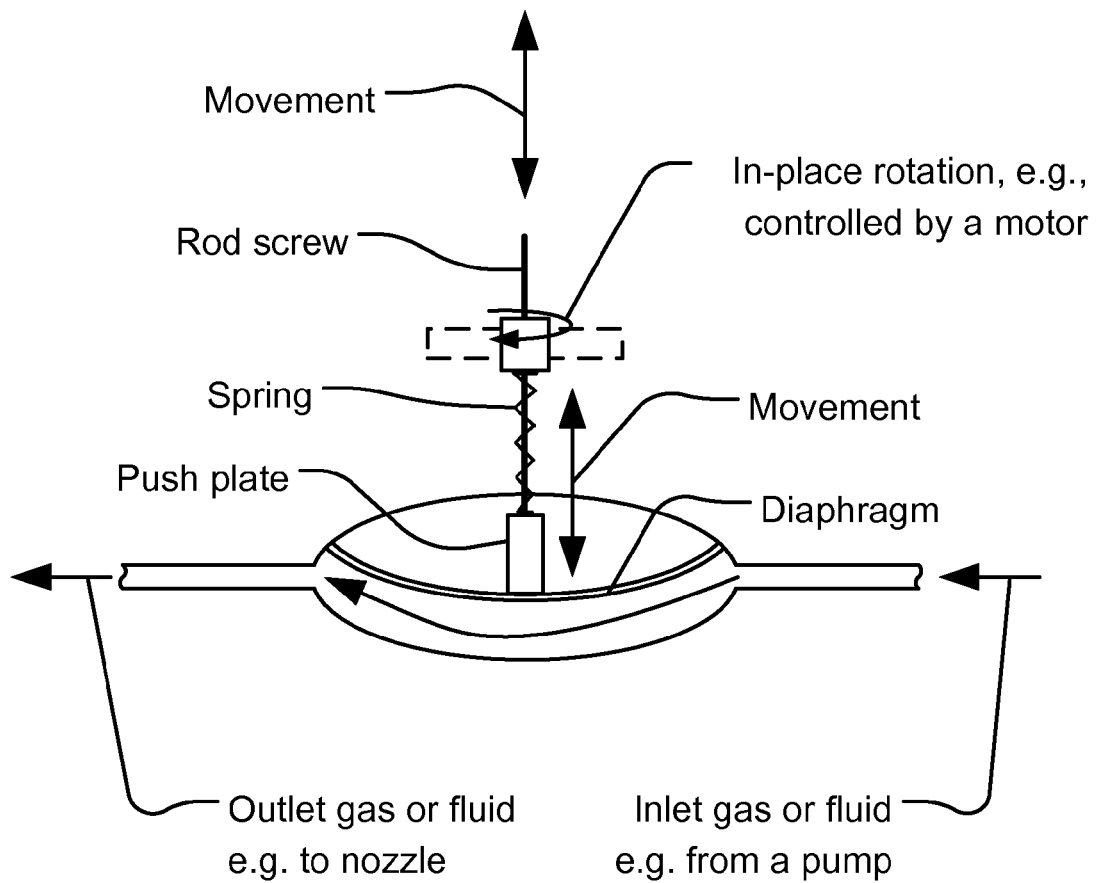
FIG. 45 shows the mechanism for a diaphragm for nozzle, with different components, for an embodiment of our invention.

FIG. 45 shows the mechanism for a diaphragm for nozzle, with different components, for an embodiment of our invention. It has a spring and screw, with push plate on diaphragm, controlled by a motor, step motor, rod, chain, or gear, plus a controller unit, to adjust the gap for the passage of the air, to adjust the volume/rate and speed and pressure of the fluid.

Figure 46:
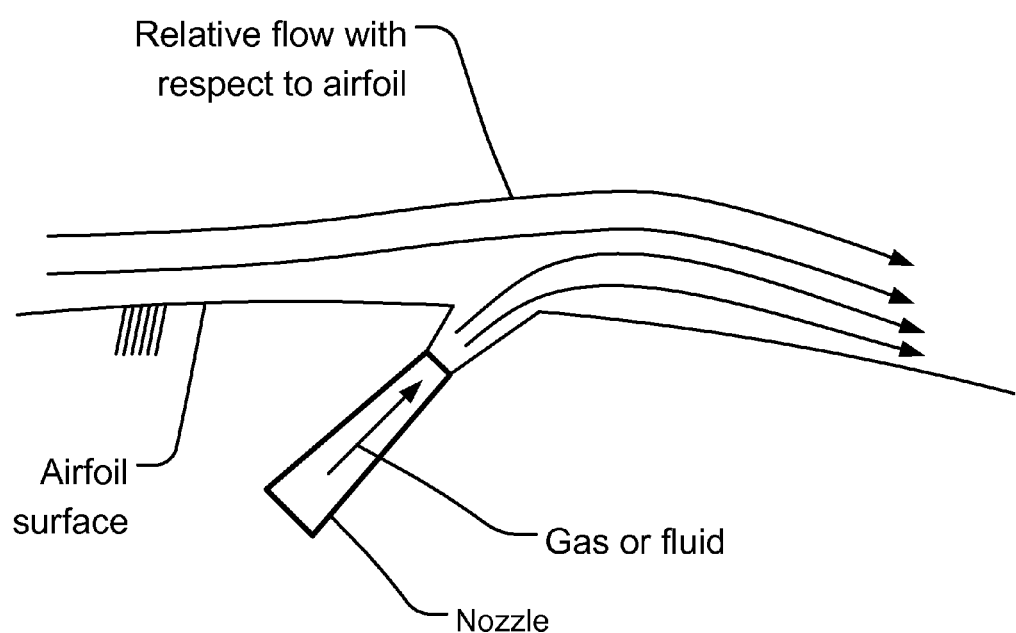
FIG. 46 shows nozzle, with fluid coming out, changing the pattern of air flow over the surface of the blade, for an embodiment of our invention.

FIG. 46 shows nozzle, with fluid coming out, changing the pattern of air flow over the surface of the blade, for an embodiment of our invention. This adjusts the efficiency of the blade and the electric generator, using optimum torque and useful force on the blades, plus reducing the harmful force or stress on the blades and tower.

FIG. 47 shows nozzle, with fluid coming out, with heating unit, cooling unit, or ionizing unit, for an embodiment of our invention. (These are 3 different inventions here.) The source of energy (for this unit, or any other parts/units in this disclosure, for ground, tower, blades, or components within) is from grid/outside, battery, electricity from wind generator itself, mechanical energy from shaft, gears, or blades, or flywheel(s).

FIG. 49 shows nozzle, with fluid coming out, with pressurizing unit, optional regular or pressurized tank, with safety valve or relief valve, or manifold, or compressor, or regulator, and controller, to adjust the process and parameters, if needed, for the pressure in the nozzle, for air or flow pattern near the blade, based on sensors feedback, for an embodiment of our invention.

Figure 50:
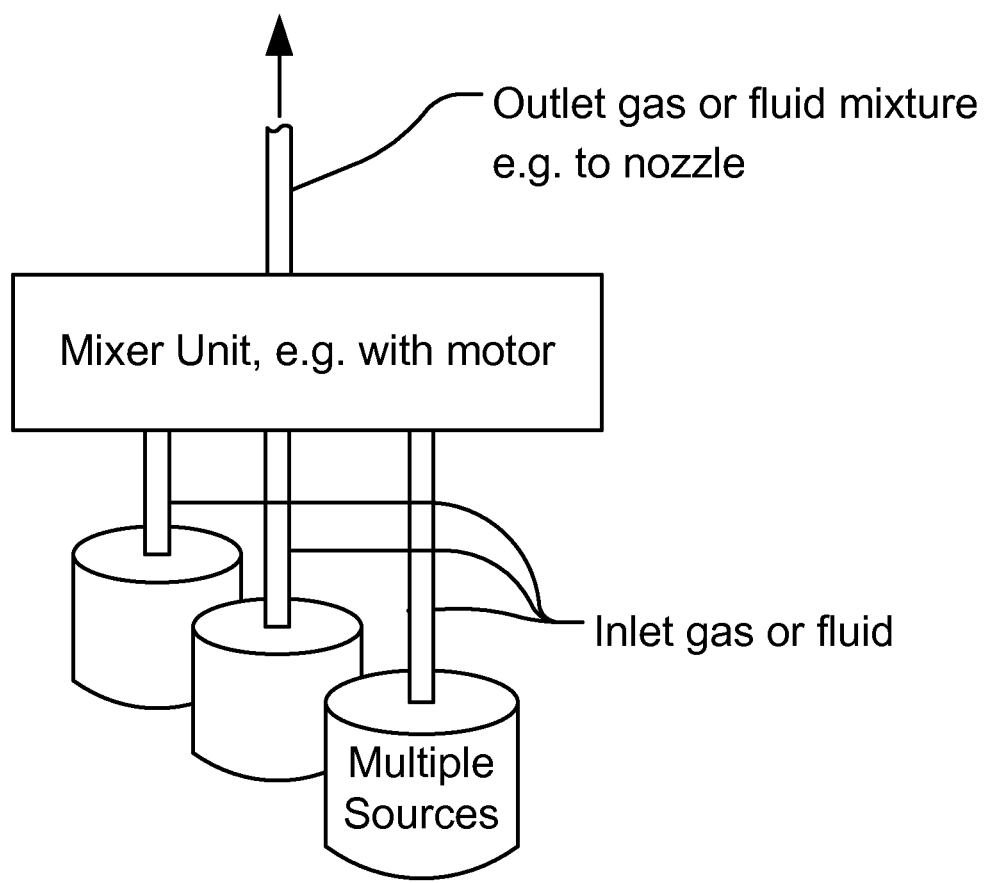
FIG. 50 shows nozzle, with fluid coming out, with mixer unit, with multiple sources, for an embodiment of our invention.
Figure 51A:
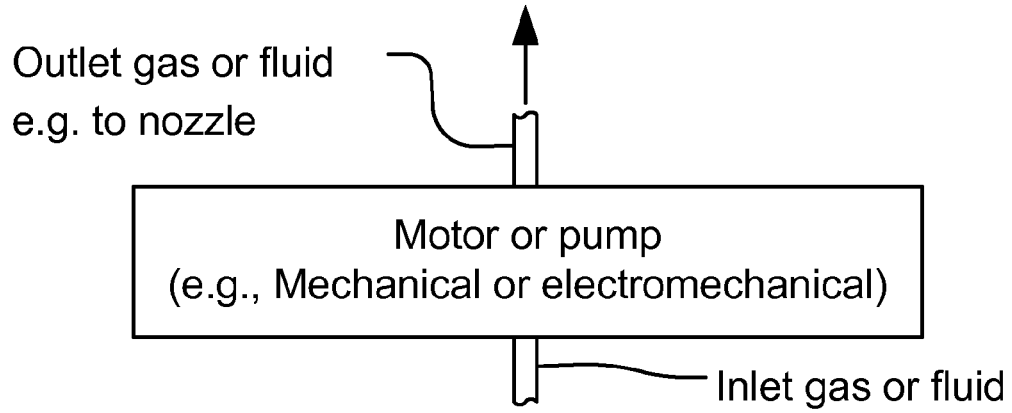
FIGS. 51(a)-(b) show nozzle, with pump and source, or connected to air outside, directly or indirectly, for an embodiment of our invention.
Figure 51B:
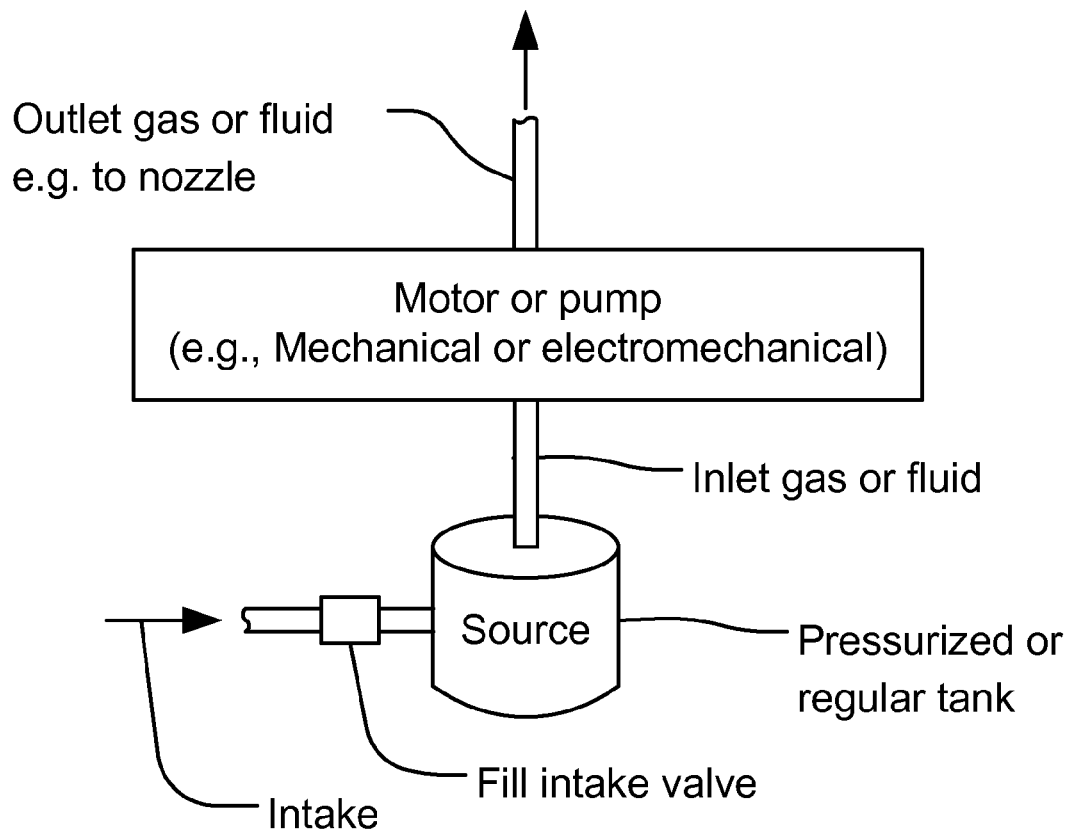

FIG. 50 shows nozzle, with fluid coming out, with mixer unit, with multiple sources, e.g. fluids and mixtures, from capsules, open air, fan, cylinders, pump, compressor, or a byproducts of a chemical reaction, for an embodiment of our invention. FIG. 51(a)-(b) show nozzle, with pump and source, or connected to air outside, directly or indirectly, for an embodiment of our invention.

Figure 52:
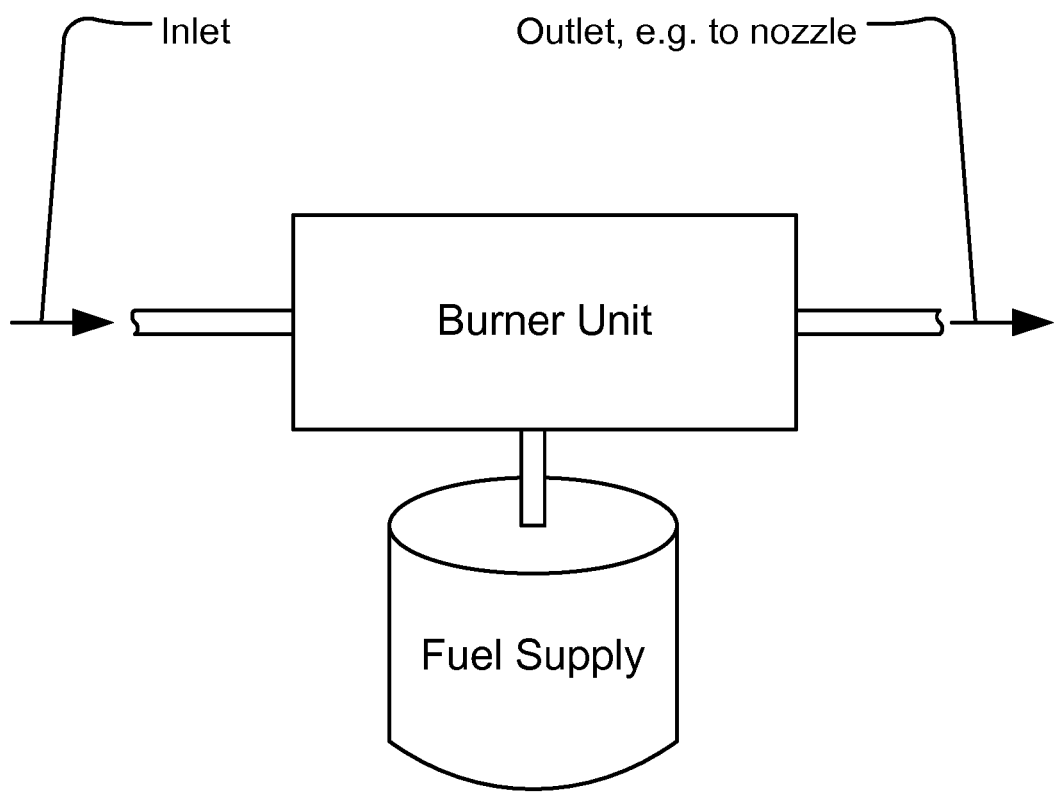
FIG. 52 shows nozzle, with fluid coming out, with burner unit, with fuel source, or mixture of fuel and oxygen/air supply or tank, for an embodiment of our invention.

FIG. 52 shows nozzle, with fluid coming out, with burner unit, with fuel source, or mixture of fuel and oxygen/air supply or tank, or from different sources and pipes/inlets, for an embodiment of our invention. The heat from burner unit and exhaust can be captured in a snake/long pipe/array of pipes, with fluid or water or oil, e.g. with metal jackets, to absorb heat by conduction and radiation (e.g. transparent jacket) (and fluid convection, e.g. using pump on fluid in the jacket), as much as possible, to save energy in a useful way, and channel it some way for storage or usage, e.g. generating steam elsewhere, for mechanical usages in the farm, or generation of electricity using steam.

Figure 53:
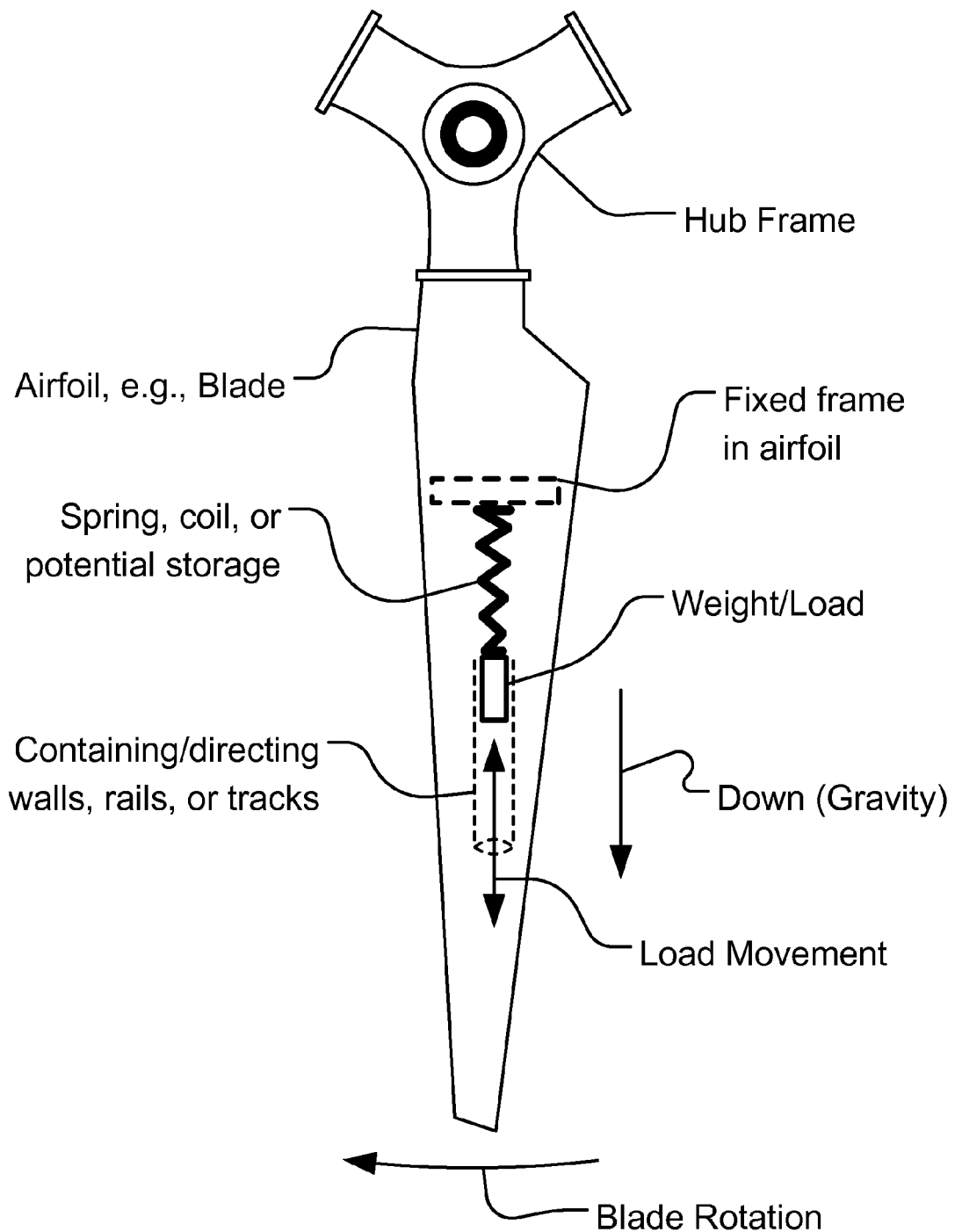
FIG. 53 shows a blade, connected to the hub, including a mass and spring, for storing potential energy, and then releasing it, for each cycle of rotation, for an embodiment of our invention.

FIG. 53 shows a blade, connected to the hub, including a mass and spring, for storing potential energy, and then releasing it, for each cycle of rotation, for an embodiment of our invention. This is used to do some mechanical things within tower and blades, using the wind energy and blade rotation, e.g. opening the valves, starting pumps, or compressing the air. The energy is stored in a coil or spring or flywheel, and during release, it can move a shaft, gear, pulley, rod, or lever, attached to the system in FIG. 53.

FIG. 54 shows nozzle, with fluid coming out, with strings pulling in or out, using motor/pulley, or valve closing for a nozzle, controlled by the controller or processor, fed by sensors or cameras, in various locations on tower, on blades, or remote, on the ground, using wired or wireless communication, for an embodiment of our invention. The controller determines and adjusts the flow around the blade, using the nozzles and strings, in this case, for optimum flow on the blades, to optimize blade rotation or electricity generation.

FIG. 56 shows sensors feeding analyzers, and then to optimizer, using the goals (e.g. increase torque, from a given wind situation/weather data) and predetermined conditions (e.g. condition 1 requires doing function $J_A$), and functions (e.g. $J_A$) corresponding to a physical property or parameter, all supplying to controller, to perform a function (e.g. $J_A$), for an embodiment of our invention.

FIG. 57 shows one or more transmitters and one or more receivers, for the electromagnetic, sound, or ultrasound waves, for traveling through blade and traveling through air around the blade, to get information on the integrity of the blade and about the weather parameters, respectively, to be compared to a historic record of baseline, to analyze the information, for controller, to control the functions on tower and blades, and further instruct transmitter(s) to adjust their functions in the future, for better accuracy, if needed, for an embodiment of our invention.

FIG. 58 shows nozzle, with fluid coming out, or mixture, for cleaning material or de-icing, with pump and valve, to be controlled and adjusted by the controller, after analyzing data by sensors (such as thermocouple for measuring T) or cameras, as feedback to system, for an embodiment of our invention. A light/electromagnetic source or sound wave source can also be applied on the surface, with the corresponding detector, to detect and analyze, for example, for spectrum analysis, to study and analyze the density and other parameters for air and material, on or around the surface of blade, around the sensor, to detect the ice or clean surface, or the degrees/quantification or lack of those conditions/states.

FIG. 59 shows wind turbine farm, with rows and columns, divided in different regions, based on the angle of the wind and direction with respect the array of the towers or wind turbines, for the proximity and interference effects of wind turbines on each other, and number of neighboring wind turbines, for an embodiment of our invention. In this case, we have 4 regions here.

Figure 60A:
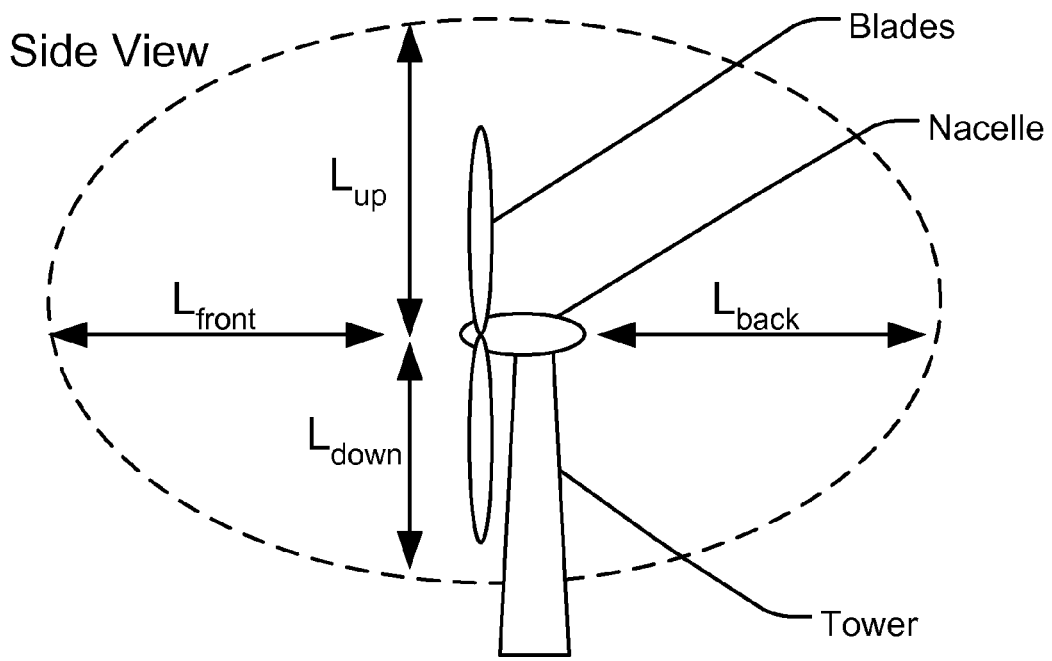
FIGS. 60(a)-(b) show envelope of influence or interference of a wind turbine with neighboring wind turbines, for distances defined in different directions, in 3-dimensional space, with a threshold defined as acceptable or negligible for operation of neighboring wind turbines in a farm, with rows and columns, or arrays, or for any obstacle like a house or tree, disturbing the air pattern or flow, for an embodiment of our invention.
Figure 60B:
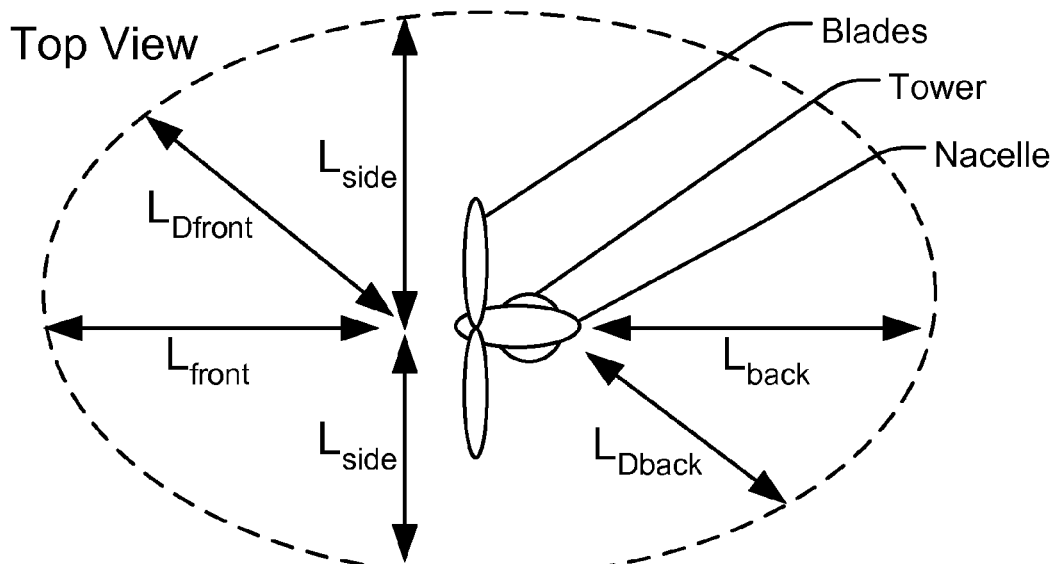

FIGS. 60(a)-(b) show envelope of influence or interference of a wind turbine with neighboring wind turbines, for distances defined in different directions, in 3-dimensional space, with a threshold defined as acceptable or negligible for operation of neighboring wind turbines in a farm, with rows and columns, or arrays, or for any obstacle like a house or tree, disturbing the air pattern or flow, for an embodiment of our invention, for a given threshold, for different applications and purposes, such as ground obstacle being different than water or another wind turbine, each having its own thresholds, and distances, hence, resulting in different shape and size for the envelope of influence, to avoid that specific obstacle. The distances are marked in the figure. The envelope may be a non-smooth 3-dimensional volume, with many edges or pockets, and no particular geometrical or uniform or clean shape. However, for the sake of simplification, we can approximate that with an ellipsoid or egg-shape space around the tower, to the first order of calculations, or approximate distances.

FIG. 61 shows wind turbine farm, with N wind turbines, sending the sensors data to a central analyzer, which is optimized and the result goes to a central controller to coordinate and adjust the functions of all N wind turbines in the farm, to optimize the farm as a whole, on any goal or issue, such as maximizing torque (or minimizing stress on blades, that causes deformation, bend, or tear on the structure), for an embodiment of our invention.

FIG. 62 shows wind turbine farm, with wind turbines at different heights, sizes, or shapes, such as hollow structure made of metal/steel beams, to reduce interference on neighboring unit, based on some acceptable threshold, for proper operation or reduced interference level or stress, per wind turbine, for an embodiment of our invention. Generally, the height difference or shape difference reduces the interferences on neighboring towers, as shown in the figure.

FIG. 63 shows an ultrasonic or vibration device (or any source of radiation, e.g. electromagnetic waves) sending waves on or close to the surface of the blade, or under the surface, to break the ice or prevent the formation of ice, monitored by sensor(s) and camera(s), or heat them up as a method of prevention (e.g. with microwave frequency), or resonate at a frequency for breaking the bonds for ice formation, mechanically, which is then analyzed with the analyzer and controller, for feedback from sensors, at different locations, for an embodiment of our invention. Once the weather condition improves or the ice is gone, according to the sensors, then the intensity or function of the vibration device is reduced or stopped, by the controller.

FIG. 64 shows a wind turbine with flywheel, with possibility of placing at many locations in the system, for storing energy or smoothening the rotation and cycle, with gear(s) and clutch, to engage or disengage the flywheel, or harvest the energy of the flywheel, e.g. at the slow wind situation or sleeping/idle mode for the generator, with a controller, deciding the mode of operation, for an embodiment of our invention. The lever can also be used (as an alternative, or any similar method of engaging), to disengage the gears, change the mode of operation, engage the flywheel, or harvest/obtain/recapture the energy later.

FIG. 65 shows blade (or airfoil, wall, wing, tower, plate, spoiler, or any extensions) with features on it, e.g. ridges, dimples, holes, and bumps, for an embodiment of our invention.

Figure 66A:
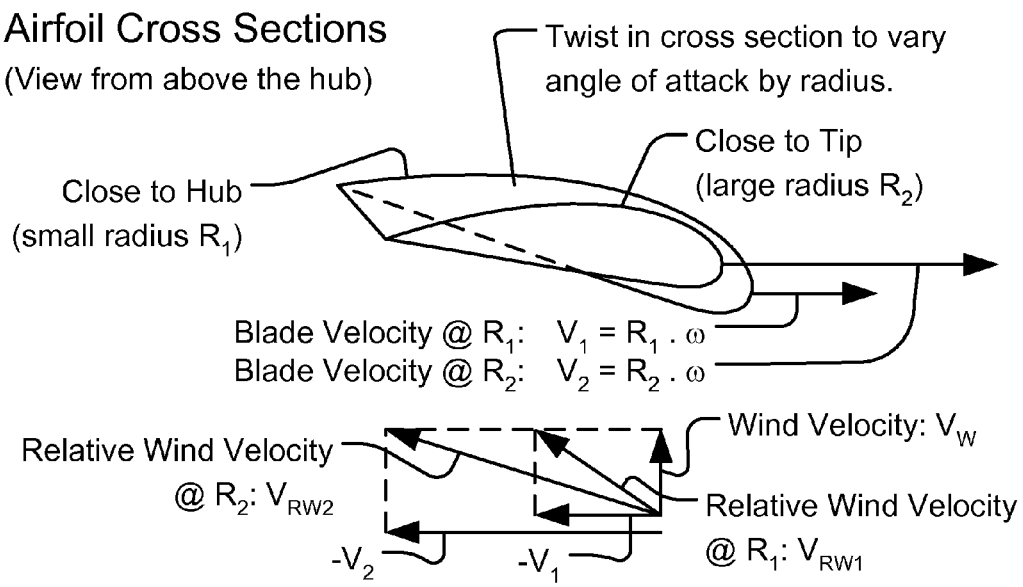
FIGS. 66(a)-(e) show blade with various rotating sections or pieces, for an embodiment of our invention.
Figures 66B, 66C:
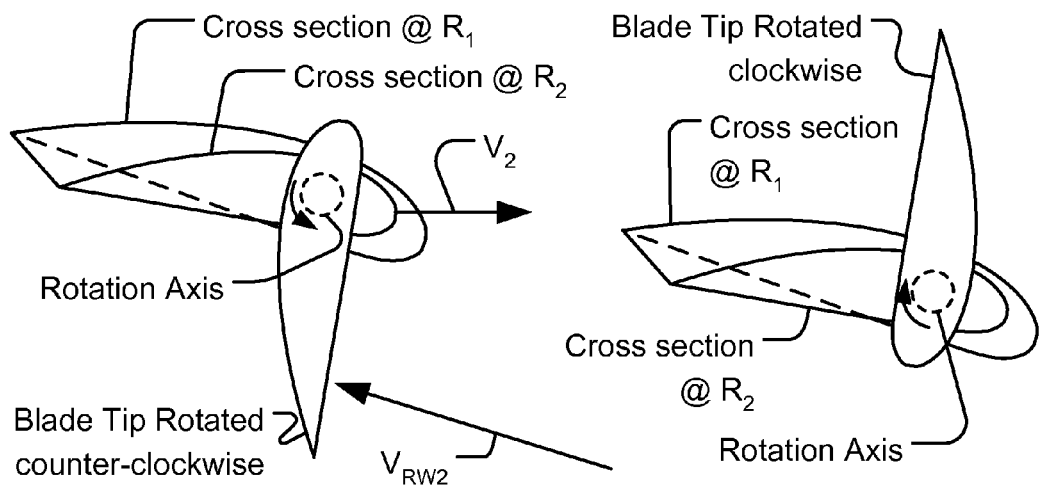

FIGS. 66(a)-(e) show blade with various rotating sections or pieces, for an embodiment of our invention. FIG. 66(a) shows the blade cross section, with a twist on the blade. It displays the relative velocities as vectors. FIGS. 66(b)-(c) show blade tip rotated CCW and CW. In one embodiment, as depicted in FIG. 66(b), an air braking at high w is provided by turning the blade tip counter clockwise. In this configuration, at low w (e.g., when starting up the rotation), the torque provided by the turned blade tip counters the torque provided by the rest of the blade. In an embodiment, as depicted in FIG. 66(c), an air braking at high w is provided by turning the blade tip clockwise. In this configuration, at low w (e.g., when starting up the rotation), the torque provided by the turned blade tip helps accelerate the rotation of the blades quickly.

Figure 66D:
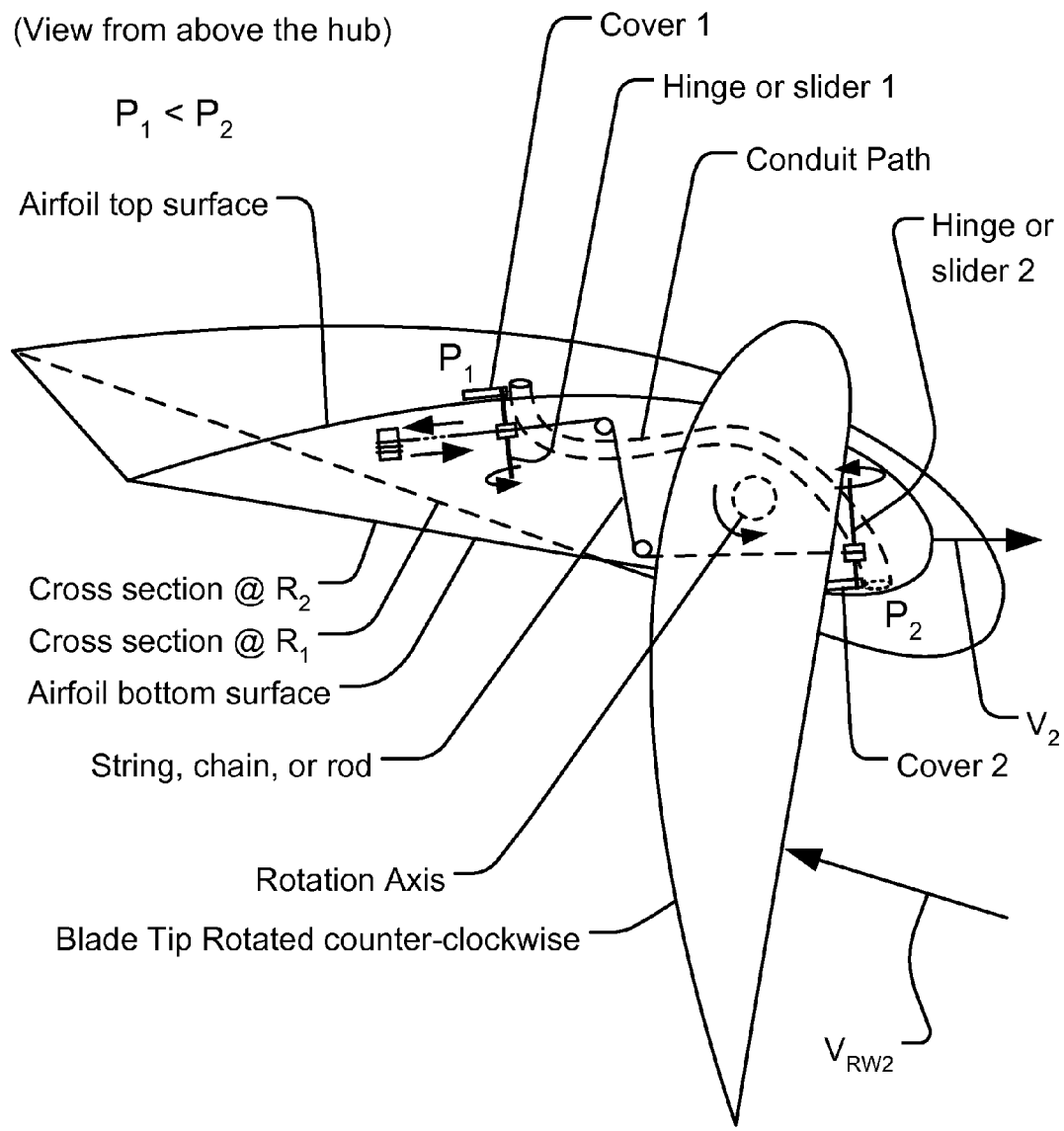

FIG. 66(d) shows the conduit path with covers, with a mechanism to open and close the conduit through the blade (e.g. with pressure adjustments around the blade surface, at 2 or more different locations), in addition to blade tip rotation (to change the cross section of the blade), to cause varied flow pattern around the blade, to increase torque for the blade.

Figure 66E:
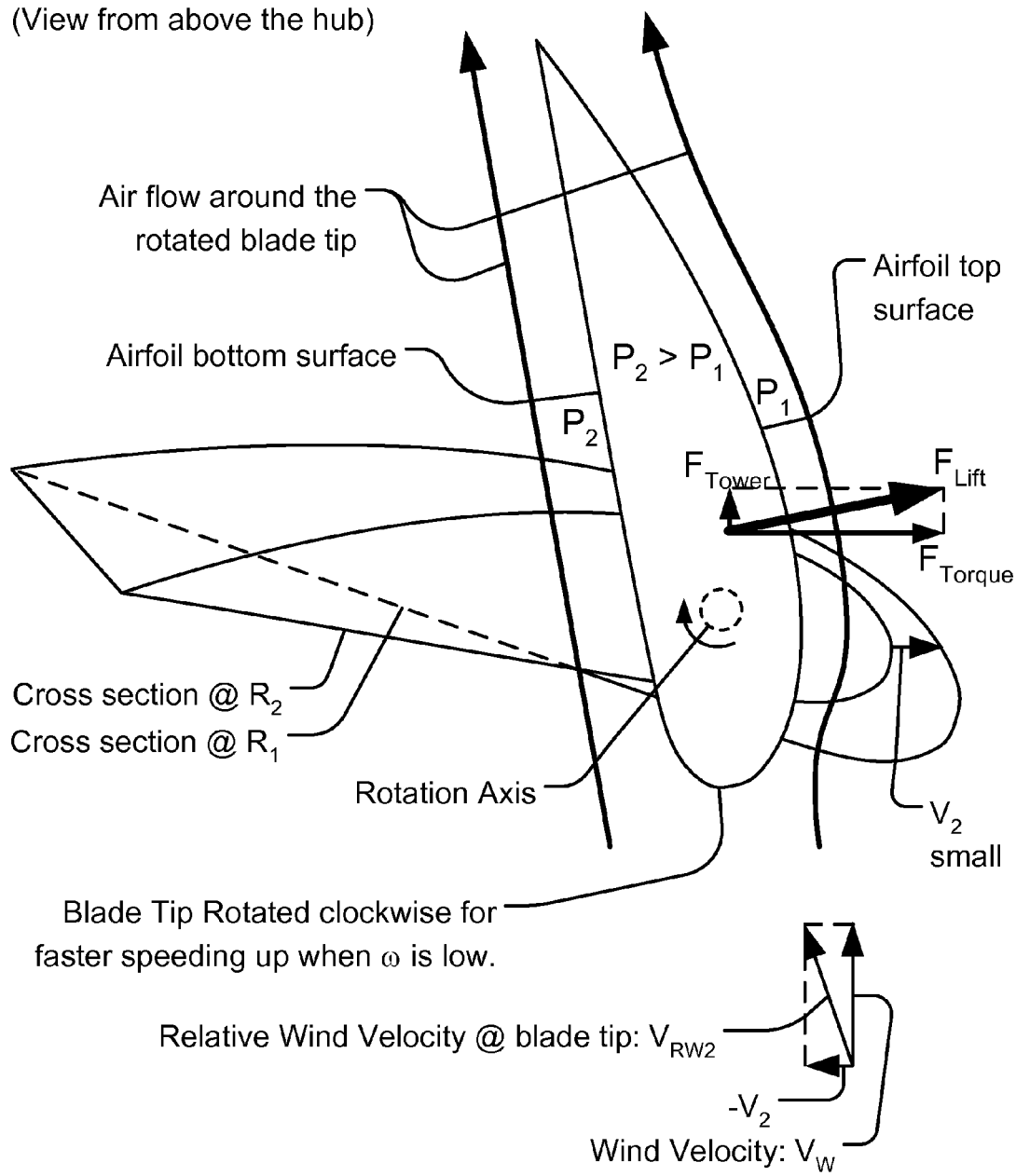

FIG. 66(e) shows the blade, with blade tip rotation (or at any part of the blade rotation, in general), with pressures around the blade tip, $P_2$ and $P_1$, wherein ($P_2 > P_1$), and velocities and relative wind velocity, as shown in the figure, with forces $F_{Torque}$, $F_{Lift}$, and $F_{Tower}$, with $F_{Lift}$ from lift on blade tip, having 2 components: $F_{Torque}$ (which helps rotate the blade, which is useful), and $F_{Tower}$, which is pushing against the tower, which puts stress on the tower, and is generally not a useful component.

The blade tip is rotated clockwise for faster speeding up, as in FIG. 66(e), when w is low, at the startup phase, when starting from the stationary position. That is a very useful feature for start of the wind turbines, for higher efficiency.

Figure 67A:
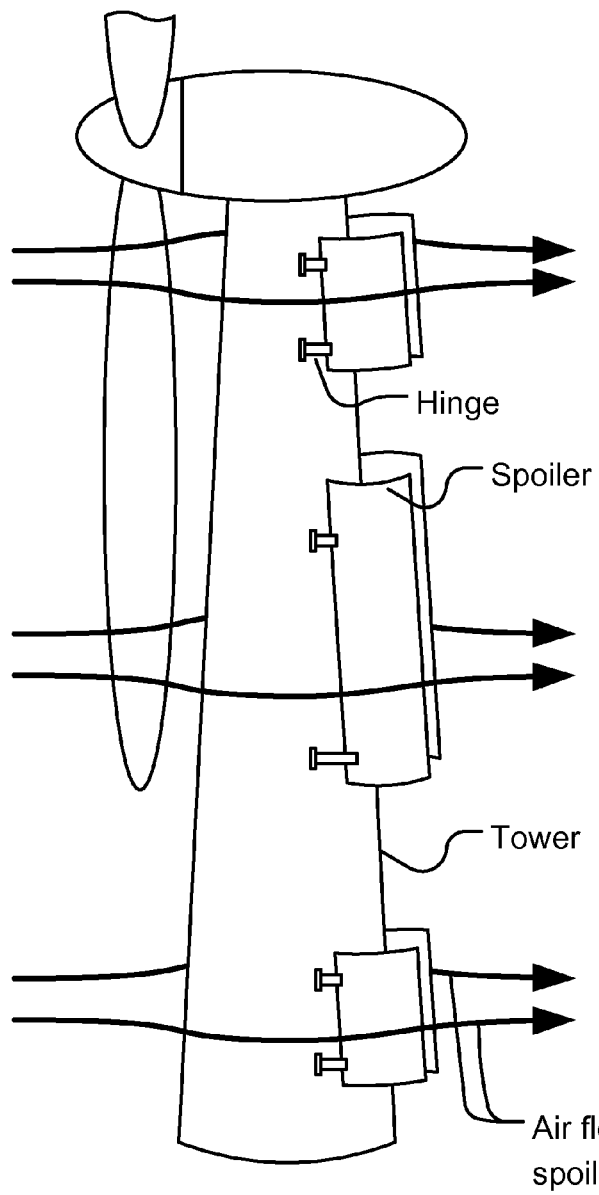
FIGS. 67(a)-(e) show tower with various spoilers, for air flow around the tower, for changing the patterns, for an embodiment of our invention.
Figure 67B:
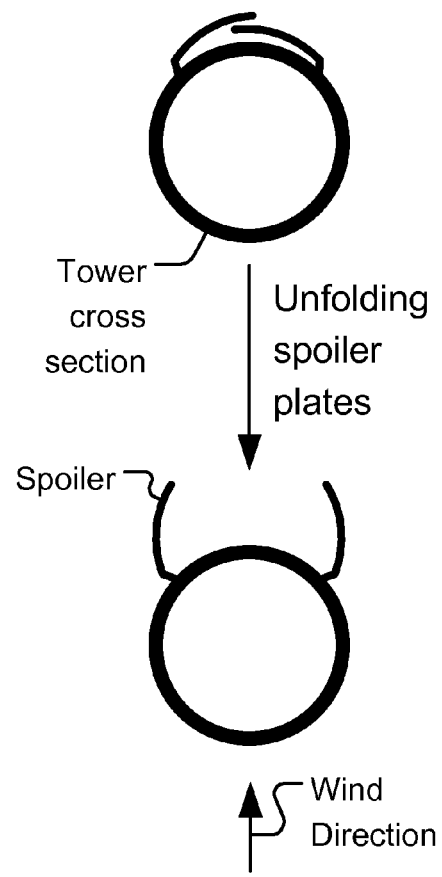
Figures 67C, 67D:
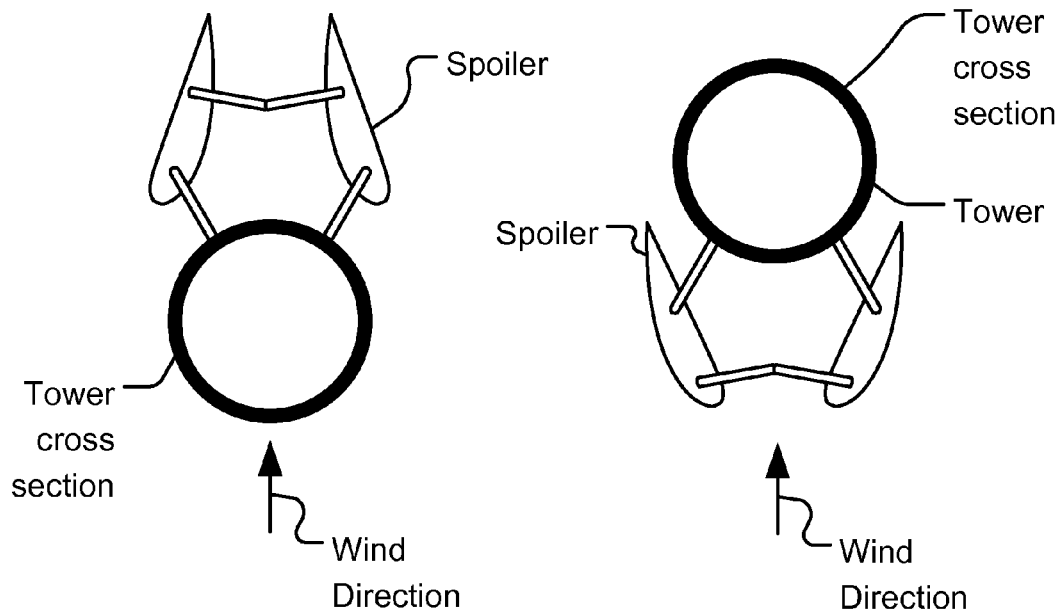
Figure 67E:
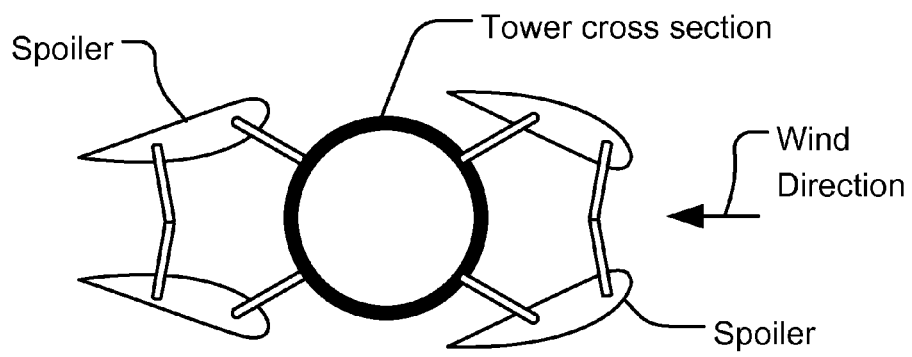

FIGS. 67(a)-(e) show tower with various spoilers, for air flow around the tower, for changing the patterns, for an embodiment of our invention. The spoilers can be folded, or opened at a different angle, using a motor, lever, hinge, or cable (or the like), to change the air pattern around the tower, depending on the speed of the wind outside, or other weather parameters. FIGS. 67(c)-(e) show connected spoilers at different orientations, with respect to the wind direction. In one embodiment, as depicted in one of FIGS. 67(c)-(e), the lift force against the spoilers, provide a torque against the tower base which is in opposite direction from the torque against the tower due to the blades pushing (or pulling in case of back-mounted blades) against the tower.

FIG. 68 shows wind farm with matrix, array, or multiple turbines or towers, in different rows and columns, with various sizes or heights, to stagger, and to reduce the interference effect on neighboring units, for higher efficiency of the blades and electricity generation for all towers, for an embodiment of our invention.

Figure 69A:
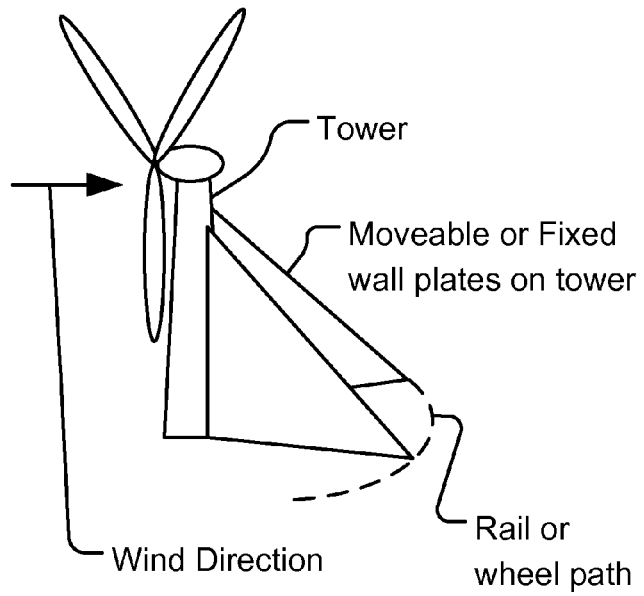
FIGS. 69(a)-(c) show tower with various wings or walls, for air flow around the tower, for changing the patterns, for an embodiment of our invention.
Figure 69C:
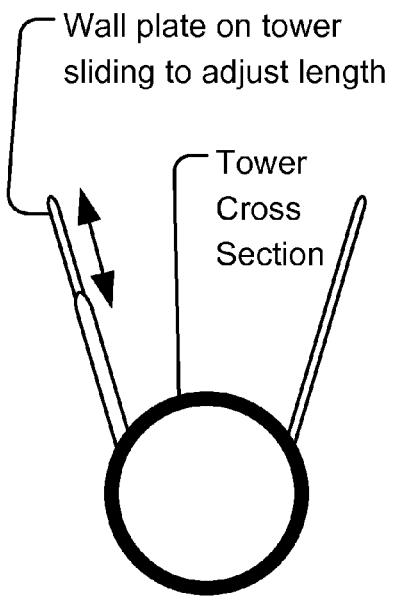
Figure 69B:
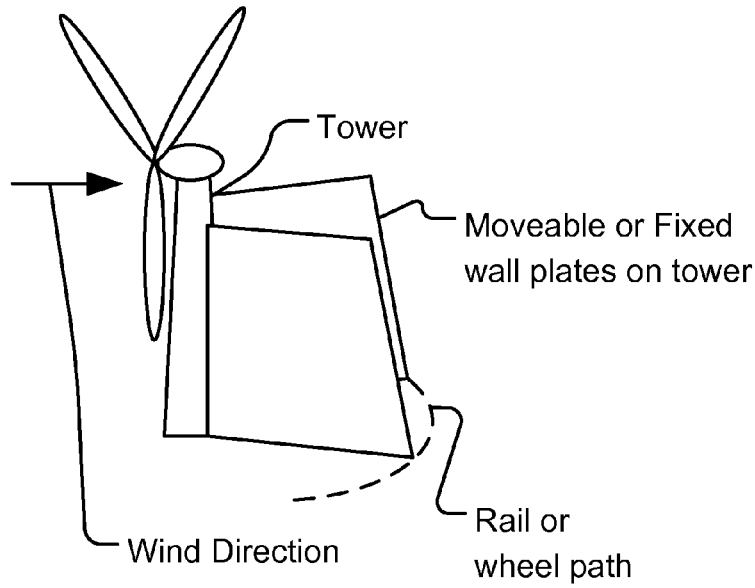

FIGS. 69(a)-(c) show tower with various wings or walls, for air flow around the tower, for changing the patterns, for an embodiment of our invention, with variable/adjustable size and length, e.g. using motor, by commands, automatically or manually, by an operator, or pure manually, i.e. moving by hands, by a user or human operator, on a rail or wheel or track.

Figure 70A:
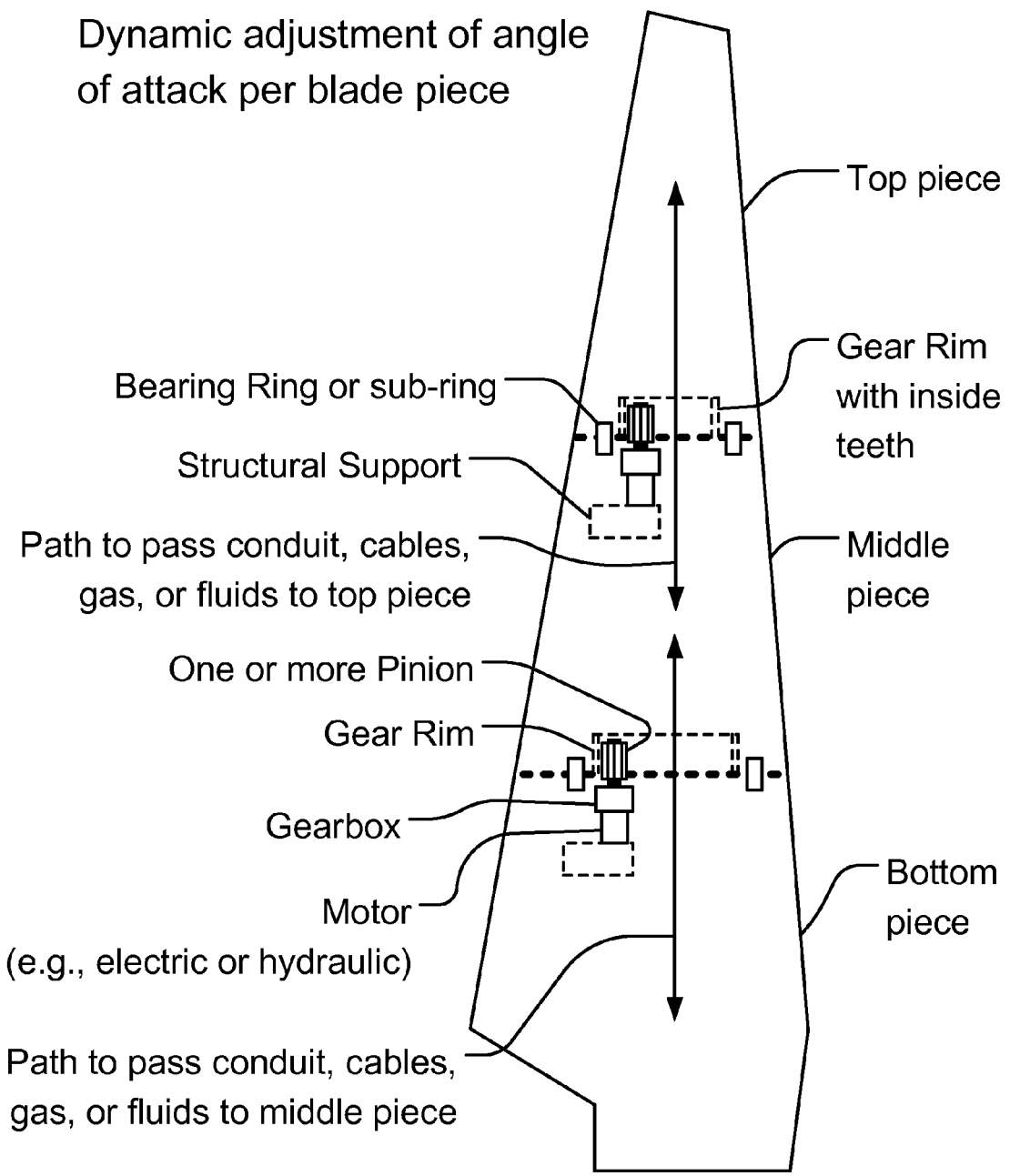
FIGS. 70(a)-(j) show blade with various pieces, and the mechanism for changing or adjusting the pieces, for an embodiment of our invention.
Figure 70B:
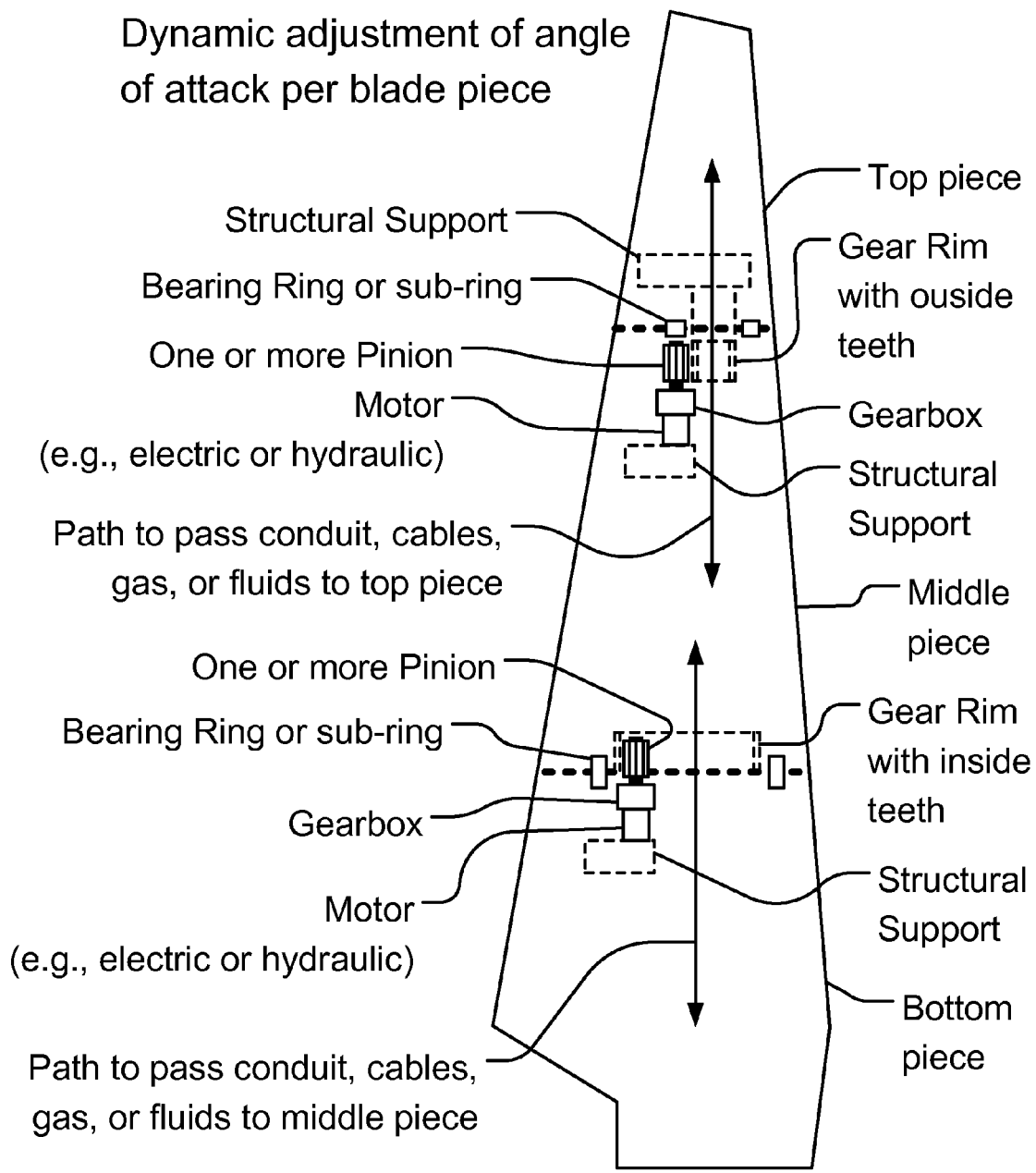
Figure 70C:
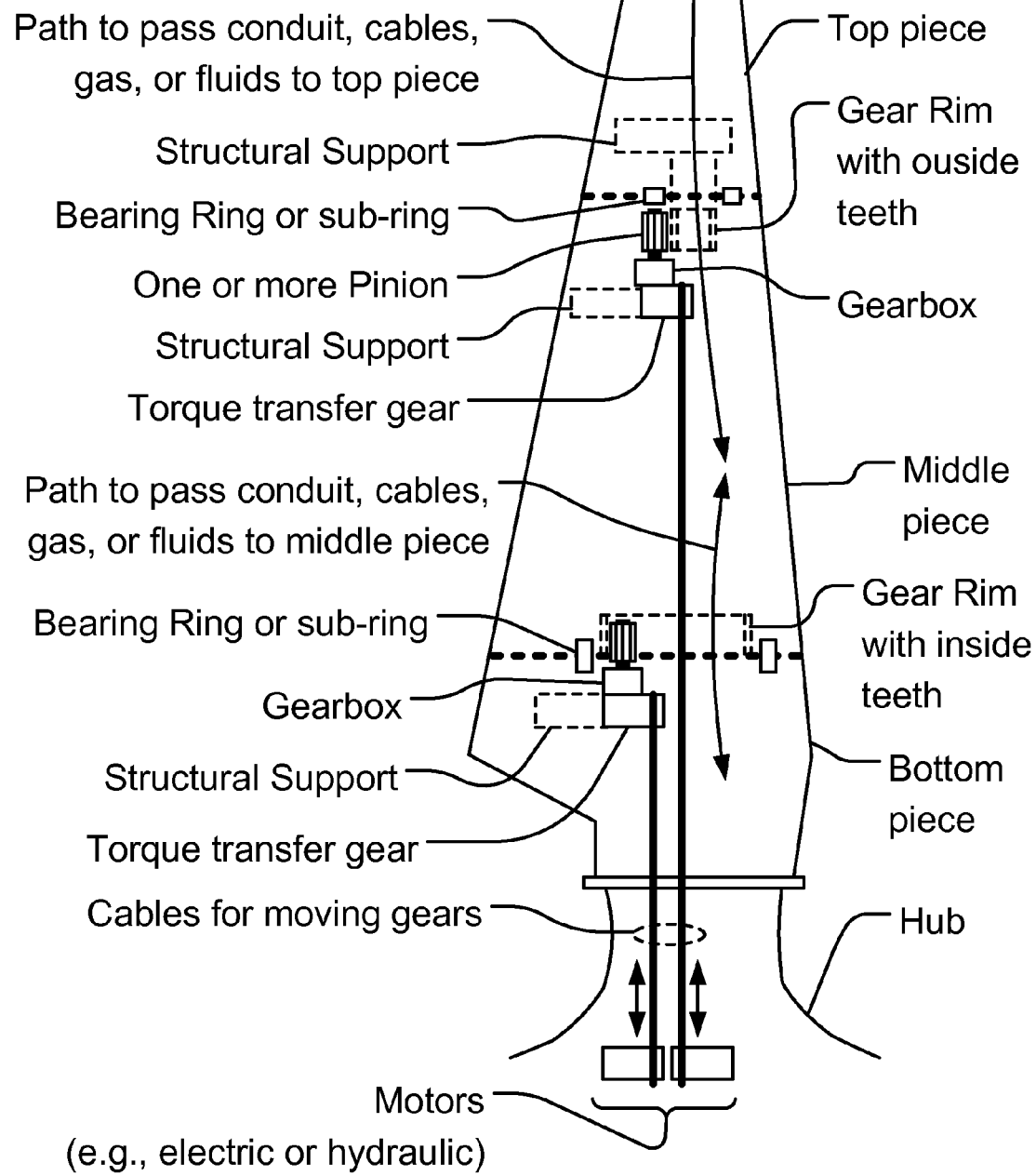

FIGS. 70(a)-(j) show blade with various pieces, and the mechanism for changing or adjusting the pieces (rotating with respect to each other, at the intersection between the pieces), for an embodiment of our invention. FIG. 70(a) shows blade, with multiple pieces (with motor, gearbox, and gear rim (with inside teeth)), with multiple motors, to drive those pieces to the right locations/orientations, with mechanisms shown in the figure. FIG. 70(b) shows blade, with multiple pieces (with motor, gearbox, and gear rim (with both inside teeth and with outside teeth, for 2 (or more) different motors)), with multiple motors, to drive those pieces to the right locations/orientations, with mechanisms shown in the figure. FIG. 70(c) shows similar mechanism, with motors outside of the blade, at the hub, transferring the movement using rods, bars, and gears, for example. That concept is useful, because each piece can be optimized separately (by the controller and its database), and the motor for each piece is smaller and more manageable, in comparison to a motor for the whole blade.

Figure 70D:
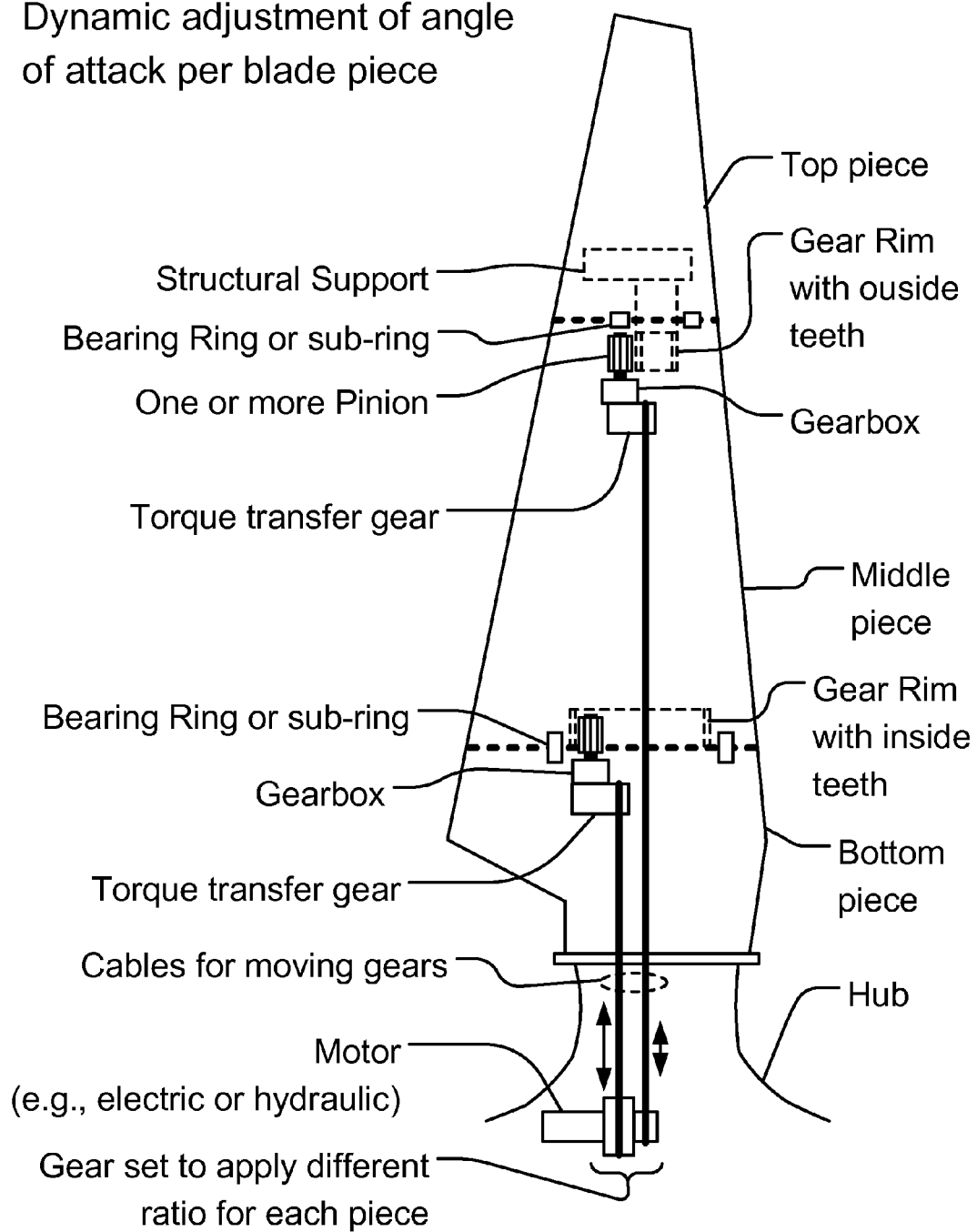
Figure 70E:
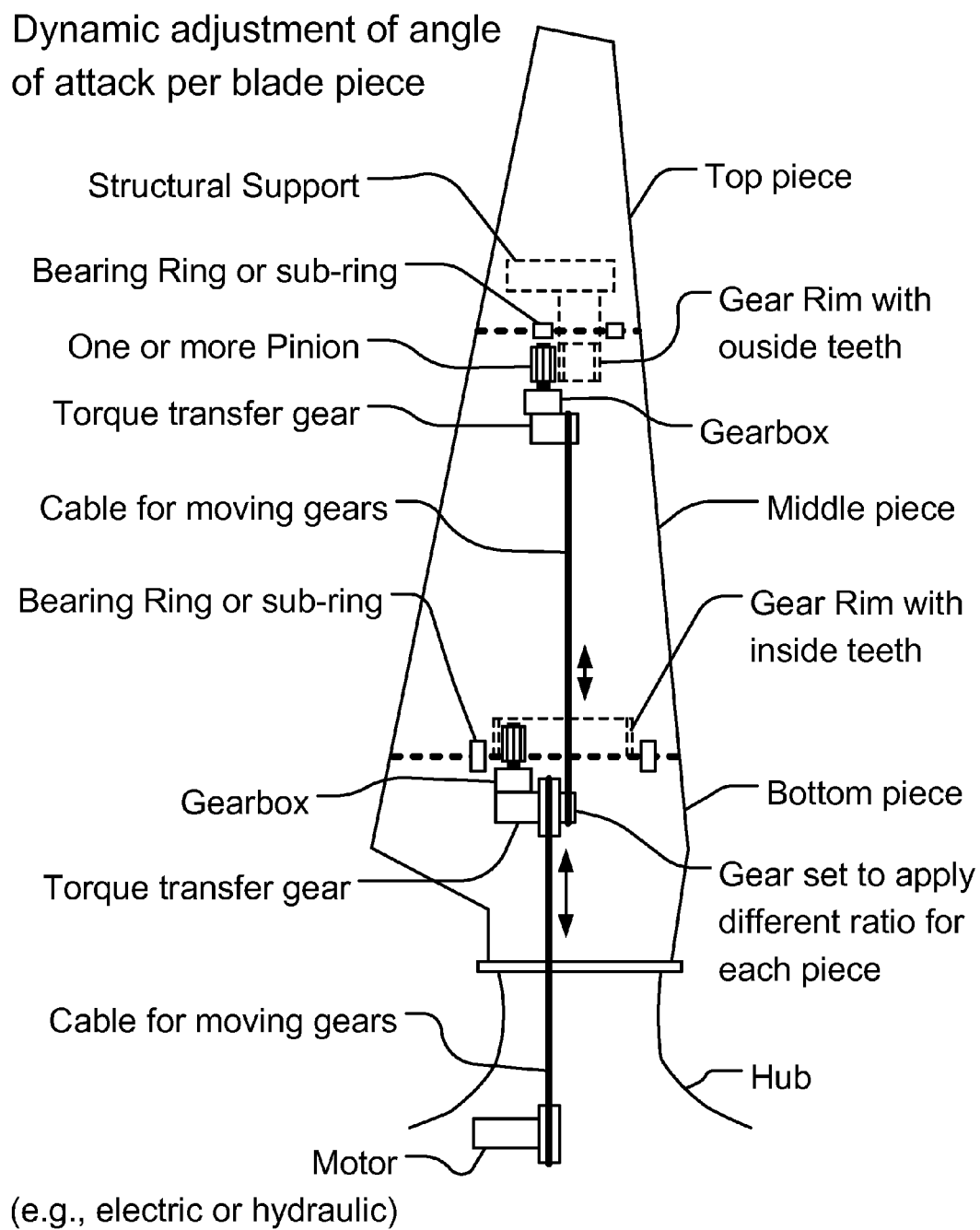
Figure 70F:
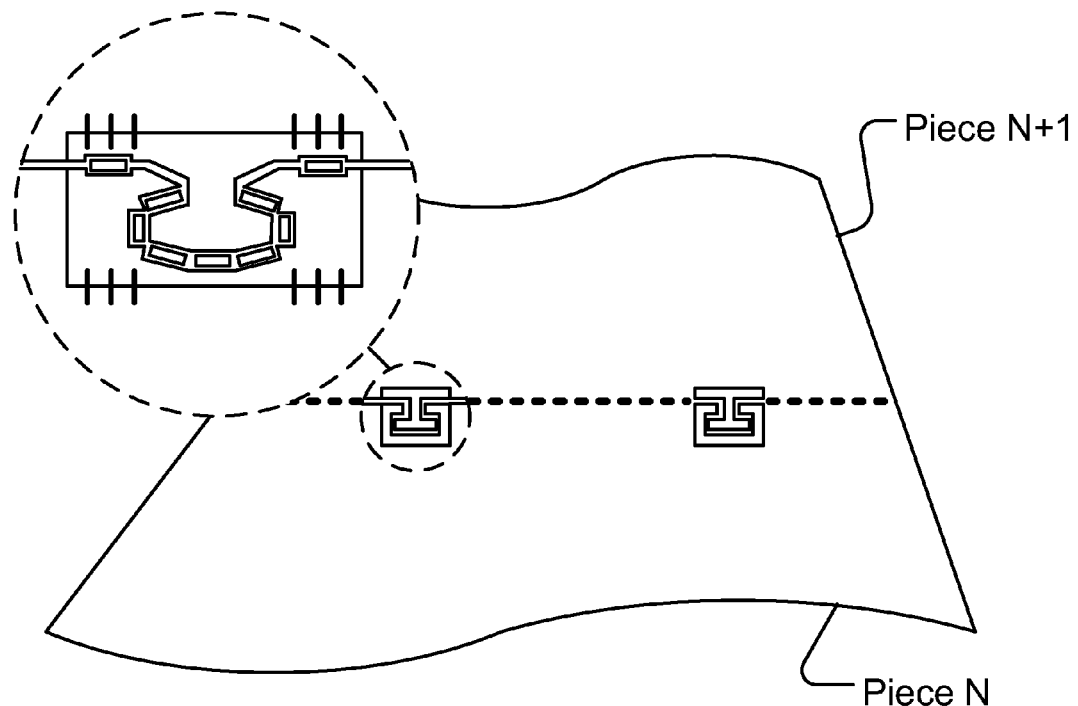

FIG. 70(d) shows similar mechanism, with one common motor, with 2 sizes of gears (concentric, on same axis), causing 2 different speeds on the connecting rods that drive the gearboxes for the moveable pieces of the blade. FIG. 70(e) shows similar mechanism, with one common motor, with 2 sizes of gears (concentric, on same axis), located in the blade at the position of the gearbox for the movement of one of the pieces of the blade, reducing the need to have 2 long rods, and saving on/reducing the weight of the assembly.

FIGS. 71(a)-(g) show nozzle or ridge or holes cross sections, on the blade or tower, with various patterns, for patterning the air flow, as planned, for optimization, for an embodiment of our invention. These can be combined with all the other nozzles that taught elsewhere in this patent application, to produce all combinations possible.

Figure 72A:
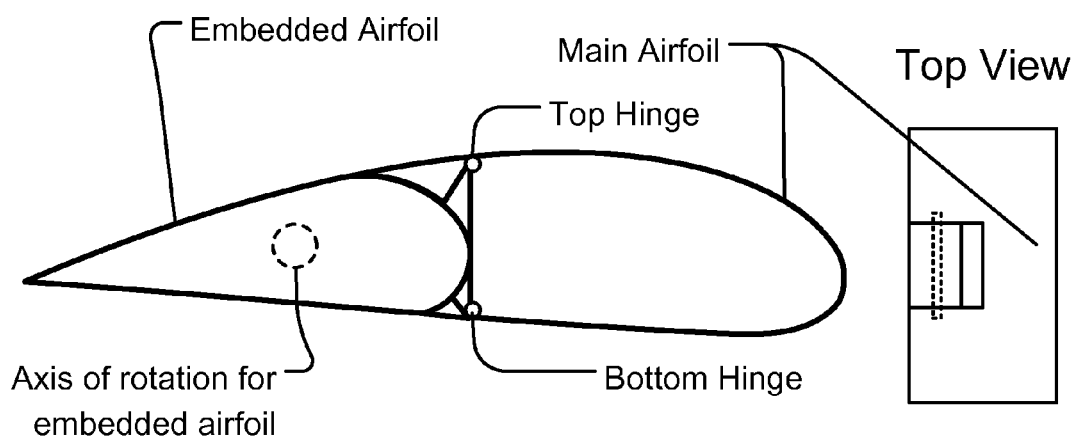
FIGS. 72(a)-(d) show blade, with flap flipped, for causing lift and torque to rotate the blade, or the head wing (the front portion of the blade) turning to cause different cross section of the blade, for an embodiment of our invention.
Figure 72B:
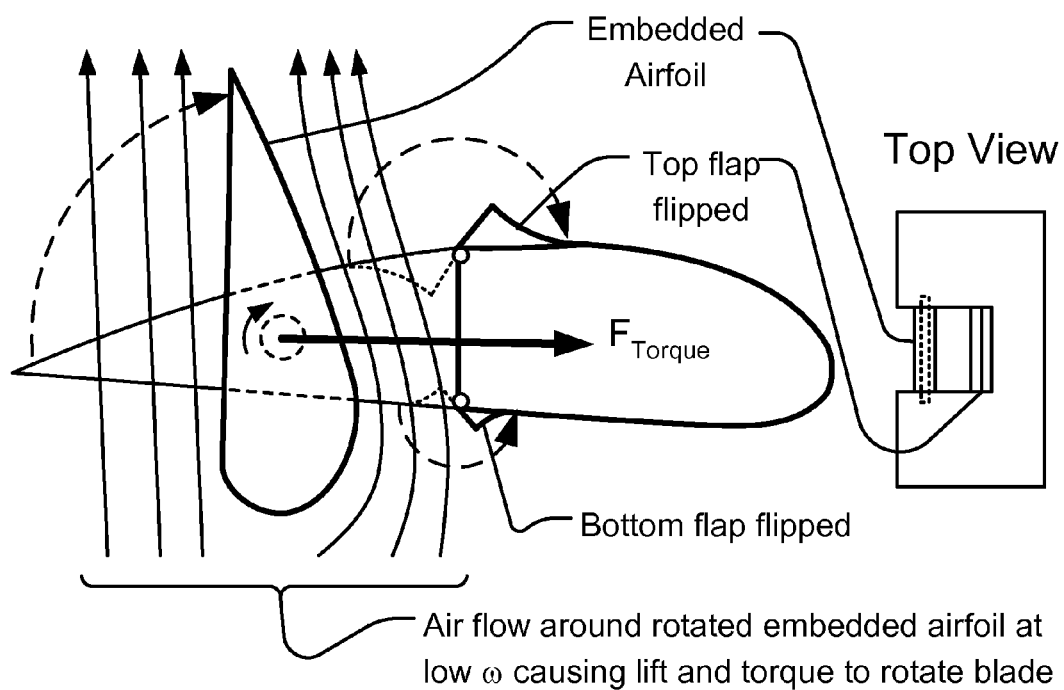

FIGS. 72(a)-(d) show blade, with flap flipped, for causing lift and torque to rotate the blade, or the head wing (the front portion of the blade) turning, to cause different cross section of the blade, for an embodiment of our invention. FIGS. 72(a)-(b) show that the embedded piece or flap is taken out, by a motor, lever, or cable, modify the air flow/pattern, at low ω, to cause lift and torque, to rotate the blade, at the startup stage. Note that similar concept is also used to make a brake/slow down, at high ω, using the increased drag.

Figure 72C:
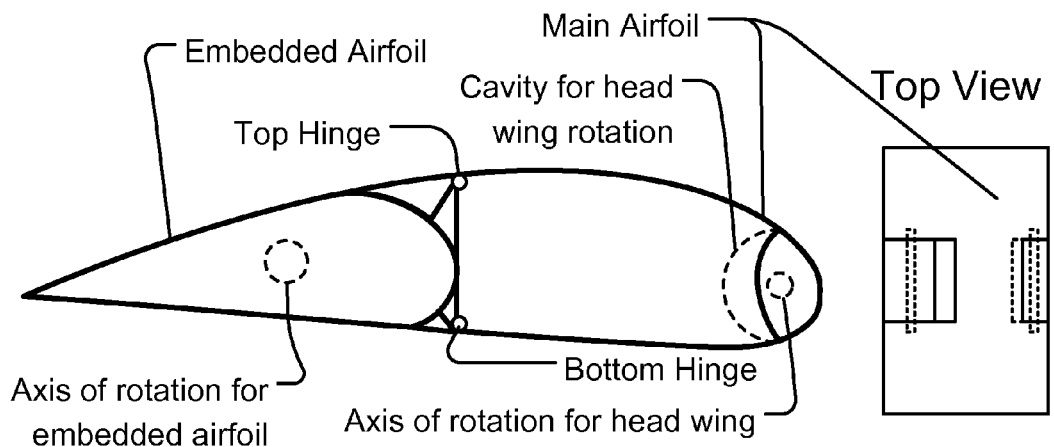
Figure 72D:
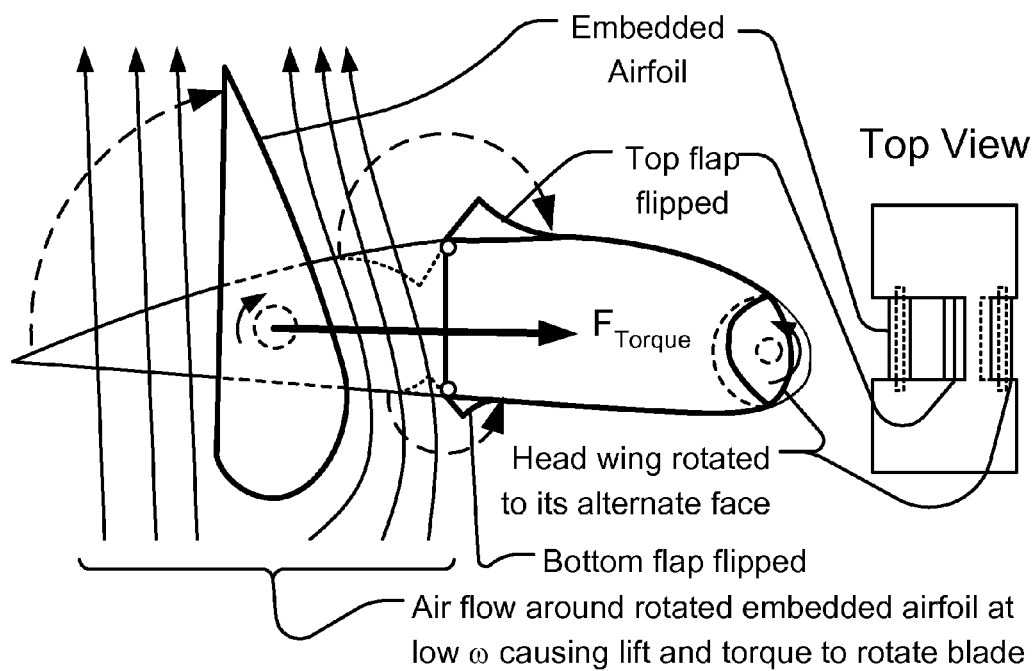

FIGS. 72(c)-(d) show that one of the embedded pieces is a "head wing", as shown in the figure. It should have enough space at the head section for such a rotation. It can also be a flat surface on the flip side, but the curved surface on both sides is more advantageous (as a compromise between the two situations). FIG. 72(d) shows the flip version, which causes high drag, to stop the blades (stop the rotation). Note that we only need a part of the blade like that, not the whole thing. (It is not necessary, but it can be done for the whole blade, as well.)

Figure 73A:
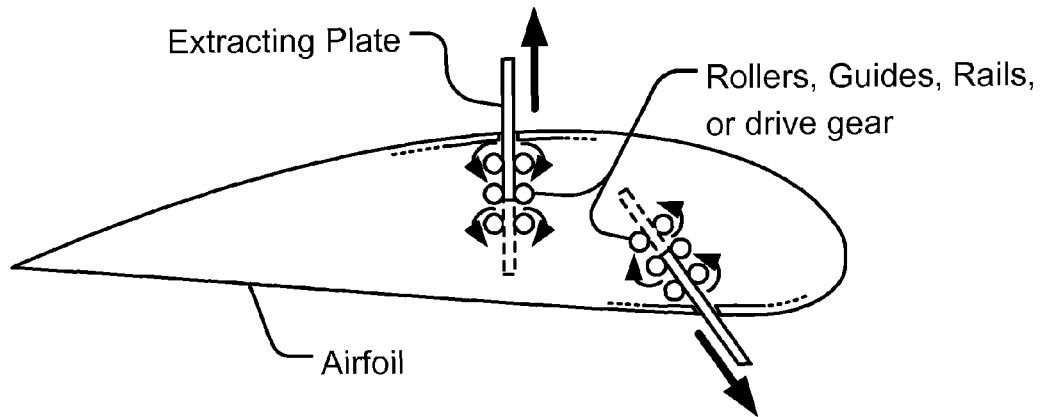
FIGS. 73(a)-(e) show blade, with flap, curved plate, or extracting plate, along with rod, piston, and motor, for an embodiment of our invention.
Figure 73B:
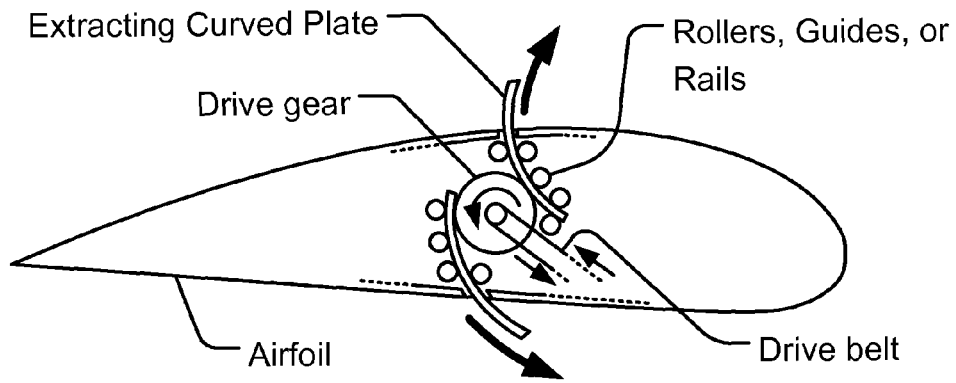
Figure 73C:
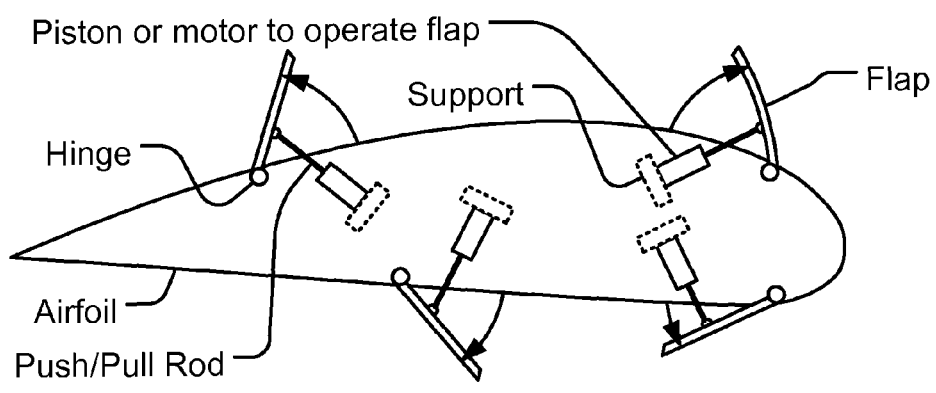
Figure 73D:
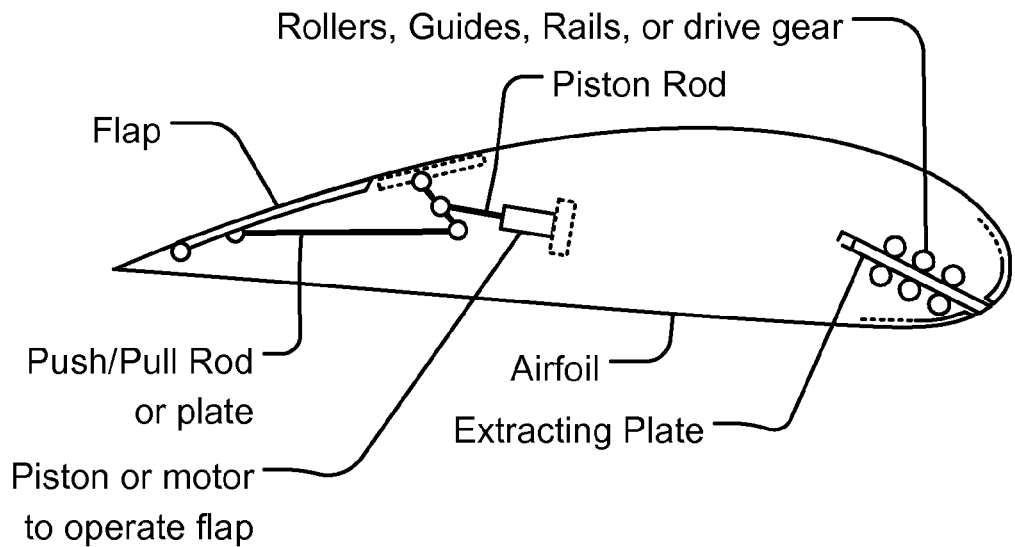
Figure 73E:
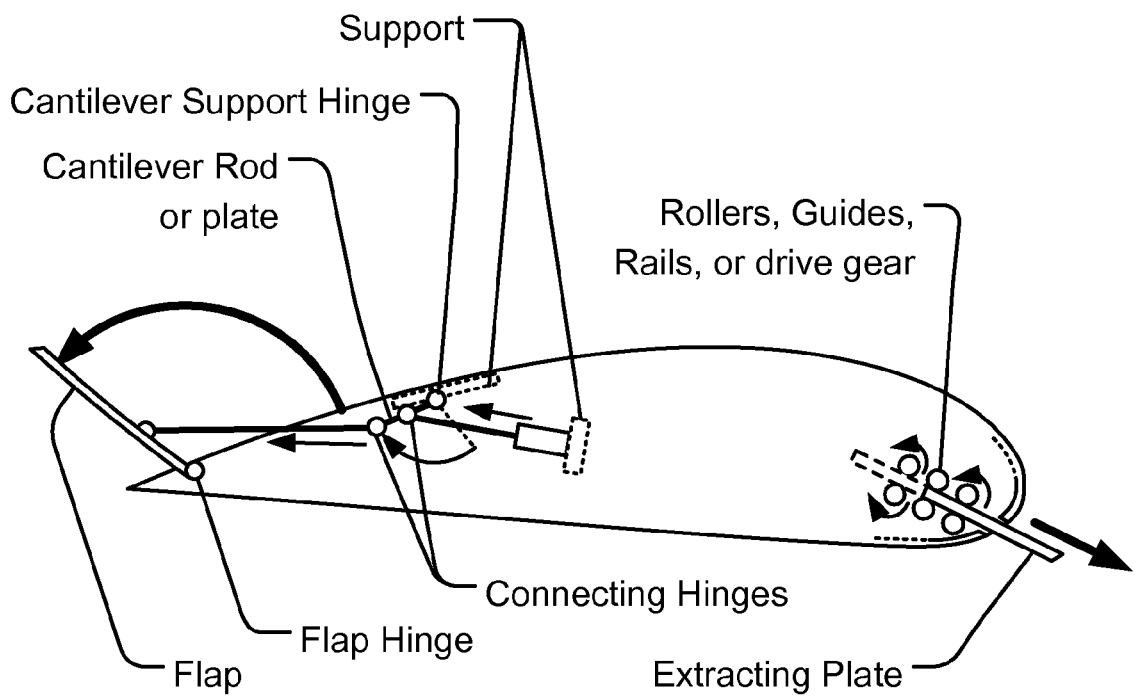

FIGS. 73(a)-(e) show blade, with flap, curved plate, or extracting plate, along with rod, piston, rollers, guides, rails, drive gears, piston, hinge, rod, cantilever rod, and motor, for an embodiment of our invention, to change the flow pattern around the blade. One embodiment, as depicted in one of FIGS. 73(a)-(c) and (d)-(e), provides air braking at high ω. In an embodiment, as depicted in FIGS. 73(d)-(e), the flap(s) and/or plate(s) are used to help create a positive torque against the blade to accelerate the blade rotation at startup or at low ω.

Figure 74A:
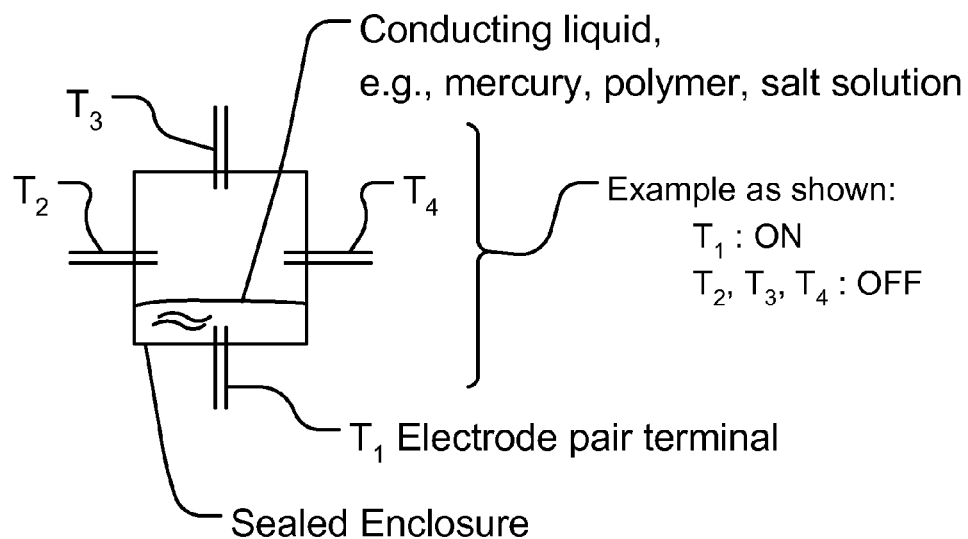
FIGS. 74(a)-(b) show blade, with liquid sensor (or switch), for an embodiment of our invention.
Figure 74B:
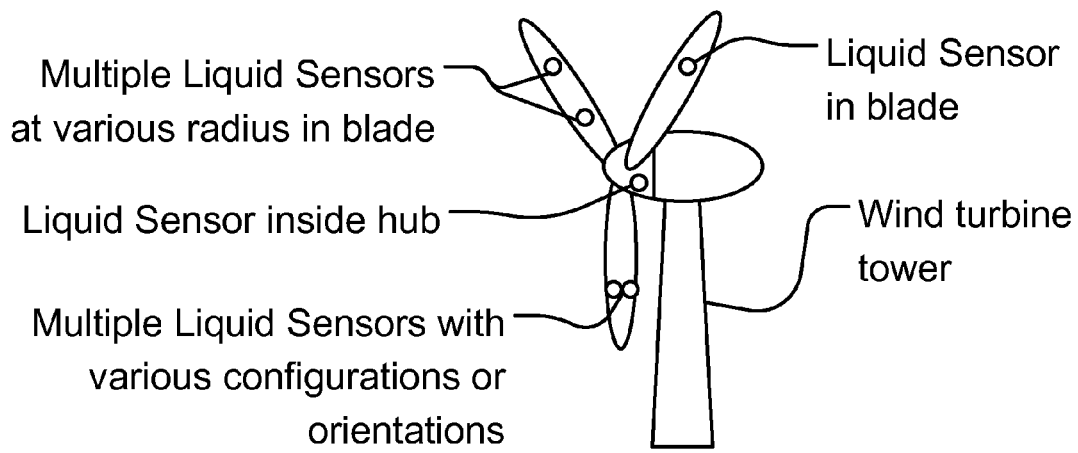

FIGS. 74(a)-(b) show blade, with liquid sensor (or switch), for an embodiment of our invention. FIG. 74(a) shows a 4-terminal sensor or device, each with one electrode pairs. In this case, terminal $T_1$ is conducting, but not the other 3 terminals. So, $T_1$ is ON, but the other 3 terminals are OFF. The sensors are installed within or on blades or hub, or other components that move or rotate.

The shapes for liquid sensors are: triangle, square, rectangle, ellipse, circle, polygon, curved, or fused shape (e.g. with deep pockets), with spherical or cylindrical shape, in cross section, as an example. The number of electrodes can be single or pair per terminal, as an example. The positions of the electrodes, with respect to the overall shape are: corner, middle of side, offset between middle and corner, in the pockets, or at the center, as an example. Liquid amount in the container covers 1, 2, 3, or more electrodes, as an example. Number of electrodes is one per side (or every other side), or 4 or more per ellipse or circle, or two or more per side, as an example. Electrodes can be wire, patch, or plate (narrow in some orientations, or change the orientation), as an example.

These (e.g. FIG. 75) can be placed at various radii and configurations, with respect to each other, e.g. at 45 degree rotation, as an example. Also, the electrodes between the various sensors are interconnected or logically connected (e.g. logic gate), as an example. Electrodes themselves are interconnected or logically connected, as an example. One can mix of two or more conducting liquids with different conductances, as an example. Or, one can mix of non-conducting and conducting liquids (e.g. separable), like oil and salt solution, as an example, e.g. to reduce effective weight and/or change the effective friction or viscosity. Note that, at a certain w range, the mixture would separate and form two regions of non-equal conductance. The mixture can be solid in the fluid environment or solution, as an example. Due to inertia, friction, or viscosity, one can get delays, or out-of-phase situation, in which the state and position of the liquid in the container lags behind the rotation of the container.

Figure 76A:
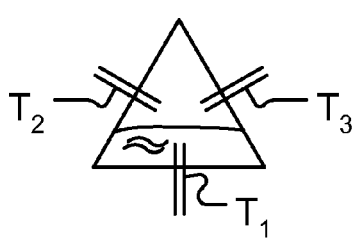
FIGS. 76(a)-(r) show liquid sensor, with various configurations, for an embodiment of our invention.
Figure 76B:
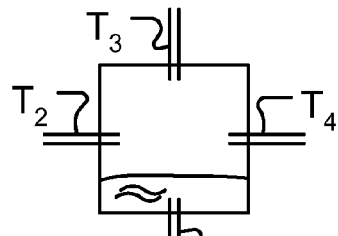
Figure 76C:
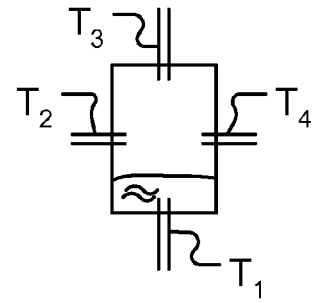
Figure 76D:
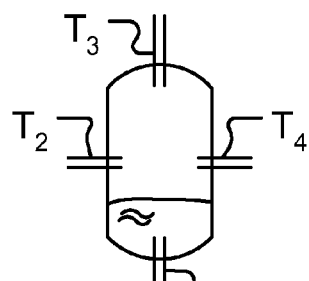
Figure 76E:
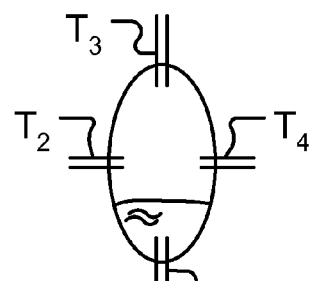
Figure 76F:
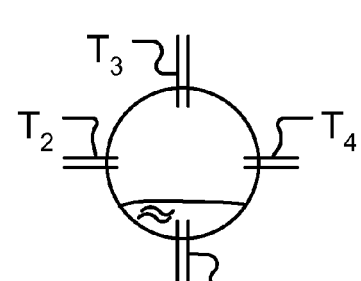
Figure 77A:
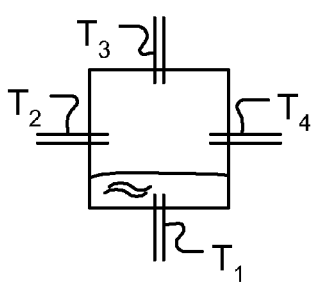
FIGS. 77(a)-(f) show liquid sensor, with various configurations, for an embodiment of our invention.
Figure 77B:
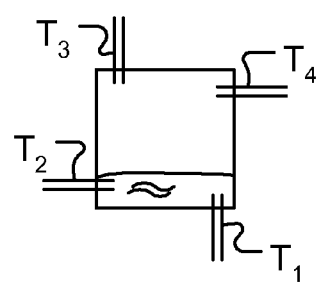
Figure 77C:
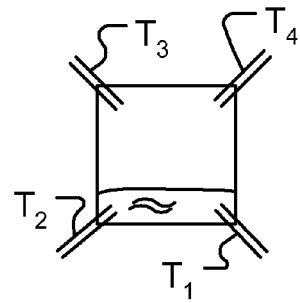
Figure 77D:
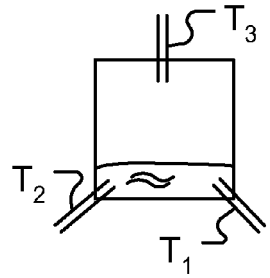
Figure 77E:
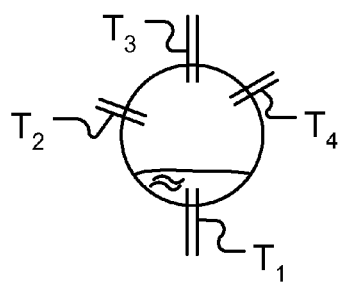
Figure 77F:
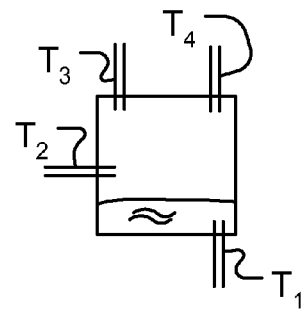
Figure 78D:
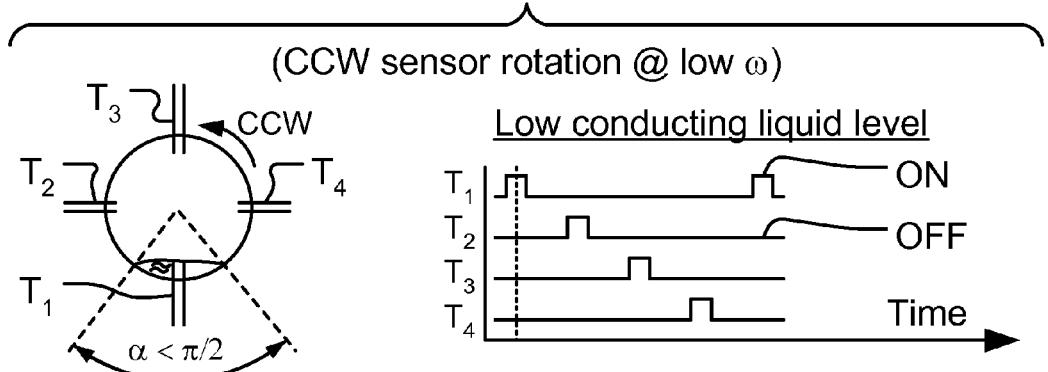
Figure 78E:
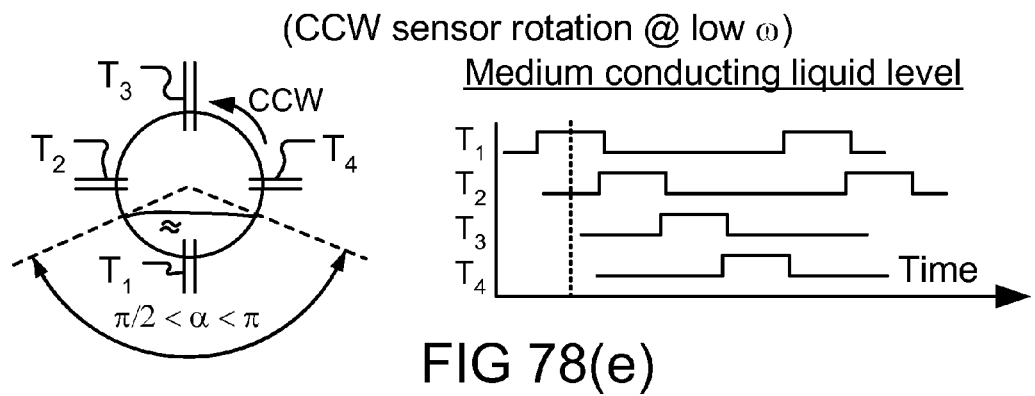
Figure 78F:
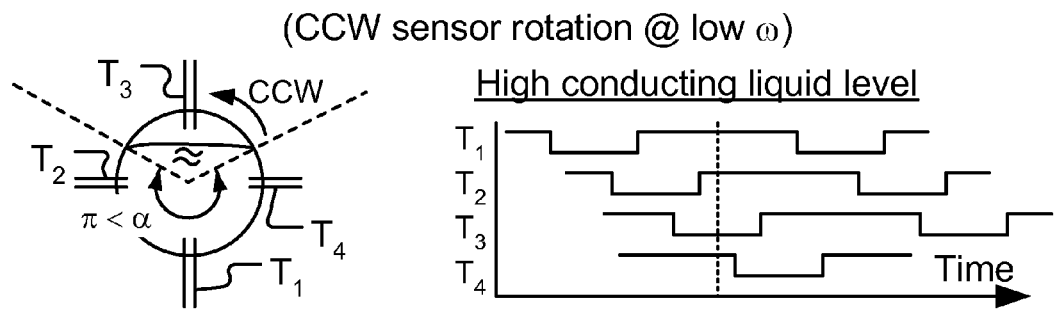

FIGS. 75(a)-(d) show liquid sensor, with various configurations, e.g., number of electrodes used for a terminal in a liquid sensor, for an embodiment of our invention. In one embodiment, where a single electrode is used for a terminal (e.g., as depicted in FIG. 75(a)), the connectivity measurements against multiple terminals (or electrodes) show whether the conducting liquid is in contact with multiple electrodes within the sensor. For example, in case of FIG. 75(a), when the connectivity between T1 and T2 electrodes is occurring within the sensor, it implies that the liquid is contacting their associated electrodes, and therefore, it implies a relative range of orientation between the sensor cavity and the conducting liquid therein (e.g., 45 degree counter-clockwise rotation of the sensor relative to the liquid). In one embodiment, for example as depicted in FIG. 75(b), there are multiple electrodes provided for a terminal of a liquid sensor. In such a case, the conductivity measurement between the electrodes of such terminal provides the information whether the conducting liquid is locally present at the terminal (given close proximity of the electrodes in one embodiment). In one embodiment, for example as depicted in FIG. 75(b), the liquid sensor is operated as one shown in FIG. 75(a) be measuring the liquid connectivity between the electrodes of two terminals. In one embodiment, for example as depicted in FIG. 75(c), having more than two electrodes for a terminal in a liquid sensor, helps use one electrode as spare in case one of the others become defected or its conducting path/wire/cable is disconnected/cut. In one embodiment, as for example depicted in FIG. 75(d), where four or more electrodes are provided for an electrode, a 4-point probe measurement method is used to measure the conductance at the terminal within the sensor. In four-point probe measurement, a current is applied to the outer probes and a voltage drop is measured using the other two probes. This way, the line/wire parasitic resistance along the probe wiring does not interfere with an accurate measurement of the resistance between at the voltage measuring probes. In one, embodiment, as depicted in FIG. 75(a) where multiple terminals have two or more electrodes, a four-point probe measurement is provided, by applying (for example) a current to one electrode of T1 (e.g., in current) and one electrode of T2 (e.g., out current), and then measuring the voltage across the second electrodes of those terminals. Diving the measured voltage by the applied current provide a measure of resistance in the conducting liquid at the relative orientation of the liquid and the sensor cavity. FIGS. 76(a)-(r) show liquid sensor, with various configurations and shapes, for an embodiment of our invention. FIGS. 77(a)-(f) show liquid sensor, with various configurations, for an embodiment of our invention.

Figure 79A:
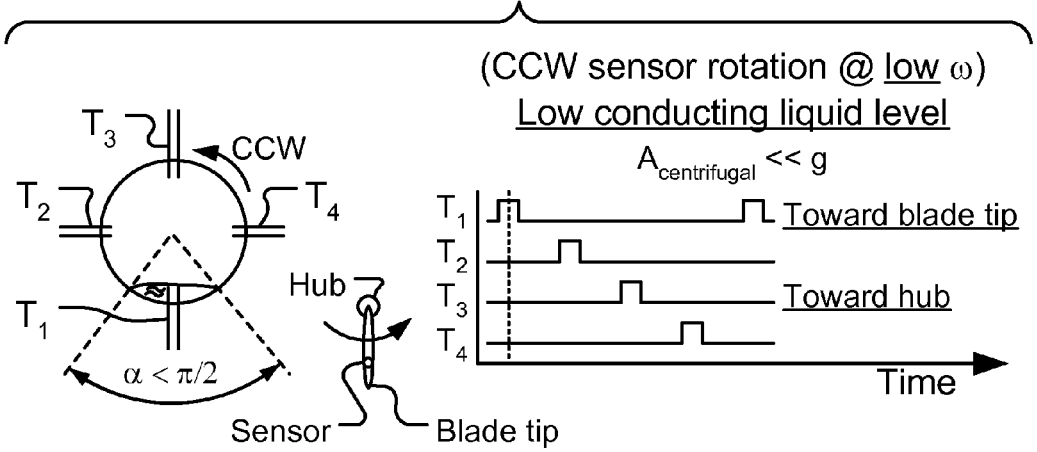
FIGS. 79(a)-(c) show liquid sensor, with corresponding terminals, e.g. $T_1$, $T_2$, $T_3$, and $T_4$, and corresponding signals, for calibration, for an embodiment of our invention.
Figure 79B:
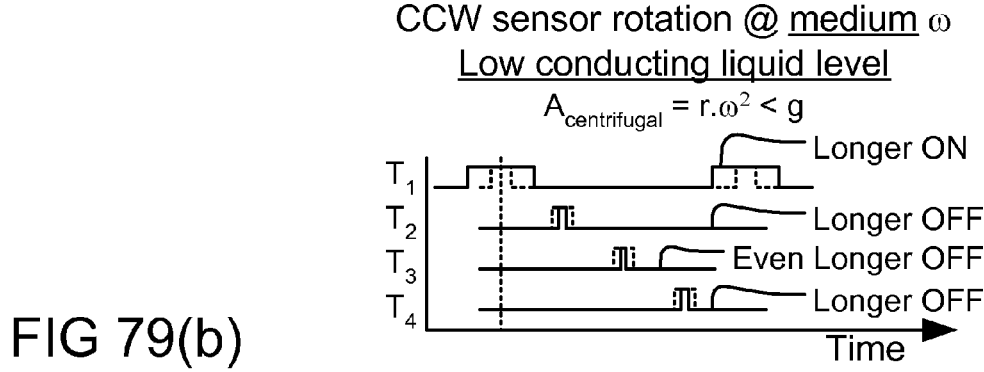
Figure 79C:
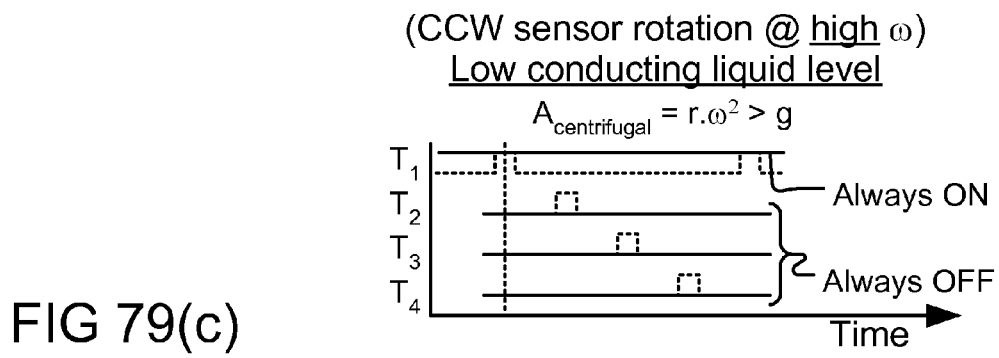
Figure 80A:
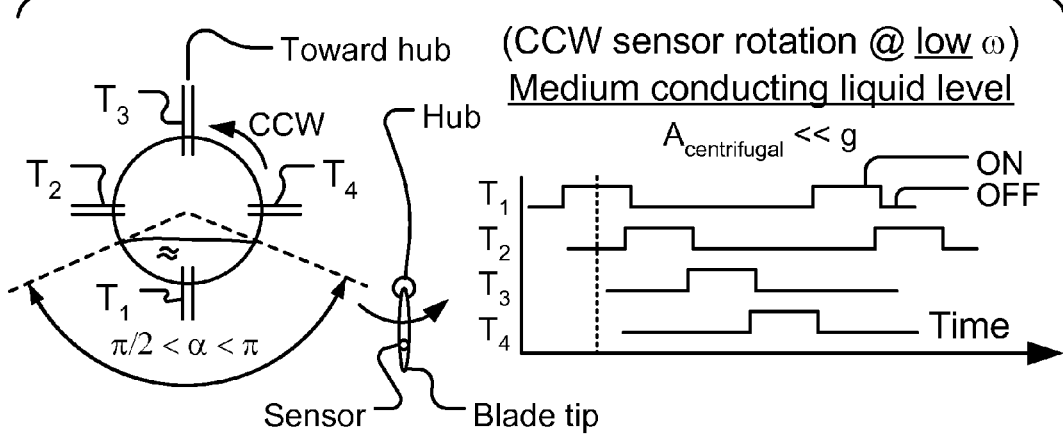
FIGS. 80(a)-(c) show liquid sensor, with corresponding terminals, e.g. $T_1$, $T_2$, $T_3$, and $T_4$, and corresponding signals, for calibration, for an embodiment of our invention.
Figure 80B:
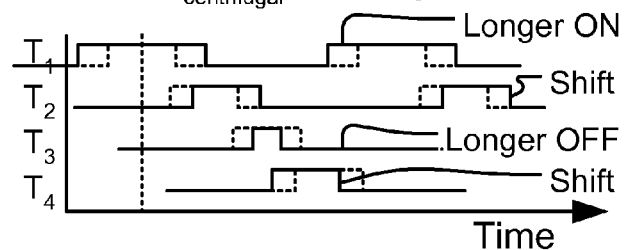
Figure 80C:
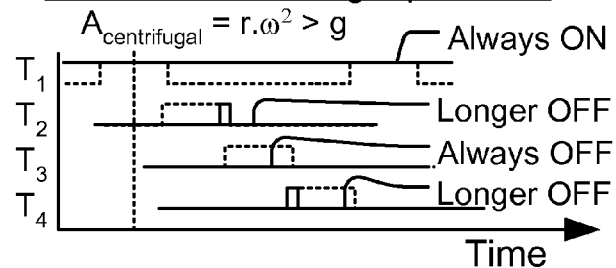

FIGS. 78(a)-(f) show liquid sensor, with various configurations, with corresponding terminals, e.g. $T_1$, $T_2$, $T_3$, and $T_4$, and corresponding signals, for calibration and measurement, for an embodiment of our invention. FIGS. 79(a)-(c) show liquid sensor, with corresponding terminals, e.g. $T_1$, $T_2$, $T_3$, and $T_4$, and corresponding signals, for calibration, for an embodiment of our invention. FIGS. 80(a)-(c) show liquid sensor, with corresponding terminals, e.g. $T_1$, $T_2$, $T_3$, and $T_4$, and corresponding signals, for calibration, for an embodiment of our invention.

Figure 81A:
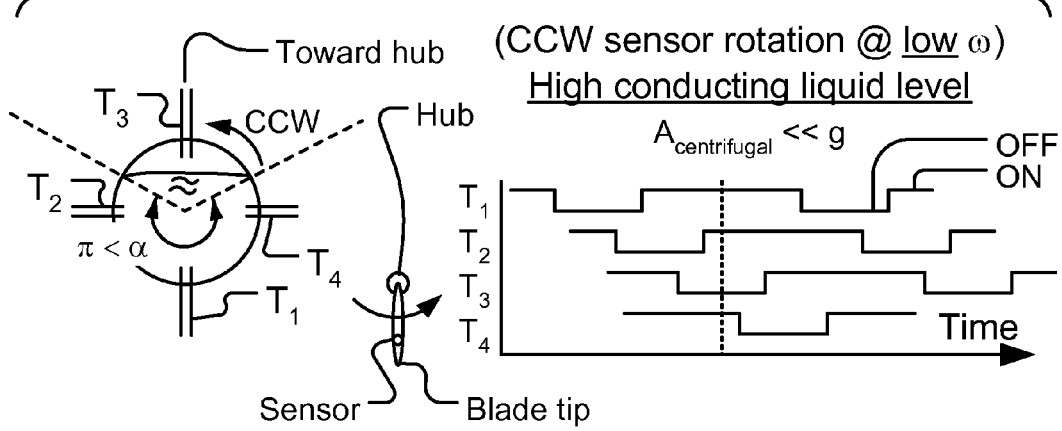
FIGS. 81(a)-(c) show liquid sensor, with corresponding terminals, e.g. $T_1$, $T_2$, $T_3$, and $T_4$, and corresponding signals, for calibration, for an embodiment of our invention.
Figure 81B:
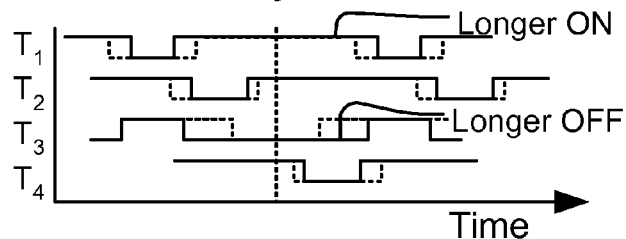
Figure 81C:
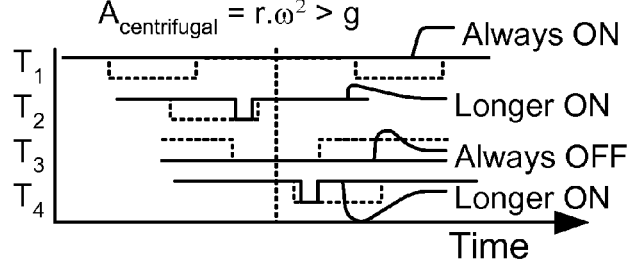

FIGS. 81(a)-(c) show liquid sensor, with corresponding terminals, e.g. $T_1$, $T_2$, $T_3$, and $T_4$, and corresponding signals, for calibration, for an embodiment of our invention.

In one embodiment of this invention, as illustrated through FIGS. 78(a)-(f), 79(a)-(c), 80(a)-(c), and 81(a)-(c), the timed measurements/monitoring from the liquid sensor terminals provides information about the orientation as well as the speed of the blade rotation (i.e., ranges of the blade rotational velocity), by comparing against calibrated baseline data.

Figure 82A:
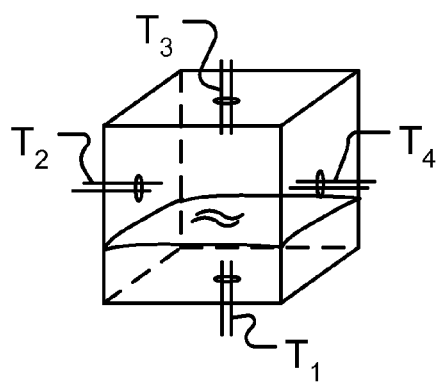
FIGS. 82(a)-(c) show liquid sensor, with corresponding terminals, e.g. $T_1$, $T_2$, $T_3$, and $T_4$, for an embodiment of our invention.
Figure 82B:
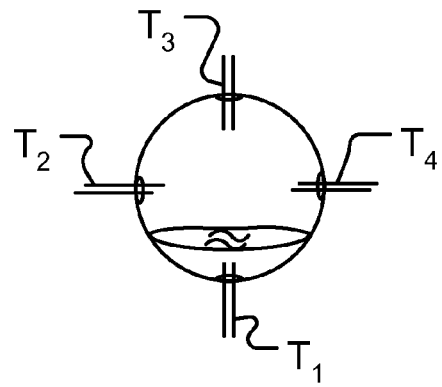
Figure 82C:
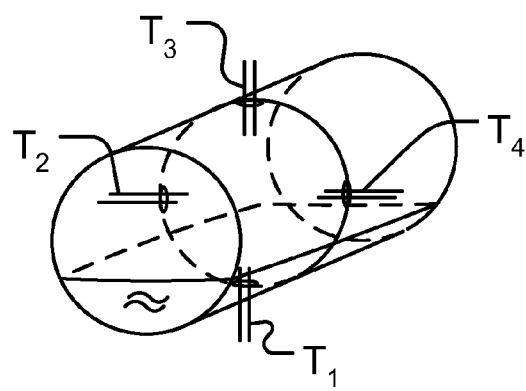
Figure 83A:
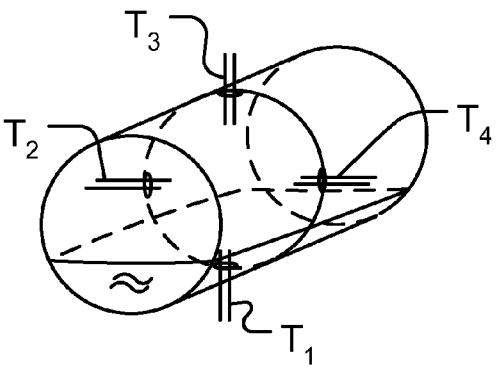
FIGS. 83(a)-(d) show liquid sensor, with corresponding terminals, e.g. $T_1$, $T_2$, $T_3$, and $T_4$, for an embodiment of our invention.
Figure 83B:
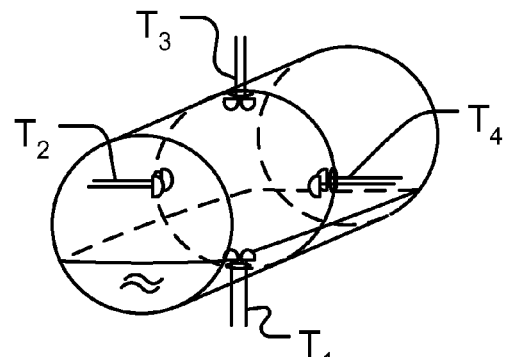
Figure 83C:
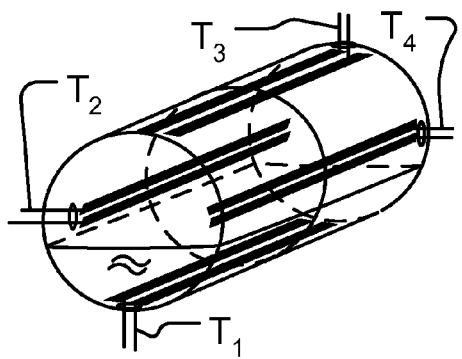
Figure 83D:
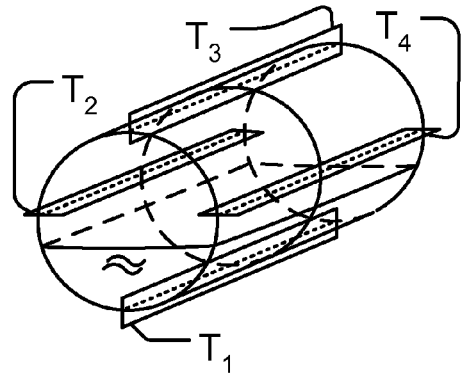

FIGS. 82(a)-(c) show liquid sensor, with corresponding terminals, e.g. $T_1$, $T_2$, $T_3$, and $T_4$, for an embodiment of our invention. FIGS. 83(a)-(d) show liquid sensor, with corresponding terminals, e.g. $T_1$, $T_2$, $T_3$, and $T_4$, for an embodiment of our invention.

Figure 84A:
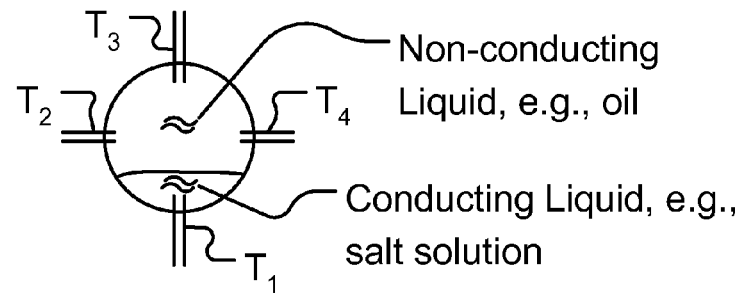
FIGS. 84(a)-(c) show liquid sensor, with corresponding terminals, e.g. $T_1$, $T_2$, $T_3$, and $T_4$, for an embodiment of our invention.
Figure 84B:
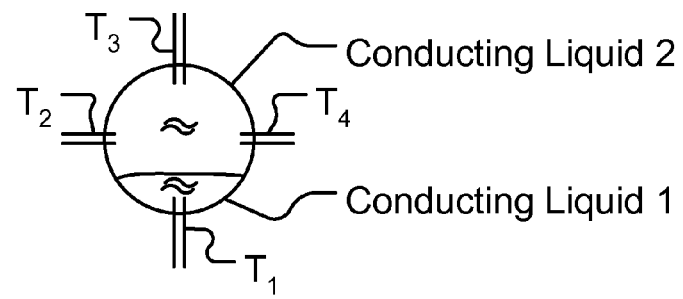
Figure 84C:
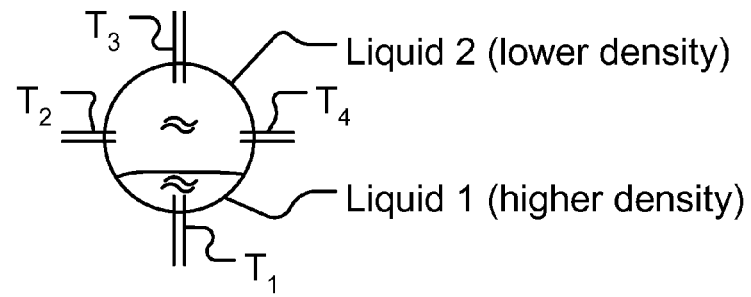

FIGS. 84(a)-(c) show liquid sensor, with corresponding terminals, e.g. $T_1$, $T_2$, $T_3$, and $T_4$, for an embodiment of our invention. In one embodiment, as depicted in FIG. 84(a), the relative inertia of the conductive liquid is modified by the addition of a non-conducting liquid (instead of air or vacuum). In one embodiment, as depicted in FIG. 84(b), the liquid sensor uses multiple conducting liquid (e.g., non-mixing). In one embodiment, there is also a pocket or air or vacuum within the sensor cavity as well. In such embodiment, the conductivity measurements against the sensor terminals are fine tuned and made more sensitive, by having different conductance for multiple conducting liquids. In one embodiment, the multiple conducting liquids have different densities and they will tend to flow and arrange accordingly. This provides finer tuned measurement across the sensor terminal. For example, if Liquid 1 in FIG. 84(b) is denser (heavier) than Liquid 2, and the level of Liquid 1 is just short of reaching T2 and T4 as depicted in FIG. 84(b), then slight relative rotation of the sensor cavity might produce significant change in conductivity measurements across, for example, (T1, T2), (T1, T4), and (T2, T4) pairs. In one embodiment, where the interface conductivity across shared surface of the conducting liquids is high, a finer measurement is provided when measuring the conductivity across the terminals of the liquid sensor, e.g., whether or not the path between measuring probes pairs need to cross the liquid boundary within the sensor cavity.

Figure 85A:
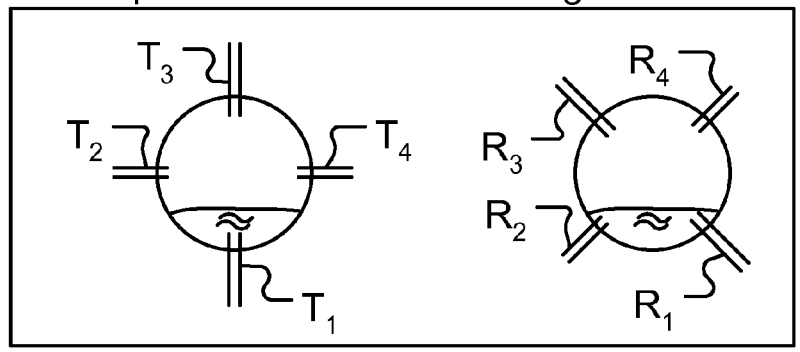
FIGS. 85(a)-(c) show liquid sensor, with corresponding terminals, e.g. $T_1$, $T_2$, $T_3$, and $T_4$, and angular offsets, plus combinational logic, for an embodiment of our invention.
Figure 85B:
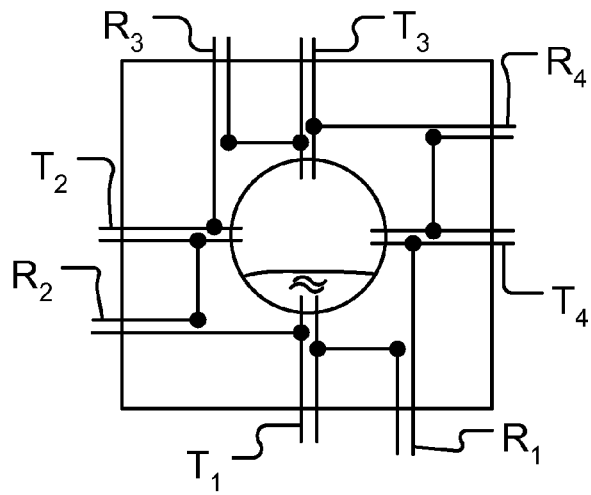
Figure 85C:
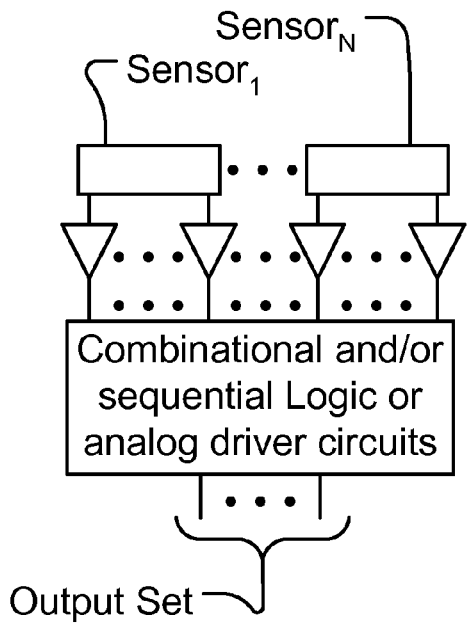

FIGS. 85(a)-(c) show liquid sensor, with corresponding terminals, e.g. $T_1$, $T_2$, $T_3$, and $T_4$, and angular offsets, plus combinational logic, or connections of the electrodes, for an embodiment of our invention.

FIG. 85(a) shows 2 sensors close to each other, working as redundancy and complementary to each other, having relative angular offset with respect to each other, e.g. 45 degrees. For example, if one of them is not accurate in some blade orientation and speed, the other one would be more accurate (and vice versa, in another blade orientation and speed).

FIG. 85(b) shows the mix and match of electrodes from terminals of the same sensor, to create additional terminals for detecting a new condition or fine distinctions, e.g. between different blade orientations and speeds. For example, if the conducting liquid covers $T_1$ and $T_2$ terminals, the composite terminal $R_2$ also indicates ON status. This effectively makes composite terminal, e.g. $R_2$.

FIG. 85(c) takes the terminal outputs of multiple sensors through the combinational or sequential logics or analog circuit, to drive an output set to control the operation of wind turbine, to be used for reporting, monitoring, and optimization.

Various illustrations and discussions provided above and for example in FIGS. 74 through 86, present various attributes of a liquid sensor in an embodiment of this invention. In one embodiment, a liquid sensor encompasses one or multiple such attributes.

Figure 86A:
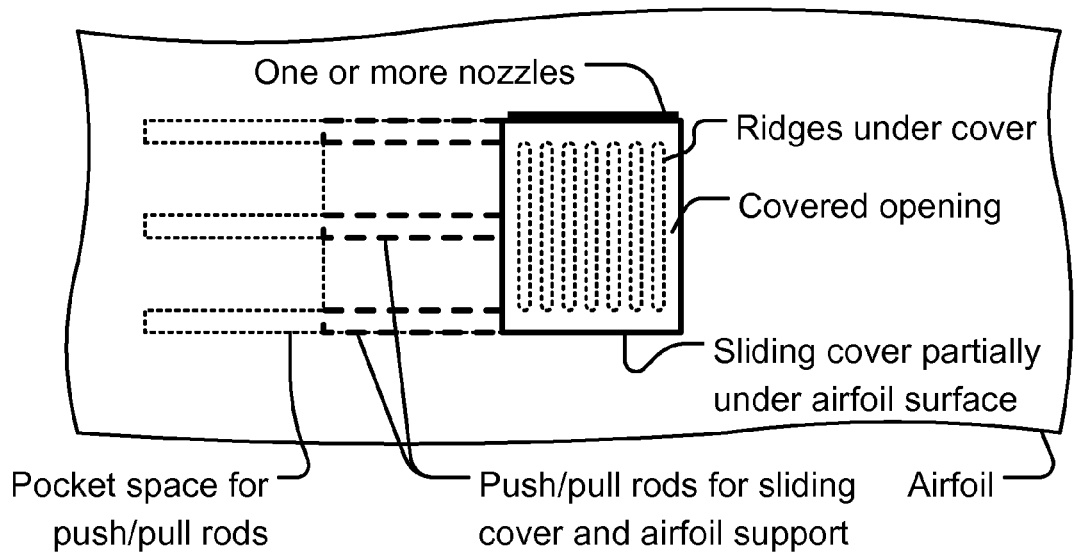
FIGS. 86(a)-(e) show ridge (different sizes or depths), nozzle (optional), and cover (sliding or rotating or Venetian blinds type), on blade (or tower), for an embodiment of our invention.
Figure 86B:
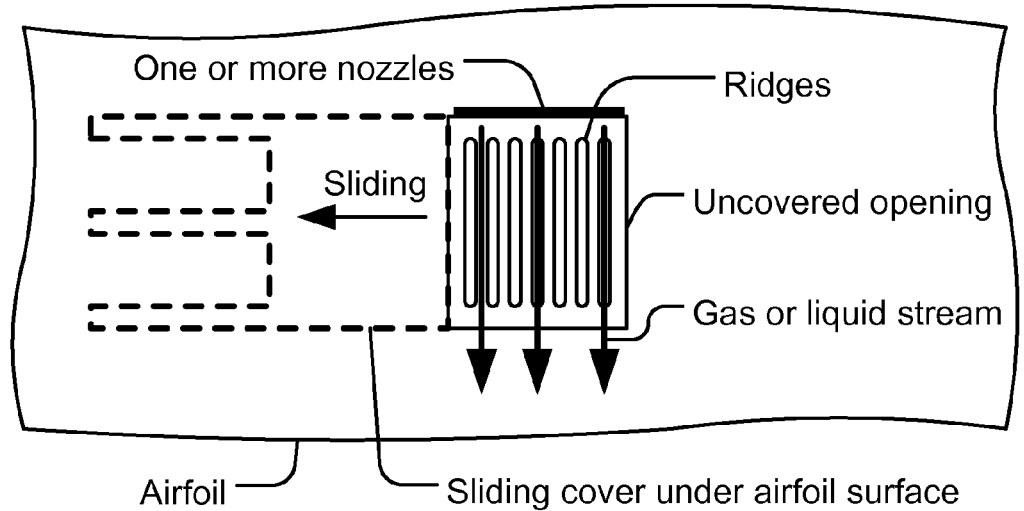
Figure 86C:
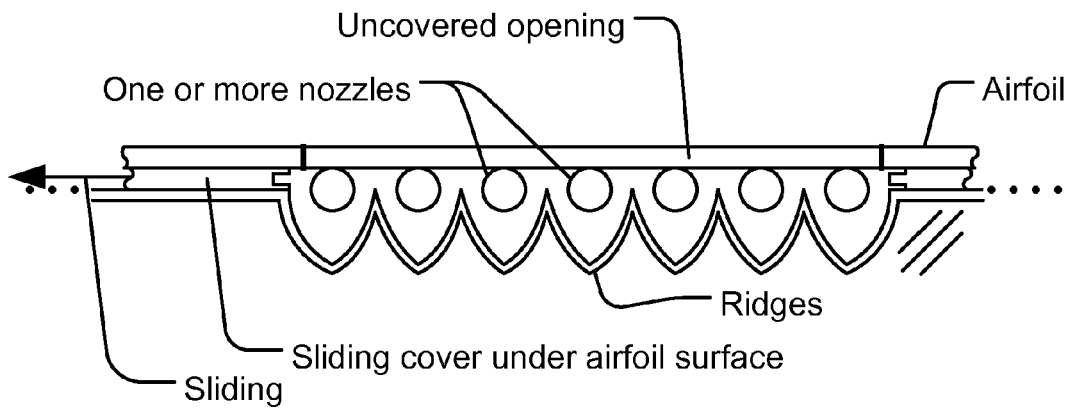
Figure 86D:
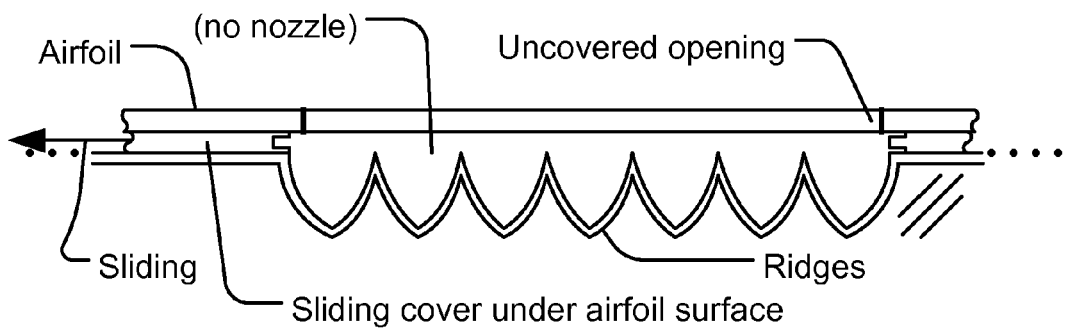
Figure 86E:
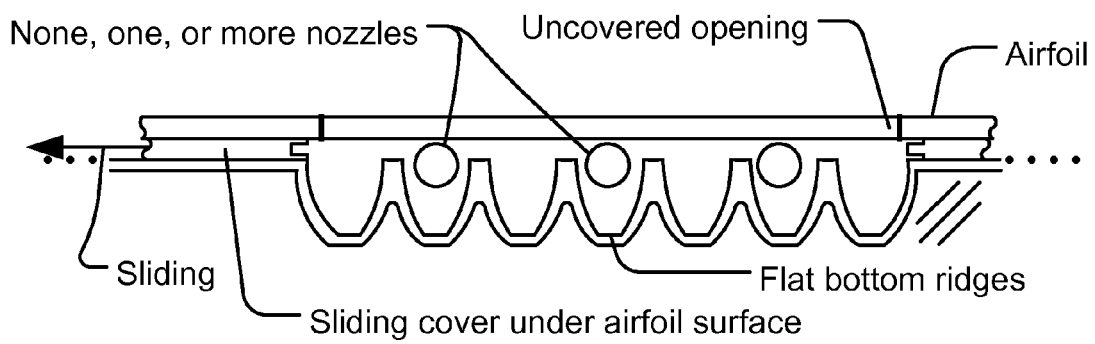

FIGS. 86(a)-(e) show ridge (different sizes or depths), nozzle (optional), and cover (sliding or rotating or Venetian blinds type), on blade (or tower), for an embodiment of our invention. FIGS. 86(a)-(b) show the closed/covered situation and open/uncovered situation, respectively, with multiple ridges, some having nozzles, sending air out, upon uncovering, with sliding or rotating cover, using a motor, string, cable, rod, lever, or pulley, for example, to move the cover. FIGS. 86(c)-(e) show the various cross sections and variations for the ridges and nozzles.

Figure 87A:
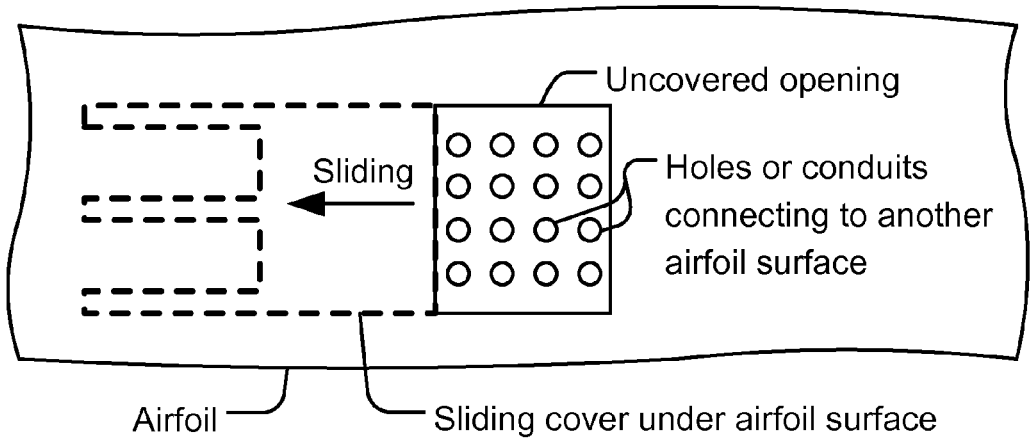
FIGS. 87(a)-(b) show ridge (different sizes or depths, e.g. up to all the way through the blade thickness, connecting the 2 sides of the blade (or tower)), and cover(s), on blade (or tower), for an embodiment of our invention.
Figure 87B:
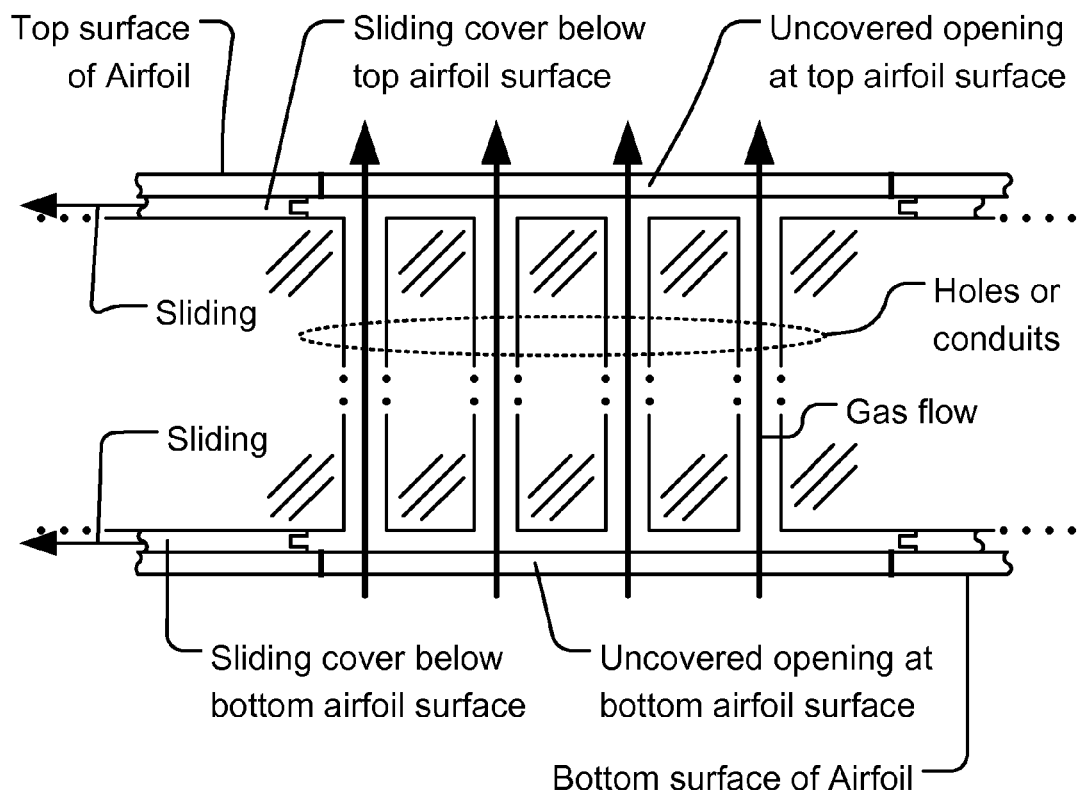
Figure 88A:
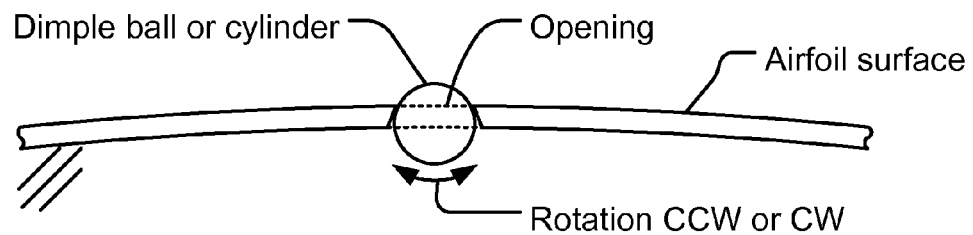
FIGS. 88(a)-(h) show dimple ball or cylinder on blade or tower or any other structures as mentioned in this disclosure, rotating CCW or CW, at different sizes, using a chain, belt, motor, lever, step motor, gear(s), steam, or pressurized air or fluid, to rotate one or more than one of them, for an embodiment of our invention. The ball can be half or partial sphere or cylindrical cross section, with hollow inside or opening, as in FIG. 88(c), as partial ball or cylindrical dimple, for an embodiment of our invention. This can be rotated to go from an opening/hole to bump, or concave-shape to convex-shape, as in FIGS. 88(*c*) and (*d*), as partial ball or cylindrical dimple, for an embodiment of our invention. It can have smaller bumps and spring/push-plate, for an embodiment of our invention.
Figure 88B:
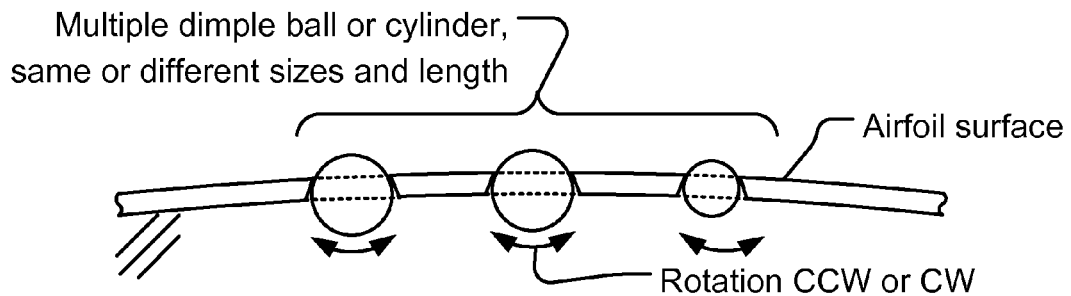
Figure 88C:
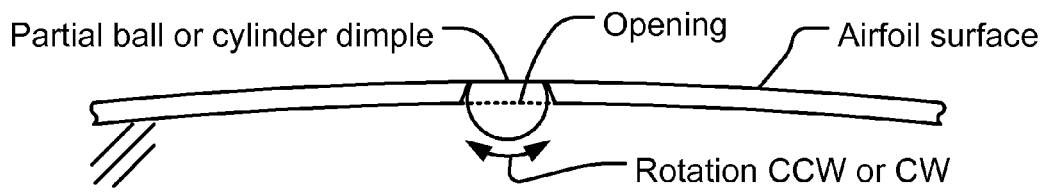
Figure 88D:
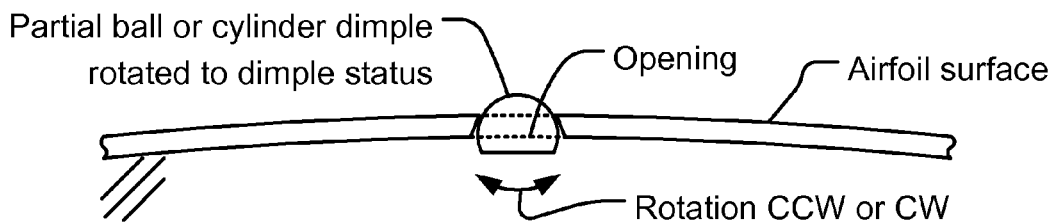
Figure 88E:
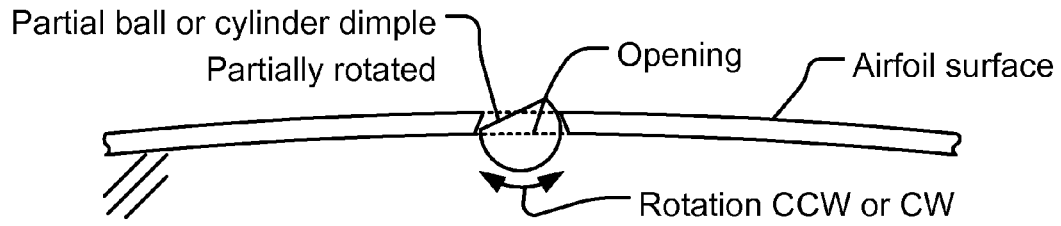
Figure 88F:
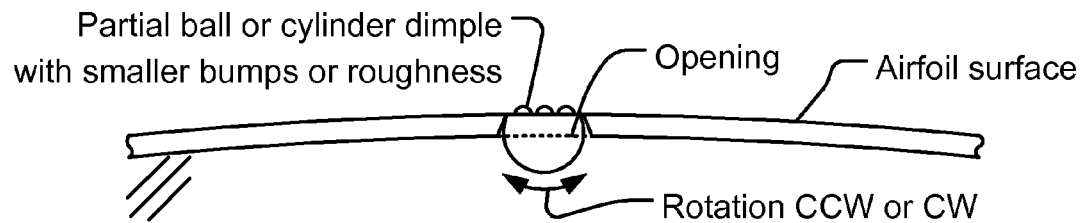
Figure 88G:
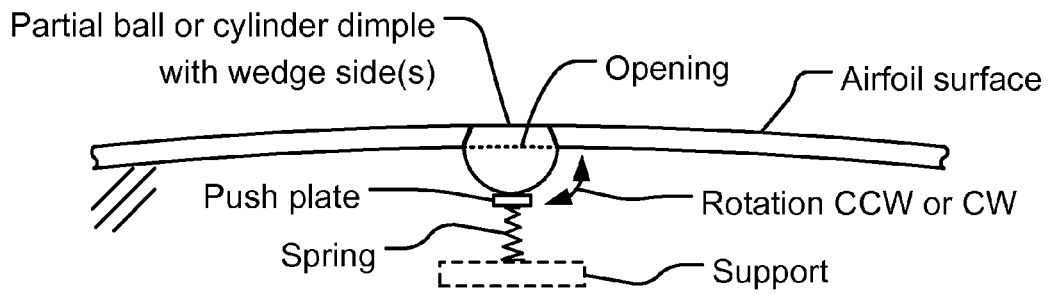
Figure 88H:
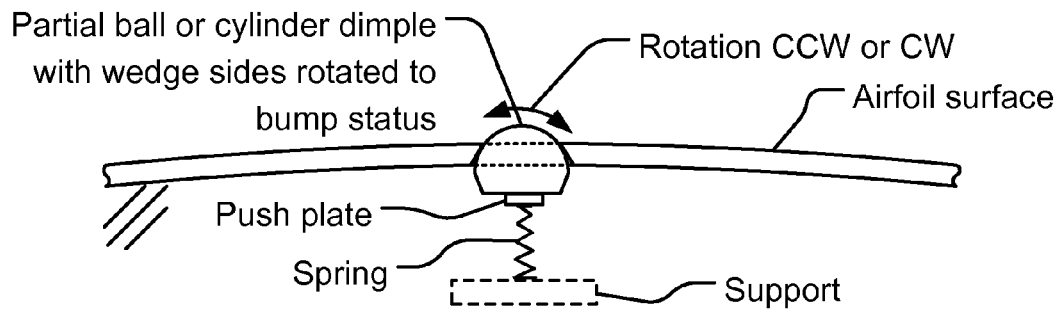

FIGS. 87(a)-(b) show ridges or conduits (different sizes or depths, e.g. up to all the way through the blade thickness, connecting the 2 sides of the blade (or tower)), and one or more cover(s), on blade (or tower), for an embodiment of our invention. Once the ridges are deep enough to reach the other side of the blade, they look like a conduits or pipes. Connecting the two sides of the blade can be used for leveling/reducing the pressure difference between the 2 sides.

FIGS. 88(a)-(h) show dimple ball or cylinder on blade or tower or any other structures as mentioned in this disclosure, rotating CCW or CW, at different sizes, using a chain, belt, motor, lever, step motor, gear(s), steam, or pressurized air or fluid, to rotate one or more than one of them, for an embodiment of our invention. The ball can be half or partial sphere or cylindrical cross section, with hollow inside or opening, as in FIG. 88(c), as partial ball or cylindrical dimple, for an embodiment of our invention. This can be rotated to go from an opening/hole to bump, or concave-shape to convex-shape, as in FIGS. 88(c) and (d), as partial ball or cylindrical dimple, for an embodiment of our invention.

Partial rotation provides an alternative dimple configuration and flow pattern, as an example. Two-faced ball/cylinder provides two bumpy surface alternatives, as an example. Wedge-edged ball/cylinder comes down, rotates, and moves back up again (mechanically). It can have smaller bumps or textures and/or spring/push-plate (e.g. to hold the ball or cylinder in place), for an embodiment of our invention. The springs can also be placed on the edge/surface of the blade, parallel to the surface, to hold the balls or cylinders horizontally. These all modify the boundary air patterns around blades.

Figure 89A:
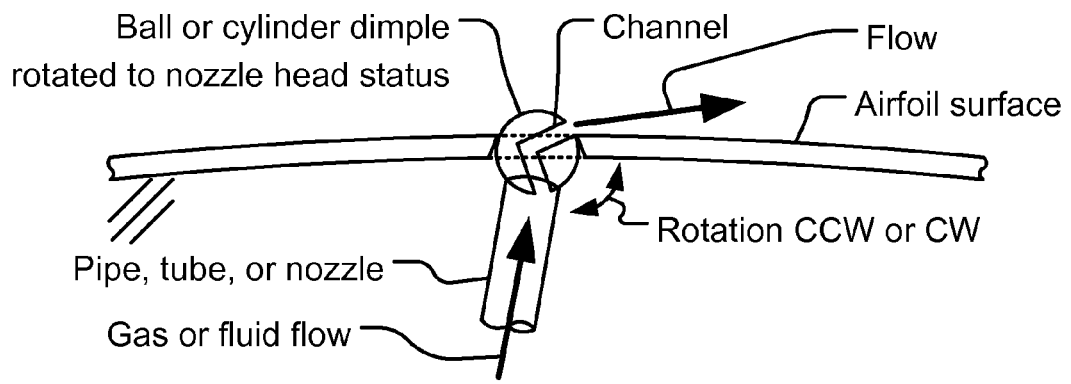
FIGS. 89(*a*)-(*b*) show dimple ball or cylinder on blade or tower or any other structures as mentioned in this disclosure, rotating CCW or CW, with a straight or curved or L-shaped conduit(s) or channel in it, which at some specific angle(s) during dimple ball rotation, or cylindrical dimple rotation, the conduit gets aligned to an open nozzle or pipe to get the air or fluid out on blade surface, or in reverse direction suck the air in. On the other angles/orientations, the ball is stopping the flow of fluid, similar to the valve, partially or fully. Thus, this acts as a regulator for the amount and pressure or frequency for the nozzle, based on the rotation speed of the dimple ball or cylinder, which is controlled by the controller, affecting/changing the boundary layers for air flow on the blades, for more efficiency for the blade, e.g. for higher torque or for useful energy harvested, for an embodiment of our invention. This can also work for partial ball or cylinder, with air or fluid going out or stopping, depending on the orientation of the ball or cylinder, as in FIG. 89(*b*). The air can also act as a rotating mechanism on the ball, especially, if it applied off-centered, on the ball, for rotation of the dimple ball or cylinder, in that direction, for an embodiment of our invention.
Figure 89B:
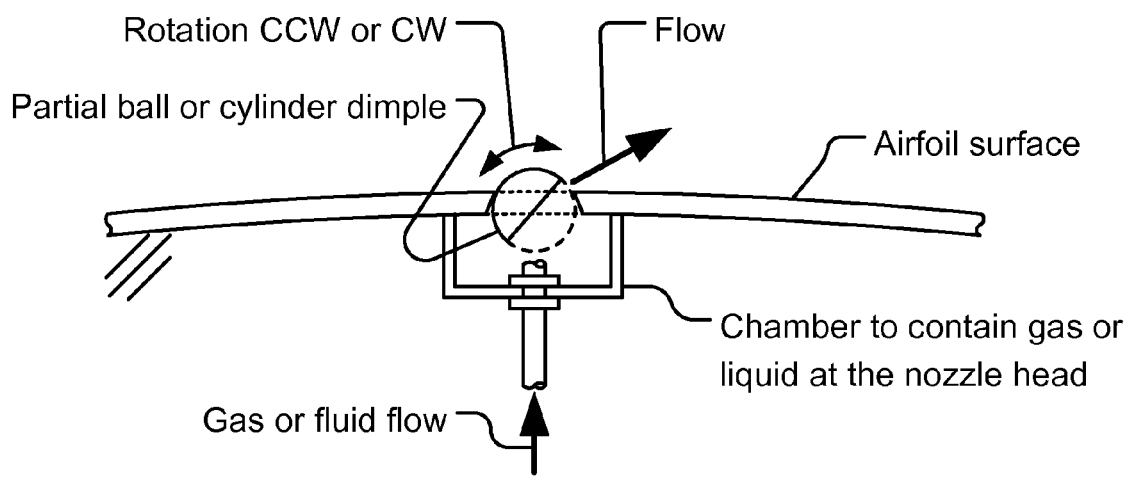

FIGS. 89(a)-(b) show dimple ball or cylinder on blade or tower or any other structures as mentioned in this disclosure, rotating CCW or CW, with a straight or curved or L-shaped conduit(s) or channel in it, which at some specific angle(s) during dimple ball rotation, or cylindrical dimple rotation, the conduit gets aligned to an open nozzle or pipe to get the air or fluid out on blade surface, or in reverse direction suck the air in. On the other angles/orientations, the ball is stopping the flow of fluid, similar to the valve, partially or fully. Thus, this acts as a regulator for the amount and pressure or frequency for the nozzle, based on the rotation speed of the dimple ball or cylinder, which is controlled by the controller, affecting/changing the boundary layers for air flow on the blades, for more efficiency for the blade, e.g. for higher torque or for useful energy harvested, for an embodiment of our invention. This can also work for partial ball or cylinder, with air or fluid going out or stopping, depending on the orientation of the ball or cylinder, as in FIG. 89(b). The air can also act as a rotating mechanism on the ball, especially, if it applied off-centered, on the ball, for rotation of the dimple ball or cylinder, in that direction, for an embodiment of our invention. FIG. 89(b) also has a chamber to act as a buffer, for fluid to stay, until the hole gets opened, for the fluid to flow outside.

FIGS. 90(a)-(f) show rolling ball or rolling cylinder(s) (at different/variable sizes or speeds, in general, using one or more moving mechanisms, as described elsewhere in this disclosure) on blade or tower or any other structures as mentioned in this disclosure, rotating CCW or CW, for changing the boundary layers near the blade surface, for higher efficiency of the blade, for better electrical generation, for example. This can be in combination of directions (for example, at opposite directions), or same directions for rotations. They can run using a chain, roller, belt, or gear, with a motor, per ball or for all balls. This can be done with a roller/belt or chain/gear combinations, as well, as in FIG. 90(c) or (d). The movement of the balls can come from a motor, chain, gear, cable, or air jet (blowing at/pushing on one corner of the balls or cylinders, to make them rotate).

Figure 90A:
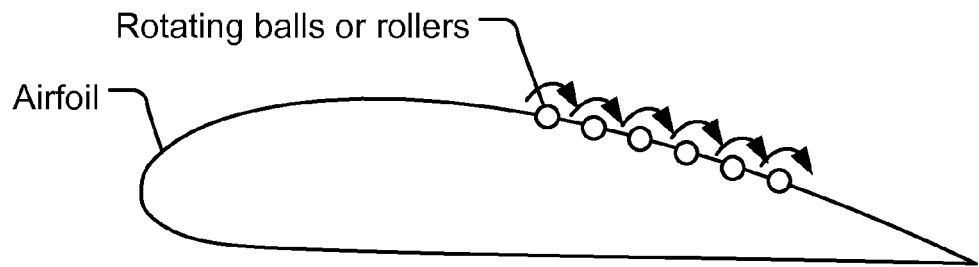
FIGS. 90(*a*)-(*f*) show rolling ball or rolling cylinder(s) on blade or tower or any other structures as mentioned in this disclosure, rotating CCW or CW, for changing the boundary layers near the blade surface, for higher efficiency of the blade, for better electrical generation, for example. This can be in combination of directions (for example, at opposite directions), or same directions for rotations. They can run using a chain, roller, belt, or gear, with a motor, per ball or for all balls. This can be done with a roller/belt or chain/gear combinations, as well, as in FIG. 90(*c*) or (*d*). This can be done in combination with our other inventions, e.g. nozzle, as shown in FIG. 90(*e*), as another embodiment. This can be done in combination with an ionizer, to accelerate the fluid or change the flow around the blade or other structures, as shown in FIG. 90(*f*), as another embodiment.
Figure 90B:
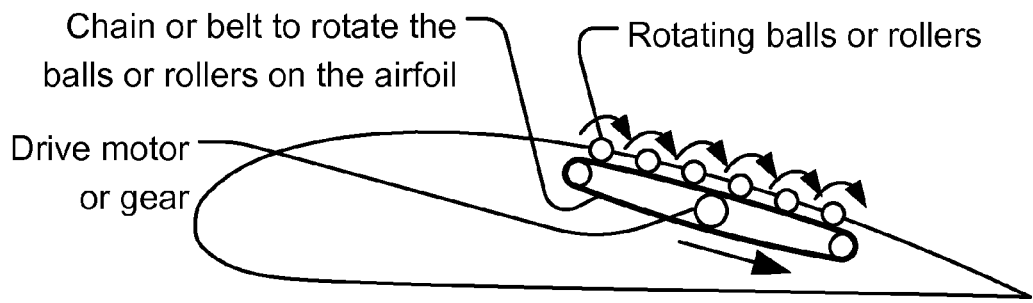
Figure 90C:
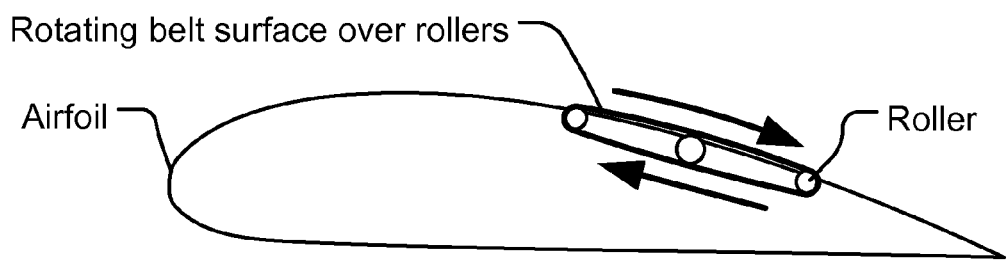
Figure 90D:
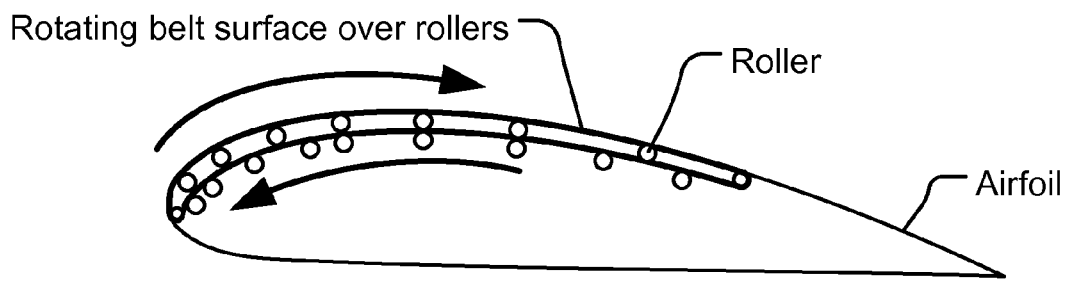
Figure 90E:
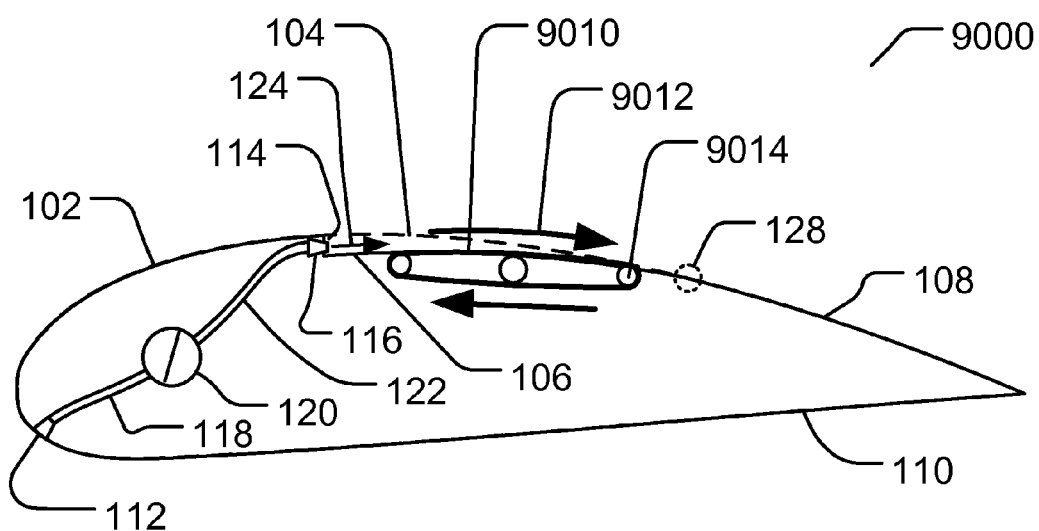
Figure 90F:
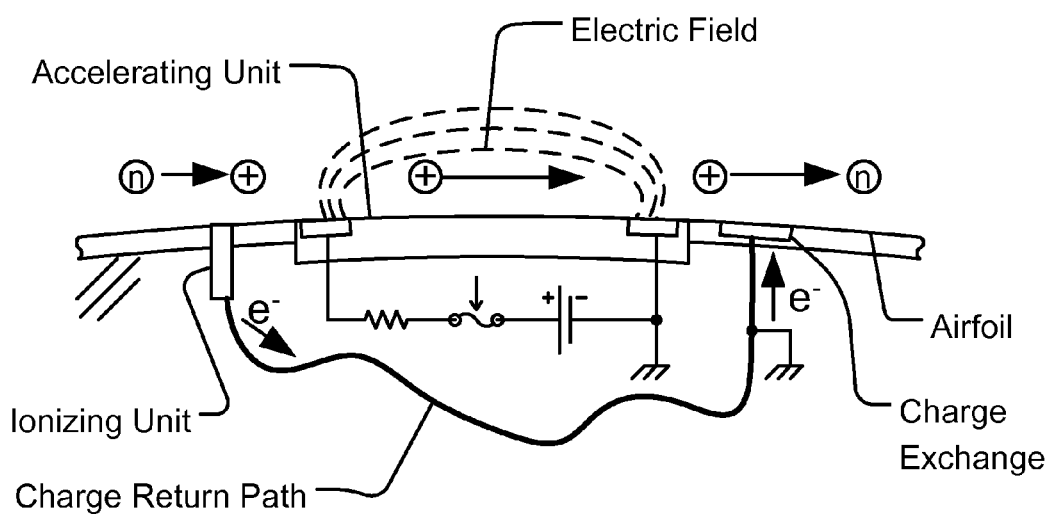

This can be done in combination with our other inventions, e.g. nozzle or valves or conduits, as shown in FIG. 90(e), as another embodiment. This can be done in combination with an ionizer (e.g. with a fuse and power source), to accelerate or separate the fluid or change the flow around the blade or other structures, as shown in FIG. 90(f), as another embodiment.

Note that "n" denotes the neutral atom or molecule, "+" denotes the positive ion or positively charged molecule, and "e⁻" denotes electron. The ionizer ionizes the neutral atom or molecule, and the positively charged atom or molecule is forced to move over the airfoil surface by an accelerating unit, having positive and negative plates, generating an electric field to accelerate the positively charged atom or molecule, via a power supply, electrically connected to the plates. The circuit may have a circuit breaker and/or limiting resistor, ahead of power supply. Charge exchange occurs by returning an electron to positively charged atom or molecule at a charge exchange plate located on the airfoil, which is electrically connected to the ionizing unit, through a charge return path for receiving electrons.

Rotating (FIG. 90) in opposite directions (for balls or cylinders) produces separation of layers in air, and increases drag, which supplements the effect of pitch adjustment on the blades, as one embodiment/example.

Rotating (FIG. 90) is done at different speed or frequency, to produce different disruption in the wake or air pattern around the blades.

Moveable Airfoil Piece

An embodiment of invention as shown in FIG. 7(a) is an airfoil system (700) (e.g., in wind turbine blade), with moveable airfoil piece (706). In one embodiment, the moveable piece (706), rotates down from a higher position (704) around a hinge (728) located near or at the airfoil surface. In one embodiment, the movement of the airfoil piece is controlled (for example) by an attached rod connected to a motor (e.g., electromechanical or hydraulic) (730) which is supported with a structure (732) within the airfoil system. In one embodiment, the hinge mechanism (728) is spring-loaded to help push the moveable airfoil piece back to its higher position (704), substantially in line with the fixed portions of the airfoil (e.g., 702, 708, and beyond 704). In one embodiment, a nozzle (716) is situated at the step (714) between the moveable piece (706) (at its low position) and another fixed portion of the airfoil (702). In one embodiment, the nozzle directs gas or liquid flow (724) over the surface of the moveable airfoil (706). In one embodiment, the gas flow helps supplement the boundary layer over the airfoil. In one embodiment, the gas or liquid flow help remove particles, dirt, or ice from the airfoil surface.

Figure 9A:
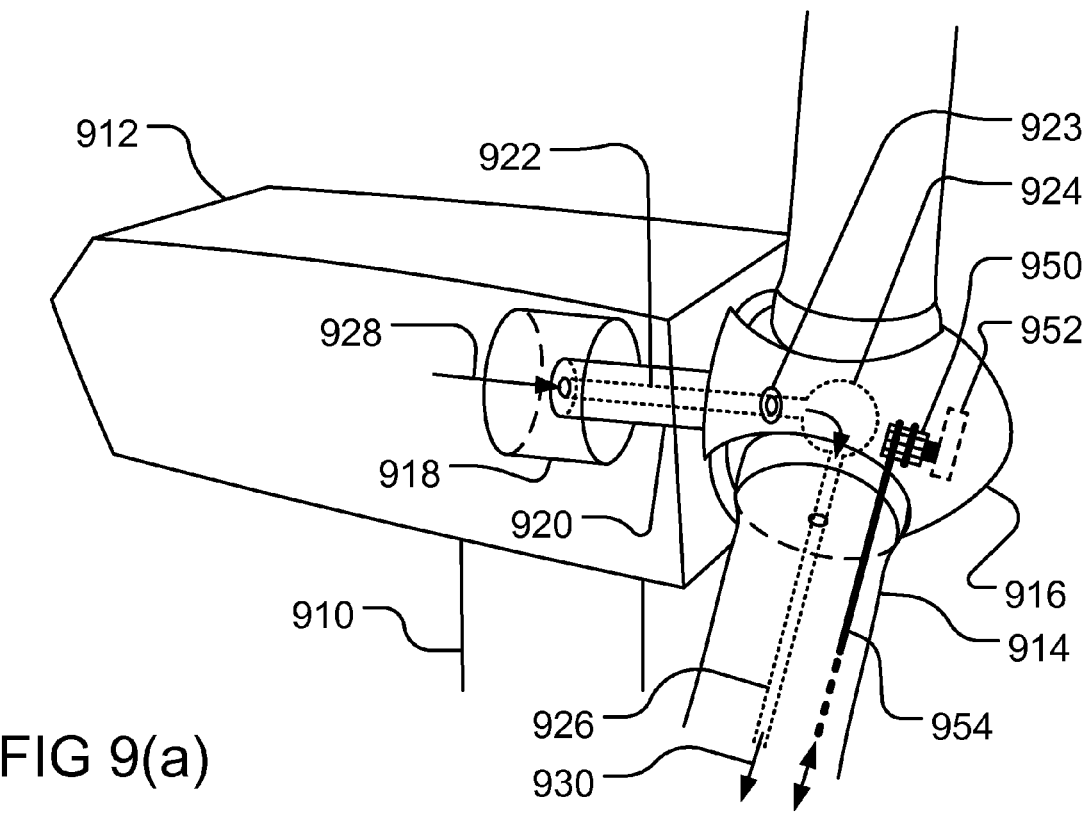
FIGS. 9(*a*)-(*b*) show the blades, rotor, tower, shaft, and gears, with other components, for an embodiment of our invention.
Figure 9B:
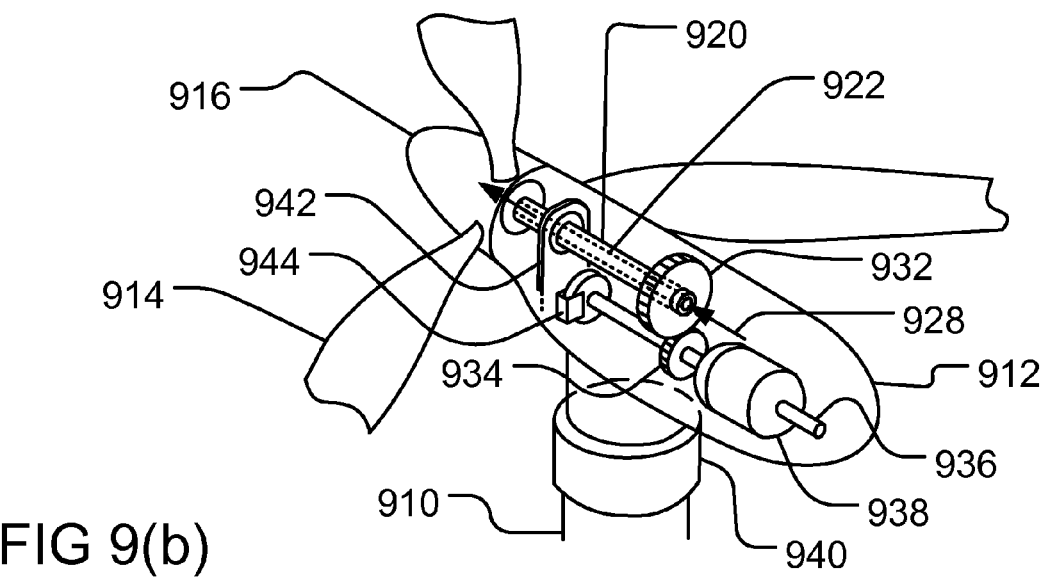

As demonstrated previously (e.g., as in FIG. 1), the inlet to the nozzle (716) is provided via a conduit or tube (722) from a value, regulator, mixer, pump, or switch (720) with one or more sources such as an intake from a location on the blade (e.g., an intake 712 at the airfoil leading edge), the blade hub (e.g., through a conduit along the blade length for example as shown in FIG. 10)), or from nacelle (e.g., as shown in FIGS. 9(*a*)-(*b*).

In one embodiment, the moveable airfoil piece (706) is situated on the top cord of the airfoil between fixed portions of the airfoil (702) and (708) toward the leading and trailing edges of the airfoil, respectively. In one embodiment, the larger portion of step (714) between the moveable piece (706) and the fixed airfoil portions is closer to the leading edge of the airfoil. In this embodiment, the flow (724) out of the nozzle (716) at the step (724) is in the same general direction of air flow over the top chord of the airfoil.

Figure 7B:
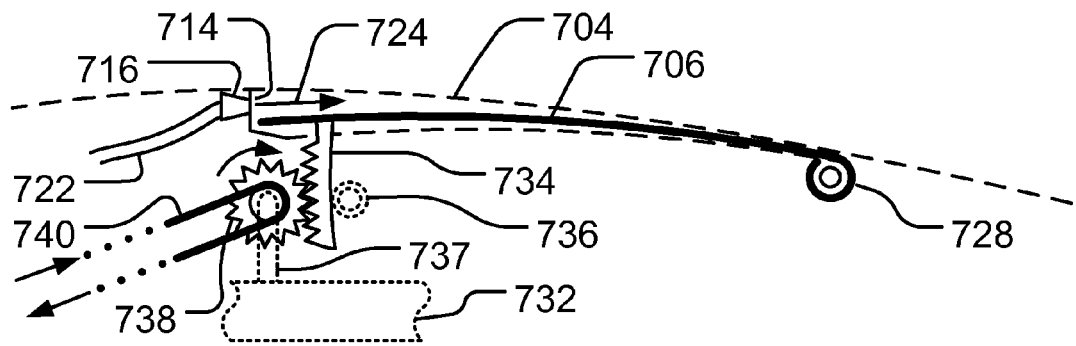
Figure 7C:
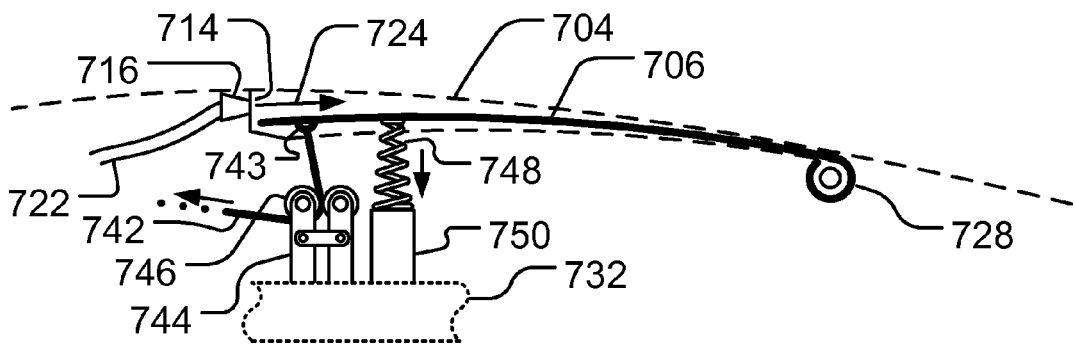

In one embodiment of this invention, as shown in for example in FIG. 7(*b*), the movement of the moveable airfoil piece (706) is effectuated by a gear system. For example, an attached toothed rod or plate (734) below the moveable piece (706) pushes/pulls the moveable piece to its up (706) and down (704) positions, respectively. In one embodiment, the toothed rod (734) is backed by a roller or slider (736) to guide its movement. In one embodiment, the toothed rod (734) is moved by a toothed gear (738) supported through it holder (737) to a supporting structure (732) within the airfoil system. In one embodiment, the toothed gear (738) is driven and rotated by a cable (740) in order to move the toothed rod and the moveable airfoil piece (706). In various embodiments, there are various ways to control and effectuate the movement of the driving cable (740). For example, the cable (740) may be driven by a motor (e.g., electromechanical or hydraulic) located in the airfoil system, hub, or nacelle. The driving mechanism, may be mechanical, e.g., getting its power from coupling to the main shaft, high speed shaft, gearbox, or flywheel.

In one embodiment of this invention, as shown in for example in FIG. 7(*c*), the movement of the moveable airfoil piece (706) is effectuated by a pulling cable system and spring. In one embodiment, a cable (752) is attached to the moveable airfoil piece (706), for example, via a hook connection (743). In one embodiment, the pulling cable (742) is guided through one or more guiding pulleys or rollers (e.g., 746) supported by their corresponding holders (e.g., 744) to a supporting structure (732) within the airfoil system, hub, and/or nacelle. In one embodiment, the moveable piece is attached to and pushed out by a spring (e.g., 748). In one embodiment, the spring is held at its other end by to a holder (750) supported by a supporting structure (732) in the airfoil system. In one embodiment, to return the moveable airfoil (706) to its high position at (704), the pulling cable (742) is released or stepped back to allow room in cable for the moveable airfoil to move up to high position (704). In such an embodiment, the spring pushes the moveable airfoil to its high position.

In one embodiment, the movement of the moveable airfoil is structurally restricted between its high and low positions (704, 706), e.g., via intruding plates or pins at the step attached to the fixed portions of the airfoil or via plates/pins attached to the moveable piece itself. These limiters are designed/adjusted to prevent the movement beyond the high and low positions.

In one embodiment, the limiting mechanism may be unlocked, e.g., by pulling/pushing locking pins to allow the movement of the moveable airfoil beyond its high position (704) by further releasing the driving cable (742). In such an embodiment, the moveable airfoil may be used as an emergency air brake for preventing a runaway situation or stopping/hampering a runaway situation rapidly, by pushing the moveable airfoil piece (e.g., via a push from loaded spring (748)) above its normal high state (704) and cutting against the relative air flow over the surface of the airfoil. Similar air brake mechanism may be provided by embodiments exemplified in FIGS. 7(*a*)-(*b*). In one embodiment, the hinge (728), the moveable airfoil (706), the pull/push mechanism (rod or cable), and supporting and locking mechanisms, withstand the drag force on the air brake.

Fluid Flow and Electrical Connections Through Wind Turbine Components

In an embodiment of this invention in a wind turbine, as demonstrated in FIGS. 9(*a*)-(*b*), the fluid flow (930), electrical cables, or mechanical cable(s) (954) are directed from the hub (916) to the blade(s) (914) directly or through one or more conduits or pipes (e.g., 926). In one embodiment, the mechanical cables or rods are effectuated by motor(s) (e.g., electromechanical or hydraulic) (950) held and supported (952) within the housing of the hub (916). These mechanisms may be used for variety of the purposes described throughout this disclosure, e.g., operating the flaps, airfoils, gears, etc. within or on the airfoil/blade.

In one embodiment, the fluid flow (928) and/or electrical cables are passed (923) from the nacelle housing (912) to the hub (916) through one or more conduits (922) passed through the center of the main shaft (920). In one embodiment, the flow or access (928) to the center of the main shaft is provided through the gearbox (918) within the nacelle (912), or an extension of the main shaft beyond the gearbox. In one embodiment, further access is provided between the hub (912) and the tower (910) through opening at the top of the tower supporting (940) the nacelle where the yaw drive and motors are placed.

In one embodiment, the hollow main shaft (920) act as a conduit, while in another embodiment, the hollow main shaft will provide opening to pass one or more conduits through and along its axis. In one embodiment, the torque transfer by the main shaft is primarily carried (for example by its steel material) at its outer radii. Therefore, a Hallow opening along its axis does not significantly impact its maximum rating for rotational stress, because the torque transfer grows with at higher radius of the main shaft. In one embodiment, the shear stress for supporting the weight of the blades and the hub may be compensated by slightly increasing the radius of the man shaft.

As demonstrated in FIG. 9(*b*), there are ready sources of heat and mechanical energy (e.g., for pumping or compressing/pressurizing fluid) within nacelle (912). In one embodiment, the heat generated within the gearbox (FIG. 9(*a*), 918) due to its operation of its gears (demonstrated by 932 and 934), the heat generated by the generator (938) placed or coupled on the high speed shaft (936), and/or the head generated from main bearing(s) (942) or other bearings can be used to provide hot fluid to the blades via the conduits and the hub (916). In one embodiment, other intermittent heat sources, such as a brake (944) and/or yaw drive/motor can be used to head fluid sent to the blades via the hub. These mechanisms also provide a cooling effect and improved operational lifetime to the wind turbine components such as gearbox (918) and the generator (938). With such cooling mechanism, these components can be made in more compact forms, in an embodiment of this invention. For example, within the gearbox, multiple stages of planetary gear may be used in a more compact form factor.

In one embodiment, the intake for gas is taken from openings in nacelle, tower, or hub. In one embodiment, the intake for fluid is taken from containers placed within the hub, nacelle, and/or tower, whose source may be replenished. For example, these may include de-icing solutions, cleaning solutions, water, and/or fuel.

In one embodiment, a gear coupling, for example on the main shaft (920), gearbox (918), or high speed shaft (936), provides mechanical power for fluid. In one embodiment, the electrical generation of wind turbine or the electricity from grid provides the electrical energy for electromechanical pump(s). In one embodiment, the centrifugal force due to the rotation of the blades provide a suction mechanism to draw fluid from the hub/nacelle through pipes or conduits to the openings within the blade (e.g., nozzles placed on the blade surface). For example, the change in pressure per incremental radius due to the centrifugal force along the blade (rotating at angular velocity w) is: $dP/dR = -\rho \cdot R \cdot \omega^2$ which is derived by equating the suction pressure difference ($-dP \cdot A$) and the centrifugal force ($\rho \cdot A \cdot dR \cdot R \cdot \omega^2$) acting upon the incremental volume $A \cdot dR$ (where A is an arbitrary cross section area) filled with a fluid with density $\rho$. Integration along the blade radius provides that the suction at radius R along the blade relative to the center of rotation is: $\frac{1}{2}\rho \cdot \omega^2 R^2$.

Rotational Coupling of Between Hub and Nacelle

In one embodiment, access for fluid (gas or liquid), electricity (power and/or signal/data), and/or other forms of connections/communications (e.g., optical fiber) are provided between the nacelle and the hub through rotational couplers (or slip couplers). These include, for example, the data/control/power cables, for example, for servo motor for pitch, other motors for operating shutters, flaps and nozzles, actuators, monitors and sensors placed on or within blade(s). In one embodiment, an access is provided through a hollow region of main shaft along its axis of rotation. In one embodiment, an off-axis access is provided from the nacelle to the hub via ring type coupler(s).

In an embodiment of this invention, as shown in FIG. 11(*a*), a rotational coupler (1110) is placed within the hub (1112). In one embodiment, the hub (1112) is secured (e.g., by bolts (1114)) to the main shaft (1116), for example by connecting to the wide portion (e.g., circular) of the main shaft (1118). In one embodiment, the portion of coupler (1110) which is stationary with respect to the hub, is directly mounted on the main shaft (e.g., as shown in FIG. 11(*a*)) and/or secured to the hub. In one embodiment, the main shaft (1116) (as well as its wide end portion (1118)) is hollow (1120) along its rotational axis to allow one or more conduits (e.g., 1122), electrical cables, and/or fluid to pass from/via nacelle (1108) to the hub (1112). In one embodiment, the coupler (1110) rotationally couples the nacelle conduit (1122) (which is rotationally stationary with respect to the nacelle (1108)) and the hub conduit (1124) (which is rotationally stationary with respect to the hub (1112)). In one embodiment, the nacelle conduit (1122) is supported (1142) by a supporting structure (1144) within the nacelle, while the hub conduit (1124) rotates (1136) along with the hub (1112), hub side of the coupler (1110), and the main shaft (1116). In one embodiment, a clearance is provided between the nacelle conduit (1122) and the rotating (1126) main shaft (1116) within the hollow region (1120) of the main shaft. Within the hub, in one embodiment, a hub conduit (1124) (e.g., out of multiple conduits fed to the hub) connects to a (e.g., distributing) cavity (1128) which in turn feeds to the blade(s) (e.g., 1130) via an extension of a blade conduit (1132) through the connection of the blade and the hub. In one embodiment, one or more access panels (1134) (e.g., sealed) is provided on the cavity (1128) to help with assembly and maintenance. In one embodiment, the electrical (power and data/signaling) cables used for blade and hub components (e.g., blade pitch motor and gear (1138) supported (1140) within the hub) are provided through the coupler (1110). In one embodiment, the nacelle conduit extends beyond the gearbox, i.e., the feed to the conduit is done through the gear box or at the extension of the main shaft beyond the gearbox.

In an embodiment, as demonstrated in FIG. 11(*b*), a rotational coupler (1142) is provided within the nacelle (1108) to rotationally couple one or more nacelle conduits (e.g., 1144) to one or more hub conduits (e.g., 1146) extended into the nacelle (1108) through the hollow portion (1120) of the main shaft (1116). In one embodiment, the other end of the hub conduit (1146) feeds into a cavity (1128) within the hub (1112). The cavity, the hub, the main shaft, as well as the hub conduit rotate (1126) together, as the blade(s) turn. In one embodiment, given that there is no relative rotation between the main shaft (1116) and the hub conduit extension (1146), there is no need to provide a clearance for the hub conduit (1146) within the hollow portion (1120) of the main shaft. In one embodiment, the hub conduit (1146) and/or electrical cables are secured to the inside of the hollow portion (1120) of the main shaft (1116). In one embodiment, the nacelle conduit extends beyond the gearbox, i.e., the feed to the conduit is done through the gear box or at the extension of the main shaft beyond the gearbox.

In an embodiment of this invention, as shown in FIG. 11(*c*), a rotational coupler (1142) is provided within nacelle (1108), as described above in FIG. 11(*b*). A capping support is provided for the hub conduit extension (1146) at the end of the main shaft (1116) (or its extension) within the nacelle. In one embodiment, the capping support seals between the hub conduit extension (1146) and the opening of the hollow portion of the main shaft (1120). The main shaft (1116), the cap seal (1148), and the hub conduit extension (1146) rotate (1126) together as the blades move.

In an embodiment, as a variation to the above, the hub conduit is split in to two disjointed portions: one portion within the nacelle connects to the rotational coupler (1142) at one end, and it is supported by the seal cap (1148) at its other end. The second portion of the hub conduit (within the hub), is similarly supported by a second seal cap (located within the hub) which covers the hollow portion of the main shaft at its opening at the hub, and with its other end extending further into the hub. In such an embodiment, the hollow portion of the main shaft essentially acts as a conduit connecting these otherwise disjointed portions of the hub conduit. The support and sealing on both ends of the main shaft via two cap seals provide the continuity function of the conduit as well as the support for rotational translation from the hub to the rotational coupler (1142) at nacelle.

In an embodiment of this invention, as shown in FIG. 11(*d*), a rotational coupler (1150) is provided having a ring type structure, and it is placed around the main shaft (1116). In one embodiment, the main shaft has a solid core, not allowing a conduit to pass through along its axis of rotation. In one embodiment, the coupler (1150) is placed between the main bearing (1152) and the hub (1112) or the flat end portion (e.g., circular) (1118) of the main shaft which connects and supports the hub (1112). The main bearing (1152) supports the sheer force on the main shaft (1116) and it is typically placed at the entrance of the main shaft into the nacelle (1108). In one embodiment, at its rotating side, the coupler (1150) is secured to the flat end portion (1118) of the main shaft (as depicted in FIG. 11(*d*)) and/or attached directly to the hub (1112), and the non-rotating side of the coupler is secured to the nacelle (1108). In one embodiment, the opening (1156) within the ring structure of the coupler allows passage of the main shaft from the nacelle to the hub. In one embodiment, a clearance is provided between the inside hole (1156) of the coupler and the main shaft (1116) (as depicted in FIG. 11(*d*)), and the ring structure of the coupler is secured to the nacelle (1108), while providing rotational coupling at substantially the same axis of rotation as that of the main shaft (1116). In one embodiment, the ring coupler (1150) rests on the main shaft via an intermediate bearing to support the coupler's weight while providing relative rotational freedom between the coupler and the main shaft. In such an embodiment, the connections of the coupler to the nacelle as well as the hub and/or flat end portion of the main shaft do not have to be load bearing (for the coupler's weight). In one embodiment, one or more nacelle conduits (e.g. 1158) and/or electrical cables connect to the coupler from the nacelle side, and one or more hub conduits (e.g., 1160) and/or electrical cables are connected to the coupler from the hub side. In an embodiment, the nacelle conduit is supported via a support structure (1162) in the nacelle, while the hub conduit is attached to other component(s) or support(s) in the hub which rotate together (1136). In one embodiment, a ring couple (1150) is used where the main shaft is does not allow a passage of a conduit (e.g., in solid core shaft) or have space for an additional conduit (for a hollow shaft) given the conduit's diameter and structure.

Figure 12:
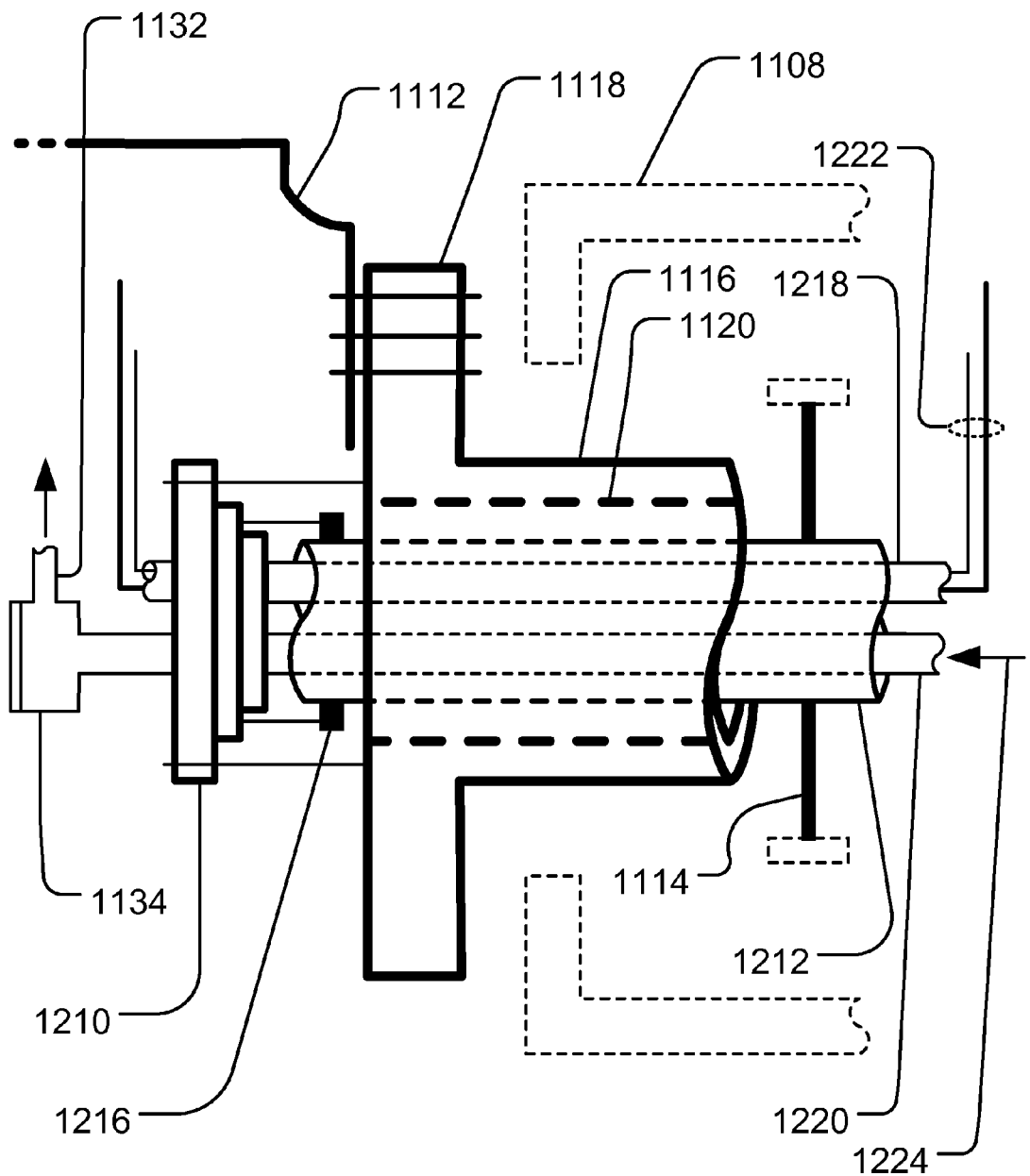
FIG. 12 shows multiple rotational couplings, for cable/electrical and hydraulic, for an embodiment of our invention.

In an embodiment of this invention, as depicted in FIG. 12, multiple conduits (e.g., 1218 and 1220) and/or cables (1222) are connected to a rotational coupler (1210). In one embodiment, the conduit(s) and/or cables are placed within a jacket conduit (1212). In an embodiment represented by FIG. 12, the jacket conduit (1212) is stationary with respect to the nacelle, and it is supported (1114) by a support structure in nacelle as well as the coupler (1210) (which is placed in the hub in this embodiment). In one embodiment, the jacket conduit (1212) is attached, e.g., by a clamp (1216) to the coupler (1210), as depicted in FIG. 12. In one embodiment, the jacket conduit (1212) is directly attached to the portion of the coupler (1210) that is stationary with respect to nacelle. In another embodiment, the jacket conduit is not connected to the coupler directly or via a clamp. In one embodiment, the inside conduit(s) and/or cables are secured to the jacket conduit. In one embodiment, a conduit (1220) is used for running fluid (1224) via nacelle to the hub (1112) and/or blade(s) through the blade conduit extension(s) (e.g., 1132). In one embodiment, a conduit (1218) is used to carry one or more cables (1222) (e.g., electrical power, control, signal, or data) via the nacelle to the hub. In one embodiment, one or more conduits within the jacket conduit (1212) are connected to the coupler (1210). In one embodiment, the coupler includes mechanism to provide rotational coupling to both fluid flow and electrical wiring.

In an embodiment, the jacket conduit (1212) is connected to coupler (1210) directly or through a clamp (1216) and it is structurally stiffer compared to one or more inside conduits (e.g., 1218 or 1220) and/or cables, so that the jacket conduit (1212) would withstand the rotational friction from the rotational coupler (1210) while the blades are rotating. In such an embodiment, the inside conduits may be employed of material or of sizes that do not have to withstand this rotational friction for an extended period of time. In one embodiment, the inside conduit may sag, rest, or be secured to the inside of the jacket conduit. This allows wider selection of the material for the inside conduits, as well as the jacket conduit (1212). For example, the jacket conduit (1212) is not drastically impacted by the type of liquid or gas (due to chemical reactions) being carried via an inside conduit (1220) from nacelle to the hub, and the inside conduit (1220) may be allowed to rest, sag, or be secured to the inside of the jacket conduit. The separation of the functions (e.g., electrical, fluid flow, or structural) to the different conduits allows for wider and more optimum selection of conduit materials and more compact structure. For example, in one embodiment, the jacket conduit may be of steel that can withstand the couplers rotational friction (torque) as well as having a structural strength to not bend or sag excessively within the main shaft hollow region. At the same time, the fluid carried by the inside conduit (1220) may be of type with an adverse long term impact on the jacket conduit if it is otherwise allowed to come in direct contact with it. Another example may be the electrical isolation and/or additional isolation provided by an inside conduit (e.g., 1218) between the cables carried (1222) and the jacket conduit.

In an embodiment, the coupler is placed inside nacelle and the jacket conduit is rotationally attached (e.g., via clamps) to a structure in the hub and/or to the main shaft. In one embodiment, the other end of the jacket conduit (through and along the axis of the main shaft) is attached and supported on the coupler at nacelle. In such an embodiment, the coupler still provided the rotational coupling, e.g., for fluid flow, electrical wiring, and/or optical fiber. The inside conduit(s) and/or cables rotate together with the jacket conduit, the main shaft and the hub, as the blades turn.

In an embodiment, the jacket conduit is attached to a rotational coupler (e.g., 1150 in FIG. 11(*d*)) having a ring type structure, providing rotational coupling through a location off-axis from the main shaft. In such an embodiment, the jacket conduit provides a guide for feeding the inside conduit(s) and/or cables to the coupler by keeping them away from nearby components or environmental elements.

Integrated Rotational Coupling for Electrical and Fluid Flow

Figure 13:
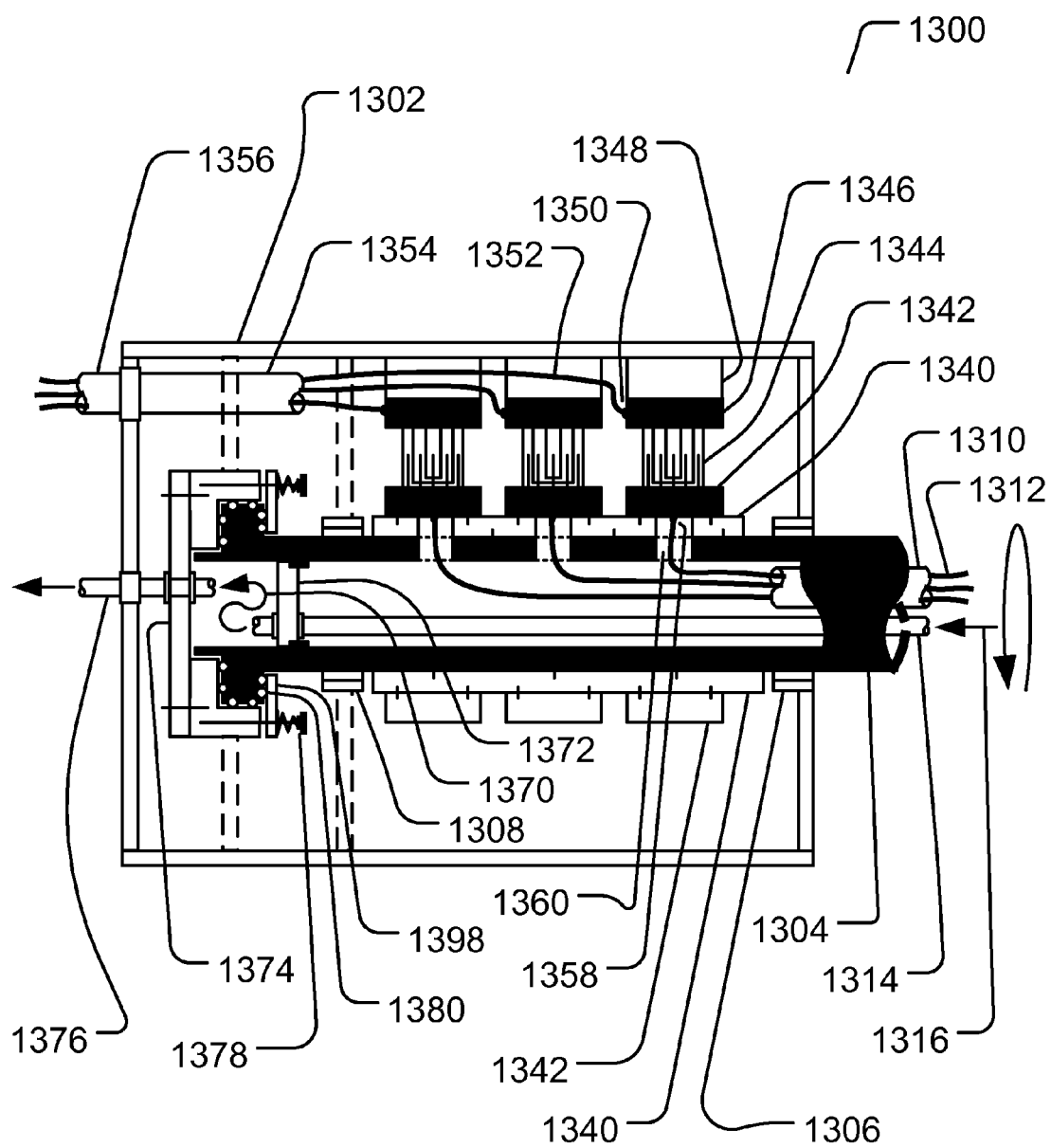
FIG. 13 shows rotational couplings, for cable/electrical and hydraulic, for an embodiment of our invention.

In one embodiment of this invention, for example as depicted in FIG. 13, within the housing of a rotational coupler (1300), simultaneous electrical and fluid rotational couplings are provided. In an embodiment, the electrical coupling is provided for one electrical wire. In one embodiment, the electrical coupling is provided for multiple wires (e.g., FIG. 13 illustrates coupling for 3 wires). In one embodiment, each electrical coupling is provided along the axis of rotation of the inlet shaft (1304). In an embodiment, the inlet shaft (1304) is rotationally separated from the non-rotating (relatively speaking) portions of the coupler (e.g., 1302) via one or more rotational bearings (e.g., 1306 at the entrance and 1308 within the housing of the coupler). The inlet shaft (1304), in an embodiment, carries one or more wires (e.g., 1312) within an electrical conduit (1310) into the housing of the coupler (1302). In another embodiment, the wires are directly carried by the inlet shaft without being placed in an intermediate conduit.

In one embodiment, for each electrical wire (e.g., 1312) that the rotational coupling is provided, a conducting rotor layer, ring or cylinder (1342) is placed over the inlet shaft having the same axis of rotation as the inlet shaft. In one embodiment, a layer, ring, or cylinder of non-conducting material (e.g., dielectric) (1340) is placed between the conducting rotor layer and the inlet shaft to electrically isolate the conducting rotor layer from the inlet shat. Small pins (as depicted in FIG. 13), pins, clamps, bolts, glue, surface roughness friction, and/or fusing are used to prevent the conducting rotor layer (1342) (as well as the non-conducting rotor insulator (1340)) from slipping when the inlet shaft (1304) is rotating (with respect to the coupler's housing). In one embodiment, the inlet shaft is electrically non-conducting or has a non-conducting outer surface, and the rotor conducting layer is placed directly over the non-conducting surface of the inlet shaft. In one embodiment, even though the surface of the inlet shaft is non-conducting, the non-conducting rotor layer (1340) is placed between the conducting rotor layer (1342) and the inlet shaft (1304) to provide better electrical isolation (e.g., less leakage current) and/or reduce the capacitive coupling between the wires from neighboring rotor conducting rings. In one embodiment, for each conducting rotor layer/ring/cylinder (1340), one or more electrical brush (1342) is provided to maintain the electrical connection between the rotor and stator for the wire during the rotational coupling. The brush (1344) touches the conducting rotor ring (1342) as well as the stator conducting holder (1346) which is supported by a non-conducting material (1348) to the stator (e.g., the coupler's housing (1302)). In one embodiment, the electrical connection (1358) to the rotor conducting layer (1342) from the corresponding inlet electrical wire (1312) is provided through a hole (1360) in the inlet shaft (1304) and non-conducting rotor insulation layer (1340). In one embodiment, the electrical connection (1350) for an outlet wire (e.g., 1356) is provided by running a conducting wire, rod, strip, or electrical path (1352) to the conducting stator holder (1346). In one embodiment, a conduit (1302) is provided at the outlet to guide the outlet wires (e.g., 1356) out of the coupler's housing and/or provide for a compact and isolated structure.

In one embodiment, the inlet shaft carries a conduit (1314) used for fluid flow (1316). In one embodiment, a compartment (e.g., cylindrical) (1370) is provided for fluid exchange between rotational coupled portions. In one embodiment, the compartment (1370) is within the interior of the inlet shaft (1304) with a backing surface (1372) which seals and blocks the fluid to run back within the inlet shaft. The backing surface (1372) is in contact and rotates together with the inlet shaft. In one embodiment, the fluid facing surface of the interior inlet shaft and the backing surface are treated or lined with a material compatible with the type of fluid, and its temperature and the pressure. In one embodiment, on the other side of the fluid exchange compartment (1370), a stator fluid cap (1374) is placed in close proximity with the rotor portions of the fluid exchange compartment (1370), to prevent significant fluid leakage. Bearings (e.g., 1380) provide rotational coupling between the stator and rotor portion of the fluid exchange compartment. These portions of the compartment are held together, e.g., by one or more spring loaded clamps/screws/bolts (e.g., 1378) pushing against a stator holding ring/plate (1398) which pushes against a rotor portion of the compartment through bearings (1380). In one embodiment, the adjusting the sealing clamp reduces the fluid leakage while it may increase rotational friction (torque transfer) between the stator and rotor portions of the fluid exchange compartment. In one embodiment, an outlet conduit (1376) for fluid flow is connected to the fluid exchange compartment (1370) through the stator fluid cap (1374).

In one embodiment, the rotor portion of the fluid exchange compartment is formed by attaching a cylindrical compartment (e.g., with larger radius than the inlet shaft and having a backing wall) to the inlet shaft, so that their axis will substantially be on the same line. The stator portion of the fluid exchange compartment is similarly coupled to the rotor portion as described above. In such an embodiment, the size of the compartment is determined by the radius of the compartment (perpendicular to the axis of rotation) and the height of the compartment (parallel and along the axis of rotation of the main shaft).

In one embodiment of this invention, as depicted in FIG. 14(*a*), an integrated electrical and fluid rotational coupler (1400) provides the coupling exchange for multiple fluid feeds (e.g., 1416 and 1417). In one embodiment, the rotational coupler also provides the rotational coupling for one or more electrical wires (e.g., 1412). In one embodiment, the electrical wire(s) are inlet to the coupler through an electrical conduit (1410). In one embodiment, the fluid and/or electrical conduits are brought into the coupler within a rotor shaft which rotates with respect to the coupler's housing (1402). In one embodiment, the rotor shaft is rotationally separated from the coupler's housing via one or more bearings (e.g., 1406 and 1408) at the entrance and within the coupler housing, respectively. For simplicity, the electrical coupling portion is not fully depicted in FIG. 14(*a*) (beyond a passage hole (1460) on the inlet shaft). For the electrical coupling details, refer to FIG. 13 and the related descriptions/embodiments.

In one embodiment, multiple fluid exchange compartments (e.g., 1470 and 1471) are provided to rotationally couple multiple fluid flows from inlet (1416, and 1417, respectively) to outlet (1476 and 1477, respectively). In one embodiment, the fluid exchange compartments are in shape of concentric cylinder and rings. For example, the central compartment (1470), as depicted in FIG. 14(*a*) has cylindrical shape, and the outer compartment (1471) has a ring shape. In another embodiment, all the compartments have concentric ring shape, leaving the central space in the middle, for example, for the extension of the rotor shaft further along its axis. In one embodiment, the compartments share a backing wall (1472) attached to the inlet shaft. The backing wall (1472) provides the confinement of the fluids in the fluid exchange compartments against flowing back into the inlet shaft (1404). Between the compartments, concentric barrier ring(s) attached to the backing wall separate the fluids from mixing with each other and/or prevent escaping of fluid from its the compartment. Similar to the embodiments represented in FIG. 13, in one embodiment, a stator seal cap (1474) is provided to cap over the fluid compartments and provide outlet conduit (e.g., 1476 and 1477) connections to the fluid exchange compartments (e.g., 1470 and 1471, respectively). As illustrated in FIG. 14(*a*), in one embodiment, bearings (e.g., 1481) are placed between the stator fluid cap (1474) and the rotor portions of the fluid compartments (e.g., over the fluid barrier rings) to provide for the rotational coupling between the rotor and stator portions. In one embodiment, a holding mechanisms, for example, including spring loaded clamp/screw/bolt (1478) and stator holding ring/plate (1498) and bearings (1480), is used to hold the stator and rotor portions of the fluid exchange compartments together providing for substantial sealing for fluids as well as rotational coupling.

In one embodiment of this invention, as depicted in FIG. 14(*b*), the rotary container (1473) is attached to the inlet rotary shaft (or its extension) (1404), having substantially the same axis of rotation as the rotary shaft (1404). In one embodiment, the rotary container (1473) is directly attached to the inlet shaft, e.g., by welding or by bolts. In one embodiment, the rotary container (1473) is attached to the inlet shaft using clamps, or by attaching a fitted color over (or inside) the rotary shaft (as depicted in FIG. 14(*b*)) and/or secured by bolts or pins. The fitted color in turn is attached to the rotary container (1473). In one embodiment, the backing wall (1472) is placed in the rotary container as depicted in 14(*b*) (as opposed to put in the inlet shaft directly as depicted in FIG.

14(*a*)). In such an embodiment, multiple compartments may be arranged at various radial (perpendicular to the axis of rotation) locations (ranges) within the rotary container (e.g., FIG. 14(*b*), 1470 and 1471). In one embodiment, the fluid inlet conduits (e.g., 1414 and 1415) are directed to their corresponding fluid exchange compartments (e.g., 1470 and 1471, respectively) through a space between the backing wall of the compartments (1472) and the bottom of the rotary container (1473) which is attached to the inlet shaft (1404). Within this space, the conduits are allowed to bend and extend radially (perpendicular to the axis of rotation) toward their corresponding fluid exchange compartments, as depicted for example in FIG. 14(*b*). In such an embodiment, additional compartments may be added and stacked radially. As the volume of the compartment scales with the average radius (from the axis) where the compartment is located, the radial width of the compartment may be reduced at larger radius in order to keep the compartment volume constant. In one embodiment, the consecutive compartment rings have equal or less width (radially) compared to their prior inner compartment.

In an embodiment of this invention, as depicted for example in FIG. 15, a rotational coupler (1500) is provided for rotational coupling of multiple fluids. In one embodiment, the couple also provides the rotation of electrical wire(s) (e.g., 1512) which may be fed through the couple via an electrical conduit (1512). The conduits (electrical or fluid carrying) are carried into the coupler through a rotary shaft (1504). For simplicity, the electrical rotational coupling is not displayed in FIG. 15 beyond a hole (1560) in the rotary inlet shaft. For details on the electrical coupling, see for example, FIG. 13 and its related embodiments. In one embodiment, the rotary shaft is rotationally isolated from the coupler's housing (stator) via bearings (1506) at the entrance to the coupler. In one embodiment, the fluid exchange compartments (e.g., 1570 and 1571) are axially distributed along the axis of rotation of the rotary shaft. These compartments form rings around the rotary inlet shaft (1504) within the coupler. In one embodiment, additional compartments are added by adding them axially on the inlet rotary shaft. In one embodiment, the fluid flow(s) (e.g., 1516 and 1517) access to their corresponding fluid exchange compartments (e.g., 1570 and 1571) are provided through hole(s) (e.g., 1590 and 1591) through the rotary inlet shaft (1504). The rotary portions of the compartments (e.g., 1572 and 1573) form rings around the inlet rotary shaft (1504). In one embodiment, these rotary portions are rotationally attached to the rotary inlet shaft, so they rotate together with the rotary inlet shaft. Various means of attachments or their combinations are used in various embodiments. For example, the radial attachment may be done by a pin and notch combination between the rotary inlet shaft (1504) and the rotary portion of the fluid exchange compartment (e.g., 1572 and 1571), as illustrated for example in FIG. 15(*a*). Another means is to use the fluid conduit sections (or an additional sleeve) that pass through the holes (1590, 1591) in the rotary shaft as well as the holes in the rotary portions of the compartments to radially restrict their rotation with respect to each other. Other means of attachments include (but not limited to) using clamps, bolts/screws, glue, surface roughness friction, fusing, and/or welding. In one embodiment, a rotary portion of the compartment includes a hole or a ring opening (e.g., 1594) for providing the fluid path to the stator portion of the compartment. The stator portion of the compartment (e.g., 1574 or 1575) provide confinement of the fluid to their respective compartments (e.g., 1570 or 1571) while providing access (1592) for fluid flow to the stator side of the coupler. The stator portion of the compartment (e.g., 1574) is in close proximity with the rotor portion of the compartment (e.g., 1572) to provide substantial seal for the fluid at the compartment (1570). In one embodiment, bearings (e.g., 1580) as well as stator back plate/holder (e.g., 1598) and are used to help maintain the seal while providing for substantial rotational isolation between the rotor and stator parts of the compartment. In one embodiment, the rotor part of the compartment (e.g., 1572) is pressed between the stator back plate/holder (e.g., 1598) and the stator portion of the compartment (e.g., 1574), using a clamp or spring loaded screw/bolt. In one embodiment, the stator portion of the compartments (e.g., 1574 and 1575) and/or the stator back plate/holder (e.g., 1598) are supported within the coupler via a stator supporting structure to have those overcome the rotational friction (torque) from the rotary portions of the compartments or the inlet rotary shaft. In one embodiment, the stator portion of the compartments (e.g., 1574 and 1575) and/or the stator back plate/holder (e.g., 1598) have ring type structure and they ride on the inlet rotary shaft (1504), and they are rotationally isolated from the rotary inlet shaft by intermediate ring bearings (e.g., 1599), as depicted in FIG. 15(*a*). In another embodiment, the stator portion of the compartments (e.g., 1574 and 1575) and/or the stator back plate/holder (e.g., 1598) do not ride on the inlet shaft, and instead, they are held by the stator portion of the coupler's housing (1502). In such an embodiment, the rotational friction against the rotary inlet shaft may be reduced.

In one embodiment, the fluid access (e.g., 1592) from the stator side of the fluid exchange compartments (e.g., 1570 or 1571) is connected to the corresponding outlet conduits (e.g., 1576 and 1577, respectively).

In one embodiment, as illustrated in FIG. 15(*b*), the fluid exchange compartments (e.g., 1570 and 1571) are stacked axially by using a stator separator element (e.g., 1582 or 1583) as both the stator back plate/holder (e.g., see also 1598 in FIG. 15(*a*)) of a fluid compartment as well as the stator portion of the next fluid compartments (e.g., see also 1574 or 1575 in FIG. 15(*a*)). In one embodiment, the stator separators have ring shape structure and they are placed around the inlet rotary shaft (1504). In one embodiment, the stator separator elements ride on the inlet rotary shaft (1504) having rotationally isolated substantially from the rotary inlet shaft, e.g., using an intermediate ring bearing (e.g., 1599). In one embodiment, the stack of the fluid compartments (e.g., 1570 and 1571) including the rotary portions (e.g., 1572 and 1673), stator separator elements (e.g., 1582), and the last and the first stator portions of the stack (e.g., 1598 and 1583) (which may have similar structure as the stator separator elements (e.g., 1583)) are held together to provide fluid seal in each compartment in the stack. In one embodiment, for example, a spring loaded bolt (1578) is used to push the end pieces of the stack (e.g., 1598 and 1583) together while sandwiching the rest of the stator and rotor portions of the compartment stack. In one embodiment, the fluid access (1592) through the stator portion of the fluid exchange compartment (e.g., 1570) is provided through the corresponding stator separator element (1582). In an embodiment, this access is through a sealed conduit within the stator barrier element. In another embodiment, the conduit is a hole through the stator separator element. In one embodiment, the hole through the stator separator element is lined with a material that is compatible with the type of chemical (fluid) flowing through the coupler (as well as its temperature and pressure). In one embodiment, the stator separator element is made up of a material compatible with the corresponding fluid. In one embodiment, the stator separator element is made of multiple pieces joined together to provide the fluid path through the stator separator element.

For example, one piece of the stator separator element facing the corresponding fluid compartment provides a hole for the fluid flow substantially parallel to the axis of rotation. A second piece provides a path for the fluid in a radial direction toward its outer edge, and the third piece confines the fluid flow through the path in second piece. In one embodiment, the second piece has a ring structure with a radial notch extending from the outer radius through where it lines up with the hole on the first piece. In various embodiments, these multiple pieces are joined through one or combination of pins, bolts, friction, glue, fusing and/or welding.

Figure 14A:
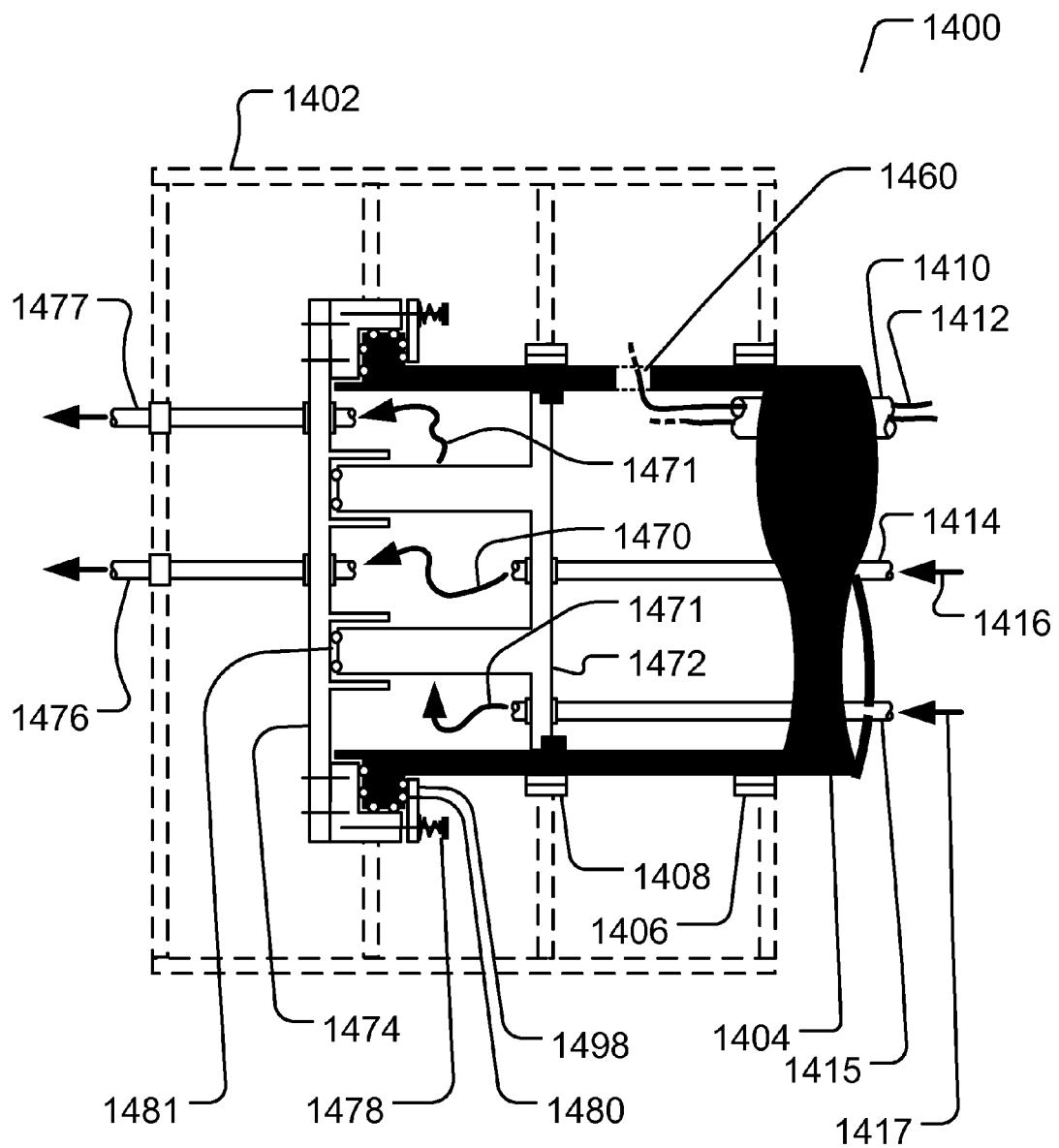
FIGS. 14(*a*) and (*b*) show multiple rotational couplings, for multiple fluids or gases, radially distributed, for gas compartments, for an embodiment of our invention.
Figure 14B:
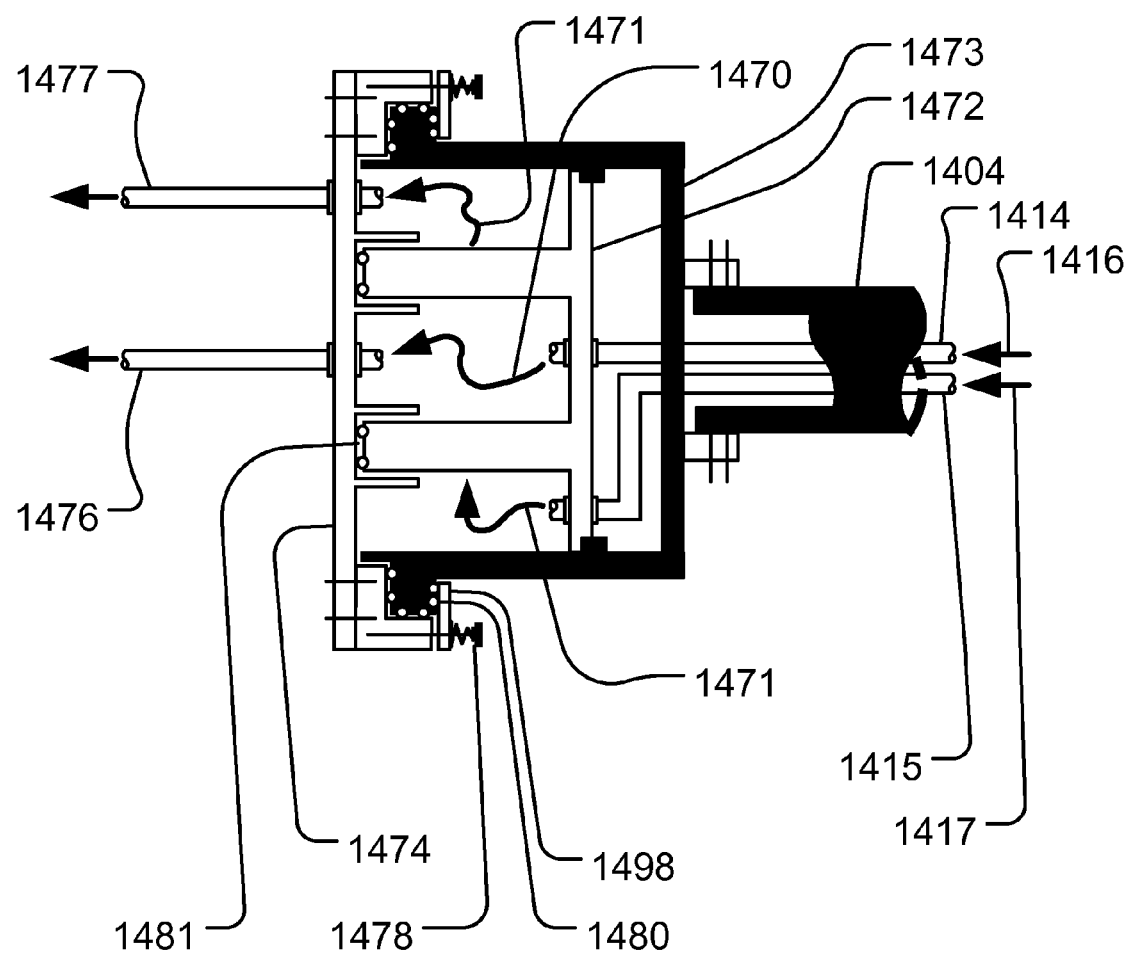
Figure 15A:
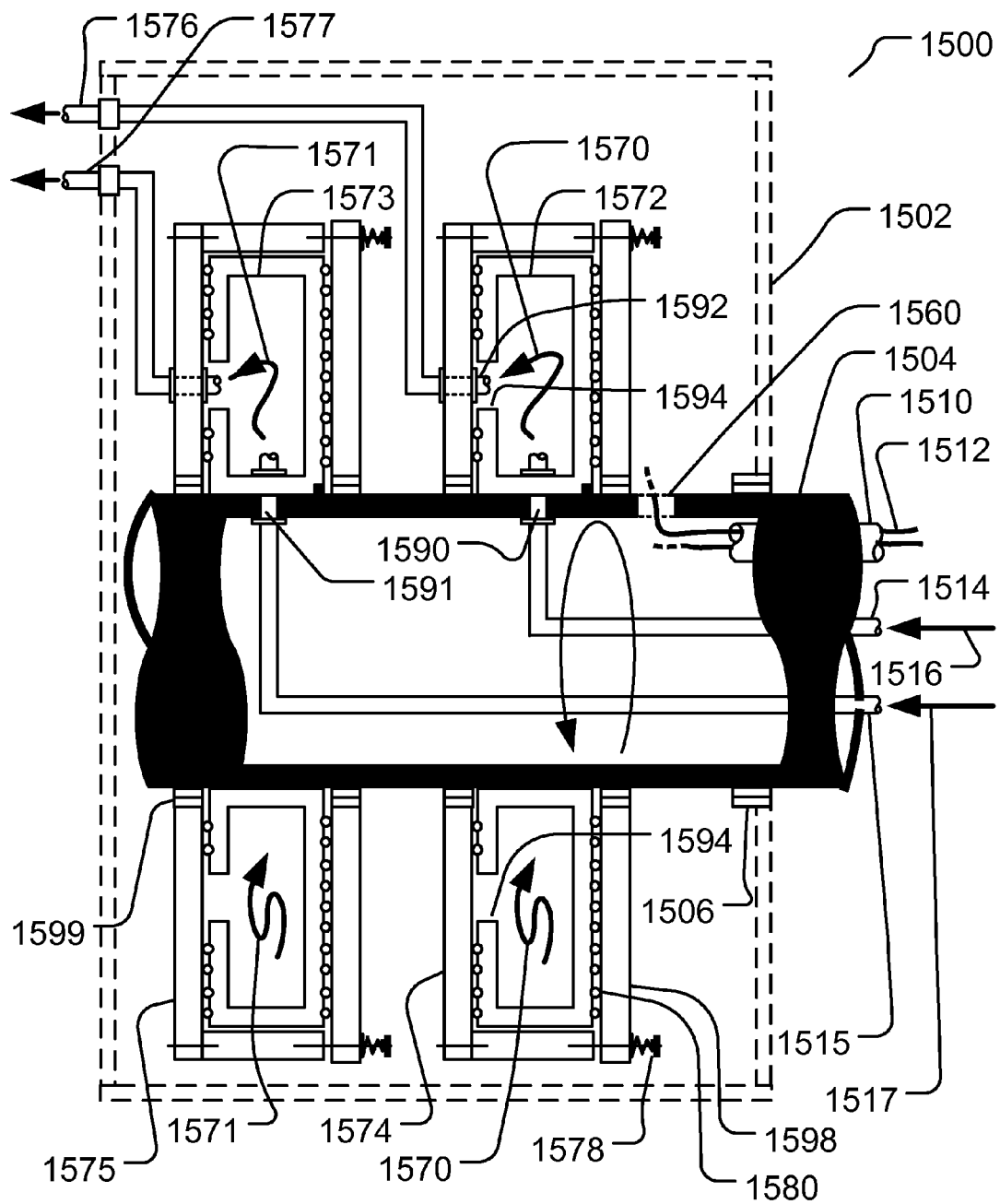
FIGS. 15(*a*) and (*b*) show multiple rotational couplings, for multiple fluids or gases, laterally distributed, for gas compartments, for an embodiment of our invention.
Figure 15B:
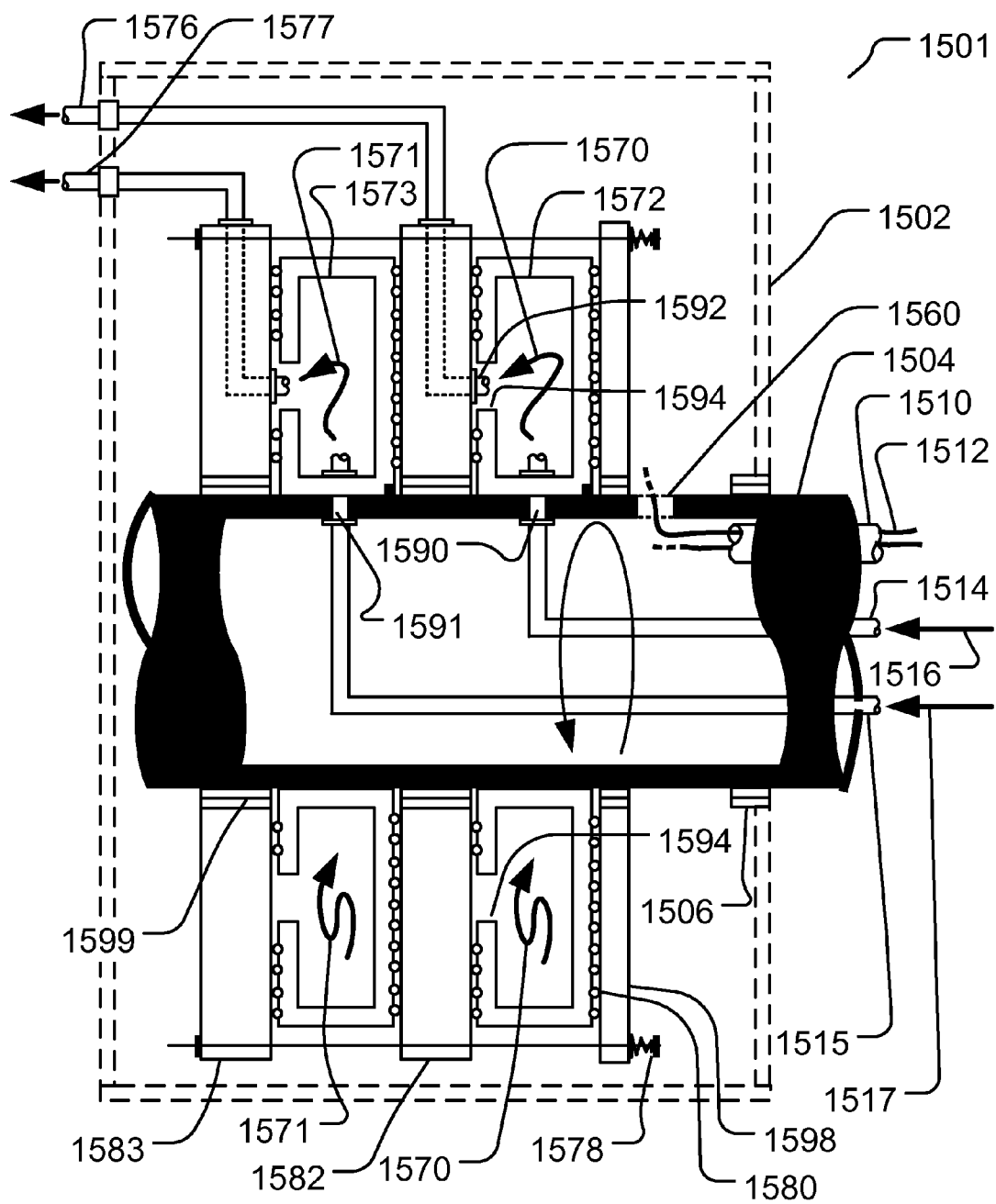

In one embodiment, the rotary inlet shaft (e.g., FIGS. 15(a)-(b), 1504) is extended beyond the fluid compartments within the rotary coupler. In one embodiment, the axial arrangements of the fluid compartments (e.g., as depicted in FIGS. 15(a)-(b)) is combined with radial arrangement of fluid compartments (e.g., as depicted in FIGS. 14(a)-(b)). For example, an embodiment depicted in FIG. 14(b) is modified to reserve the center space (1470) for extension of the rotary inlet shaft (1404) (as discussed previously) and to stack the fluid compartments radially (as discussed previously). Then, the stator cap (1481) works the same way, except that it will have a opening in it middle to allow the extension of the rotary inlet shaft to pass through. Then, another rotary container element (similar to 1473) is added on the extension of the rotary inlet shaft to axially stack another set of compartments in the rotational coupler.

Electrical Rotational Coupler with Intermediate Rotor

In an embodiment of this invention, an electrical rotational coupler is used with an intermediate rotor. In such an embodiment, the relative angular velocity between the rotor and stator is split by an intermediate rotor, so that a coupling is provided through the intermediate rotor by having a coupling between the intermediate rotor and the stator as well as a coupling between the intermediate rotor and the main rotor. In one embodiment, the reduced relative angular velocity at each stage of electrical coupling increases the lifetime of the electrical coupling components due to reduced wear and tear associated with running a stator brush against a rotor conductor at a lower relative angular velocity. In one embodiment, the reduced relative angular velocity at each stage of electrical coupling reduces the rotational friction (torque transfer) for the rotational coupler.

Figure 16:
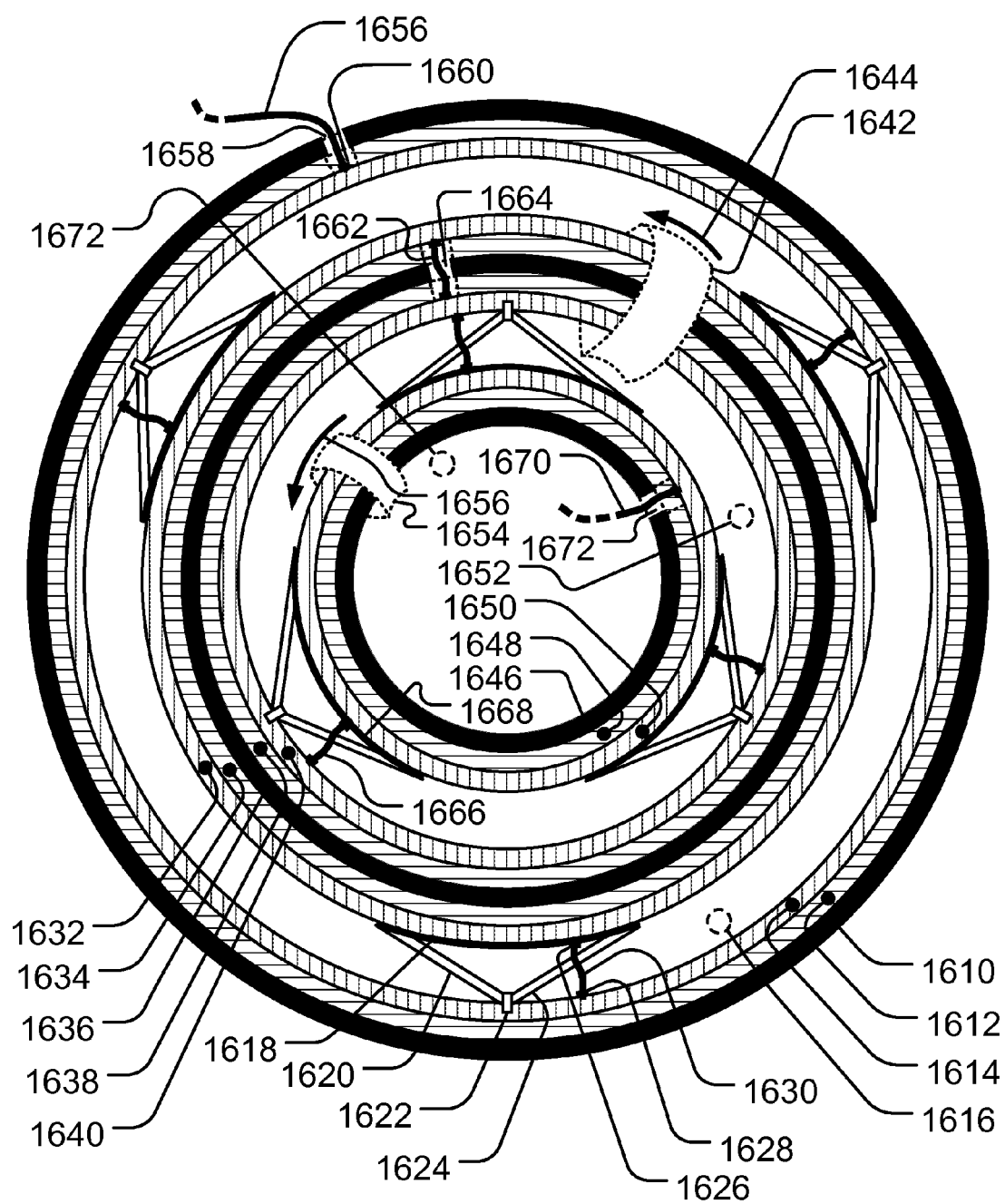
FIG. 16 shows intermediate rotational coupling, for electrical connection, for an embodiment of our invention.

FIG. 16 depicts a cross section of an embodiment of this invention having an intermediate rotor (1642) (e.g., including rings/layers/cylinders 1632, 1634, 1636, 1638, 1640), stator (e.g., including rings/layers/cylinders 1610, 1612, and 1616), and main rotor (1654) (e.g., including rings/layers/cylinders 1650, 1648, and 1646). In an embodiment, the rotor is rotating with angular velocity $\omega_r$ with respect to the stator, and the intermediate rotor is rotating in the same direction with the angular velocity $\omega_i$ with respect to the stator. The relative angular velocity between the stator and the intermediate rotor is $\omega_i$, while the relative angular velocity between the intermediate rotor and the main rotor is $\omega_r - \omega_i$.

In one embodiment, the core main rotor is a rotary shaft (1646) and the core stator (1610) is a stationary (with respect to stator) enclosure. The core stator (as well as other elements in the stator such as 1612 and 1614) may have various shapes in various embodiments, depending on the structure of the coupler, given that it is stationary with respect to the stator. In an embodiment, for example as depicted in FIG. 16, this stator core has a ring/cylindrical structure which is substantially aligned centrally with the axis of rotation of the main rotor. In one embodiment the intermediate rotor rings/layers/cylinders are substantially aligned centrally with the axis of rotation of the main rotor. In one embodiment, there is a clearance space (1616) between the stator and the intermediate rotor. In one embodiment, there is a clearance space (1652) between the intermediate rotor and the main rotor. In one embodiment, within these spaces, the electrical brushes are used to rotationally couple the stages and create substantially a continuous electrical path between a rotor wire (1670) and the stator wire (1656).

In an embodiment of this invention, the main rotor core (1646) and the intermediate rotor core (1636) provide the rotational drive to the other layers that are attached to them. In one embodiment, the main rotor core (1646), the intermediate rotor core (1636), and/or the stator enclosure (1610) are electrically conductive. In one embodiment, there are multiple rotor wires rotationally coupled to their corresponding stator wires (e.g., see FIG. 17 and its related discussion). In one embodiment, the main rotor core (1646), the intermediate rotor core (1636), and/or the stator enclosure (1610) are electrically insulated from the coupled wire(s).

In one embodiment, at a stage of coupling (e.g., between the stator and the intermediate rotor), one or more electrical brushes (e.g., three are depicted in between the stator and the intermediate rotor in FIG. 16) provide rotational coupling by sliding a conducting surface (e.g., 1618) against the outer rotating conducting surface (1632) of (intermediate) rotor. In one embodiment, the sliding surface of the brush (1618) is held against the conducting surface (1632) by a flexible bent structure (e.g., 1620 and 1624) under stress or via a spring pushing against the sliding surface (1618) supported by the stator. In one embodiment, the pressing structure(s) (e.g., 1620 and 1624) in the brush are electrically conducting and provide an electrical path beyond the sliding surface of the brush (1618) to the stator. In one embodiment (which works also with non-conducting pressing structure(s) in the brush), an electrical path (e.g., 1630) is provided between the conducting sliding surface of the brush (1618) and a conducting layer (of the stator) (1614) supporting the brush by for example connecting a conductor/wire (1630) at a location (1626) on the sliding surface of the brush (1618) and a location (1628) on the conducting surface (of the stator) (1614) supporting the brush. In one embodiment, the brush is supported by insertion in a notch (1622) at the stator. In one embodiment, the connection between the conducting layer (1616) of stator and the stator wire (1656) is provided by a connection (1660) to the stator wire through a hole in the stator enclosure (1610). In one embodiment, a layer/ring/cylinder of non-conducting layer (e.g., dielectric) (1612) is provided between the stator enclosure (1610) and the stator conducting surface (1616) to electrically isolate the stator conducting surface (1614) and the stator enclosure (1610) from each other. In an embodiment, the electrical connection (1660) is made via an extension of the hole (1658) in the stator enclosure through the stator non-conducting layer (1612). In one embodiment, the conducting surface (1614) for the stator has a ring/layer structure. In an embodiment, the conducting surface (1614) of the stator has a shape that provides a contiguous surface for an electrical path between the electrical connection 1660 (between the stator wire and the stator conducting surface) and the location 1628 on the stator conducting surface (for connecting to the conducting sliding surface (1618) of the brush), in order to provide continuous electrical path from the stator wire (1656) through the outer conducting surface (1632) of the intermediate rotor (1642). In one embodiment, the stator wire (1656) is extended and connected to the conducting sliding surface (1618) of the brush which slides on the intermediate rotor's outer conducting surface (1632). In one of such embodiments, the stator conducting layer (1614) and/or the stator non-conducting layer/ring/cylinder (1612) are absent.

In one embodiment, the intermediate rotor includes an outer conducting surface (e.g., in shape of ring/layer) (1632) and an inner conducting surface (1640). The electrical connection between these conducting surfaces, in one embodiment, is provided via one or more path(s)/wire(s) (e.g., 1662) through one or more hole(s) (e.g., 1664) in the core of the intermediate rotor (1636). In one embodiment, the core of the intermediate rotor (1636) is electrically insulated from the inner (1640) and/or outer (1632) conducting surfaces of the intermediate rotor via an inner non-conducting layer/ring/cylinder (e.g., dielectric) (1638) and/or an outer non-conducting layer/ring/cylinder (e.g., dielectric) (1634), respectively. In such an embodiment, hole 1664 extends through these non-conducting layers (1634 and 1638) to allow the electrical connection between the corresponding conducting layers (1632 and 1640) via path 1662.

Similarly to the rotational coupling between the stator and the intermediate rotor (described above), in one embodiment, one or more electrical brushes (e.g., three brushes depicted in FIG. 16) are provided between the intermediate rotor and the main rotor (e.g. within clearance space 1652). In one embodiment, one or more electrical path(s)/wire(s) (1666) connects the inner conducting surface (1640) of the intermediate rotor (1642) to the conducting surface of a brush which slides on the conducting surface (1650) of the main rotor, in order to provide the electrical path between the intermediate rotor and the main rotor. In one embodiment, the brush is secured to the intermediate rotor in order for it to rotate together with the intermediate rotor. In one embodiment, a notch in an inner portion of intermediate rotor (e.g., its inner conducting layer (1640)) provides an anchor location for securing the brush to the intermediate rotor. In one embodiment, the inner conducting surface (1640) of the intermediate rotor has a shape to provide a conducting path between path 1664 and conducting sliding surface of the brush which slides on the main rotor's conducting surface (1650). In one embodiment, the inner conducting surface of the intermediate rotor has ring/layer/cylinder shape. In one embodiment, the connection path (1662) from the outer conducing surface (1632) of the intermediate rotor is extended and connected to the conducting surface of the brush which slides on the main rotor's conducting surface (1650). In one of such embodiments, the inner conducting layer (1640) of the intermediate rotor and/or the inner non-conducting layer/ring/cylinder (1638) of the intermediate rotor is absent.

In one embodiment, the conducting surface (1650) of the main rotor (1654) (which is in electrical contact with the brush from the intermediate rotor), is isolated from the core of the main rotor (1646) by a non-conducting layer/ring/cylinder (1648). In one embodiment, the electrical contact between the rotor wire and the main rotor's conducting surface (1650) is provided by the electrical connection through one or more holes (e.g., 1672) through the core (1646) of the main rotor. In one embodiment, the core (1646) of the main rotor is electrically conducting. In one embodiment, having a non-conducting material for the core (1646) of the main rotor (where it is in contact with the conducting layer/ring/cylinder (1650) of the main rotor), a non-conducting layer (e.g., 1648) is absent.

Figure 17:
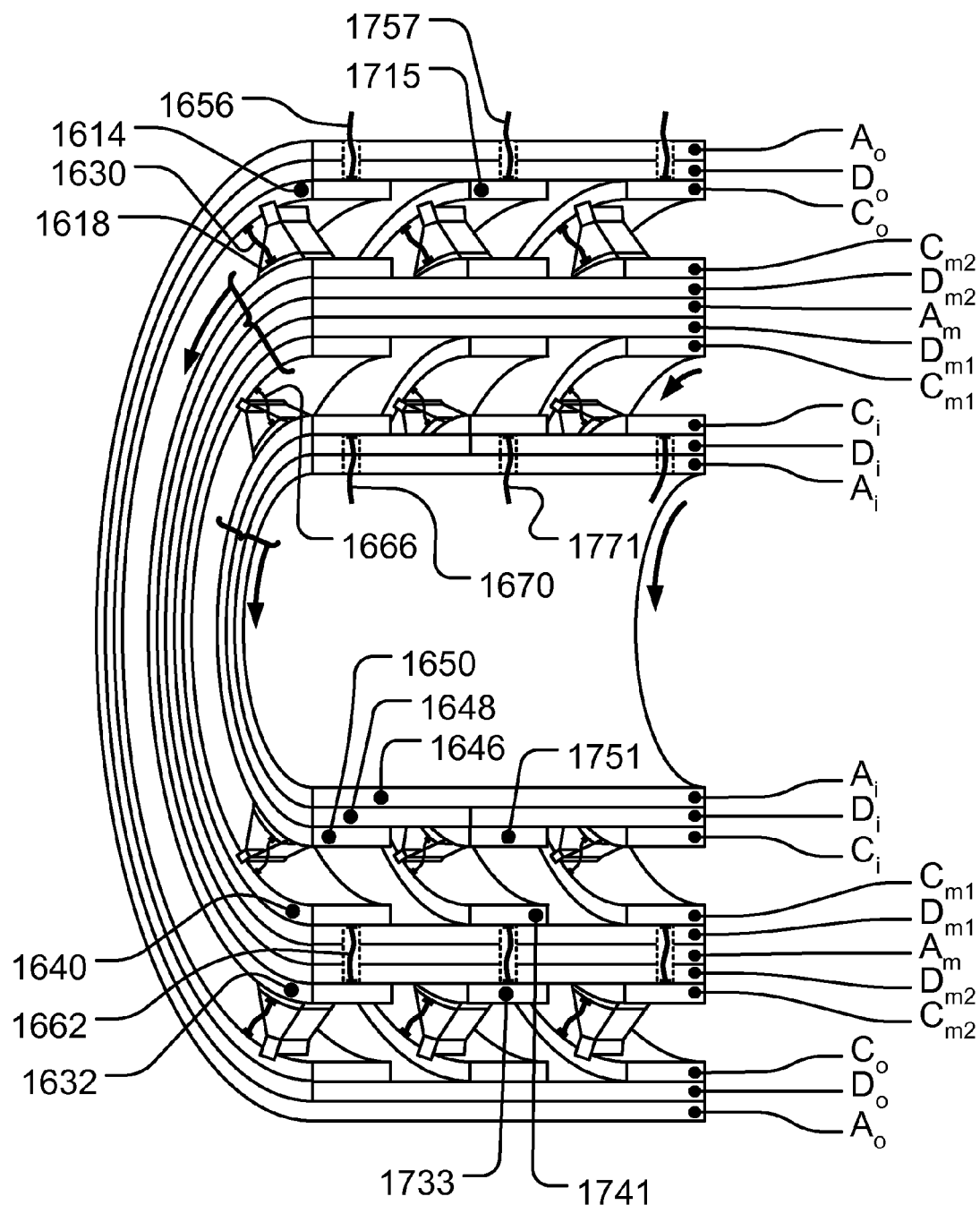
FIG. 17 shows intermediate rotational coupling, for electrical connection, cross sectional view, for an embodiment of our invention.

In one embodiment of this invention, as depicted in FIG. 17, electrical rotational coupling is provided for multiple rotor wires (e.g., 1670 and 1771) and their corresponding stator wires (e.g., 1656 and 1757). As depicted in FIG. 17, for illustrative purposes only, rotational coupling is depicted a set of three wires. However, the approach may be extended for more or less number of wires in various embodiments of this invention. FIG. 17 illustrates various layers/rings/cylinders in a half cross section view, for an embodiment of this invention. For the purpose of labeling the layers/rings/cylinders on the right side of FIG. 17, subscript "o" denotes the outer or stator side, subscript "m" denotes the middle or the intermediate rotor, and subscript "i" denotes inside or main rotor. Letter "A" denotes axial or core cylinder. Letter "C" denotes conducting layer/surface/ring/cylinder. Letter "D" denotes non-conducting/dielectric layer/surface/ring/cylinder. For the middle or intermediate rotor, the outer layers/rings are additionally subscribed by "2" and the inner layers/rings are subscribed by "1". So, "$D_{m1}$" denotes the inner non-conducting layer/ring/cylinder of the intermediate rotor, $A_o$ denotes the stator enclosure, while $A_i$ denotes the main rotor shaft.

In an embodiment, as for example illustrated in FIG. 17, the conducting layers/rings/surfaces of the stator ($C_o$), the outer and inner intermediate rotor ($C_{m2}$ and $C_{m1}$, respectively), and the conducting layer/surface/ring of the main rotor ($C_i$) are electrically disconnected from each other with the rotational coupler. In one embodiment, one or more of these conducting layers are in shape of rings (as depicted in FIG. 17). For example, in one embodiment, to provide for conducting surface for the main rotor (for separate rotor wires (e.g., 1670 and 1771)), separate conducting layers/rings (e.g., 1650, 1751) are provided at $C_i$ level. Similarly, in one embodiment, separate conducting layers/rings (e.g., 1632, 1733) are provided at $C_{m2}$ level, which provide separate electrical path to their corresponding rotor wires (1670 and 1771, respectively). Similarly, for an embodiment with inner conducting surface/layer on intermediate rotor for multiple rotor wires, separate conducting layers/rings/cylinders (e.g., 1640 and 1741) are used at $C_{m1}$ level, which provide separate electrical path to their corresponding rotor wires (1670 and 1771, respectively). Similarly, for an embodiment with inner conducting surface/layer on the stator for multiple stator wires, separate conducting layers/rings/cylinders (e.g., 1614 and 1715) are used at $C_o$ level, which provide separate electrical path to their corresponding stator wires (1656 and 1757, respectively).

In one embodiment, as illustrated by FIG. 17, one or more layers/rings/cylinders are shared between the multiple electrical couplings. For example, in one embodiment, the same one or more non-conducting layers, e.g., at levels $D_o$, $D_{m2}$, $D_{m1}$, and/or $D_i$, are used across the electrical couplers. For example, in one embodiment, the same core/axial cylinders for stator, intermediate rotor, and main rotor are used at $A_o$, $A_m$, and $A_i$ levels, respectively, across the electrical couplers.

Figure 18:
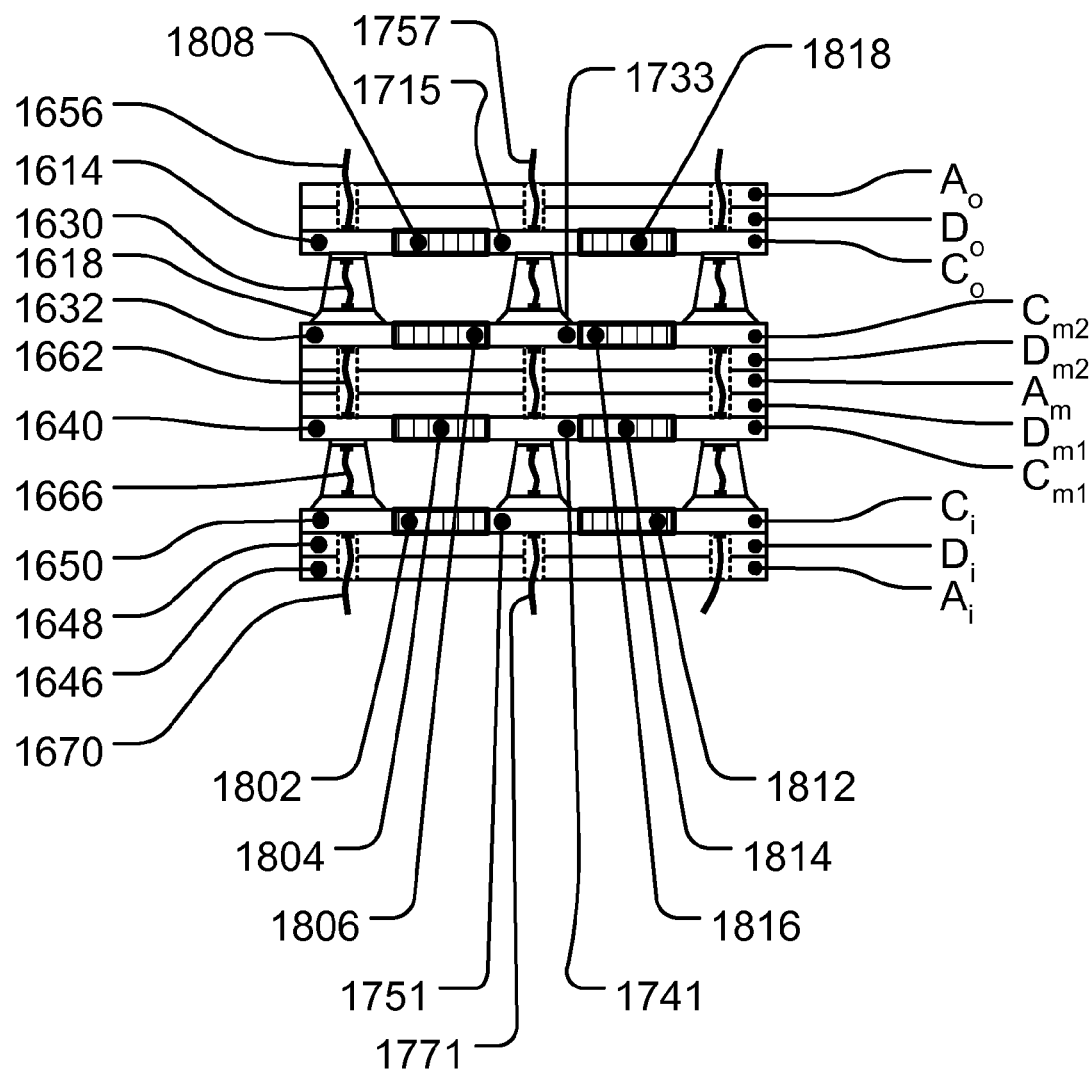
FIG. 18 shows schematic diagram corresponding to FIG. 16, showing dielectric rings between conductor rings, for an embodiment of our invention.

In one embodiment, as depicted in FIG. 18, one or more additional non-conducting rings/spacers/cylinders are employed axially between one or more conducting layers/rings/cylinders for stator, intermediate rotor (inner or outer), and/or the main rotor. For example, in one embodiment, non-conducting rings/spacers (e.g., 1806 and/or 1816) are axially placed between the outer conducting layers/rings/cylinders (e.g., 1632 and 1733) of intermediate rotor, at $C_{m2}$ level. Similarly, in one embodiment, one or more non-conducting rings/spacers/cylinders (e.g., 1802 and/or 1812) are axially placed at $C_i$ level between the main rotor conducting layers/rings/cylinder (e.g., 1650 and 1751). Similarly, in one embodiment, one or more non-conducting rings/spacers/cylinders (e.g., 1804 and/or 1814) are placed axially at $C_{m1}$ level between the inner conducting layers/rings/cylinder (e.g., 1640 and 1741) of the intermediate rotor. Similarly, in one embodiment, one or more non-conducting rings/spacers/cylinders (e.g., 1808 and/or 1818) are axially placed at $C_o$ level between the stator's conducting layers/rings/cylinder (e.g., 1614 and 1715).

In an embodiment, for example as illustrate in FIG. 18, the one or more additional non-conducting rings/spacers/cylinders (e.g., 1806) placed axially between the conducting layers/rings/cylinders (e.g., 1632 and 1733), provide stacking capability for the individual couplers (per rotor/stator wire) during assembling. FIG. 18 illustrates a cross section of a rotational coupler similar to that of FIG. 17, with focus toward the top portion of the cross section. For example, the non-conducting ring 1806 acts as a spacer between rings 1632 and 1733 for a precise placement of the rings in their locations riding over the core of the intermediate rotor. In an embodiment, such dielectric rings are used at the ends of the axial stack of electrical couplers to provide better electrical isolation between the components within the rotational coupler.

Planetary Gear

Figure 19:
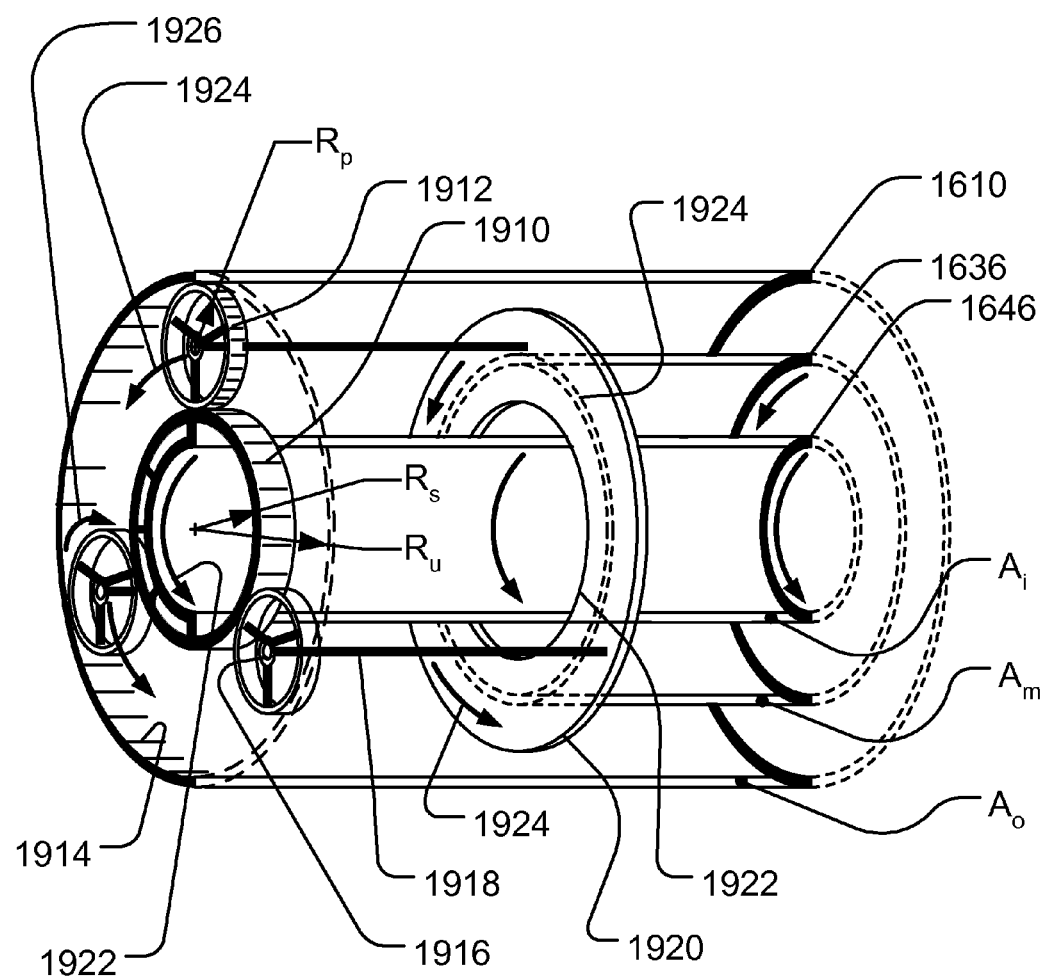
FIG. 19 shows planetary gear, for use with intermediate electrical rotational coupling, driven by planetary gears, for an embodiment of our invention.

In an embodiment of this invention, as depicted for example by FIG. 19, a planetary gear is used to provide relative rotational speed between the stator and intermediate rotor and the intermediate rotor and the main rotor for an electrical rotational coupler. In one embodiment, the planetary gear is integrated with the rotational coupler. In one embodiment, as for example illustrated in FIG. 19, the core of the stator (i.e., stator enclosure) (1610, $A_o$), the core of intermediate rotor (1636, $A_m$), and the core of the main rotor (i.e., rotor shaft) (1646, $A_i$) are rotationally attached to the planetary gear's ring wheel with inner teeth (1914), the planet carrier (1920), and the sun wheel (1910). In one embodiment, the planet carrier has a ring structure and it is placed around the main rotary shaft (1646) (e.g., with a clearance or separated by a bearing) to allow the main shaft to reach and be attached to the sun wheel (1910). In one embodiment, the sun wheel's radius $R_s$ is different from the radius of the main rotary shaft, and the attachment of the sun wheel to the main rotary shaft may be done in various ways (in various embodiments), e.g., by mounting the sun wheel at the end of the rotary shaft, or by bolting/welding/fusing/gluing the sun wheel over the main rotary shaft. In one embodiment, multiple planet wheels (e.g., 1912) are used between the sun wheel (1910) and the ring wheel (1914). For example, FIG. 19 illustrates three planet wheels used in the planetary gear. In one embodiment, the planetary wheels are substantially distributed uniformly around the sun wheel. In one embodiment, at the center of a planet wheel, a rotational bearing (e.g., 1916) is used to connect the planet wheel to the planet carrier via a corresponding planet axel/rod (e.g., 1918). In one embodiment, the bearing (1916) allows the rotation (1926) of the planet wheel around itself, while the planet axel/rod (e.g., 1918) remains attached to the planet carrier (1920). In another embodiment, the planet rod/axel (e.g., 1918) is attached directly to the planet wheel (i.e., it rotates together with the planet wheel around itself), while the corresponding bearing is provided on the planet carrier (1920) where the planet rod/axel (e.g., 1918) contacts the planet carrier (1920). In one embodiment, the bearings are provided both on the planet wheel and the carrier wheel for the planet rod/axel. In one embodiment, the carrier wheel rotates (1924) at the same rotational speed as the planet wheels rotate around the sun wheel. In one embodiment, the sun wheel rotates (1922) at the same rotational speed (with respect to the ring wheel (1914)) as the main rotary shaft (1646) rotates with respect to the stator enclosure (1610). In one embodiment, the intermediate rotor (e.g., 1636) rotates with the same rotational speed as the carrier wheel (1920), for example, by having the intermediate rotor core ($A_m$) extended and attached to the carrier wheel (e.g., at 1924).

Based on the planetary wheel motion, the relationship between the rotational speed of the intermediate rotor ($\omega_i$, with respect to the stator) and the main rotor shaft ($\omega_r$, with respect to the stator) may be approximately expressed by:

$$\omega_r/\omega_i = (1 + R_u/R_s) = 2 \cdot (1 + R_p/R_s) \quad \text{(Eq. 1)}$$

where, as illustrated in FIG. 19, $R_s$, $R_p$, and $R_u$ are radii of the sun wheel (1910), the planet wheel (e.g., 1912) and the ring wheel (1914), respectively. In the above, it is assumed that $R_u$ is about $R_s + 2 \cdot R_p$. In this configuration, the angular rotation of the intermediate rotor is reduced by more than a factor of 2 compared to the angular velocity of the main rotor. In one embodiment, the ratio of $\omega_r/\omega_i$ is adjusted by changing the relative sizes of the wheels in the planetary gear.

In one embodiment, as illustrated in FIG. 19, the radial location (from the axis of rotation) of the attachment of the planet axis/axel is different from the radial location of the attachment (1924) to the intermediate rotor core ($A_m$). In one embodiment, the radius ($R_u$) of the ring wheel (1914) is approximately the same as the radius of the stator enclosure ring (1610).

In one embodiment, a transitional plate/ring is used to attach to both the stator enclosure (1610) and the ring wheel (1914) allowing for substantially different radii for stator enclosure and the ring wheel. In one embodiment, this transitional plate ring for the stator is similar to the structure shown for the carrier wheel (1920) in FIG. 19, in that the transitional plate provides the attachment at different radial location. In one embodiment, this transitional plate for the stator is placed between the stator enclosure (1610) and the ring wheel (1914), providing the attachments via its both flat surfaces. In one embodiment, the stator transitional wheel is placed at the same side of both the ring wheel and the stator enclosure, while providing attachments from one of its surfaces facing both the ring wheel and the stator enclosure.

In one embodiment, a transitional plate/ring is used between the main rotary shaft and the sun wheel. In one embodiment, this rotor transitional plate/ring is axially placed between the carrier wheel (1920) and the main rotor shaft (1646). In one embodiment, the rotor transitional plate/ring help match with the radius of the sun wheel. In one embodiment, multiple transitional plates/rings are used to connect the main rotary shaft (1646) and the sun wheel (1910). For example, in one embodiment, two transitional plates/rings are placed on either side of the carrier wheel. The main rotary shaft and the sun wheel are then attached to the rotor transitional plate closest to them, and one (or more) axial rod is used between the rotor transitional plates/rings to transfer the main rotary shaft rotation between the rotor transitional plates/rings. In one such embodiment, the minimum radius of opening at the center of the carrier ring/plate (1920) is reduced below both the sun wheel radius and the main rotary shaft radius, by having the connecting axel between the rotor transition plates have a smaller radius than the minimum radius for the hole in the carrier wheel plate/ring.

Figure 20:
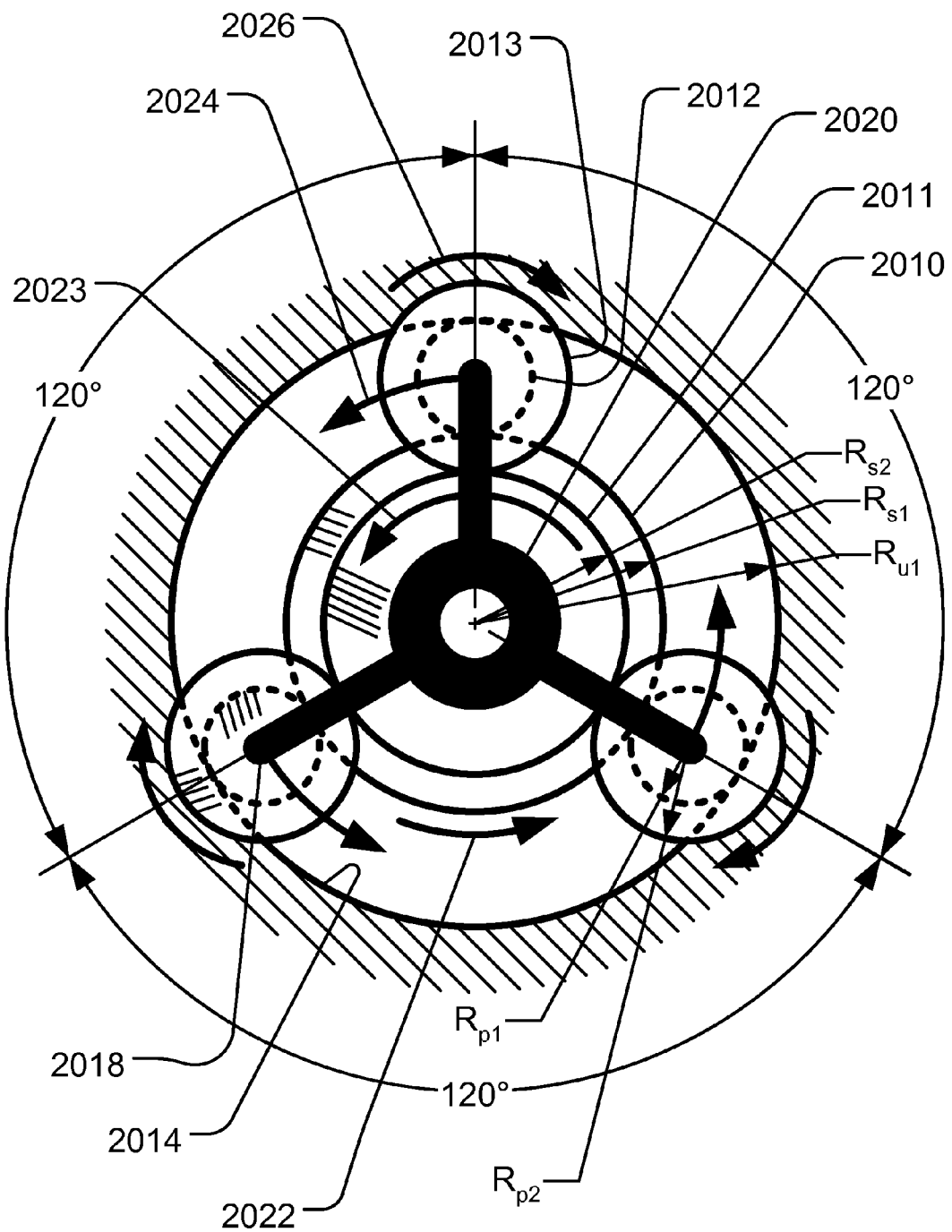
FIG. 20 shows enhanced planetary gear, with multiple sun and planetary radiuses, for an embodiment of our invention.

An embodiment of this invention uses a multiple planet/sun wheels, as illustrated in FIG. 20. In one embodiment, the first set of planet wheels (e.g., 2012) having the radius $R_{p1}$ rotate around the first sun wheel (2010) having the radius $R_{s1}$. In one embodiment, the first set of planetary wheels are confined by a (first) ring wheel (2014) having inner teeth and radius $R_{u1}$. The first set of planets is carried via a carrier wheel (represented by 2020) which attaches to the axel/rod at the center of each planet wheel through a rotational bearing (e.g., 2018). In one embodiment, the first set of planet wheels comprise of three planet wheels (e.g., 2012) approximately evenly distributed around the first sun wheel (2010) (as illustrated in FIG. 20), separated by about 120 degrees. In other embodiments, there are more (or less) planets wheels in the first set of planet wheels. In one embodiment, a second set of planet wheels (e.g., 2013) are placed on the same axis as the corresponding planet wheels in the first set of planet wheel. For example, planet wheel 2013 has the same axis of rotation as planet wheel 2012. In one embodiment, a planet wheel from the second set is constraint to rotate in synch with its corresponding planet wheel from the first set, e.g., by being attached to the same axel/rod or extension of axel/rod at their axis of rotation. In one of such embodiments, the carrier wheel (2020) connects the shared axis of the planet wheels via a rotary bearing (e.g., 2018). The second set of planet wheels (e.g., 2013) rotate around a second sun wheel (2011). In one embodiment, the first and second sun wheels rotate around the same axis of rotation, but they are not rotationally coupled together directly, allowing for different rotational velocities for the sun wheels. The radius of the planets on the second set and the second sun wheel are denotes as $R_{p2}$ and $R_{s2}$, respectively. In one embodiment, there is no ring wheel confining the second set of the planet wheels, as illustrated in FIG. 20. In one embodiment, a second ring wheel confines the second set of planet wheels, however, it is not rotationally affixed to the first ring wheel, i.e., it is allowed to rotate with respect to the first ring wheel (2014).

To determine the relationship between the sun wheels and carrier wheel rotational velocities, consider the rotation of the wheels in the frame of reference of the carrier wheel ($\Omega_{carrier}$). In $\Omega_{carrier}$, assume the rotational velocity (shown by 2026) of a planet wheel (e.g., 2012 or 2013) (around its own axis) is $\omega_p$ (clockwise). Therefore, in $\Omega_{carrier}$, the rotational velocities of the (first) ring wheel (2014), the first sun wheel (2010), the second sun wheel (2011), denoted respectively as $\omega_{u1-rel}$, $\omega_{s1-rel}$, and $\omega_{s2-rel}$ (all positive), are approximately given by:

$$\omega_{u1-rel} = \omega_p \cdot (R_{p1}/R_{u1})(\text{clockwise}) \quad \text{(Eq. 2)}$$

$$\omega_{s1-rel} = \omega_p \cdot (R_{p1}/R_{s1})(\text{counter-clockwise}) \quad \text{(Eq. 3)}$$

$$\omega_{s2-rel} = \omega_p \cdot (R_{p2}/R_{s2})(\text{counter-clockwise}) \quad \text{(Eq. 4)}$$

$\omega_{u1-rel}$ is used as a frame offset to convert the rotational velocities from $\Omega_{carrier}$, to the stator's stationary frame, $\Omega_{ring}$ (i.e., the frame of reference for (first) ring wheel). Therefore, the rotational velocities (in $\Omega_{ring}$) for carrier wheel (2024), the first sun wheel (2022), the second sun wheel (2023), denoted respectively as $\omega_{carrier}$, $\omega_{s1}$, and $\omega_{s2}$ (all positive), are approximately given by:

$$\omega_{carrier} = \omega_{u1-rel}(\text{counter-clockwise}) \quad \text{(Eq. 5)}$$

$$\omega_{s1} = \omega_{s1-rel} + \omega_{u1-rel}(\text{counter-clockwise}) \quad \text{(Eq. 6)}$$

$$\omega_{s2} = \omega_{s2-rel} \omega_{u1-rel}(\text{counter-clockwise}) \quad \text{(Eq. 7)}$$

The above can be rewritten in terms of $\omega_p$:

$$\omega_{carrier} = \omega_p \cdot (R_{p1}/R_{u1})(\text{counter-clockwise}) \quad \text{(Eq. 8)}$$

$$\omega_{s1} = \omega_{p1} \cdot R_{p1} \cdot (1/R_{u1} + 1/R_{s1})(\text{counter-clockwise}) \quad \text{(Eq. 9)}$$

$$\omega_{s2} = \omega_p \cdot (R_{p2}/R_{s2} + R_{p1}/R_{u1})(\text{counter-clockwise}) \quad \text{(Eq. 10)}$$

In one embodiment, $R_{p1} < R_{p2}$ and $R_{s1} > R_{s2}$ (as illustrated in FIG. 20), given that $R_{p1} + R_{s1}$ is approximately the same as $R_{p2} + R_{s2}$ (which is approximately the radial distance of the center of planet wheels to the sun wheels axis of rotation). In one of such embodiments, $\omega_{s1-rel} < \omega_{s2-rel}$ in $\Omega_{carrier}$ frame. Similarly, since both sun wheels rotations experience the same counter-clockwise offset when switching from $\Omega_{carrier}$ frame to $\Omega_{ring}$ frame, in this embodiment we have: $\omega_{s1} < \omega_{s2}$ As in case of single planetary gear system mentioned previously, the ratio of angular velocity between the carrier wheel and the first sun wheel (see Eq. 1) is bigger than factor of two:

$$\omega_{s1}/\omega_{carrier} = (R_{u1} + R_{s1})/R_{s1} = 2 \cdot (1 + R_{p1}/R_{s1}) > 2 \quad \text{(Eq. 11)}$$

$$\omega_{s2}/\omega_{carrier} = (R_{u1}/R_{s2}) \cdot (R_{p2}/R_{p1}) + 1 \quad \text{(Eq. 12)}$$

For the case of $R_{p2} > R_{p1}$, then $\omega_{s2} > \omega_{s1}$ (as mentioned above). This can also be seen from Eq. 12 where $R_{u1} > R_{s1} > R_{s2}$ and $R_{p2} > R_{p1}$; therefore, both $(R_{u1}/R_{u2})$ and $(R_{p2}/R_{p1})$ ratios are bigger than one, and hence, $\omega_{s2}/\omega_{carrier}$ is bigger than 2, as well.

On the other hand, for case of $R_{p1} < R_{p2}$, the ratio $\omega_{s2}/\omega_{carrier}$ may even get close to 1 in extreme cases. This is the case because the second set of planet wheels are not confined by the first ring wheel (stationary), and even if they had been confined by a second ring wheel (as described previously), the second ring wheel would not be stationery with respect to the first ring wheel. The applicable constraint will arise out of the radial location of the planet wheels center, i.e., $R_{s1} + R_{p1} = R_{s2} + R_{p2}$. Therefore, the ratio $\omega_{s2}/\omega_{carrier}$ can be expressed in terms of $(R_{p2}/R_{p1})$ and $(R_{s1}/R_{p1})$ ratios as follows:

$$\omega_{s2}/\omega_{carrier} = 1 + [(2 + R_{s1}/R_{p1}) \cdot (R_{p2}/R_{p1})]/[1 + (R_{s1}/R_{p1}) - (R_{p1}/R_{p1})] \quad \text{(Eq. 13)}$$

For example, if in an extreme case where $(R_{s1}/R_{p1})$ ratio is small, $\omega_{s2}/\omega_{carrier}$ ratio is approximately $(R_{p2} + R_{p1})/(R_{p2} - R_{p1})$ which may have a range of value between 1 (e.g., for small $R_{p1}$) to much higher than 1 when $R_{p2}$ is close to $R_{p1}$.

In one embodiment, the carrier wheel is rotationally attached to the rotational coupler's intermediate rotor, while the second sun wheel is rotationally attached to the main rotor shaft. In one of such embodiments (as described above, for example by using Eq. 13), the ratio of the rotation velocities of the main rotor and the intermediate rotor is set below 2 (i.e., $\omega_{s2}/\omega_{carrier} < 2$). In another one of such embodiments, the ratio of the rotation velocities of the main rotor and the intermediate rotor is set equal or above 2 (i.e., $\omega_{s2}/\omega_{carrier} \geq 2$).

In addition, in one embodiment, the ratio of the angular velocities of the sun wheels (i.e., $\omega_{s2}/\omega_{s1}$) in such a multiple sun/planet system (e.g., as depicted in FIG. 20) is not constrained similarly constrained as in Eq. 1. In an embodiment of this invention:

$$\omega_{s2}/\omega_{s1} = [(R_{p2}/R_{s2} + R_{p1}/R_{u1})]/[R_{p1} \cdot (1/R_{u1} + 1/R_{s1})] \quad \text{(Eq. 14)}$$

To simplify the above, define the planet radius to sun radius ratio factors as the following:

$$\xi_1 = R_{p1}/R_{s1} \quad \text{(Eq. 15)}$$

$$\xi_2 = R_{p2}/R_{s2} \quad \text{(Eq. 16)}$$

Then $\omega_{s2}/\omega_{s1}$ ratio can be rewritten in terms of $\xi_1$ and $\xi_2$ as follows (by assuming that approximately $R_{u1} = R_{s1} + 2 \cdot R_{p1}$):

$$\omega_{s2}/\omega_{s1} = [2 \cdot \xi_1 \cdot \xi_2 + \xi_1 + \xi_2]/[2 \cdot \xi_1 \cdot (\xi_1 + 1)] \quad \text{(Eq. 17)}$$

For example, in one embodiment, having a small $\xi_1$, the ratio $\omega_{s2}/\omega_{s1}$ is large. In one embodiment, having small $\xi_2$, the ratio $\omega_{s2}/\omega_{s1}$ is approximately $0.5/(\xi_1 + 1)$, which has a value range from very low up to 0.5.

Figure 21:
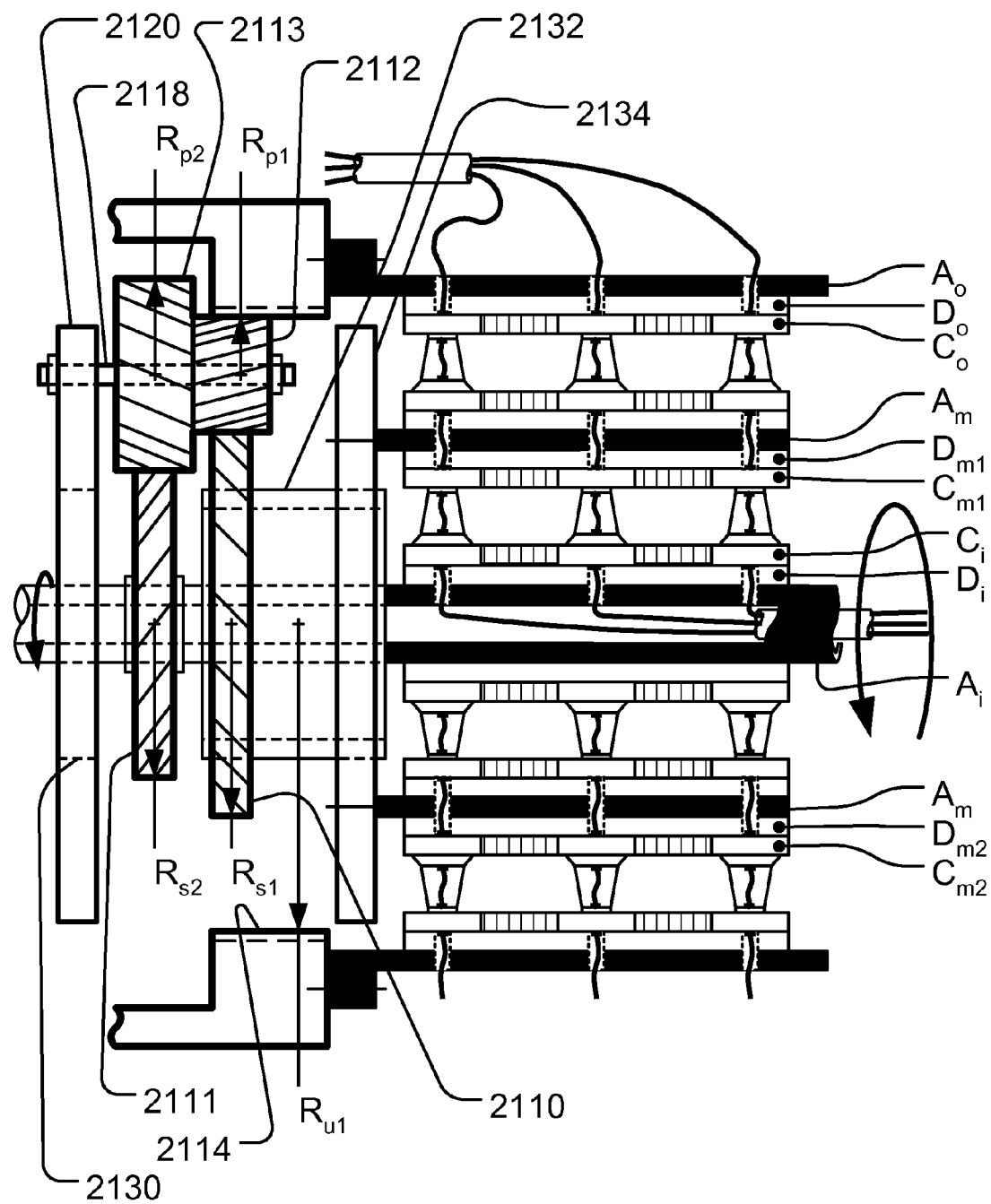
FIG. 21 shows the use with intermediate electrical rotary coupling, corresponding to the FIG. 20, for an embodiment of our invention.

In one embodiment of this invention, as for example depicted in FIG. 21, an electrical rotational coupler is integrated with a multi planet/sun gear system. In one embodiment, the sun wheels of the gear system are rotationally attached to the main rotary shaft ($A_i$) and the core of the intermediate rotor ($A_m$). FIG. 21 shows a cross section of the coupler and the gears along the axis of the rotation of the main rotary shaft. In one embodiment, the first set of planet wheels (having radius $R_{p1}$) (e.g., 2112) is confined by the ring wheel (2114) and they revolve around the first sun wheel (2110) (having radius $R_{s1}$). In one embodiment, the axel/rod (2118) at the axis of the planet wheel (2112) (from the first set of planet wheel) is rotationally attached to that planet wheel, as well as the corresponding planet wheel (2113) from the second set of planet wheels (having radius $R_{p2}$). The second set of planet wheels revolve around the second sun wheel (2111) (having radius $R_{s2}$). In one embodiment, a carrier wheel (2120) is attached to the planet wheels' axel/rod (e.g., 2118) through a rotational bearing located, for example, on the carrier wheel. In one embodiment, the axel/rod (2118) is attached to its corresponding planet wheels (e.g., 2112 and 2113) via a rotary bearing placed radially between the planet wheels and the axel/rod (2118). In such an embodiment, the planet wheels are rotationally locked together by other means (than their axel/rod (2118)), e.g., bolt(s), fusing, glue, forming from one piece, pin(s), and/or welding. In one embodiment, $R_{p1} < R_{p2}$ and $R_{s2} < R_{s1}$ as illustrated in FIG. 21. In one of such embodiments, $\xi_1 < \xi_2$ (see Eqs. 15-16); and therefore, $\omega_{s2}/\omega_{s1} > 1$. This can be seen by rewriting Eq. 17 as below:

$$\omega_{s2}/\omega_{s1} = 1 + (\xi_2 - \xi_1) \cdot (2 \cdot \xi_1 + 1)/(2 \cdot \xi_1 \cdot (\xi_1 + 1)) \quad \text{(Eq. 18)}$$

When $\xi_1 < \xi_2$, then $(\xi_2 \xi_1) > 0$ in Eq. 18, and therefore $\omega_{s2}/\omega_{s1} > 1$.

Conversely, for an embodiment having $\xi_2 < \xi_1$, then $\omega_{s1} > \omega_{s2}$ (according to Eq. 18).

Therefore, as indicated by Eqs. 17-18 and prior discussions, having two independent parameter $\xi_2$ and $\xi_1$ provides wide range of possible $\omega_{s2}/\omega_{s1}$ ratios that is used in various embodiments.

In one embodiment, for example as illustrated in FIG. 21, having $\omega_{s2} > \omega_{s1}$, the second sun wheel (2111) is connected to the main rotary shaft ($A_i$) or its extension, e.g., by bolt(s), pin(s), glue, fusing, welding, surface friction, or clamping. In such an embodiment, the rotational speed of the second sun wheel (2111) becomes the same as that of the main rotary shaft ($A_i$), i.e., $\omega_{s2} = \omega_r$.

In one embodiment, for example as illustrated in FIG. 21, having $\omega_{s2} > \omega_{s1}$, the first sun wheel (2110) is rotationally connected to the core of intermediate rotor ($A_m$). In one embodiment, this connection is provided via an axel extender cylinder (2132) and an intermediate plate/ring (2134), as illustrated in FIG. 21. In another embodiment, with having radius of $A_m$ (from the main rotary shaft axis of rotation) smaller than the radius of the first sun wheel ($R_{s1}$), the extension of the core of intermediate rotor ($A_m$) is directly connected to the first sun wheel (2110). In an embodiment having the axel extender cylinder (2132) and the intermediate plate/ring (2134), the axel extender cylinder (2132) is attached to the first sun wheel (2110), while letting the extension of the main rotary shaft reach the second sun wheel (2111) through a hollow region of the axel extender cylinder (2132). In one embodiment, the axel extender cylinder (2132) is connected at its other face to the intermediate plate/ring (2134) which in turn provides a connection to the core of the intermediate rotor ($A_m$) (or its extension), for example, at approximately the same radius as the intermediate rotor ($A_m$). The connection between the intermediate plate/ring (2134) to the axel extender cylinder (2132) and/or the intermediate rotor ($A_m$) is done by for example, pin(s), bolts, glue, fusing, welding, and/or clamping in various embodiments. In an embodiment, for example as illustrated in FIG. 21, having the first sun wheel rotationally connected to the core of the intermediate rotor ($A_m$), the rotational speed of the first sun wheel will become the same as that of the core of the intermediate rotor, i.e., $\omega_{s1} = \omega_i$.

In one embodiment, as for example illustrated in FIG. 21, $\omega_i < \omega_r$. In one embodiment, $\omega_{s1} = \omega_i$ and $\omega_{s2} = \omega_r$. In one embodiment, $\omega_r - \omega_i$ is adjusted to a fraction of $\omega_r$ based on the sizes of the radii of the sets of planets and sun wheels. In one embodiment, $\omega_r - \omega_i$ is adjusted to a fraction of $\omega_r$ based on the values of $\xi_1$ and $\xi_2$.

In one embodiment, as illustrated in FIG. 21, the carrier wheel (2120) has a ring structure allowing for a clearance for an extension the main rotary shaft to go through it.

In one embodiment, the carrier wheel (2120) is placed between the rotational coupler and the sun wheels (e.g., 2110 and 2111). In such a case, the opening at the center of the carrier wheel is large enough to let the connections/extensions and/or the intermediate axial extensions from Ai and/or Am reach their corresponding sun wheels through the opening in the carrier wheel.

In one embodiment, the second sun wheel is placed closer to the rotation coupler than the first sun wheel (along the axis of rotation for the main rotary shaft). In one embodiment, $R_{p1} > R_{p2}$, $\xi_2 < \xi_1$, and $\omega_{s1} > \omega_{s2}$. One embodiment is illustrated by FIG. 21 having the following modifications: reversing the labels "1" and "2" for sun wheels and planet wheels, increasing the radius of the ring wheel and shifting the ring wheel to confine the planet wheel(s) having the larger radius (i.e., with modified label "1").

In an embodiment of this invention, a rotational fluid coupler is integrated with planetary gear to provide multi stage fluid exchange sub-compartments. For example, in one embodiment, the sub-compartments (for a given fluid flow) are radially stacked (from the axis of rotation of main rotary shaft). In one embodiment, e.g., having the radially distributed sub-compartments for fluid exchange reduce the relative rotational speed of the sub-compartments at each stage, provide improved sealing and integrity to the rotational coupler, reduce the total rotational friction or torque transfer (due to the reduced relative angular velocity at each stage of fluid coupling), and/or improve the life time of the rotational coupler by reducing the wear and tear associated with the rotation of the components in the coupler at a lower relative rotational velocities.

Structure of Blade Bearing Between Blade Pieces

In an embodiment of this invention, there are multiple middle blade pieces stack on each other and placed between the bottom and top blade pieces. Note that, for illustration purposes only and for simplicity, FIGS. 70(*a*)-(*e*) depict one middle blade piece; however in similar embodiments, the number of middle blade pieces may be increased, and the blade will have one or multiple middle pieces.

In one embodiment of this invention, as depicted in FIG. 70(*f*), a blade bearing is provided between subsequent blade pieces (e.g., Piece N and Piece N+1). The blade bearing allows Piece N and Piece N+1 to rotate with respect to each other. For one embodiment, a more detailed view of the blade bearing is illustrated in FIG. 70(*f*). In one embodiment, the blade bearing withstands the compressive and tensile force (e.g., due to the weight of blade pieces supported at the blade bearing and the centrifugal force), sheer stress (e.g., due to the weight of blade pieces when the blade is held horizontally), and stress from torque (e.g., due to lift and drag forces on the airfoil).

In one embodiment, as depicted in FIG. 70(*i*), the blade bearing has a ring shape structure, having a top portion of the blade bearing locked into a bottom portion of the blade bearing, restricting their relative lateral and perpendicular movements, while allowing their relative rotational movement about the axis of the ring. In an embodiment, as depicted in FIG. 70(f), the top portion of blade bearing is connected (e.g., by bolts) to blade Piece N+1 and the bottom portion of the blade bearing is connected to blade Piece N. In one embodiment, an extension of the top (or bottom) portion of the blade bearing trapped within a cavity within the bottom (or top) portion of the blade bearing to restrict the lateral and vertical movements of the portions. In one embodiment, cylindrical and/or spherical bearings are placed between the extension of the top (or bottom) portion and the cavity walls within the bottom (or top) portion to provide rotational movements between the portions, while the portions may be under various stress forces from different directions. For example, as illustrated in FIG. 70(f) detailed view, in one embodiment, the bearings are placed under the extension of the top portion to provide rotational movement while under the compression force between the blade pieces. Similarly, in one embodiment, the bearings are placed above the extension of the top portion to provide rotational movement while under the tensile stress or the centrifugal force trying to pull blade pieces apart. Similarly, in one embodiment, the bearings are placed at the sides of the extension of the top portion to provide rotational movement while sheer stress due to weight or torque trying to pull blade pieces apart. In one embodiment, as depicted in FIG. 70(i), the diameter of the blade bearing (ring) is large enough to withstand the torque against the blade pieces. In such a case, for example, the left side of the blade bearing may experience compression stress, while the right side may experience tensile stress. The larger the diameter of the blade, the larger torque it can withstand for the same amount of compression and tensile stress.

Figures 70G, 70H:
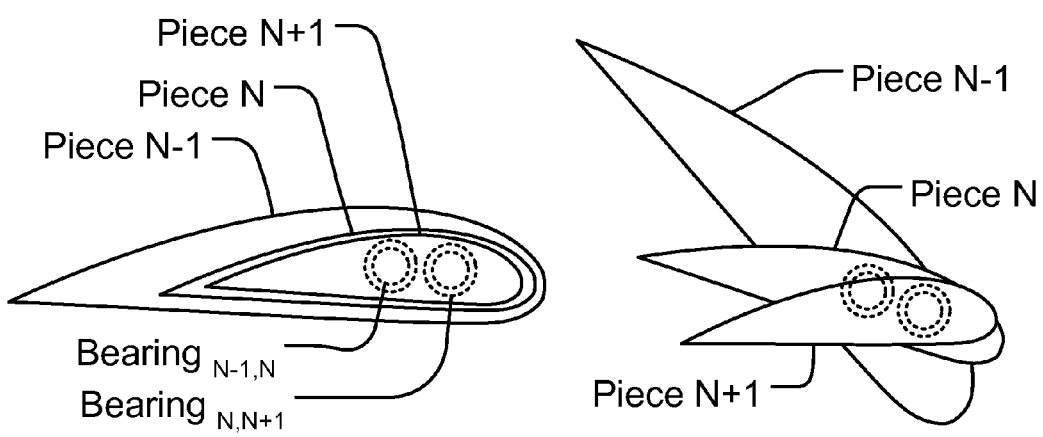
Figure 70I:
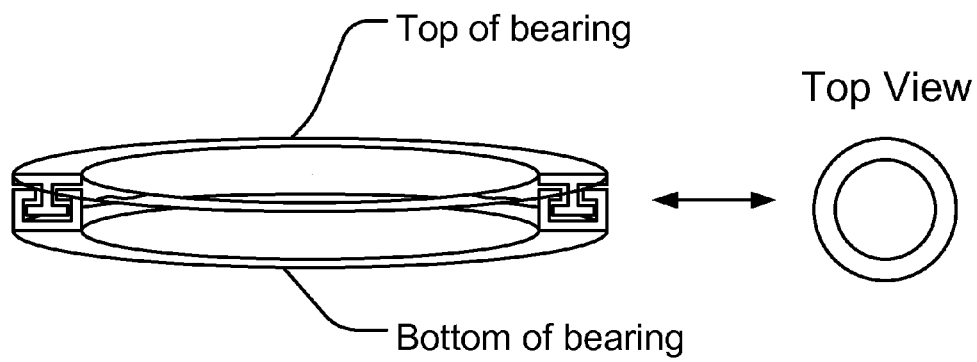
Figure 70J:
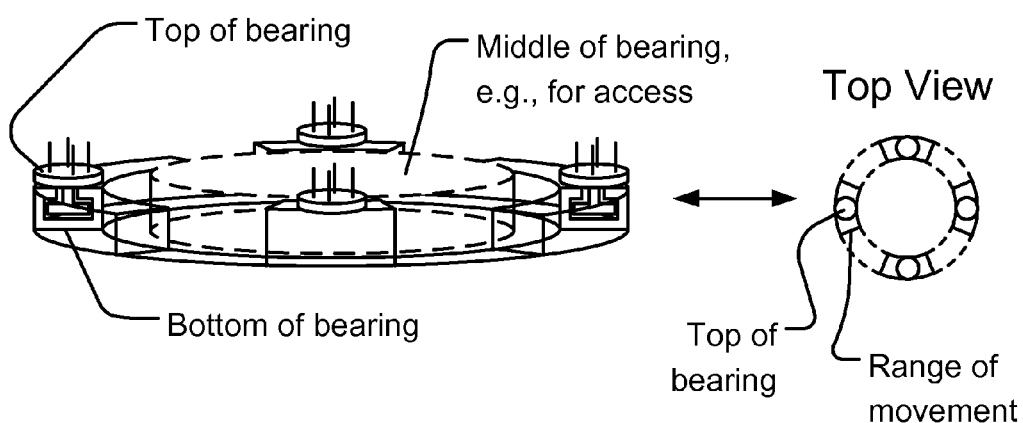
Figure 71A:
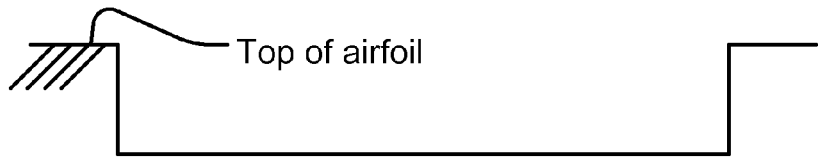
FIGS. 71(a)-(g) show nozzle or ridge or holes cross sections, on the blade or tower, with various patterns, for patterning the air flow, as planned, for optimization, for an embodiment of our invention.
Figure 71B:
Figure 71C:
Figure 71D:
Figure 71E:
Figure 71F:
Figure 71G:
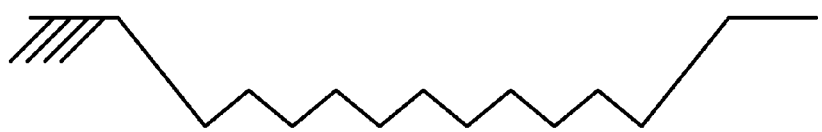

In an embodiment of this invention, as depicted in FIG. 70(j), the blade bearing has a structure of sub-ring, i.e., it does not have full ring portions for the top and/or bottom portions. In one embodiment, the top portion of the blade bearing includes one or more stubs that are affixed (e.g., via bolts) to blade Piece N+1. The stubs have an extension that is trapped within a cavity of the bottom portion of blade bearing. The bottom portion of the blade bearing, in one embodiment, includes one or more sub-ring structures that limit the movement of the stub to a predefined angle ranges. The housing of the sub-ring prevents the movement of the stub beyond the ends of the sub-ring. In one embodiment, having a sub-ring type blade bearing between the blade pieces, the blade bearing limits the rotation of the blade pieces with respect to each other to a predefined range. Similar to a ring-type blade bearing, in an embodiment, a sub-ring type has multiple ball bearing or cylindrical bearing between the bottom (or top) portion and the extension of the top (or bottom) portion of the blade bearing.

In one embodiment, as illustrated in FIGS. 70(i)-(j), the middle of the blade bearing is open for access between the blade pieces, e.g., for electrical, mechanical, fluid, and optical access.

In an embodiment, as depicted in FIGS. 70(g)-(h), multiple blade bearings are used for multiple blade pieces. For example, a blade bearing denoted as Bearing$_{N-1, N}$ is placed between blade piece N−1 and blade piece N, and a blade bearing denoted as Bearing$_{N, N+1}$ is placed between blade piece N and blade piece N+1. In one embodiment, multiple blade bearings do not share an axis of rotation. In one embodiment, the axes of rotation of the multiple blade bearings are approximately parallel.

FIG. 70(h) depicts an embodiment of this invention, where the blade pieces are rotated with respect to each other based on their respective common blade bearing locations. In one embodiment, when the axes of the rotation of multiple blade bearings are not the same, as illustrated in FIGS. 70(g)-(h), the rotation about these bearings may result in a lateral offset between non-consecutive blade pieces (e.g., Piece N−1 and Piece N+1), as illustrated in FIG. 70(h). This provides additional degree of freedom in arranging and optimizing the structure/shape of the blade pieces, as well as, dynamically optimizing the rotation of the pieces based of factors including the environment factors (e.g., wind speed).

The teachings above can also be applied for car roofs or other types of vehicles in different medium/fluid, e.g. water or underwater.

Note that for this disclosure, CCW means counter-clockwise, and CW (in figures or text) means clockwise. The features (e.g. dimples) can be formed by molding, casting, glued, or screwed to the surfaces, such as attaching to the blades.

Anything we taught here can be applied to any blades, wings, or airfoils, interchangeably. These inventions/teachings also apply to any wind turbines, windmills (big, small, vertical, horizontal, on ground, floating in the air, or in the sea), wind energy electric generators, wind farms, or similar structures, interchangeably.

We can combine any of the two or more embodiments in this disclosure. The variations of the teachings above are also meant to be covered under this patent disclosure.

The invention claimed is:

1. A wind turbine or wind mill, comprising:
a rotor;
wherein said rotor comprises one or more blades and a hub;
a tower;
a shaft; and
one or more nozzles or openings on said one or more blades;
wherein a fluid, air, or mixture is sent out of said one or more nozzles or openings onto said one or more blades;
wherein said one or more nozzles or openings are connected to one or more supplies of fluid, liquid, gas, mixture, powder, chemical compound, pure gas, air, open air, liquid air, pressurized fluid, or mixed gasses, through one or more pipes, conduits, or gaps;
wherein said one or more nozzles or openings are connected to a valve, manifold, cap, cover, diaphragm, plate, shutter, or regulator;
wherein said one or more nozzles or openings comprises at least two nozzles or openings;
wherein a first of said one or more nozzles or openings are connected to a second of said one or more nozzles or openings, directly or indirectly, through a valve, manifold, cap, cover, diaphragm, plate, shutter, regulator, pipe, conduit, or gap;
wherein said one or more nozzles or openings are cone shaped, spiral shaped, telescopic structure, retractable, line source, point source, circular shaped, spherical shaped, cylindrical shaped, rectangular shaped, or square shaped;
a sensor, measuring device, or camera;
a controller;
an analyzer;
an optimizer;
wherein said controller directs operation of said one or more nozzles or openings and operation of parts in said wind turbine or wind mill;

wherein said sensor, measuring device, or camera is connected to said analyzer;

wherein said sensor, measuring device, or camera sends sensor or measurement data to said analyzer;

said analyzer processes said sensor or measurement data;

said analyzer sends said processed sensor or measurement data to said optimizer;

said optimizer adjusts one or more system parameters, based on said processed sensor or measurement data;

said optimizer sends said adjusted one or more system parameters to said controller;

wherein, based on said adjusted one or more system parameters, said controller adjusts a first fluid pressure around said first of said one or more nozzles or openings and adjusts a second fluid pressure around said second of said one or more nozzles or openings, using a hinge, slider, cover, cap, motor, pulley, string, chain, or rod, on said one or more nozzles or openings;

wherein, based on said adjusted one or more system parameters, said controller adjusts cross sectional profile of said one or more blades around said first of said one or more nozzles or openings, to modify fluid flow around said first of said one or more nozzles or openings, to modify said first fluid pressure around said first of said one or more nozzles or openings, with respect to said second fluid pressure around said second of said one or more nozzles or openings;

and one or more components from following list: a pitch adjuster, low speed shaft or axis, gear box, generator, anemometer, wind vane, nacelle, high speed shaft, yaw drive, yaw motor, one or more brakes, or one or more batteries for storage.

2. The wind turbine or wind mill as recited in claim 1, wherein said one or more nozzles or openings are connected to an ionizer.

3. The wind turbine or wind mill as recited in claim 1, wherein air or fluid is sucked in from around said one or more blades into said one or more nozzles or openings.

4. The wind turbine or wind mill as recited in claim 1, wherein said one or more nozzles or openings are connected to a pump or motor.

5. The wind turbine or wind mill as recited in claim 1, wherein said one or more nozzles or openings are connected to a heating or cooling unit.

6. The wind turbine or wind mill as recited in claim 1, wherein said one or more nozzles or openings are connected to one or more tanks, capsules, cylinders, storages, containers, or repositories, for gas, liquid, or fluid.

7. The wind turbine or wind mill as recited in claim 1, wherein said first of said one or more nozzles or openings and said second of said one or more nozzles or openings are on the same side of a first of said one or more blades.

8. The wind turbine or wind mill as recited in claim 1, wherein said first of said one or more nozzles or openings and said second of said one or more nozzles or openings are on the opposite sides of a first of said one or more blades.

9. The wind turbine or wind mill as recited in claim 1, wherein said first of said one or more nozzles or openings and said second of said one or more nozzles or openings are positioned parallel to each other.

10. The wind turbine or wind mill as recited in claim 1, wherein said first of said one or more nozzles or openings and said second of said one or more nozzles or openings are positioned not-parallel to each other.

11. The wind turbine or wind mill as recited in claim 1, wherein said one or more blades have a mechanism or motor to change angle of said one or more nozzles or openings with respect to surface of said one or more blades.

12. The wind turbine or wind mill as recited in claim 1, wherein said one or more blades have a motor or a mechanism to retract in said one or more nozzles or openings.

* * * * *